United States Patent [19]

Kamigaki et al.

[11] Patent Number: 5,025,441
[45] Date of Patent: Jun. 18, 1991

[54] KEY TELEPHONE SYSTEM

[75] Inventors: Masaharu Kamigaki; Hironobu Oshikata, both of Tokyo; Yoshihiro Kawata, Saitama; Nobuyasu Shiga, Tokyo; Hideharu Omori, Tokyo; Masayuki Kawashima, Tokyo; Toshimichi Shimatani, Tokyo, all of Japan

[73] Assignee: Iwatsu Electric Company, Ltd., Tokyo, Japan

[21] Appl. No.: 291,442

[22] Filed: Dec. 28, 1988

[30] Foreign Application Priority Data

Dec. 28, 1987 [JP] Japan ................................ 62-332162
Dec. 28, 1987 [JP] Japan ................................ 62-332163
Dec. 29, 1987 [JP] Japan ................................ 62-336654
Dec. 29, 1987 [JP] Japan ................................ 62-336655
Dec. 30, 1987 [JP] Japan ................................ 62-336559

[51] Int. Cl.$^5$ ................................................ H04J 3/00
[52] U.S. Cl. ..................................... 370/77; 379/156; 370/112; 370/62; 370/29
[58] Field of Search ....................... 370/58.1, 58.2, 60, 370/94.1, 110.1, 62, 29, 77, 112; 379/220, 158, 157, 164, 156

[56] References Cited

U.S. PATENT DOCUMENTS

| | | | |
|---|---|---|---|
| 4,061,880 | 12/1977 | Collins et al. | 370/62 |
| 4,442,321 | 4/1984 | Stehman | 379/220 |
| 4,644,535 | 2/1987 | Johnson et al. | 370/58 |
| 4,658,398 | 4/1987 | Hsing | 370/62 |
| 4,805,165 | 2/1989 | Kawamura | 370/112 |
| 4,831,618 | 5/1989 | Bruce | 370/62 |

Primary Examiner—Douglas W. Olms
Assistant Examiner—Christopher O. Edwards
Attorney, Agent, or Firm—Oblon, Spivak, McClelland, Maier & Neustadt

[57] ABSTRACT

A key telephone system for use in PCM telecommunications includes an office line communication units, an extension interface unit, a receiving unit, an extension communication unit, and an information transmitting and receiving unit. The system further includes a timing setting unit for setting the timings for transmitting and receiving information from and to each of the office line communication unit, the extension interface unit, the receiving unit, the extension communication unit, and the information transmitting and receiving unit in which downstream information, which is applied from the extension interface unit to a plurality of terminal units, contains a start bit, bits expressive of data information, and bits expressive of parity information in each of a plurality of frames, contains bits expressive of control information in at least one of the frames, and contains frame-synchronization information for achieving the synchronization of frames in at least one of the frames, and upstream information, which is applied from the terminal units to the receiving unit, contains the bits expressive of the data information, the bits expressive of the parity information, and the bits expressive of the control information, and one of the downstream and upstream information is sent in the former half of each of the frames, and the other thereof is sent in the latter half thereof.

7 Claims, 105 Drawing Sheets

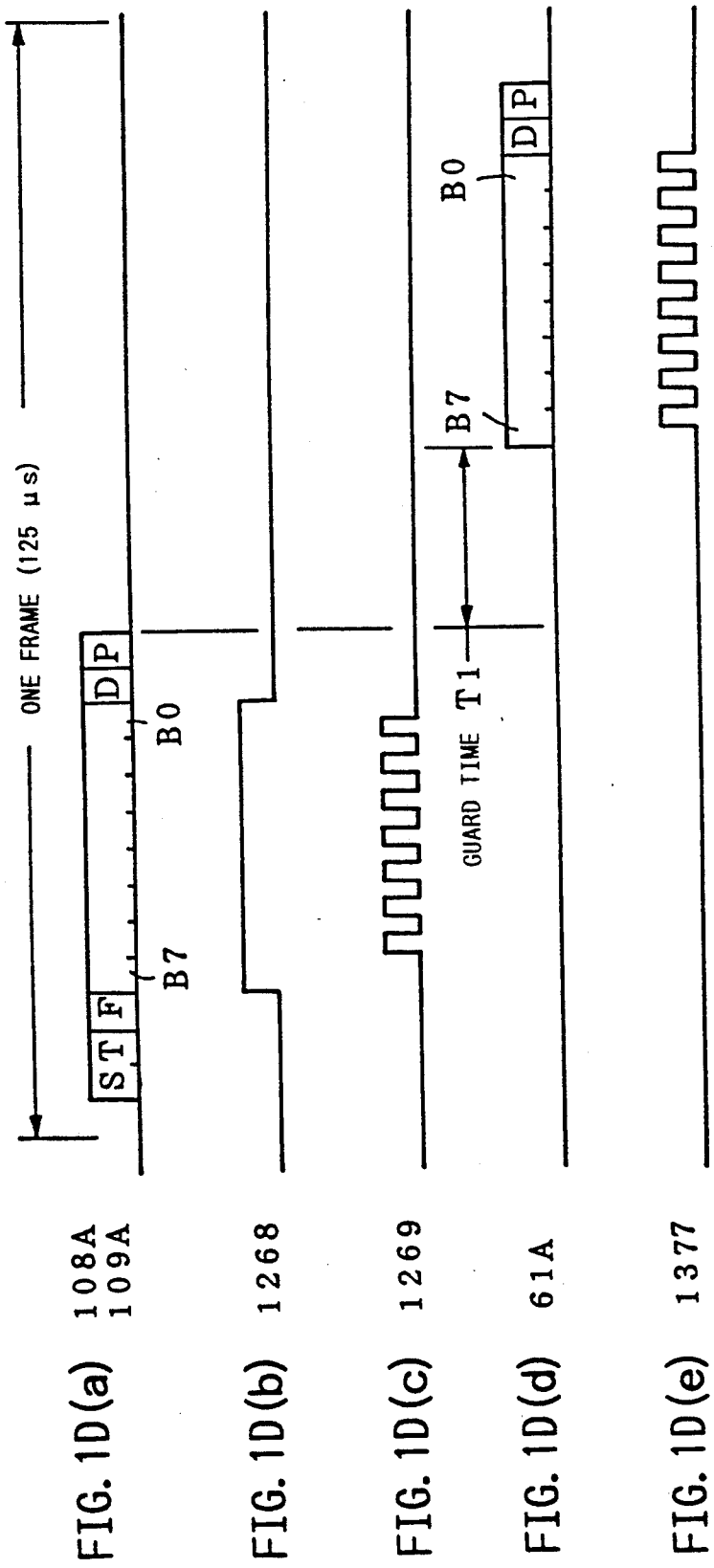

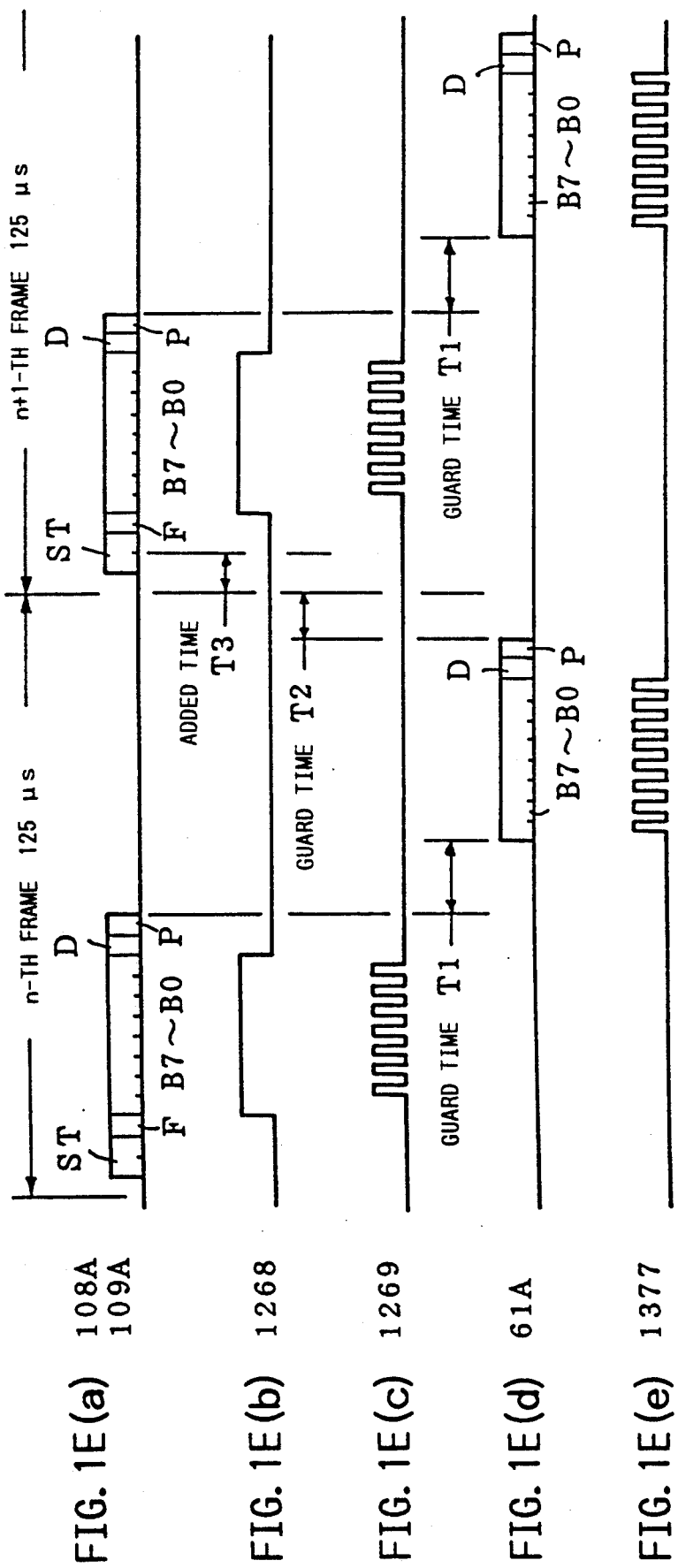

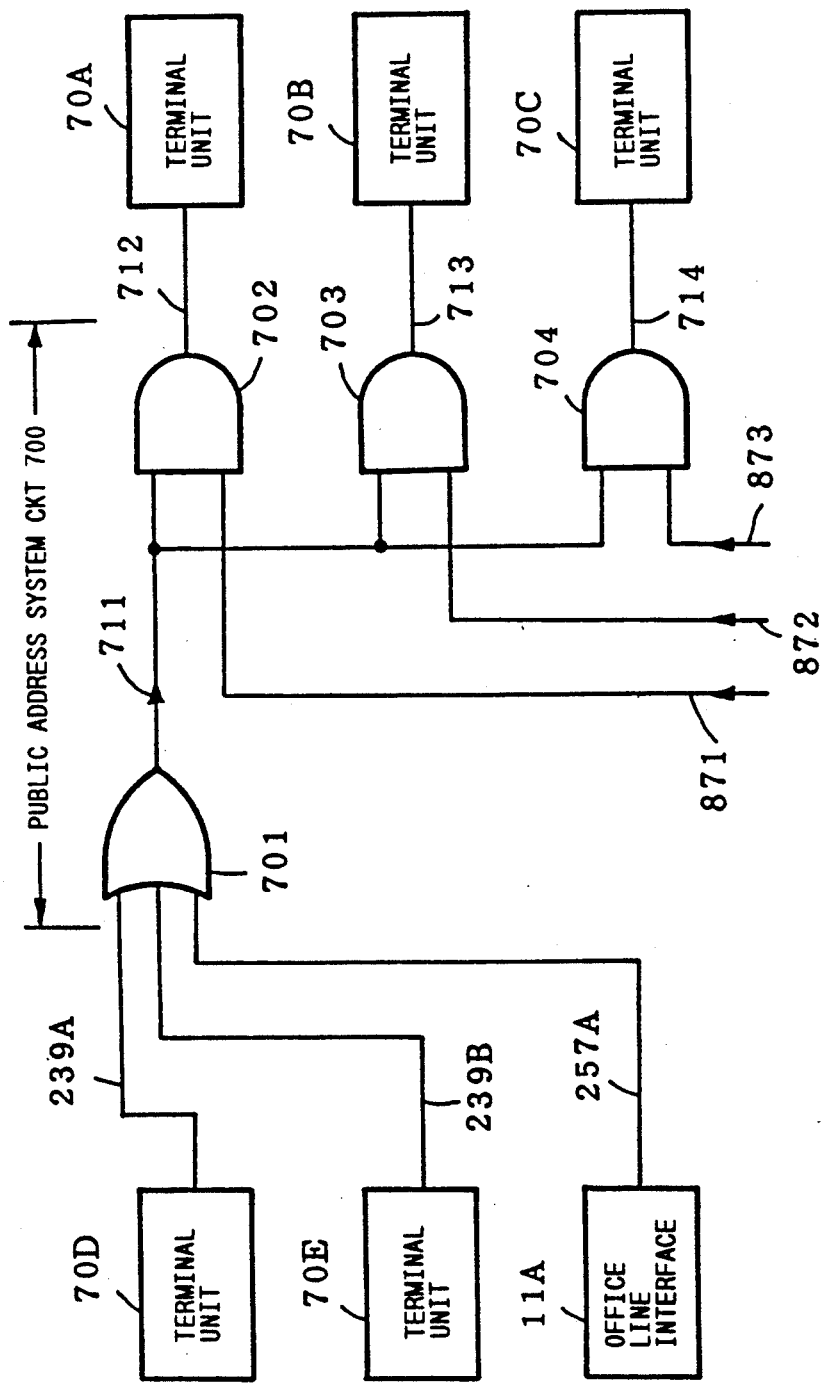

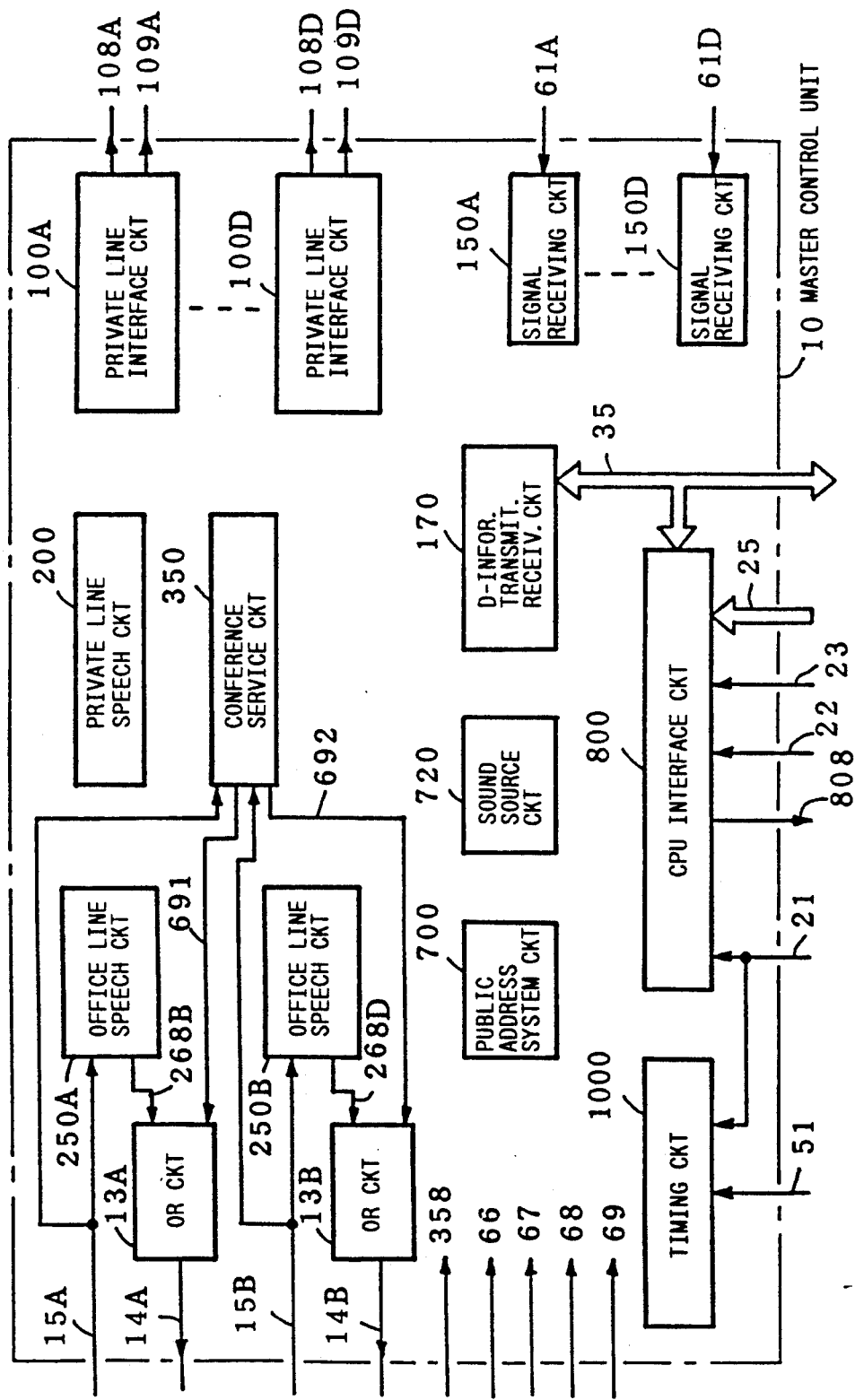

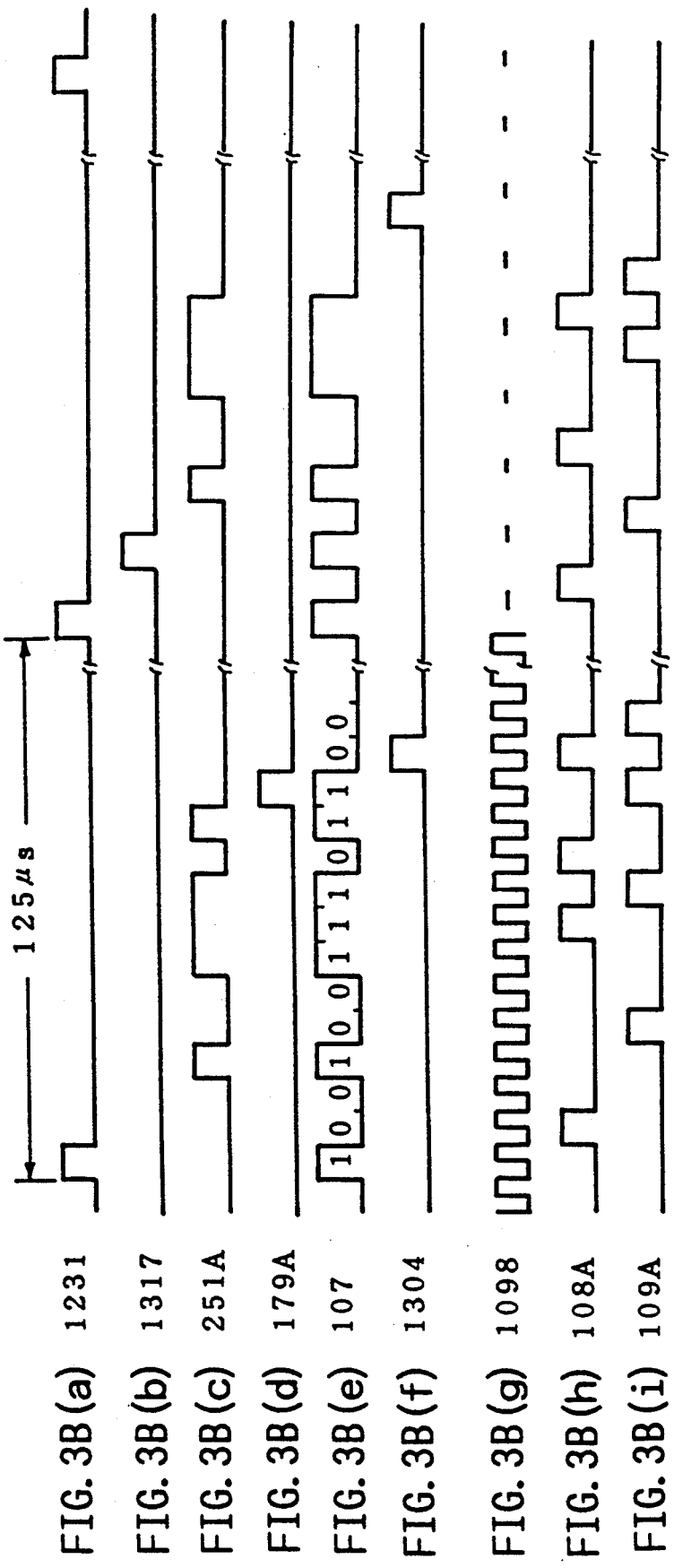

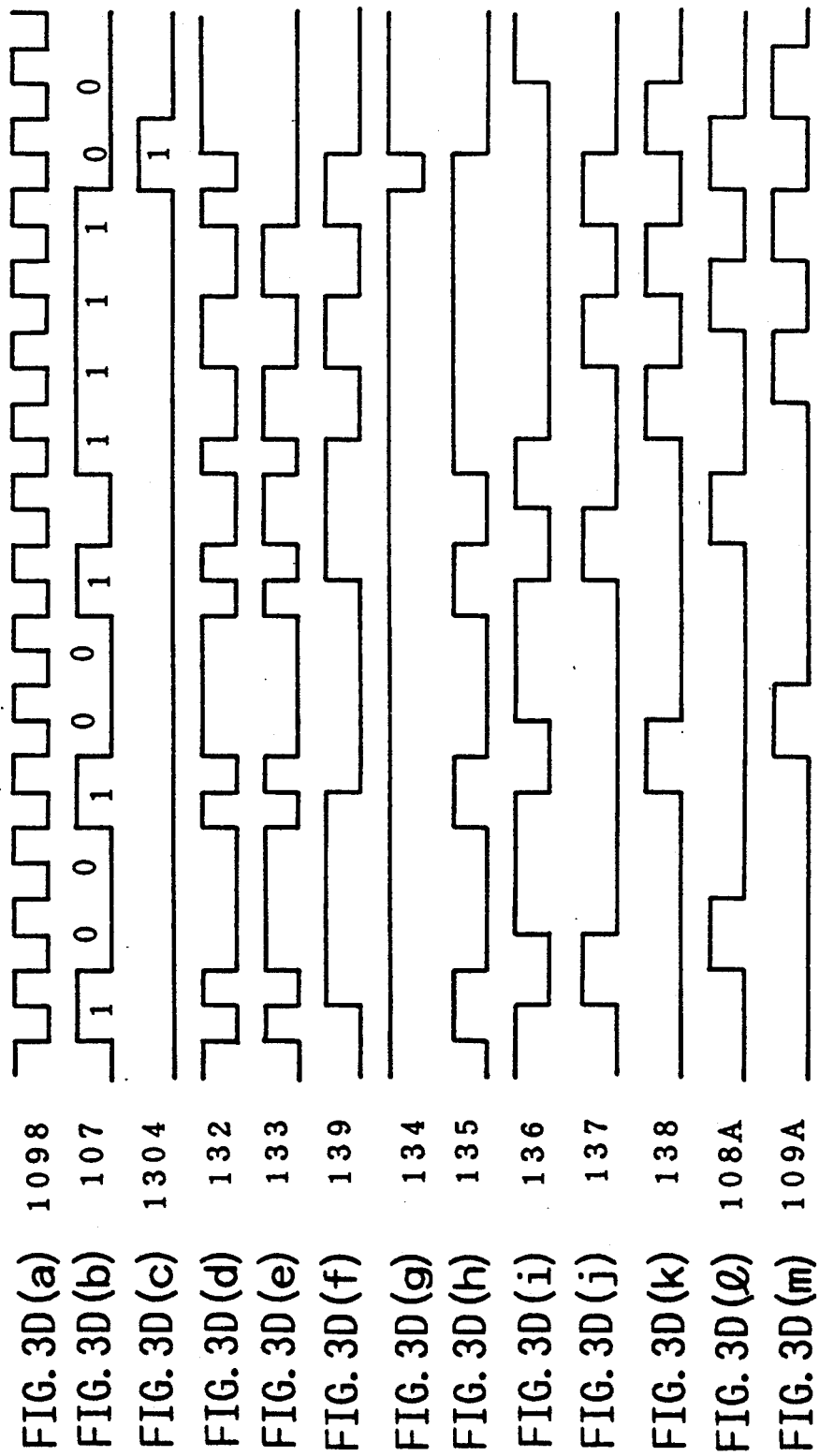

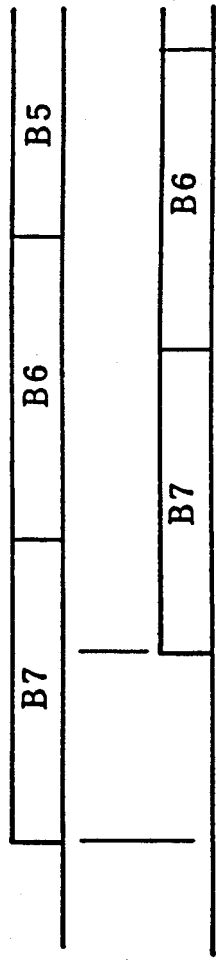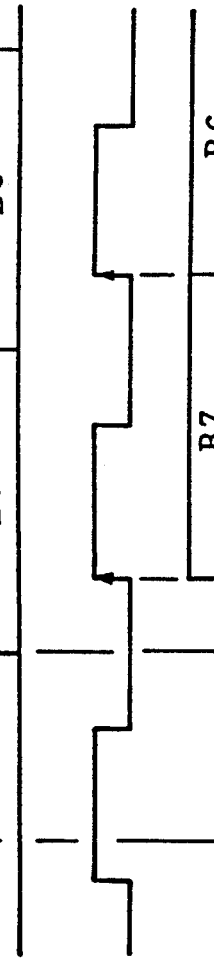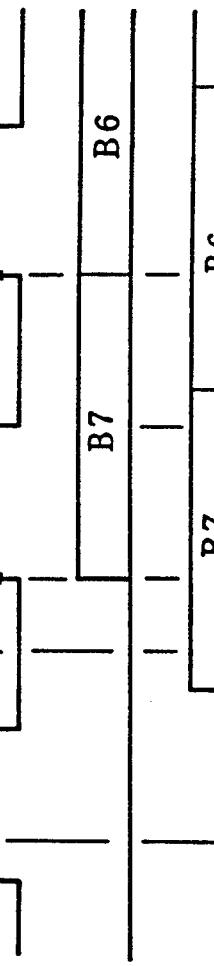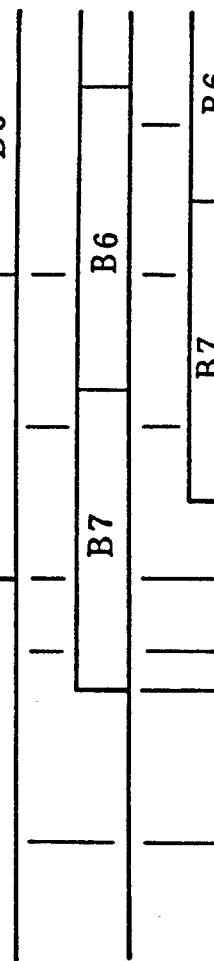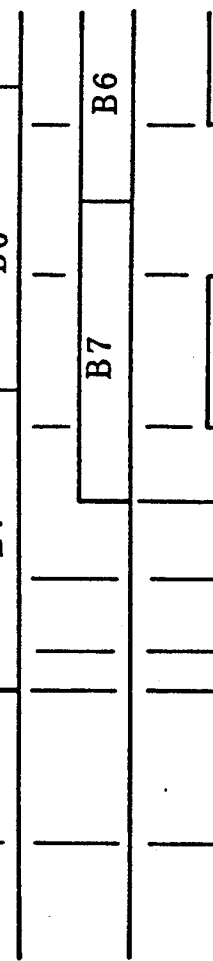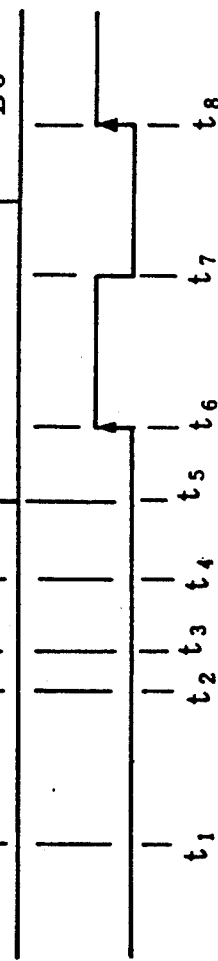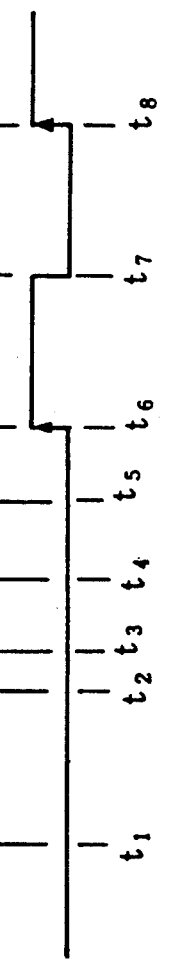
FIG. 4B(a) 61A (0 m)
FIG. 4B(b) 61A ($\ell_1$ m)
FIG. 4B(c) 1376
FIG. 4B(d) 161
FIG. 4B(e) 61A ($\ell_2$ m)
FIG. 4B(f) 61A ($\ell_3$ m)
FIG. 4B(g) 1377

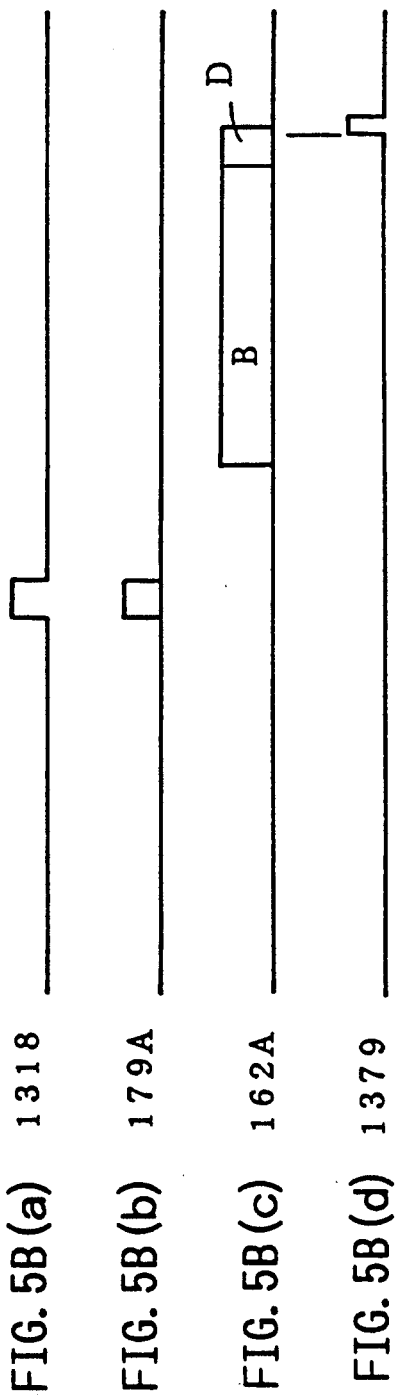

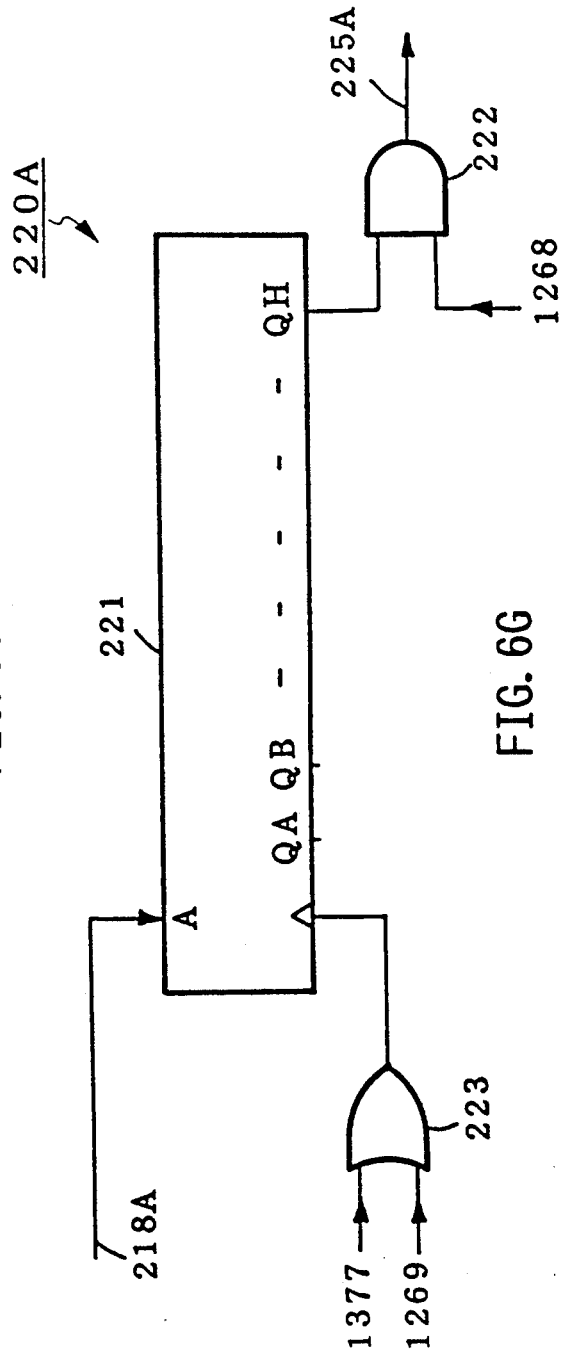
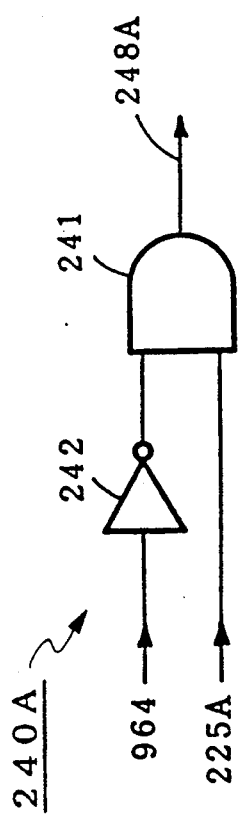
FIG. 6C
FIG. 6G

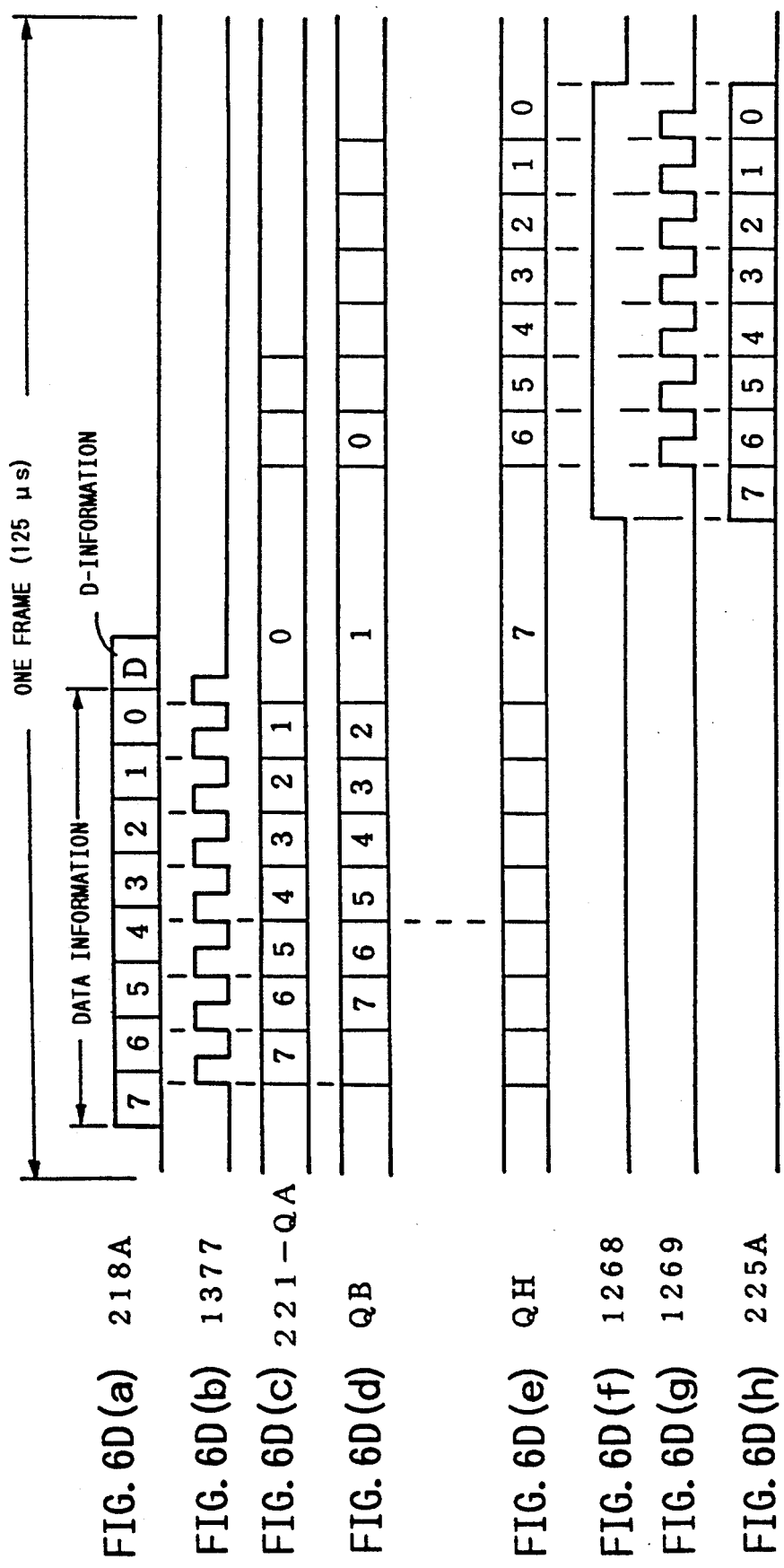

| 329 | 298 |
|---|---|
| "1" | 328 |
| "0" | 268B |

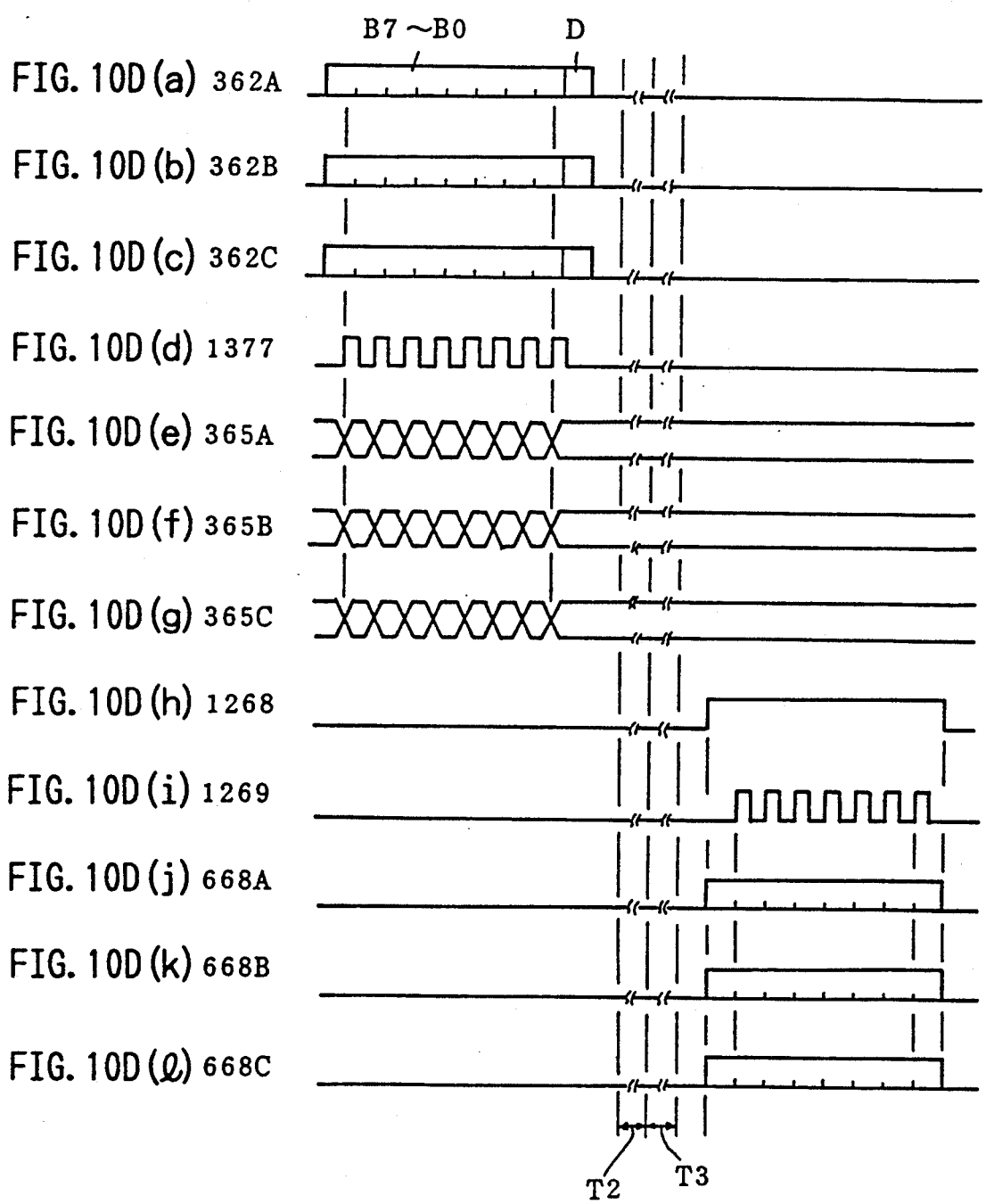

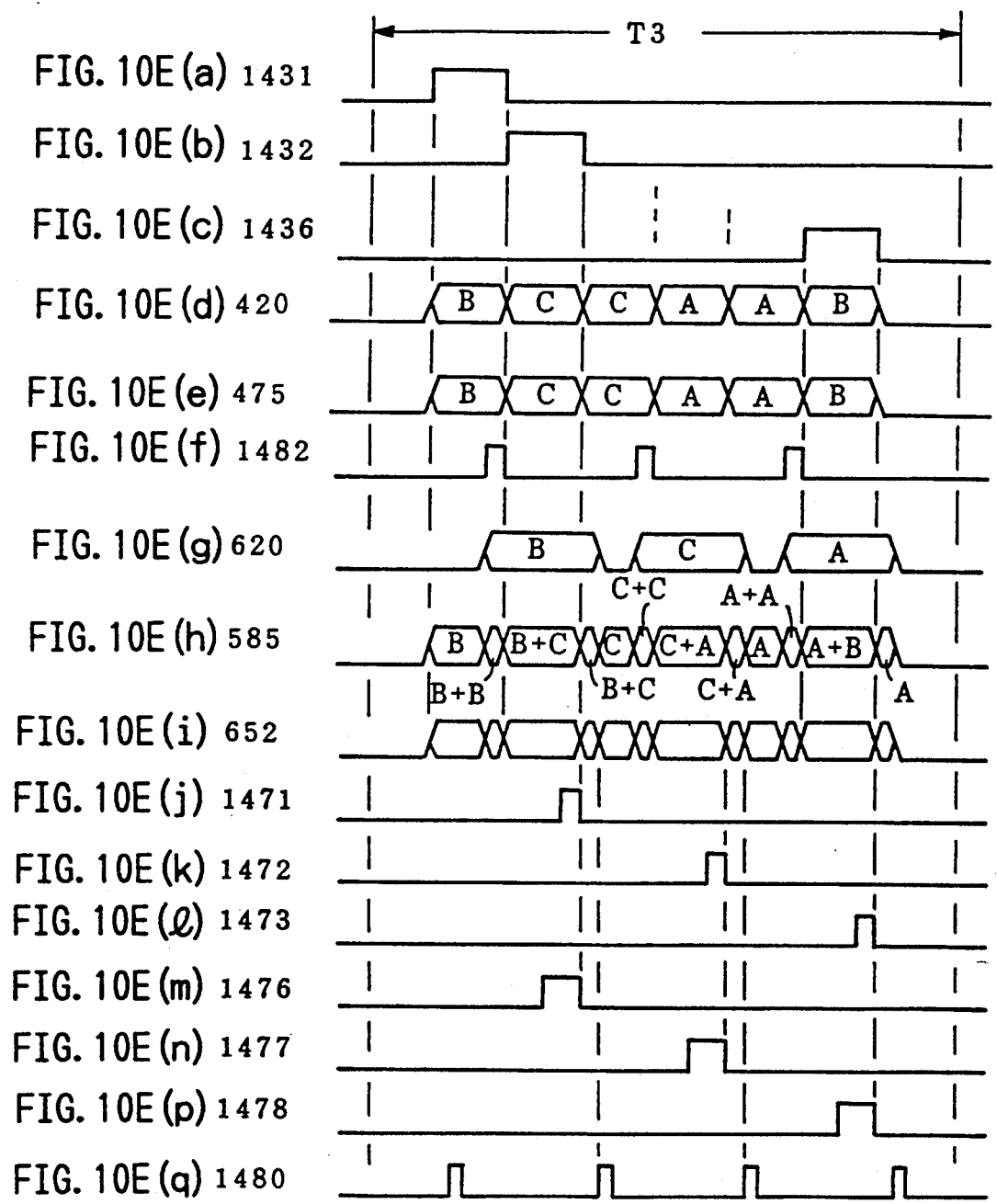

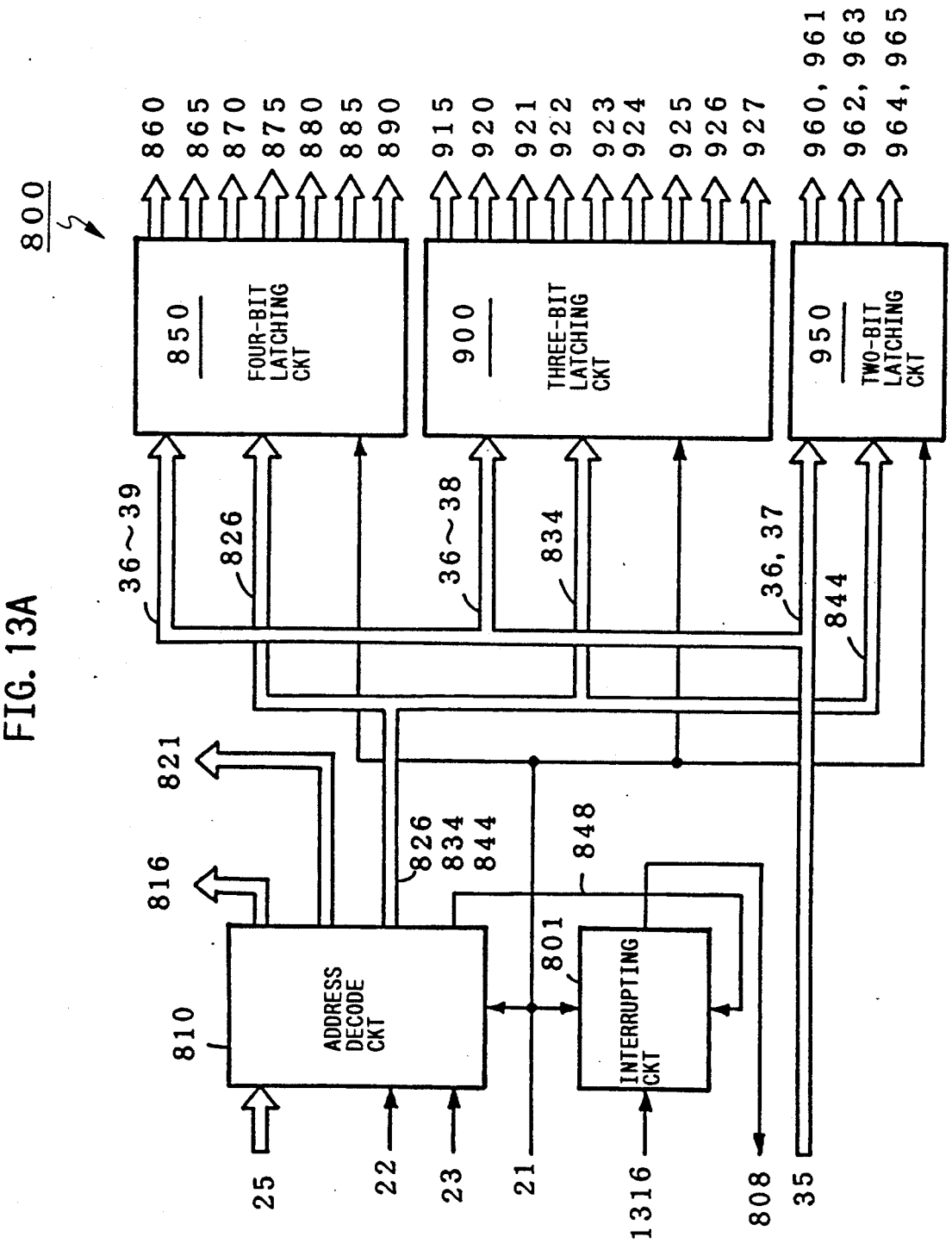

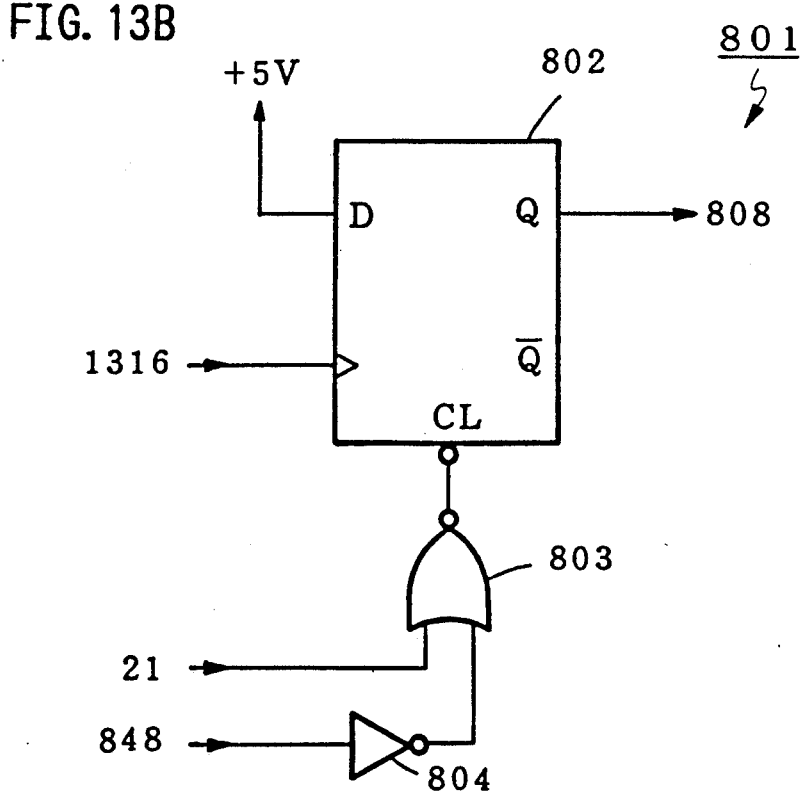
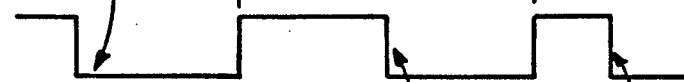

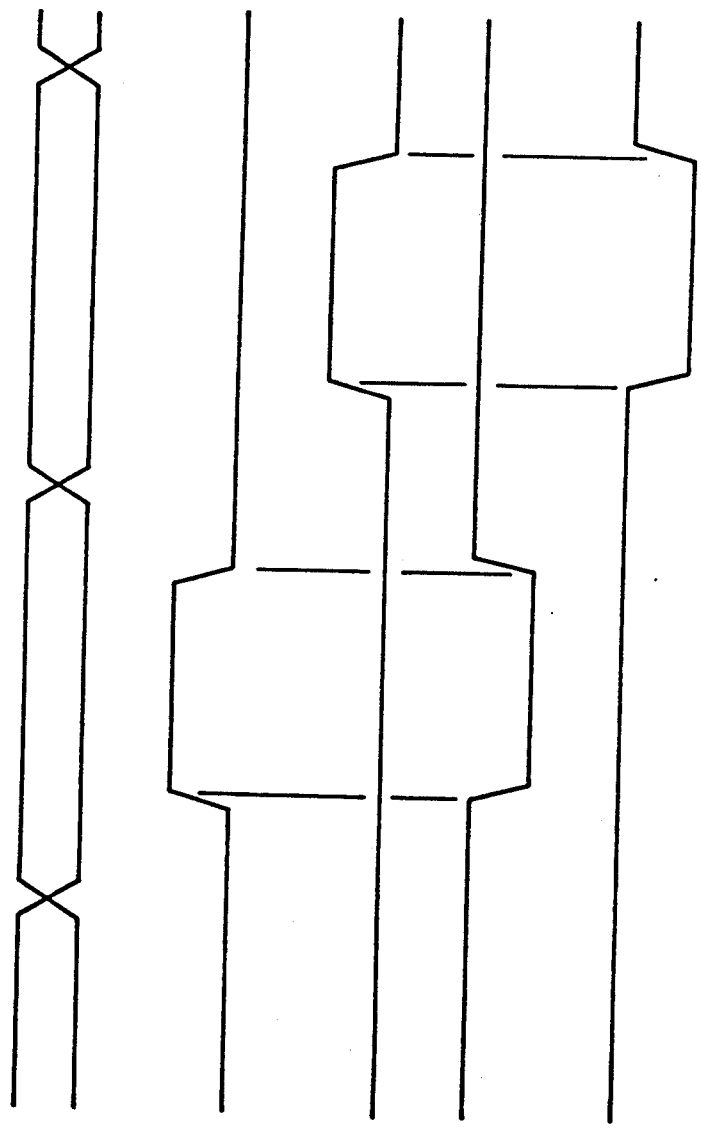

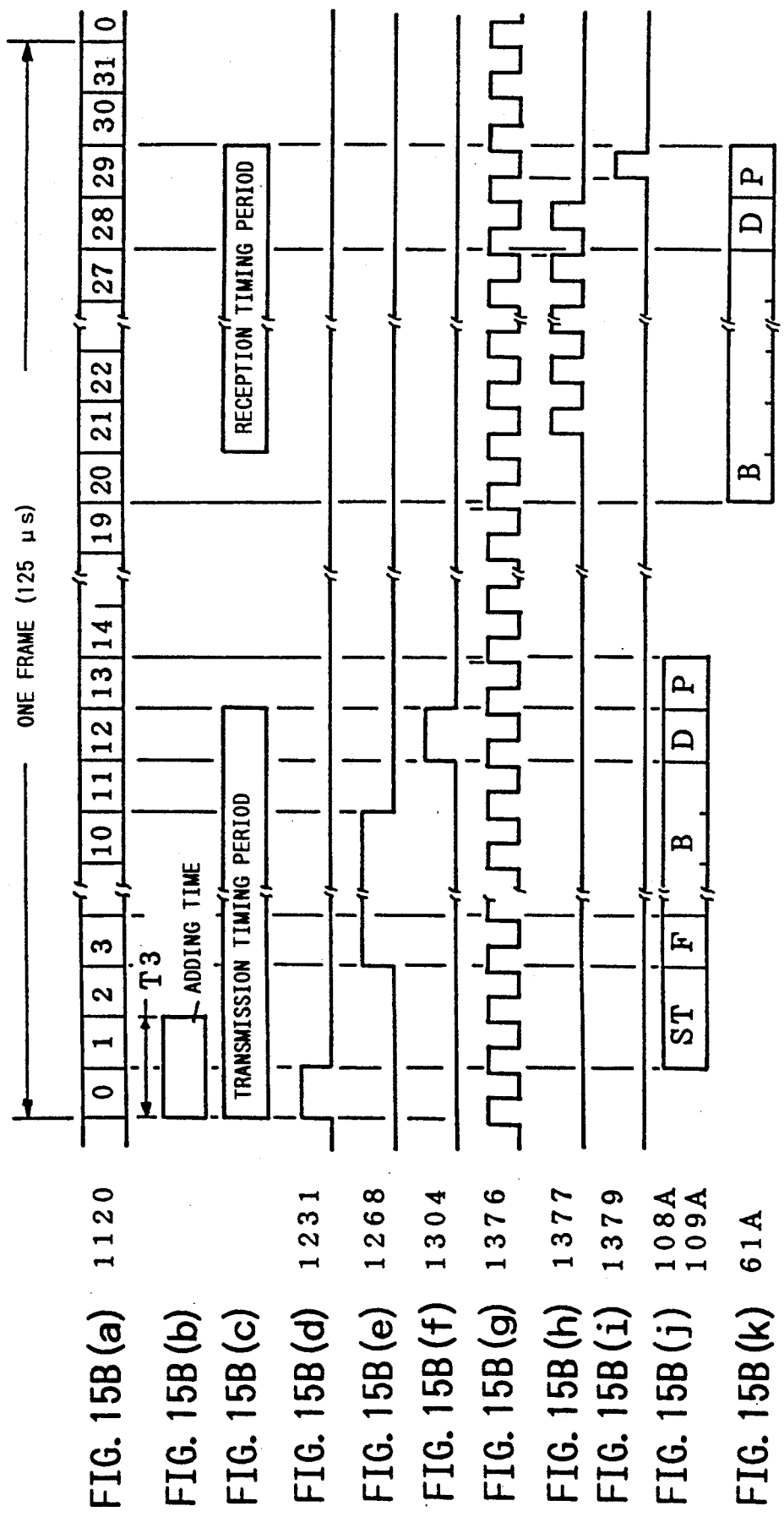

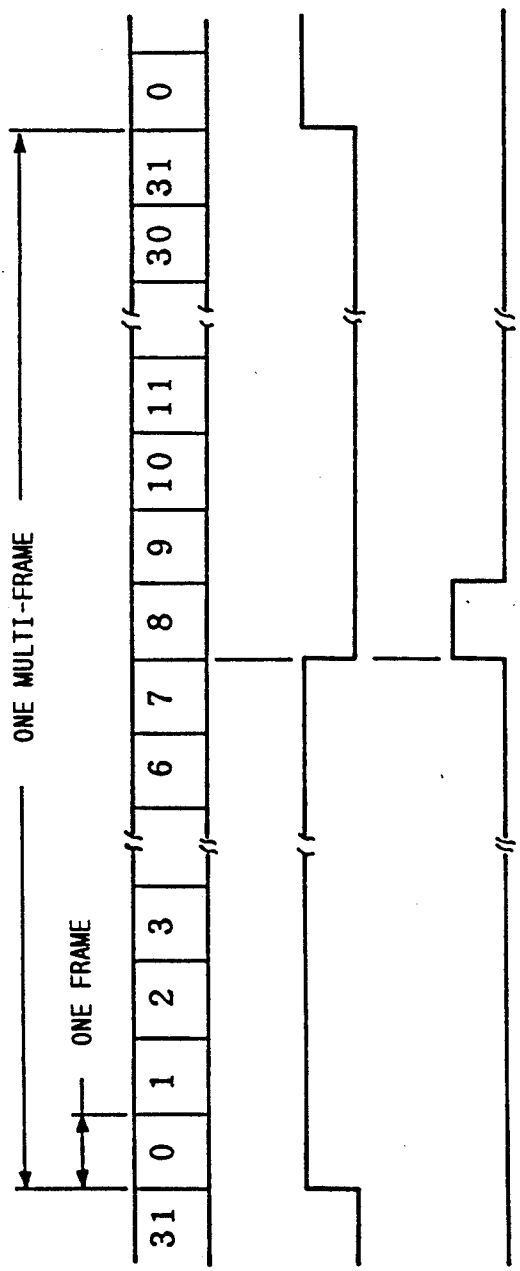

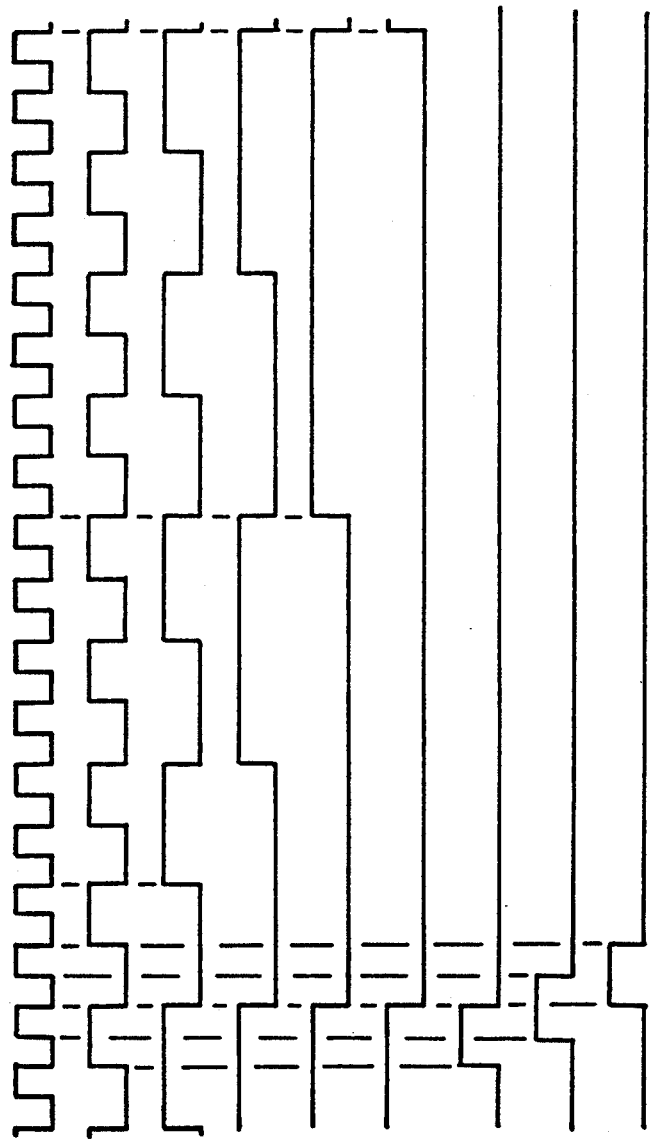

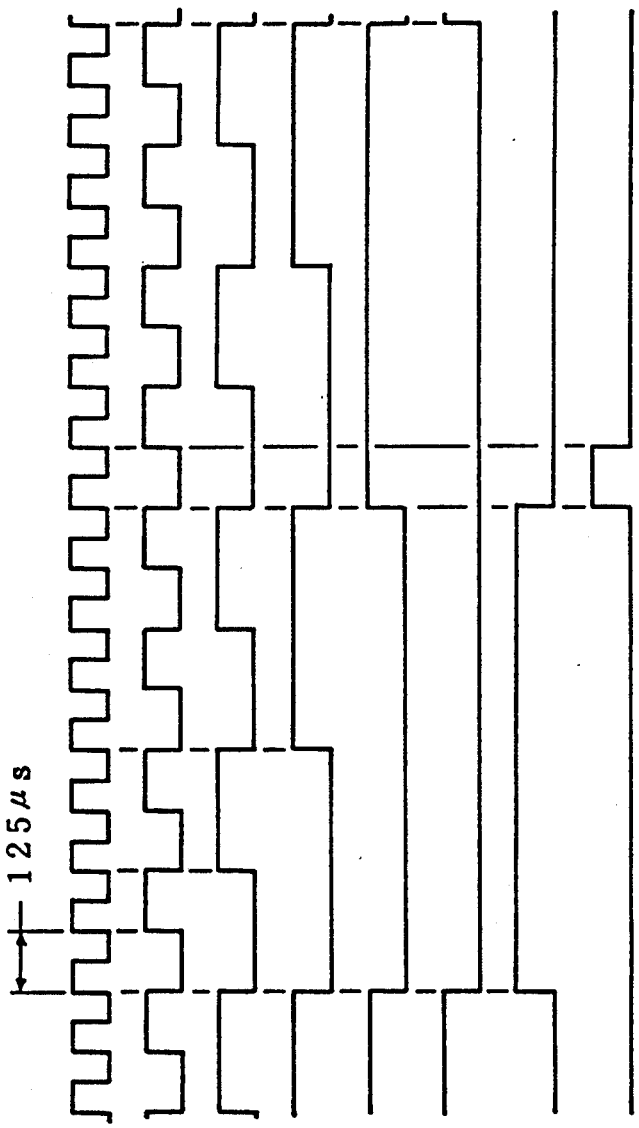

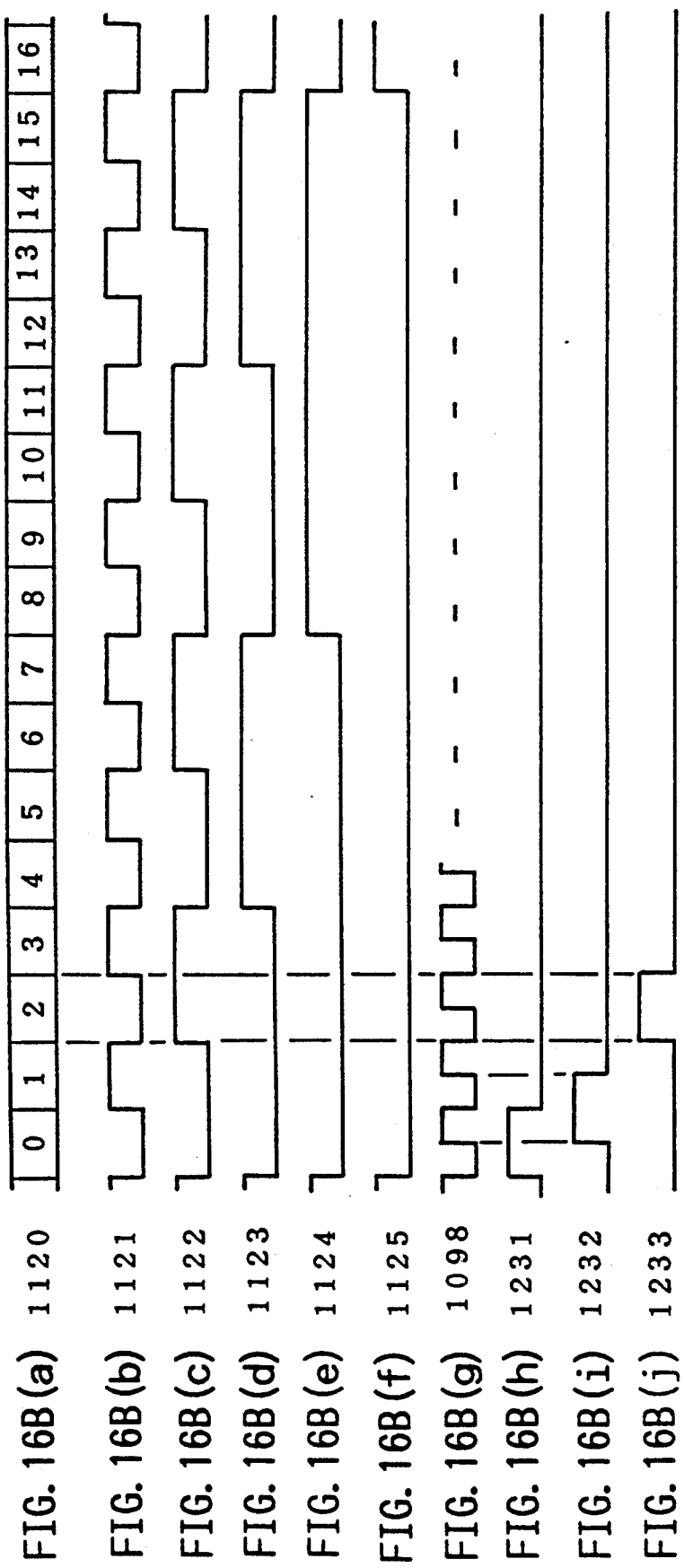

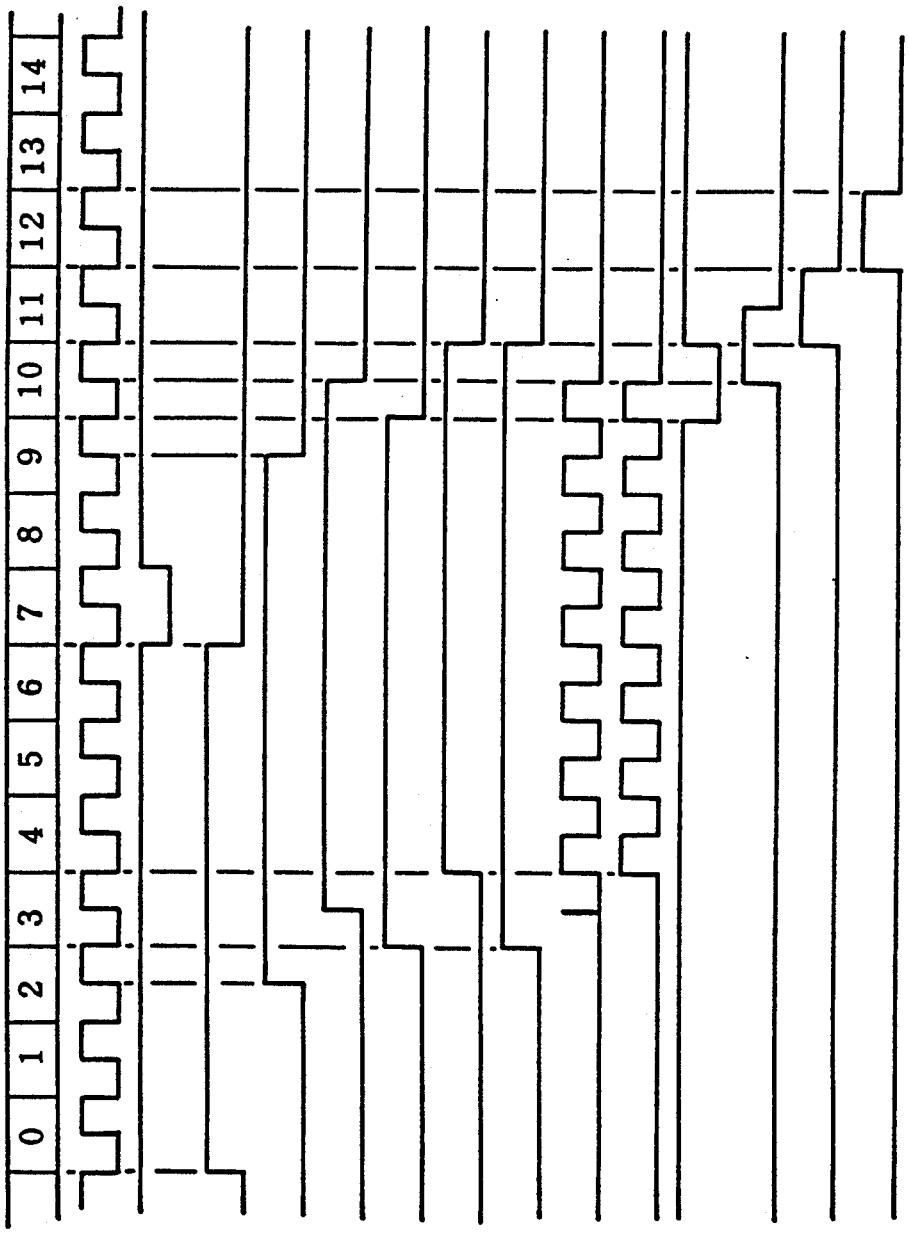

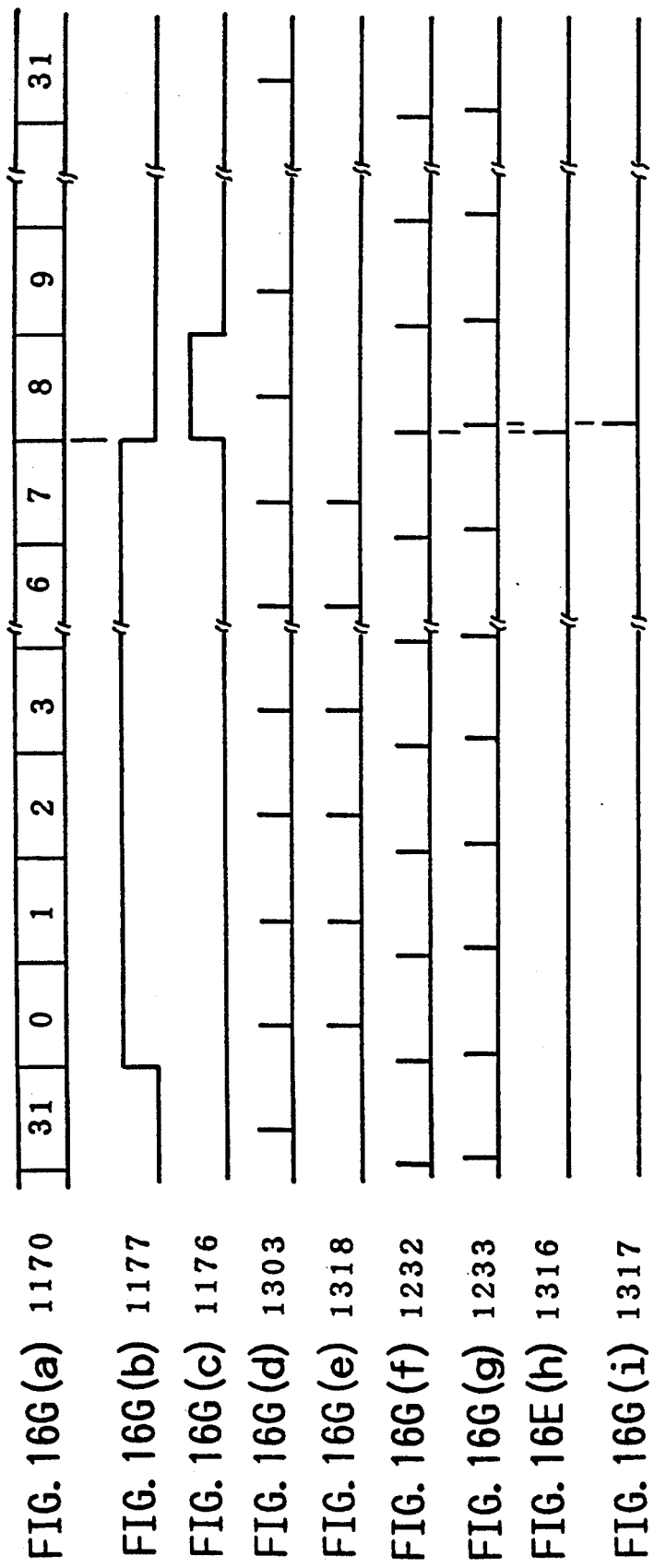

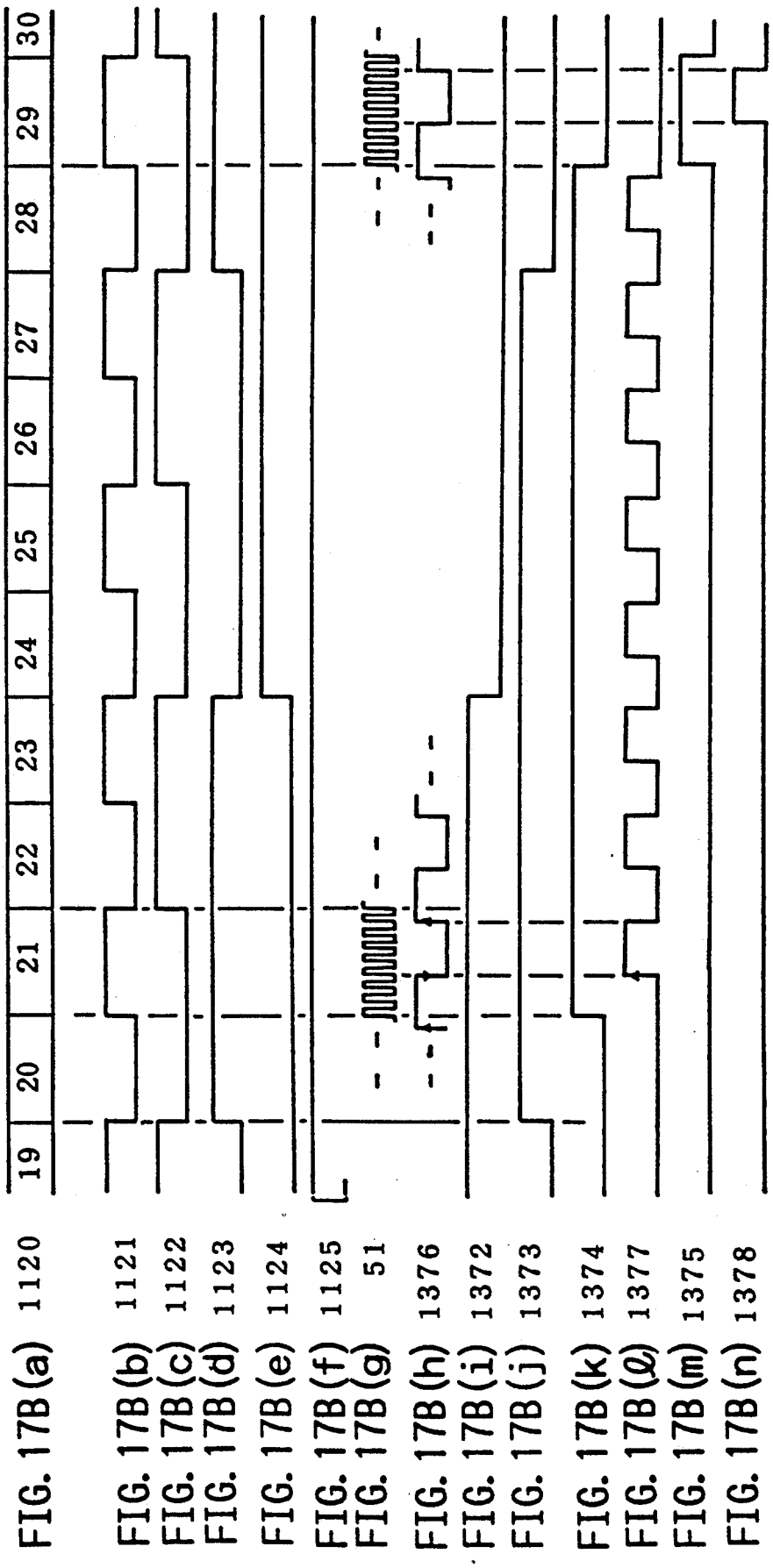

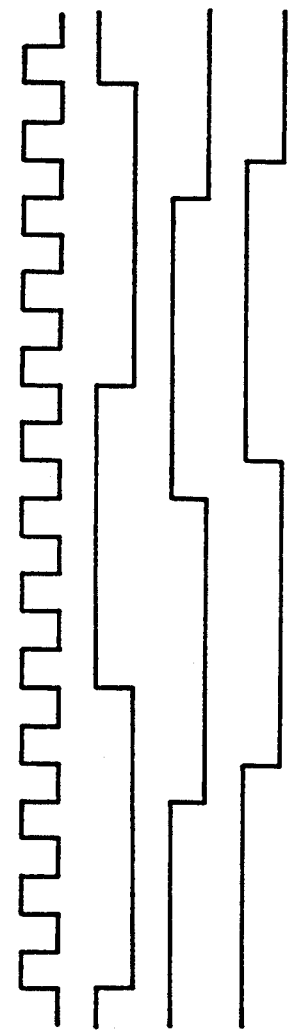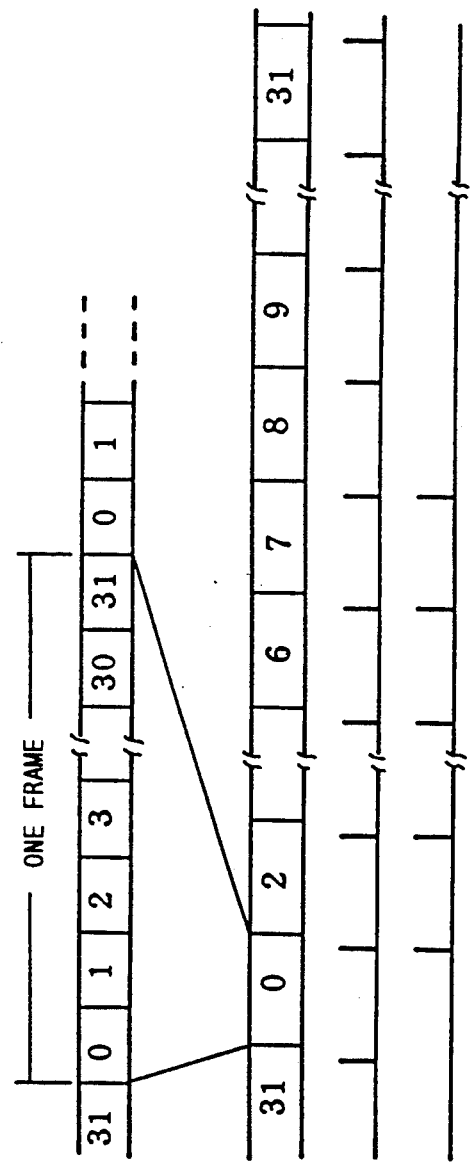

FIG. 18B (ℓ) 1434 

FIG. 18D(ℓ) 1473 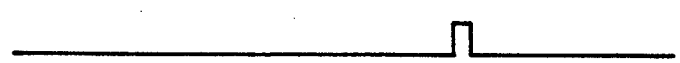

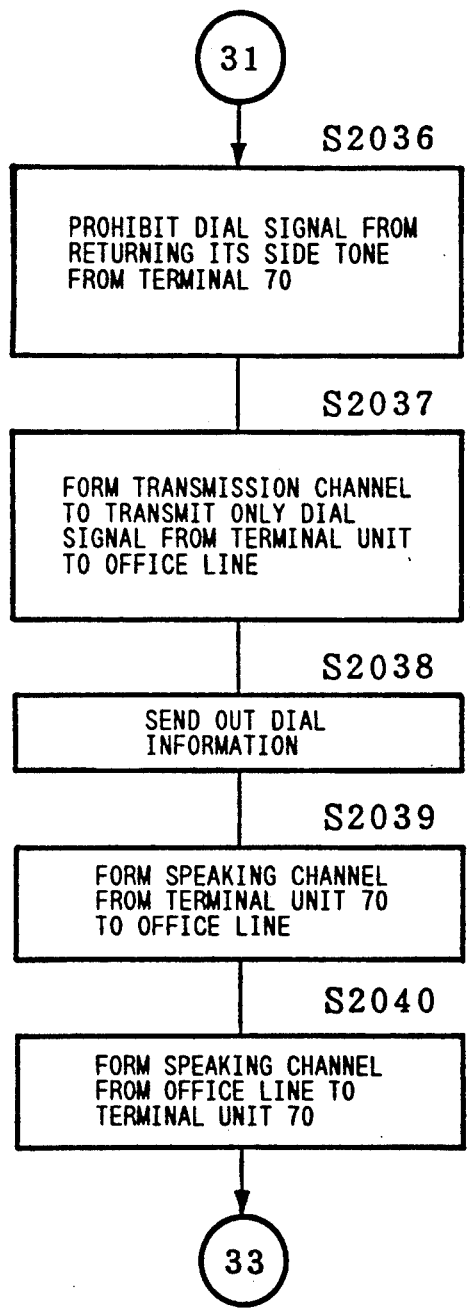

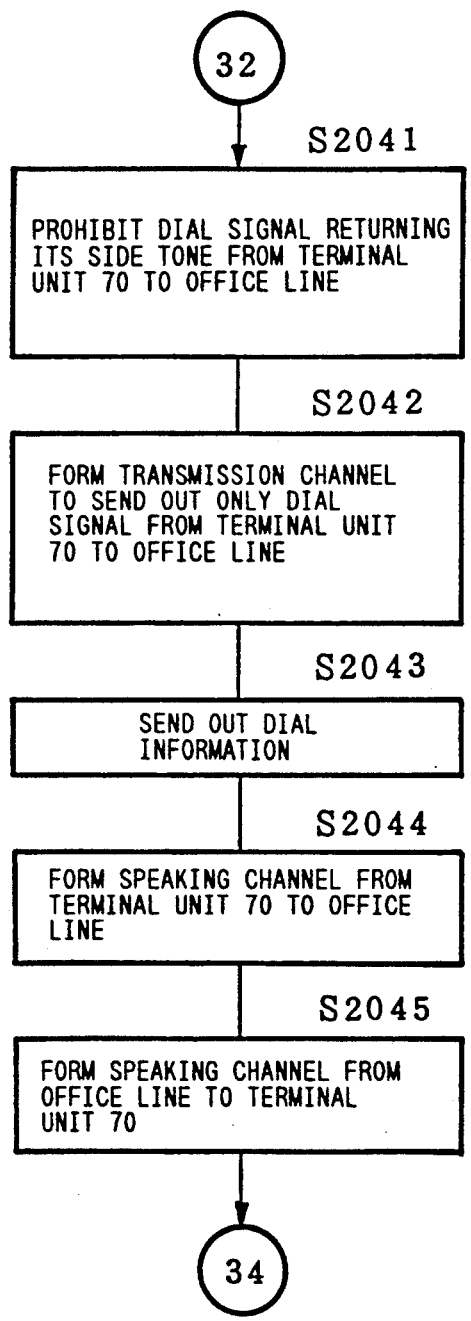

KEY TELEPHONE SYSTEM

BACKGROUND OF THE INVENTION

1. Field of the Invention

This invention relates to a key telephone system for use in PCM (Pulse Code Modulation) telecommunications, more particularly to a key telephone system using a PCM operating system which is capable of permitting voluntary connections of terminal units including telephone sets and data equipments between a central office line and individual terminal units. Such a key telephone system may include a central office line channel trunk, an extension communication channel trunk, conference communication channel trunk, or public address system trunk.

2. Prior Art

For the transmission and exchange of a large number of communication signals and data signals, there are generally those cases in which time division is used and those in which space division is employed.

In the case where time division is employed, call signals and so forth are converted, as it is generally known, into digital signals in encoded forms, which are either "0" or "1" whereby the signals for many call signals are carried and transmitted on a single transmission line. In this multiplexed time-division transmission of signals, the arrangement of the codes and the timing thereof are predetermined, so that the receiving system separates the multiplexed call signals and so forth and rearranges the sequence of data, thereafter performing the digital/analog (D/A) conversion to make it possible to communicate by the system.

On the contrary, in the space division type speech channel, switching operation is performed by closing, with a cross point switch, the input lines and the output lines in numbers corresponding to the individual terminal units. In this case, the signals are transmitted generally as they are, i.e. in the form of analog signals, without being subjected to any analog/digital (A/D) conversion or to any digital/analog (D/A) conversion.

In time division, the PCM system is employed, so that the call channels can be multiplexed to provide as many channels as desired by increasing the bit rate. Hence, the more the channels are multiplexed, the less the cost per channel will be. However, this system has hitherto presented a problem in that it meant a higher cost in a small-scale system because it requires A/D converters, D/A converters, encoders, decoders, speed converters for its transmission of signals in the form of digital codes.

However, in the space division type speech channel, there is a problem in that the number of the cross point switches in the switchboard increases in proportion to the square of the number of the communication circuits if the number of such circuits increases, even though the system, which transmits the signals as they are, i.e. in the form of analog signals, does not require any A/D converter, D/A converter, encoder, decoder, or speed converter although they are necessary for the PCM transmission and exchanges.

Furthermore, in the space division type speech path, it has hitherto been difficult to deal with digital-coded signals. The reason for this is to be found in the delay time (5-6 ns/m) that occurs in the transmission line, causing a deviation in phase between the transmission timing and the reception timing. Thus, it has not been possible to use this system for highly efficient transmission and reception with simple equipment.

The cost per channel of the existing time division type speech channel operated by the PCM system and that of the space division type speech channels are found to be equal to each other in the proximity of 100 channels. Specifically, the space division type results in a lower cost in a system which has terminal units with 100 or fewer channels whereas the time division type by the PCM system turns out to be lower in cost in a system with more than 100 channels, eventually proving to be more effective.

However, recent progress attained in the LSI (Large Scale Integrated Circuit) technology has brought about a reduction of size and an increase in economic efficiency in the time division type speech channel operated with the PCM system, and these features, coupled with more excellent affinity to data equipment, have produced greater overall superiority in this system as such.

SUMMARY OF THE INVENTION

This invention has been made in view of the circumstances as described above, and, accordingly, an object of the present invention is to provide a telephone system having the advantages of excellent functional performance and economic efficiency even when it is embodied in a small-sized system.

In order to accomplish this objection, the system according to this invention uses a PCM system operating with digital codes, which are highly resistant to noises and permit easy processing, and the system is provided with master control units, which respectively control each of a plurality of terminal units, transmission lines for connecting the individual terminal units with the master control units by a two-line type ping-pong transmission, and a transmitter-receiver unit for sending out signals on the transmission lines between one of the two ends of the above-mentioned transmission line and the terminal units and between the other of the two ends of the said transmission line and the master control units and for receiving signals from the transmission line, the receiving circuit contained in this master unit being compatible with the two-line type ping-pong transmission and capable of dealing adequately with any transmission distance within a certain range (for example, within 200 m) and also a transmission line covering a longer distance (for example, within 400 m and moreover up to 600 m or even more).

This master control unit is provided, in addition to the receiving circuit, with a central office line speech circuit, a private line speech circuit, a conference service circuit, and a public address system circuit, as well as a CPU interface circuit, for the CPU (Central Processing Unit) which controls these circuits, and a timing circuit for generating timing signals necessary for the individual circuits contained in the master control circuit, for the purpose of enhancing the overall functions of this system.

The conference service circuit contained in the telephone system according to this invention is provided with the following:

a multiplexing circuit for muliplexing the communication signals sent out from the respective terminal units, an adder for adding up the output from the multiplexing circuit, and a demultiplexing circuit for demultiplexing the output from the adder and sending it to the respective terminal units.

The public address system circuit contained in the telephone system according to this invention is provided with the following:

an OR gate for OR gating the signals received as the sound sources for the public address service from the office line or the terminal units, and an AND gate, which is a transmitting means for sending out the output signals from the OR gate to the respective terminal units which are to receive the public address service, according to the instruction from the CPU.

For the first and the second terminal units in this system, the private line speech circuit contained in the telephone system according to this invention is provided with the following:

a first multiplexer for multiplexing the signals sent out from the second terminal unit, a first shift register means for temporarily storing the output from the first multiplexer to send it out, a first demultiplexer for demultiplexing the output from the first register to send it to the first terminal units, a second multiplexer for multiplexing the signals sent out from the first terminal unit, a second register means for temporarily storing the output from the second multiplexer to output it, a second demultiplexer for demultiplexing the output from the second register to send it out to the second terminal unit.

The central office line speech circuit contained in the telephone system according to this invention is provided with:

a timing circuit which outputs the timing signals to each of a plurality of terminal units, control means which outputs the control information for making their connections to the destinations, a multiplexer which selects one output out of the pulse-code-modulated control information sent from the plurality of terminal units, a serial-input and serial-output register for storing in temporary memory the output from a multiplexer to output the same at the prescribed timing, a second serial-input and serial-output register for storing in temporary memory the input applied from the central office line to output the same at the prescribed period, and a demultiplexer for applying the output from the second serial-input and serial-output register to the selected terminal unit or units which the demultiplexer has selected out of the many terminal units.

With a construction described above, the system according to this invention is designed to transmit the information which is to be transmitted from the terminal unit or units selected on the basis of the control information to the central office line in the first half of one frame (125 μs) and to transmit the information which is to be transmitted from the central office line to the terminal unit or units in the second half of the frame. The reliability of the transmission is enhanced by the provision of a guard time at the timing set with the timing circuit lost the information transmitted in the former half of one frame and the information transmitted in its latter half should collide with each other.

According to this invention, in the case where a transmission line extends over a long distance (for example, within 400 m), there will be not be any delay within the signal receiving circuit, and the signals are transmitted to the private line speech circuit, the central office line speech circuit, or the conference service circuit while the system on a transmission line covering a short distance (for example, 200 m) has been designed to have the received signals transmitted to the private line speech circuit, the central office line speech circuit, or the conference service circuit after a delay by the prescribed duration of time (i.e. the transmitting time for 200 m on the transmission line) in the receiving circuit.

Accordingly, it has been made possible for the system to be connected to the terminal units with transmission lines covering long distances and short distances.

Owing to the designing of the system in the manner described hereinabove, the telephone system according to this invention is operated with a PCM system and provided with many such functions to deal adequately with transmission lines extending over a long distance even though it is a small-sized key telephone system.

BRIEF DESCRIPTION OF THE DRAWINGS

FIG. 1B, FIG. 1C, FIG. 1D, and FIG. 1E present timing charts illustrating the waveforms of the individual sections represented in FIG. 1A.

FIG. 1J presents a drawing illustrating the principle and construction of the public address system trunk which is to be used for transmitting the same information at the same time to a larger number of terminal units connected to the key telephone system embodying the present invention.

FIG. 2A presents a schematic conceptual drawing illustrating one embodiment of the master control unit 10 including the various kinds of circuits for realization of various kinds of functions shown in FIG. 1A through FIG. 1J.

FIG. 3B presents the timing charts which represent the waveforms of the various parts of the private line interface circuit 100 shown in FIG. 3A.

FIG. 3D presents the timing charts which represent the waveforms of the various individual parts of the code conversion circuit 110 shown in FIG. 3C.

FIG. 4B shows the timing charts which represent the waveforms of the individual parts of the signal receiving circuit 150 shown in FIG. 4A.

FIG. 5B presents the timing charts which illustrate the waveforms of the individual parts of the D-information transmitting and receiving circuit 170 given in FIG. 5A.

FIG. 6C presents a circuit diagram which illustrates one embodiment of the serial/serial register 220.

FIG. 6D presents a timing chart which shows the waveforms of the individual parts of the S/S register 220.

FIG. 6G presents a circuit diagram illustrating one embodiment of the transmission control circuit 240.

FIG. 10D and FIG. 10E present timing charts illustrating the principal operations of the conference speech circuit 350.

FIG. 13A presents a circuit block diagram illustrating one embodiment of the CPU interface circuit 800.

FIG. 13B presents a circuit diagram illustrating one embodiment of the interrupting circuit 801.

FIG. 13C presents a timing chart illustrating the waveforms of the individual parts of the interrupting circuit 801.

FIG. 13E presents a timing chart illustrating the waveforms of the individual parts of the address-decode circuit 810.

FIG. 15B presents a timing chart illustrating the waveforms of the individual parts of the timing circuit 1000.

FIG. 15C presents a timing chart illustrating the waveforms of multiframe pulse circuit 1150.

FIG. 15G presents a timing chart illustrating the waveforms of the individual parts of the frame pulse circuit 1100.

FIG. 15I presents a timing chart illustrating the waveforms of the individual parts of the multi-frame pulse circuit 1150.

FIG. 16B presents a timing chart illustrating the waveforms of the individual parts of the first signal transmission timing circuit.

FIG. 16E presents timing charts illustrating the individual parts of the first through the third signal transmission timing circuits.

FIG. 16G presents a timing chart illustrating the waveforms of the individual parts of the fourth signal transmission timing circuit.

FIG. 17B, FIG. 17C, and FIG. 17D present timing charts illustrating the waveforms of the individual parts of the signal receiving timing circuit 1350.

DETAILED DESCRIPTION OF THE PREFERRED EMBODIMENTS

Figure 1A:
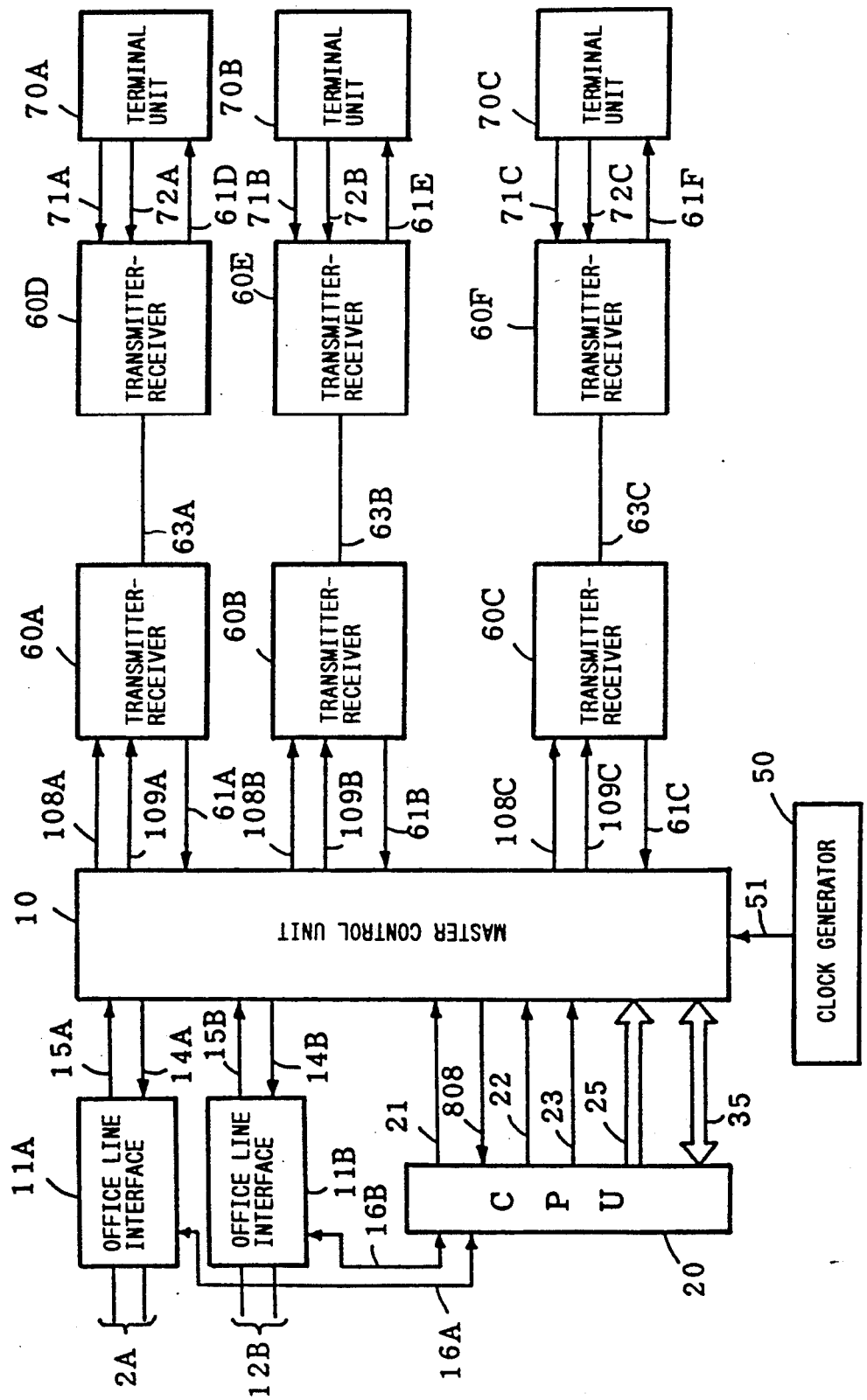
FIG. 1A is a drawing illustrating the principle and construction of the key telephone system embodying the present invention.

The principle of the button telephone which is proposed by this invention is illustrated in FIG. 1A while the waveforms recorded by the individual sections of the telephone system are described with reference to the timing charts presented in FIG. 1B, FIG. 1C, FIG. 1D, and FIG. 1E.

In FIG. 1A, numeral reference 10 indicates a master control unit embodying the present invention, which operates with the signals 21, 22, 23, and 808, an address bus signal 25 and a data bus signal 35 between this unit and the CPU (Central Processing Unit) 20 in synchronization with a clock 51 generated from a clock generator 50. To the master control unit 10, a transmitter-receiver 60A (60B, 60C), a transmission channel 63A (63B, 63C), and a transmitter-receiver 60D (60E, 60F) are connected by a signal 61A (61B, 61C), a signal 108A (108B, 108C), and a signal 109A (109B, 109C) while a terminal unit 70A (70B, 70C) is connected by a signal 61D (61E, 61F) and a signal 72A (72B, 72C). Furthermore, to the master control unit 10 is connected a central office line 12A (12B) by a signal 14A (14B) and a signal 15A (15B) through a central office line interface 11A (11B). The arrivals of calls at the office are detected by means of a CPU 20 on the basis of a signal 16A (16B) that occurs between the central office line interface 11A (11B) and the CPU 20, or the central office interface 11A (11B) furnishes the information to be taken as the basis for sending out a dial signal.

With an arrangement described above, the system is designed to be capable of performing exchanges of communications among the terminal units 70A, 70B, and 70C or between each of the terminal units and the central office line 12A (12B).

Figure 1B:
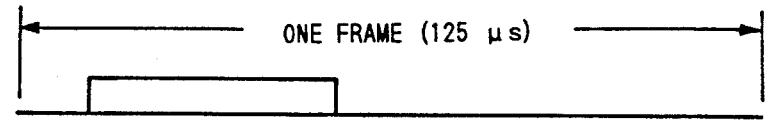
Figure 1B:
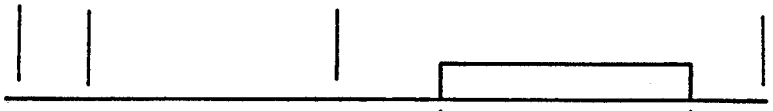
Figure 1B:

In FIGS. 1B(a) and 1B(b) are indicated the signals 108A, 109A and the signal 61A, which are signals generated between the master control unit 10 and the transmitter-receiver 60A while the signal on the transmission line 63A is shown in FIG. 1B(c). The signals 108A, 109A in FIG. 1B(a) are output from the master control unit 10 in the first half of one frame (125 μs), and thereafter the signal 61A in FIG. 1B(b) is output from the transmitter-receiver 60A in the second half of the one frame. The signal on the transmission line 63A shown in FIG. 1B(c) illustrates the manner how the signals shown in FIG. 1B(a) and 1B(b) are transmitted.

Figure 1C:
Figure 1C:
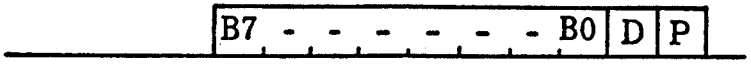

In FIGS. 1C(a) and 1C(b), the contents of the signals 108A, 109A and 61A shown in FIGS. 1B(a) to 1B(C) are presented. In these Figures, ST represents a start bit, F represents the information for attaining the synchronization of the frame (which is to be hereinafter referred to as a "F-bit"), B7 through B0 represent voice information (data information), D indicates the control information for the connection of a call to the destination (which is to be hereinafter called a "D-information"), and P represents the parity information (which is to be known as a "P-information") for maintaining a direct current balance.

In FIGS. 1D(a) to 1D(e), a description is presented on the upstream information and the downstream information on the transmission line 63A and the timing signals for these types of information, FIG. 1D(a) showing the signals 108A and 109A, FIG. 1D(d) showing the signal 61A, and FIGS. 1D(b), 1D(c), and 1D(e) showing the signals, 1268, 1269, and 1377, which are being generated in the master control unit 10. The signal 1268 expresses the duration for sending out the voice information B7 through B0, and the signal 1269 in FIG. 1D(c) shows the timing for sending out the voice signals B7 through B0, presented in FIG. 1D(a), and the signal 1377 in FIG. 1D(e) represents the reception timing signal for the voice information B7 through B0, for the signal 61A shown in FIG. 1D(d).

Between the signals 108A, 109A in FIG. 1D(a) and the signal 61A in FIG. 1D(d) is provided a guard time T1, which is a time provided in order to prevent the collision of the rear edges of the signals 108A, 109A shown in FIG. 1D(a) and the front edge of the signal 61A shown in FIG. 1D(d). The signals are transmitted in the form of a combination of the two signals 108A, 109A, which is convenient for the transmission of the signals by 100-percent AMI signals, from the master control unit 10 through the transmitter-receiver 60A. They the transmission channel 63A by the 100-percent AMI signal and are then fed into the terminal unit 70A as the signal 61D through the transmitter-receiver 60D, and the voice information B7 through B0, the control information D, and the parity information P, excluding the start bit ST and the frame bit F, are received from the terminal unit 70A, which has thus received the signals so transmitted, into the master control unit 10, as the signal 61A shown in FIG. 1D(d) through the transmitter-receiver 60D, the transmission channel 63A, and the transmitter-receiver 60A.

In FIGS. 1E(a) through 1E(e), the influence which the length of the transmission channel 63A exerts on the upstream information and the downstream information is illustrated. The signal 61A shown in FIG. 1E(d), which is transmitted back from the terminal unit 70A as a result of the sending of the signals 108A, 109A in FIG. 1E(a) in the first half of the n-th frame, is delayed in the transmission channel 63A and received in the n-th frame. This is a condition which makes it necessary to provide a guard time T2, which is to function to prevent the collision of the rear edge of this signal 61A and the front edges of the signals 108A, 109A in the (n+1)th frame in FIG. 1E(a), in addition to the guard time T1. An addition time 3, which is equivalent to two bits and to be used in the case where any conference talk is necessary, is provided in the section between the point directly subsequent to this guard time T2 and the intermediate point in the start bit ST composed of two bits. Thus, this system is not liable to any collision of the upstream signal being transmitted from the terminal unit 70A towards the master control unit 10 with the downstream signal being transmitted from the master control unit 10 towards the terminal unit 70A even in the transmission channel 63A used for signal transmission over a short distance or a long distance.

Figure 1F:
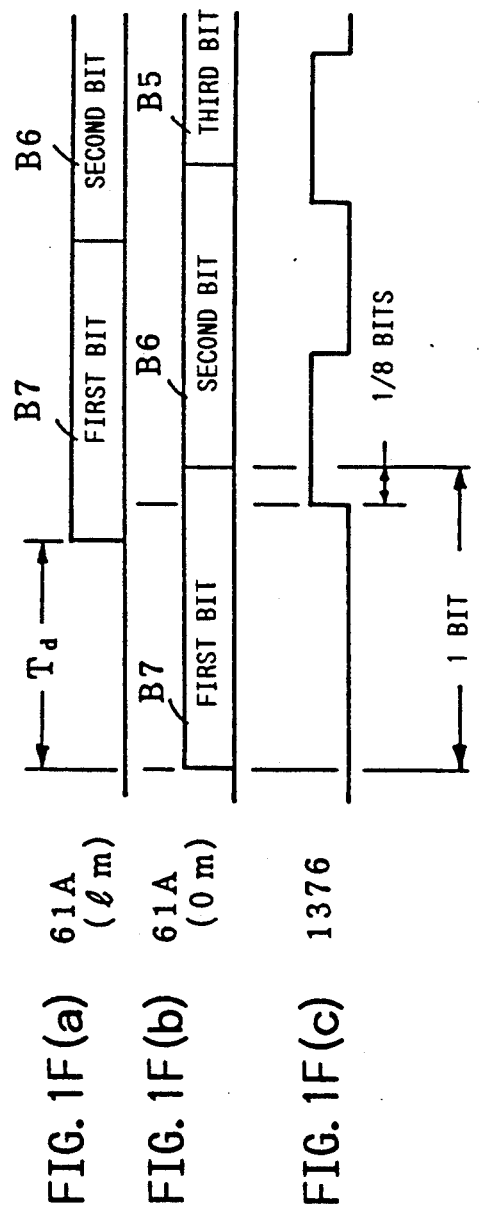
FIG. 1F presents a timing chart which shows waveforms which explain the reason why restrictions are placed on the length of a transmission line.

In FIGS. 1F(a) through 1F(c) is presented a waveform chart intended for explaining the reason why the length of the transmission channel 63A is subject to a restriction, FIG. 1F(a) showing the case in which the transmission channel has a length of l, FIG. 1F(b) showing the case in which the length is zero meter, and FIG. 1F(c) showing the signal 1376 which has a period equivalent to the period of each bit in the voice information B7 through B0, which form the signal 61A as shown in FIGS. 1F(a) and 1F(b). In relation to the signal 61A in FIG. 1F(b), the signal 61A in FIG. 1F(a) will have a delay time Td by 2×l meter in the transmission channel 63A, but the delay time Td should be of such a length that it can be accommodated in one bit. Otherwise, it will not be possible to distinguish this delay time bit from the subsequent bit. In this invention, the delay time Td (0 to ¼ bit) is set up with a margin of ¼ for example. When the bit rate is 256 Kbps for example, the value of l will be approximately 200 meters.

Figure 1G:
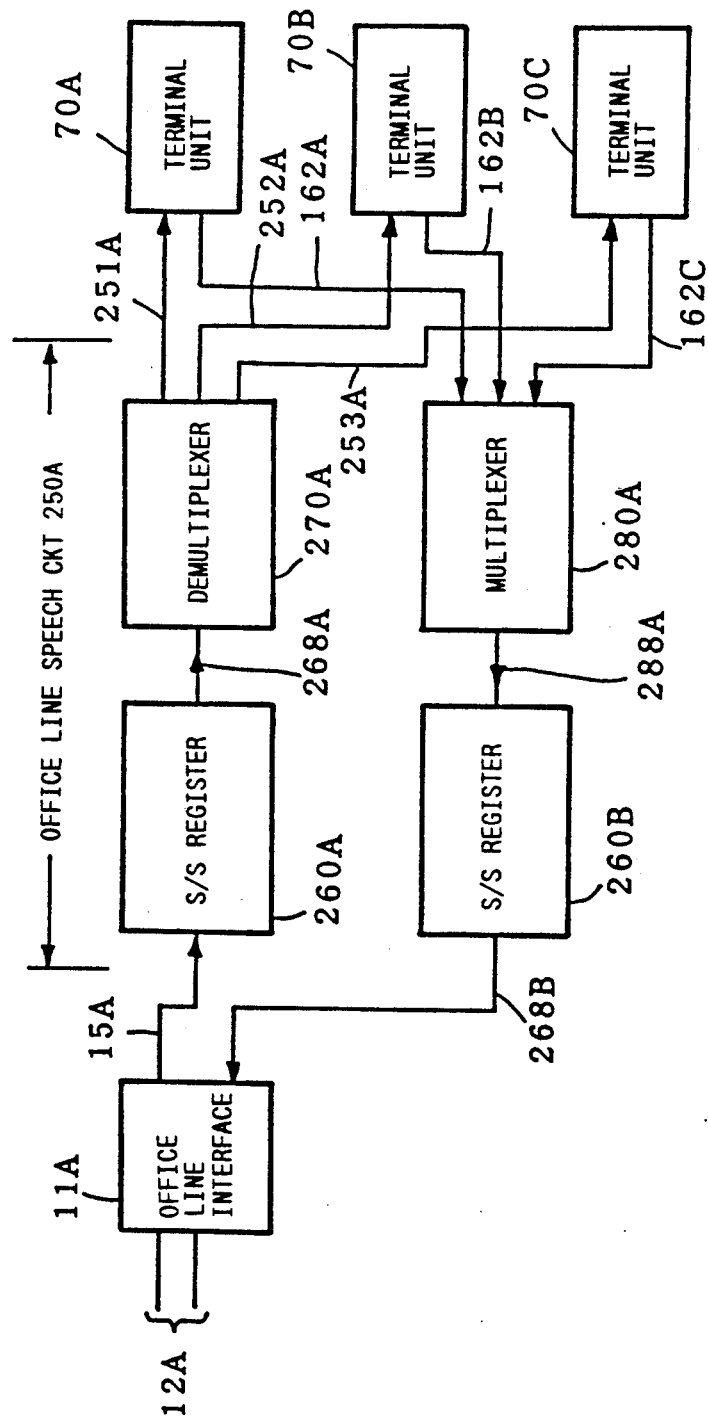
FIG. 1G presents a drawing illustrating the principle and construction of the key telephone system embodying the present invention as connected to the central office line.

In FIG. 1G is illustrated the principle at work when the button telephone proposed in the present invention is connected to the office line.

The terminal units 70A, 70B, and 70C are data equipment, such as telephone equipment, and these terminal units are connected to the central office line 12A through a central office line speech circuit 250A and a central office line interface 11A. The central office line speech circuit 250A takes the signal 15A into a serial/-serial (hereinafter S/S) register 260A thereof in the second half of one frame, through the central office line interface 11A, from the office line 12A, and, with the signal 268A being then output, one of the signals 251A, 252A, and 253A is sent out from the demultiplexer 270A to one of the terminal units 70A 70C in the first half of the next frame.

On the other hand, in the terminal units 70A~70C, the signal 162A outputted from the terminal unit 70A, for example, is selected in a multiplexer 280A and taken into a S/S register 260B, which gives serial input and serial output, in the second half of one frame and is output as a signal 268B from a S/S register 260B in the first half of the next frame, and the output signal is sent out to the central office line 12A through the central office line interface 11A. In this manner, communications are exchanged between the central office line 12A and the terminal units 70A~70C.

Figure 1H:
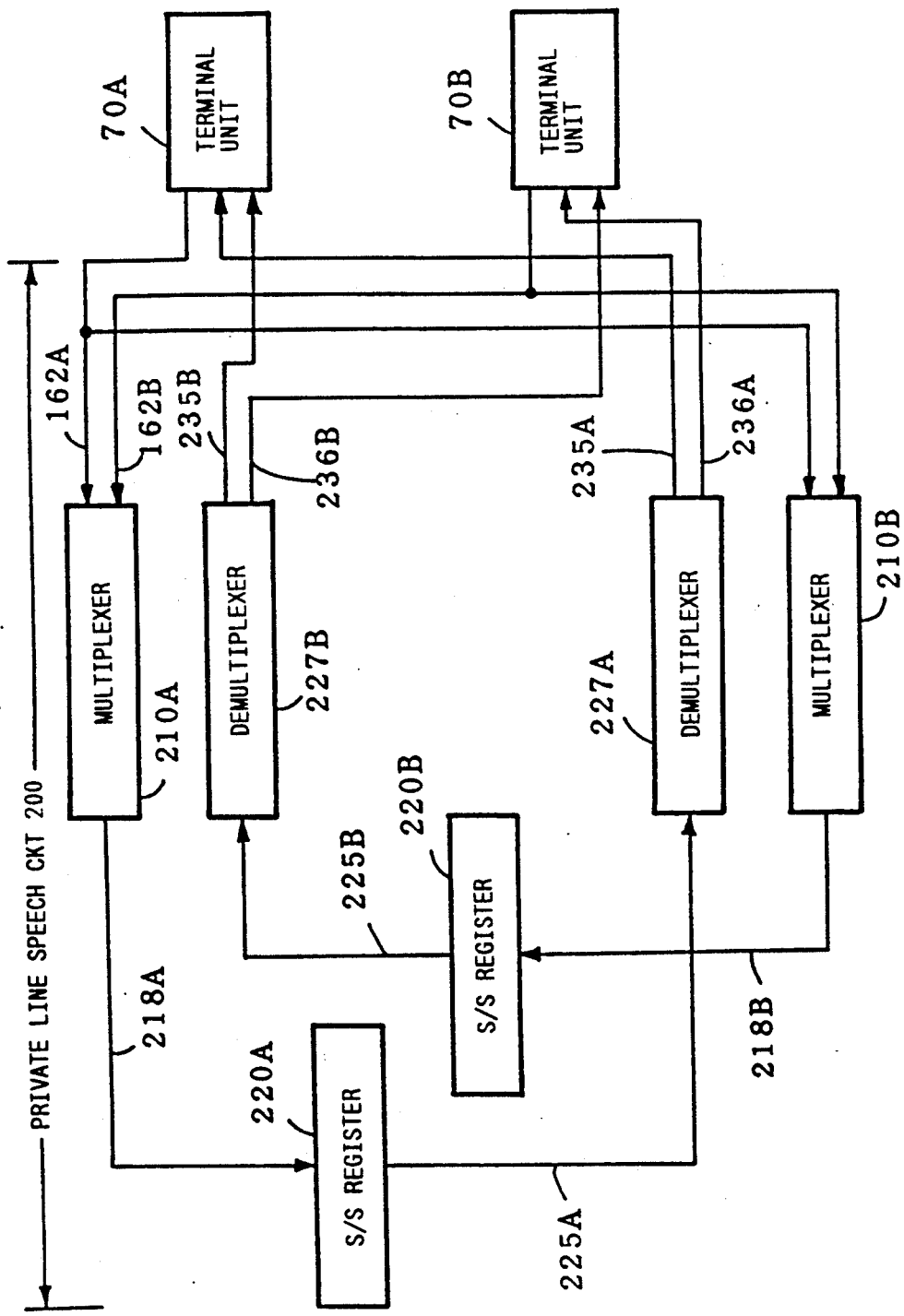
FIG. 1H presents a drawing illustrating the principle and construction of the private line speech trunk which enables the exchanges of communications among the terminal units in the key telephone system embodying the present invention.

FIG. 1H shows a chart illustrating the principle applied to an extension speech trunk for enabling the exchanges of communications between the terminal units within the key telephone system without channeling such communications through the central office line, according to the invention.

A signal 162A, which is transmitted from the terminal unit 70A, is applied to the multiplexers 210A and 210B and is selected, for example, by the multiplexer 210A with a control signal not illustrated in the Figure, and the signal 218A thus selected is taken into a S/S register 220A, which yields the serial input and serial output of the signal, in the second half of one frame, the signal being thereafter output from the S/S register 220A as a signal 225A in the first half of the next frame. Thereafter, the output signal 225A is applied to a demultiplexer 227A and then selected as a signal 236A, for example, with a control signal not illustrated, and applied to the terminal unit 70B. The transmission signal 162B from the terminal unit 70B is selected with a control signal not illustrated by the multiplexer 210B, and then a signal 218B is outputted from the multiplexer 210B and taken into a S/S register 220B in the second half of one frame so that the S/S register 220B outputs a signal 225B in the first half of the next frame. Thereafter, the output signal 225B is applied to a demultiplexer 227B and selected with a control signal not shown is then output as a signal 235B to be applied to the terminal unit 70A.

Figure 1I:
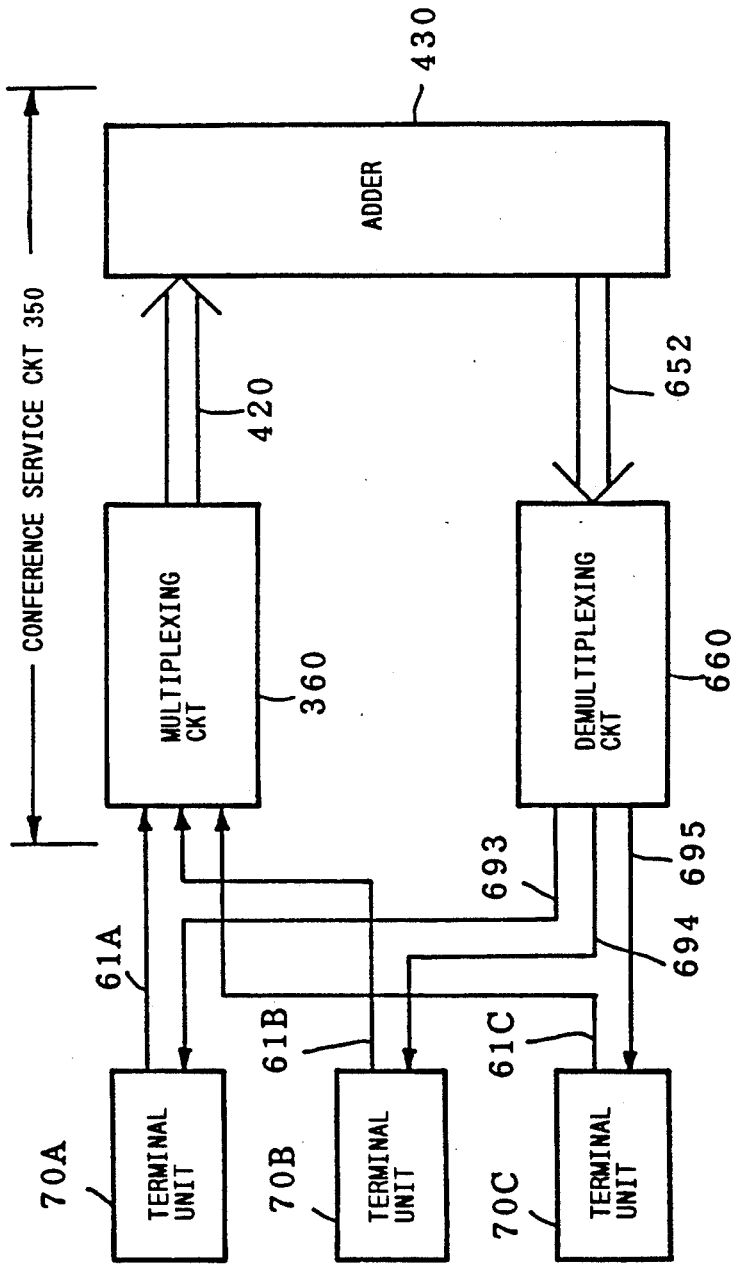
FIG. 1I presents a drawing illustrating the principle and construction of the conference service system trunk which enables the exchanges of communications among three or more terminal units at the same time within the key telephone system embodying the present invention.

In FIG. 1I, a chart illustrating the principle is shown for a conference service trunk which makes it possible to perform the exchanges of communications between two or more terminal units.

In this case, the conference talks among the terminal units 70A, 70B, and 70C are illustrated as an example. In this system, a signal 61A (61B, 61C), which is output from the terminal unit 70A (70B, 70C) is applied to a multiplex circuit 360 within a conference service circuit 350, which makes it possible to communicate conference talks, and the respective signals are accumulated therein in the second half of one frame and are applied as a bus signal 420 from a multiplex circuit 360 to a adder 430 by time division.

In this adder 430, the signals which have been transmitted from the respective terminal units 70A (70B, 70C) as the bus signal 420 are added up, the result of the addition being output as a bus signal 652, which is applied to a demultiplex circuit 660.

The demultiplex circuit 660 outputs a signal 693 (694, 695) to the terminal unit 70A (70B, 70C) in the first half of the frame immediately following the guard time T2. The signal 693 reflects the addition of the contents of the signals 61B and 61C, which are output from the terminal units 70B and 70C. In the same way, the signal 694 represents the result obtained by the addition of the contents of the signals 61A and 61C, and the signal 695 represents the result of the addition of the signal 61A, 61B. In this manner, conference talks by this system are made possible.

FIG. 1J shows a chart illustrating the principle applied to the public address service trunk for performing simultaneous transmissions of identical information to all of a large number of terminal units connected to the key telephone system embodying this invention or to some specified ones of such terminal units according to the present invention.

Here, one of signals 239A, 239B, and 257A is applied from terminal units 70D, 70E or from the office line through the office line interface 11A to an OR-gate 701, which is included in a public address circuit 700, and obtained as a signal 711, which is output as signals 712, 713, and 714 to the terminal units 70A, 70B, and 70C through AND-gates 702, 703, and 704 by the aid of the simultaneous application of control signals 871, 872, and 873. In this manner, public address service is made possible. The signals 239A, 239B, and 257A, which will be input into the OR-gate 701, are processed by the CPU (Central Processing Unit) 20 in such a way that the input of one of these signals necessarily results in the prohibition of the input of the other signals.

In FIG. 2A, a schematic drawing is presented to illustrate the configuration of the master control unit including the various types of circuits which have been explained with reference to FIG. 1A through FIG. 1J, which are here omitted to show the connections in the inside of the master control unit 10.

Numeral references 100A through 100D represent the private line interface circuits, which are connected either directly to the terminal unit 70 by the signals 108A, 109A~108D, and 109D or through the transmitter-receiver 60 or the transmission line 63 thereto (Refer to FIG. 1A).

Numeral references 150A through 150D are receiving circuits, which receive the signals 61A to 61D transmitted from the terminal unit 70.

Numeral reference 170 is a D-information transmitting and receiving circuit, which receives the dial information and the information for controlling the terminal units, and this circuit exchanges the information for controlling the dial information and the terminal units with the CPU 20, which is not shown in the Figure here, by the aid of the data bus signal 35.

Numeral reference 200 indicates the extension speech circuit, which performs the function of the private line communication explained with reference to FIG. 1H.

Numeral references 250A and 250B represent the central office line speech circuits, which perform the function of the central office line communication explained with reference to FIG. 1G.

Numeral reference 350 represents the conference service circuit, which performs the function of the conference communication explained with reference to FIG. 1I.

Numeral reference 700 shows the public address circuit, which performs the function of public address service explained with reference to FIG. 1J.

Numeral reference 720 represents a sound source circuit. The circuit receives the various kinds of signals 66~69, which are applied from their sources outside the master control unit 10, and then transmits these signals selectively to the terminal unit 70 via the extension interface circuit 100A~100D, and the background music (BGM), a holding tone, the chime tone for the door phone, etc. are included in these various kinds of signals 66~69.

Numeral reference 800 represents a CPU interface circuit, which serves as the interface for the address bus signal 25, the data bus signal 35, a resetting signal 21, a reading signal 22, a writing signal 23, and a signal 808 used for interruption into the CPU 20, which are transmitted and received by and between the CPU 20 (not shown) and the various kinds of circuits included in the master control unit 10.

Numeral reference 1000 expresses a timing circuit, which produces the various kinds of timing signals required inside the master control unit 10 from a clock signal 51 applied to the circuit from the outside and then applies such timing signals to the various circuits installed in the inside of the master control unit 10.

Numeral reference 358 shows a $\mu$/A switching signal which is applied from the outside and is used for selecting the $\mu$-rule or the A-rule to be employed for the addition processing performed in the conference service circuit 350.

The signals 14A, 15A (14B, 15B) are signals exchanged with the central office line 12A (Refer to FIG. 1A), and the signal 15A (15B) is input directly into the central office line speech circuit 250A (250B) while the signals transmitted from the central office line speech circuit 250A (250B) or the conference service circuit 350 are sent out to the central office line as the signal 14A (14B) through the OR-circuit 13A (13B).

In the case of the private line communications, the signals 61A through 61D sent out from the terminal unit 70 are sent out to another terminal unit 70 as the signals 108A, 109A~108D, and 109D through the receiving circuits 150A~150D and the private line speech circuit 200 and the private line interface circuits 100A~100D.

In the case of the central office line communications, the signals 61A through 61D sent out from the terminal unit 70 are sent out to the central office line through the receiving circuits 150A~150D, the central office line speech circuits 250A and 250B and the OR-circuits 13A and 13B while the signals sent out from the central office line are sent out to the terminal unit 70 as the signals 108A, 109A~108B, and 109D through the central office line speech circuits 250A, 250B and the private line interface circuits 100A~100D.

In the case of the conference communications, the signals 61A~61D sent out from the terminal unit 70 are sent out to the central office line through the receiving circuits 150A~150D, the conference service circuit 350, and the OR-circuits 13A and 13B and further the signals are transmitted from the conference service circuit 350 to another terminal unit 70 as the signals 108A, 109A~108D, and 109D through the private line interface circuits 100A~100D. Moreover, the signal 15A fed from the central office line is sent out to each terminal unit as the signals 108A, 109A~108D, and 109D through the conference service circuit 350 and the private line interface circuits 100A~100D.

In the case of the public address communications, the signals sent out of the public address system circuit 700 are sent out to each terminal unit 70 as the signals 108A, 109A~108D, and 109D through the private line interface circuits 100A~100D. For the signals to be sent out from the public address system circuit 700, there are some cases in which the signals 61A~61D output from the terminal unit 70 are applied to the public address system circuit 700 through the receiving circuit 150A~150D and the private line speech circuit 200 and there are other cases in which the signals are applied from the central office line side as the signals 15A, 15B to the circuit 700 through the central office line speech circuits 250A and 250B.

When a dial signal is generated from the terminal unit 70 to indicate the destination of a call, the signal is applied as the signals 61A~61D to the signal receiving circuits 150A~150D, and the applied signal is then transmitted to the D-information transmitting and receiving circuit (information transmitting and receiving means) 170. This dial information is read by the CPU 20 from the D-information transmitting and receiving circuit 170 through the data bus signal 35. When there is and arrival of a call from the office line, the CPU 20 reads the arrival of a call at the office, by the signals 16A, 16B, from the central office line interfaces 11A, 11B (as shown in FIG. 1A). Thereupon, the destination of the call is transmitted by the data bus signal 35 to the D-information transmitting and receiving circuit 170, from which the call-receiving information is transmitted to one or more of the private line interfaces 100A~100D connected to the terminal unit 70 for the destination.

Figure 2B:
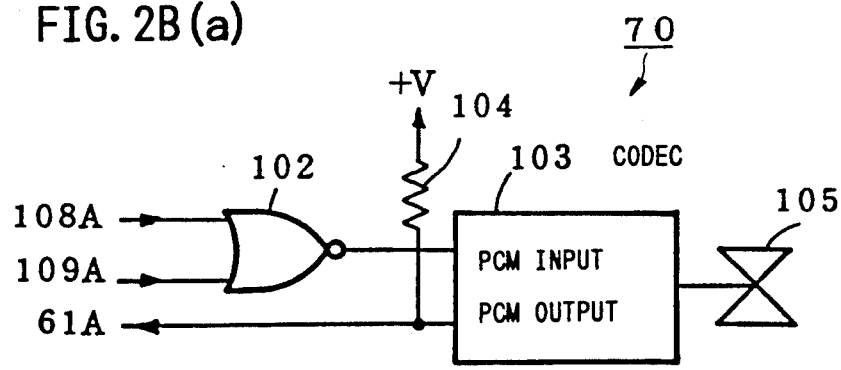
FIG. 2B shows a circuit block diagram illustrating one example of the terminal units to be connected to the master control unit 10 shown in FIG. 2A.
Figure 2B:
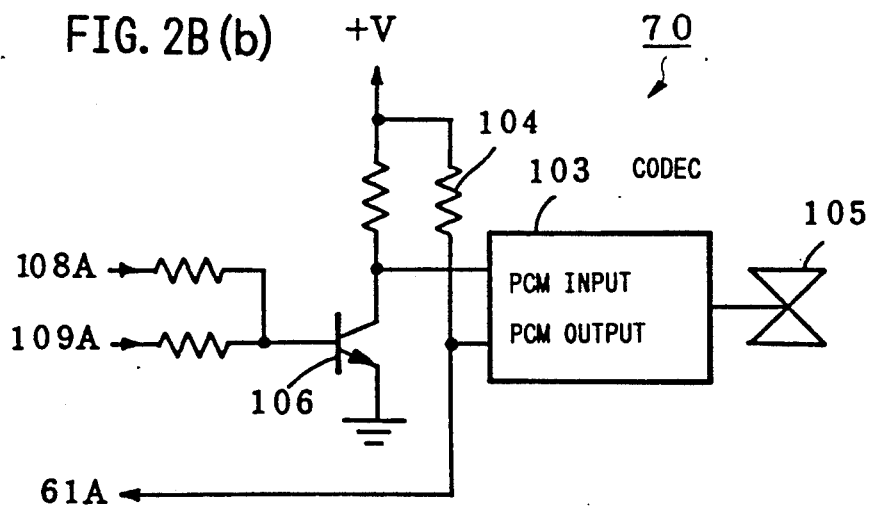

In FIGS. 2B(a) and 2B(b), one example is given for the terminal units 70 which are connected to the master control unit 10, in which FIG. 2B (a) shows Codec 103, which converts the signals transmitted or received by the telephone set 105 into PCM signals, and the way how the signals 108A and 109A are applied to the PCM input via the NOR-gate 102, the signal 61A being thereupon output from the PCM output to which the pullup resistor 104 is connected.

In FIG. 2B (b), a circuit in which the NOR-gate 102 is replaced with a circuit including the transistor 106 is shown, and the function of this circuit is the same as that shown in FIG. 2B(a).

Figure 3A:
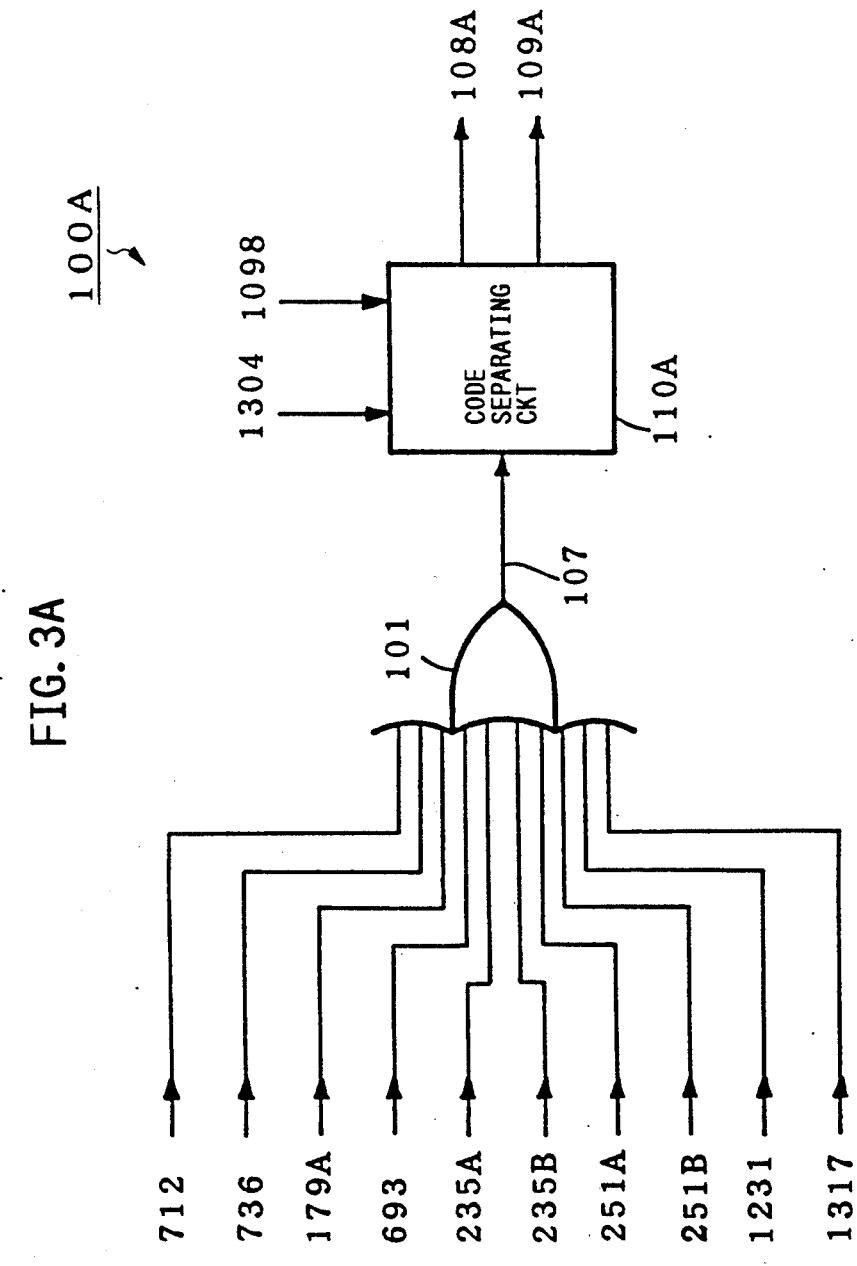
FIG. 3A presents a circuit block diagram illustrating one embodiment of the private line interface circuit 100.

In FIG. 3A is shown a private line interface circuit, e.g. 100A while the waveform timing charts for the individual parts of the interface circuit are presented in FIG. 3B.

To the input of an OR-gate 101 are applied a signal 712 from the public address system circuit 700, a signal 736 from the sound source circuit 720, a signal 179A (Refer to FIG. 3B(d)), which is the D-information (Refer to FIG. 1C), from the D-information transmitting and receiving circuit 170, a signal 693 from the conference service circuit 350, signals 235A and 235B from the private line speech circuit 200, the signals 251A, (Refer to FIG. 3B(c)) and 251B from the office line speech circuit 250A and 250B, and the signals 1231, 1317 (Refer to FIG. 3B(a) and (b)) generated for timing from the timing circuit 1000, and the signal 107 shown in FIG. 3B (e) is output from the OR-gate. FIG. 3B represents an instance of an office line communication system which receives the signal 251A to the OR-gate 101 from the office line speech circuit 250A, being controlled by the CPU 20.

The signal 1231 in FIG. 3B(a) represents the start bit ST (FIG. 1C) while the signal 1317 in FIG. 3B(b) shows the F bit (FIG. 1C) and the signal 251A in FIG. 3B(c) is a speech signal from the office line. These signals and the D-information in FIG. 3B(d) are processed by the OR-gate operation so that a signal 107 shown in FIG. 3B(e) is obtained.

The signal 107 is applied to a code separating circuit 110A. The code separating circuit 110A is provided within the central office line circuit 100A (refer to FIG. 2A) to keep the balance of the direct current for a signal transmission in the transmission line 63a (refer to FIG. 1A). To the code separating circuit 110A, the signal 1304, which is the P-information shown in FIG. 3B(f), and the signal 1098 shown in FIG. 3B(g) are applied. The code separating circuit 110A separates the data from these signals into two signals 108a and 109a. Signal 108a indicates data in the odd number bits as shown in FIG. 3B(h) and FIG. 3B(i) and signal 109A indicates data in the even number bits.

The signals 108A and 109A in FIGS. 3B(h) and 3B(i), which express the contents of the signal 107 in FIG. 3B(e) and the signal 1304 in FIG. 3B(f), contains the "1" appearing first after the start of the frame 1 in the signal 107 with a delay of one bit (defined by the signal 1098 in FIG. 3B(g)), that the signal so becomes "1" of the signal 108A in FIG. 3B(h), and, when the second "1" in the signal 107 has appeared, the signal 109A in FIG. 3B(i) in the same manner becomes "1," and the operation is performed thereafter in the same manner, so that the signal 108A in FIG. 3B(h) is becomes "1" for all the "1" is in odd number positions in signal 107. Similarly the signal 109A becomes "1" for all the "1"'s in even number positions in the same signal 107. When the sum of the signal 108A and the number of "1"'s in the signal 109A become an odd number, the "1" in the signal 1304, which is the P-information (parity information) is output in the signal 109A. As the result, the number of the "1"'s appearing in each of the signals 108A and 109A in the frame 1 become equal, so that a favorable DC balance is thereby maintained.

Figure 3C:
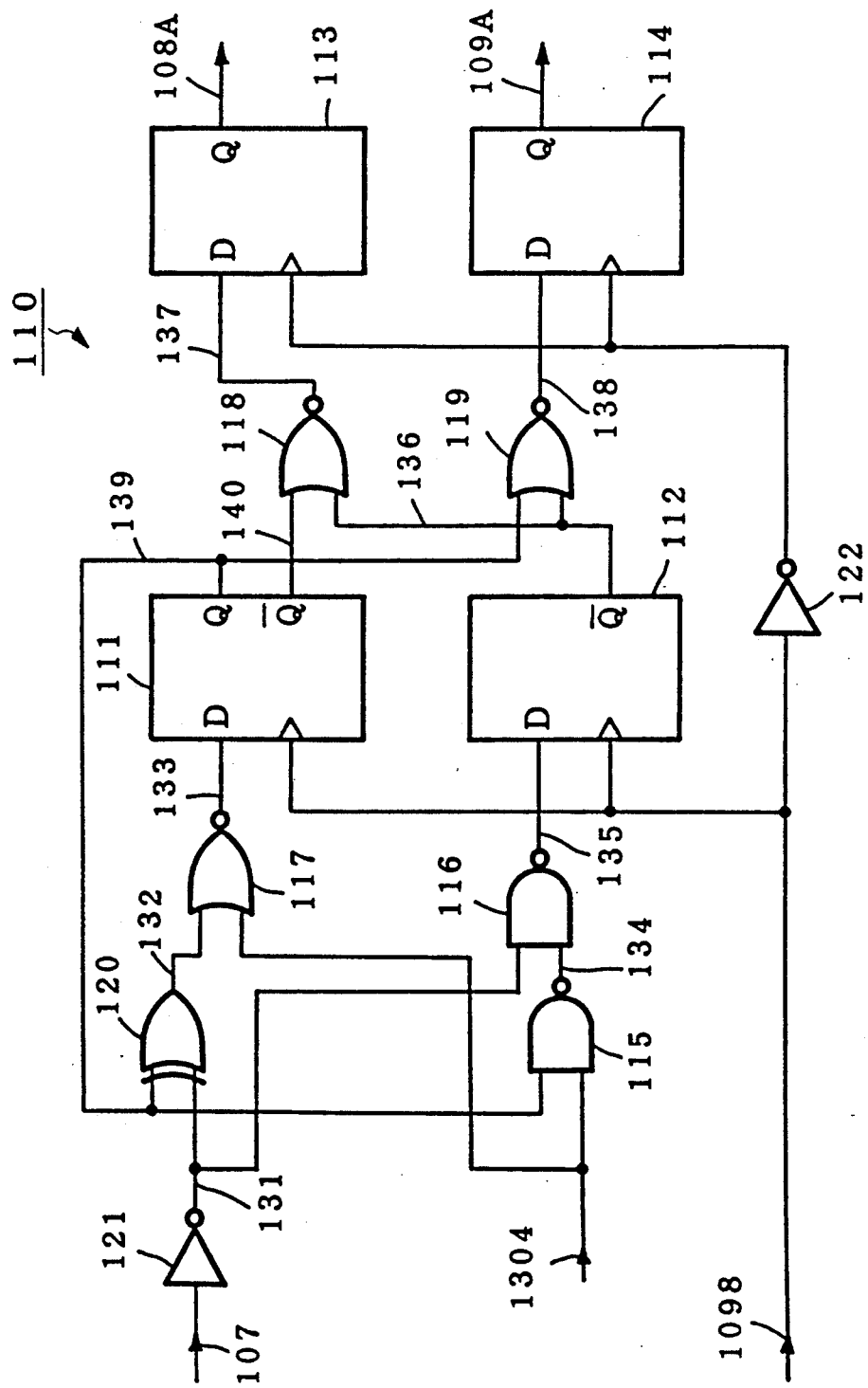
FIG. 3C presents a circuit diagram illustrating one embodiment of the code conversion circuit 110, which is included in the private line interface circuit 100 shown in FIG. 3A.

FIG. 3C is a detailed circuit diagram for the code separating circuit 110A, and the waveforms of the individual sections of the circuit are presented on the timing chart in FIG. 3D.

The signal 107 shown in FIG. 3D(b) is applied as the signal 131 to an EXCLUSIVE-OR gate 120 through the inverter 121, and the signal 132 output from the gate 120 shown in FIG. 3D(d), is applied to one of the input terminals on a NOR gate 117, and the signal 133 output from the gate 117 shown in FIG. 3D(e) is applied to the data terminal of a D-flipflop 111. To the clock terminal for the D-flipflop 111 is applied a signal 1098 which has a period corresponding to the division of the frame 1 into 32 equal segments as shown in FIG. 3D(a).

The signal 139 in FIG. 3D(f), which represents the output Q from the D-flipflop 111, is "0" in the initial period, and, when the "1" in the signal 107 in FIG. 3D(b) is applied, the D-flipflop outputs the signal 139 in FIG. 3D(f) showing "1" in its odd number position and "0" in its even number position. The signal 1304 shown in FIG. 3D(c) is the parity information which assumes "1" when the "1" in the signal 107, which indicates the timing of the downstream signal in FIG. 3D(b) shows an odd number of pieces in one frame, and this signal is applied to the other input into the NOR gate 117.

Moreover, to the other terminal of the EXCLUSIVE-OR gate 120, the signal 139 in FIG. 3D(f) is applied.

The signal 1304 in FIG. 3D(c), which is parity information, is applied to one of the input terminals of NAND gate 115 while the signal 139 in FIG. 3D(f) is applied to the other terminal of the gate 115, and the signal 134 in FIG. 3D(g) is output. This signal 134 in FIG. 3D(g) shows "0" when the signal 1304 in FIG. 3D(c), which is the parity information, shows "1" but the signal 134 shows "1" at any other time.

Upon reception of the signal 131 and the signal 134 in FIG. 3D(g), a NAND gate 116 outputs the signal 135 in FIG. 3D(h) and applies this signal to the data terminal of a D-flipflop 112. To the clock terminal of this D-flipflop 112 is applied the signal 1098 in FIG. 3D(a). From the not-Q output of the D-flipflop 112 is outputted the signal 136 in FIG. 3D(i). The signal 136 in FIG. 3D(i) adds the signal 1304 in FIG. 3D(c) to the signal 107 in FIG. 3D(b) and sets a delay on the signal 1098 in FIG. 3D(a) by one half of the period and indicates the inverted output of signal.

A NOR gate 118, to which the not-Q signal 140 output from the D-flipflop 111, which represents an inversion of the signal 139 in FIG. 3D(f), and the signal 136 in FIG. 3D(i) are applied, gives the output of the signal 137 shown in FIG. 3D(j). The signal 137 in FIG. 3D(j), which is the output of the NOR gate 118, becomes "1" when the "1" in the signal 107 in FIG. 3D(b) is in an odd number of pieces. This signal 137 in FIG. 3D(j) is applied to the data terminal of the D-flipflop 113. The signal 1098 in FIG. 3D(a) is applied to the clock terminal of the D-flipflop 113 through the inverter 122, and then the signal 108A shown in FIG. 3D(l) is outputted from the output Q thereof. This signal 108A becomes "1" when the signal 107 in FIG. 3D(b) shows "1" in an odd number of pieces.

Upon the application of the signal 139 in FIG. 3D(f) and the signal 136 in FIG. 3D(i), a NOR gate 119 outputs the signal 138 in FIG. 3D(k), which is applied to the data terminal D of a D-flipflop 114. The signal 138 in FIG. 3D(k) indicates "1" when the "1" in the signal 1304 in FIG. 3D(c) is added to the signal 107 in FIG. 3D(b) provided that the "1" is in an even number of pieces.

To the clock terminal of the flipflop 114, the signal 1098 in FIG. 3D(a) is applied through the inverter 122, and the signal 109A in FIG. 3D(m) is outputted from the output Q thereof. This signal 109A becomes "1" when the signal 107 contains "1" in an even number of pieces.

FIG. 3D shows a case in which the total of the "1"'s in the signal 107 given in FIG. 3D(b) is in an odd number, but, in case the total of the "1"'s is an even number, the signal 1304, which is the parity information, shows "0".

Figure 4A:
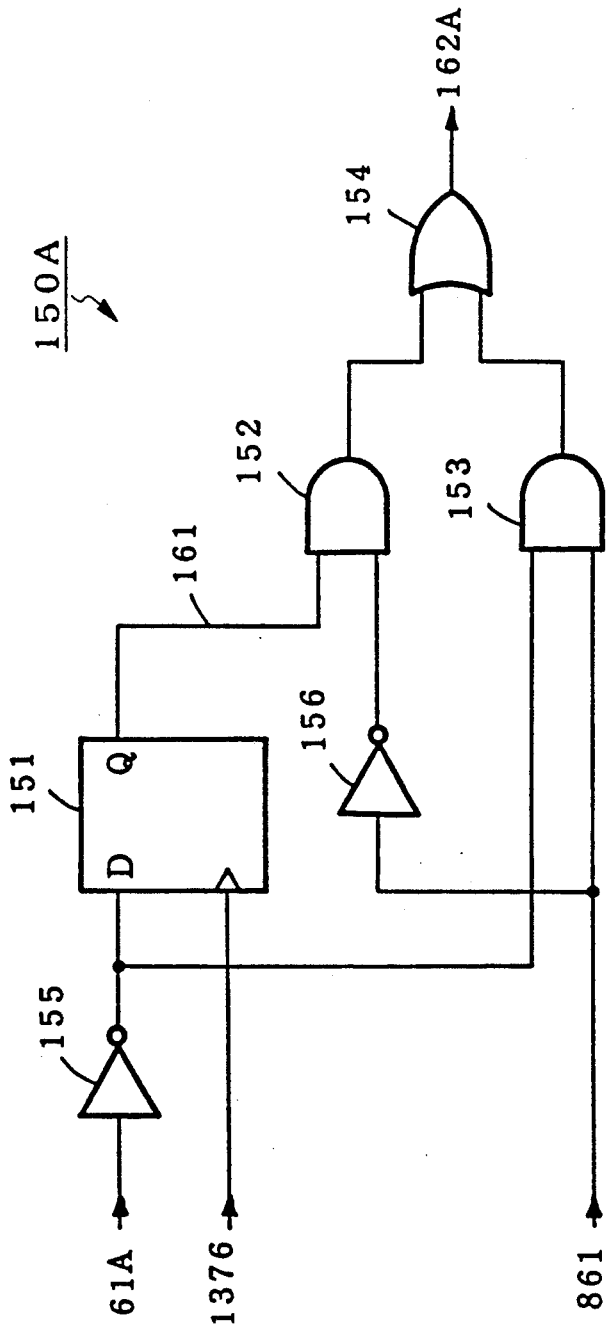
FIG. 4A shows a circuit diagram illustrating one embodiment of the signal receiving circuit 150 shown in FIG. 4A.

FIG. 4A illustrates the specific circuits in receiving circuit 150A, for example, of the receiving circuits 150A through 150D, and the waveforms of the individual sections of the circuits are shown in the form of a timing chart in FIGS. 4B(a) through 4B(g).

The signal 61A in FIG. 4B(a) or 4B(b) is applied to the data terminal D of a D-flipflop 151 through an inverter 155, and the signal 1376 in FIG. 4B(c), which has a period corresponding to the division of the frame 1 for receiving the upstream signal in 32 equal portions, is applied to the clock terminal thereof so that the signal 161 shown in FIG. 4B(d) is obtained from the output Q thereof.

To an AND gate are applied the signal 161 in FIG. 4b(d) and the signal 861, which shows "0" when the transmission distance from the signal receiving circuit 150A to the terminal unit 70 is, for example, 200 meters but shows "1" when the distance is 150 meters to 350 meters, for example.

To an AND gate 153, the signal 861 is applied and the signal 61A is also applied through the inverter 155. The outputs from both of the AND gates 152 and 153 are applied to an OR gate 154, which then outputs the signal 162A.

FIG. 4B(a) shows the signal 61A for the case in which the transmission distance is zero meters. FIG. 4B(b) shows the signal 61A for the case with the transmission distance, l1 = 200 meters, FIG. 4B(e) shows the signal 61A for the case with the distance, l2 = 150 meters, and FIG. 4B(f) shows the signal 61A for the case with the distance, l3 = 350 meters.

In the case where the length of the transmission line is zero meters, the top part of the data information B7 through B0 is applied to the signal receiving circuit 150A at the time t1 as shown in FIG. 4B(a). In the case where the length of the transmission line l1 is 200 meters, the top part of the data information B7 through B0 is applied to the signal receiving circuit 150A at the time t3 as shown in FIG. 4B(b). In the same way, in the case with l2 = 150 meters, the top part of the data information is applied at the time t2 as shown in FIG. 4B(e), and in the case with l3 = 350 meters, the top part of the data information is applied at the time t5 as shown in FIG. 4B(f) to the signal receiving 150A, respectively.

In the case of FIGS. 4B(a) and 4B(b), the signal 861 is "0" and the signal 1376 in FIG. 4B(c) is used for performing the sampling of the signal 61A at the times t4 and t7, by which the data is taken into the D-flipflop 151 and the output therefrom, i.e. the signal 161, is output as the signal 162A through the AND gate 152 and the OR gate 154.

In the case of FIGS. 4B(e) and 4B(f), the signal 861 is "1" and, with the signal 1377 in FIG. 4B(g), (which is not illustrated in FIG. 4A for convenience in description) the signal 61A, which is sampled in another circuit, is output at the times t6 and t8 through the inverter 155, the AND gate 153, and the OR gate 154.

The output in the case of FIGS. 4B(e) and 4B(f) is generated with a delay from the output in the case of FIGS. 4B(a) and 4B(b) by a time corresponding to one half of the period of the signal 1376 in FIG. 4B(c). In this manner, the system is designed to secure its capabilities of dealing adequately with various kinds of transmission lengths for signals.

Figure 5A:
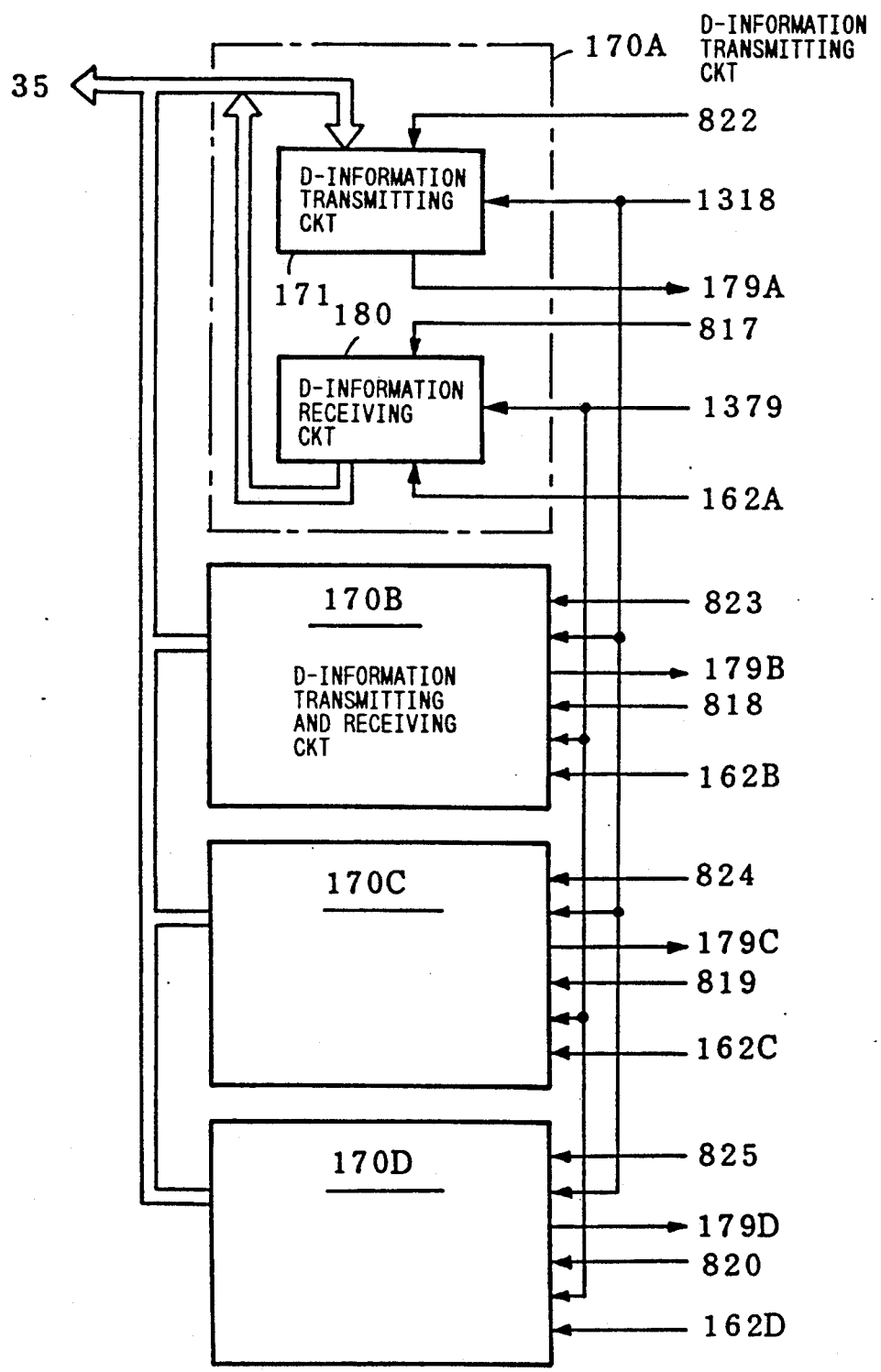
FIG. 5A present a circuit block diagram representing one embodiment of the D-information transmitting and receiving circuit 170.

In FIG. 5A, the circuit configuration of the D-information transmission and receiving circuit 170 is shown, and FIG. 5B is a timing chart which shows the waveforms of the individual sections of the circuit.

The D-information transmitting and receiving circuit 170 is a circuit for transmitting and receiving the dial information as well as the information for controlling the terminal unit 70, and FIG. 5A illustrates four sets of the D-information transmitting and receiving circuits 170A through 170D as examples, among which 170A, for instance, includes the D-information transmission circuit 171 and the D-information receiving circuit 180.

To the D-information transmitting circuit 171 is applied the signal 1318, which determines the timing for sending out the D-information shown in FIG. 5B(a), and, upon reception of the signal 822 for writing, which is to be used for taking into the circuit the data bus signal 35 issued from the CPU 20, the circuit sends out the signal so taken into it to the private line interface circuit 100A as the signal 179A in FIG. 5B(b) at the timing set with the signal 1318.

To the D-information receiving circuit 180 is applied the signal 1379 shown in FIG. 5B(d), which determines the receiving timing for the D-information shown in FIG. 5B, and this circuit takes into it the signal 162A in FIG. 5B(c) from the signal receiving circuit 150A and outputs the data bus signal 35 to the CPU 20 at the timing set with the signal 817.

Figure 5C:
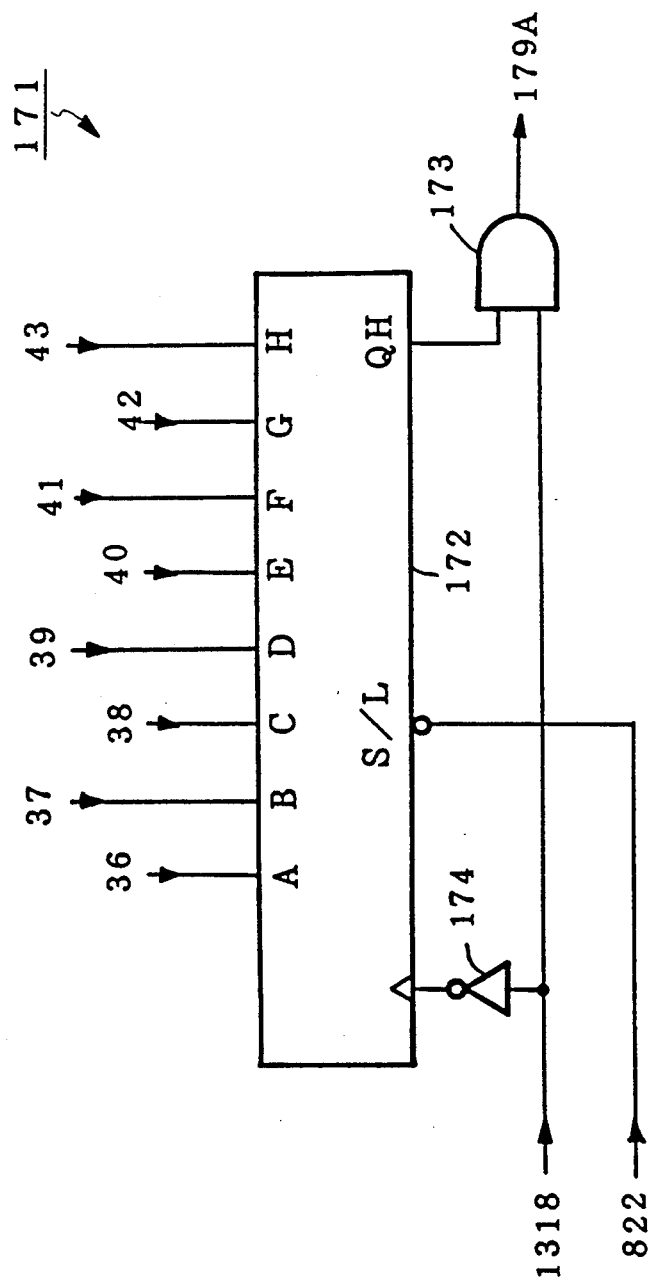
FIG. 5C shows a circuit diagram illustrating one embodiment of the D-information transmitting circuit 171.

In FIG. 5C, a specific circuit diagram is presented for the D-information transmitting circuit 171.

Numeral reference 172 represents a P/S (Parallel/-serial (hereinafter P/S) register, and, with the signals 43,42, ... 36 obtained in the stated order in the form of serial signals in the output QH at each time when the signal 822 applied to the shift/load terminal S/L takes into itself the signals 36~43, which are applied in parallel to the input terminals A~H, at "0", the signal 1318 (as shown in FIG. 5B(a)) being applied at "1" to its clock terminal through the inverter 174, the signal is output as the signal 179A (as shown in FIG. 5B(b)) through the AND gate to which the signal 1318 has been applied.

Figure 5D:
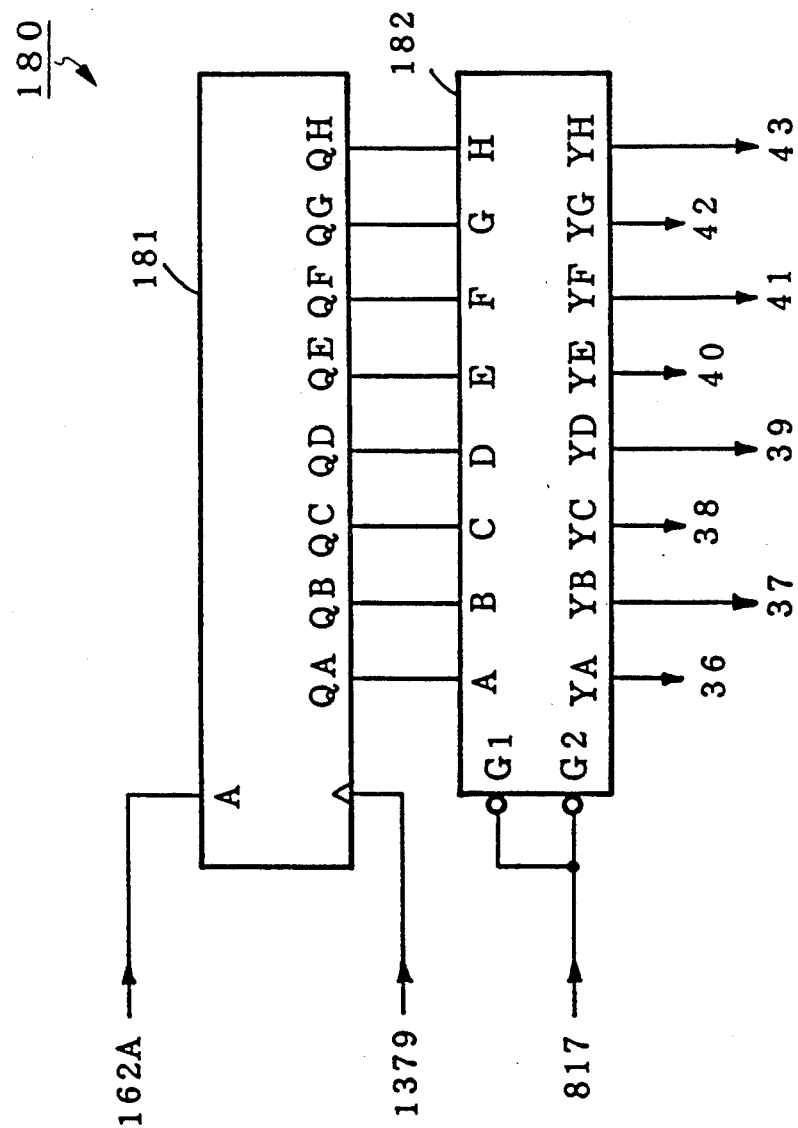
FIG. 5D shows a circuit diagram illustrating one embodiment of the D-information receiving circuit 180.

FIG. 5D shows a specific circuit diagram for the D-information receiving circuit 180.

To the terminal A for an 8-bit shift register 181 is applied the signal 162A from the signal receiving circuit 150A, and this register takes into itself the data in the signal 162A at each time when the signal 1379 for taking in the data is applied to the clock terminal thereof and outputs the data in parallel to the output QA~QH by shifting in regular sequence. These parallel outputs QA~QH are input in parallel into the input terminals A through H of a three-state buffer 182, which outputs to the CPU 20 the signals applied to the input terminals A through H thereof when the signal 817, which is the read signal applied from the CPU to the control terminals G1 and G2, shows "0" as the signals 36~43, which respectively constitute the data bus signals 35, from the output terminals YA through YH.

Figure 6A:
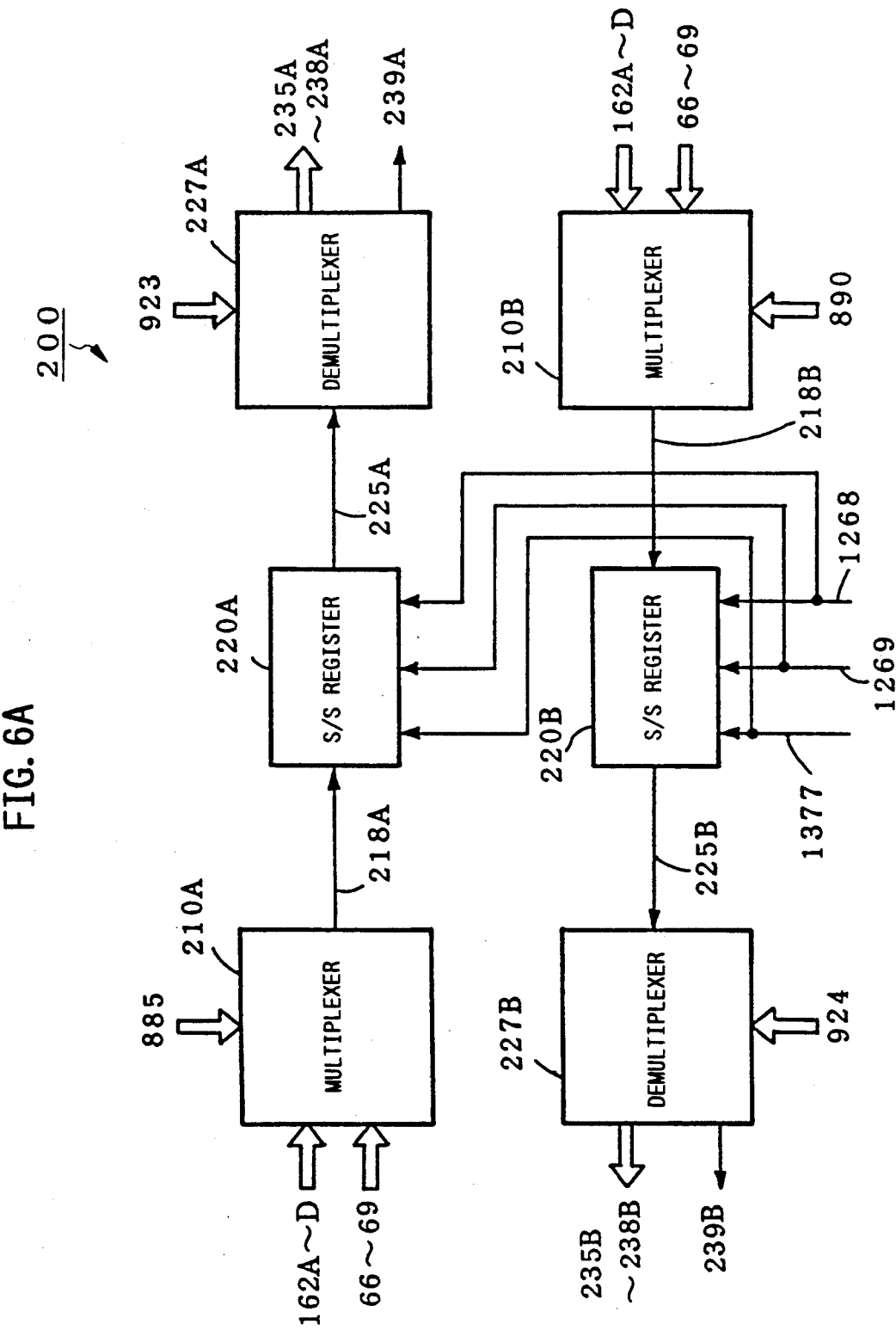
FIG. 6A presents a circuit block diagram illustrating one embodiment of the private line speech circuit 200.

In FIG. 6A, a circuit block diagram is presented for the private line speech circuit 200, and a multiplexer 210A outputs the signal 218A to a S/S register 220A by performing selection of the signals 162A~162D from the signal receiving circuits 150A~150D and the signals 66~69 indicating the sound source information, operating with the bus signal 885 which is to work for the selection of these signals 162A~162D and 66~69.

The S/S register 220A receives the signal 218A, which is a serial signal, and performs the reception of the signal at the timing set with the signal 1377 and sends out the received signal as the signal 225A at the timing set with the signal 1269, this sending operation continuing as long as the signal 1268 remains "1".

Upon reception of the signal 225A and the bus signal 923 for indicating the destination for the sending operation, a demultiplexer 227A sends out the signals 235A~238A respectively to the private line interface circuits 100A~100D and the signal 239A to the public address system circuit 700.

A multiplexer 210B, a S/S register 220B, and a demultiplexer 227B are respectively in correspondence with the multiplexer 210A, the S/S register 220A, and the demultiplexer 227A and operate in the same manner as these counterparts.

Figure 6B:
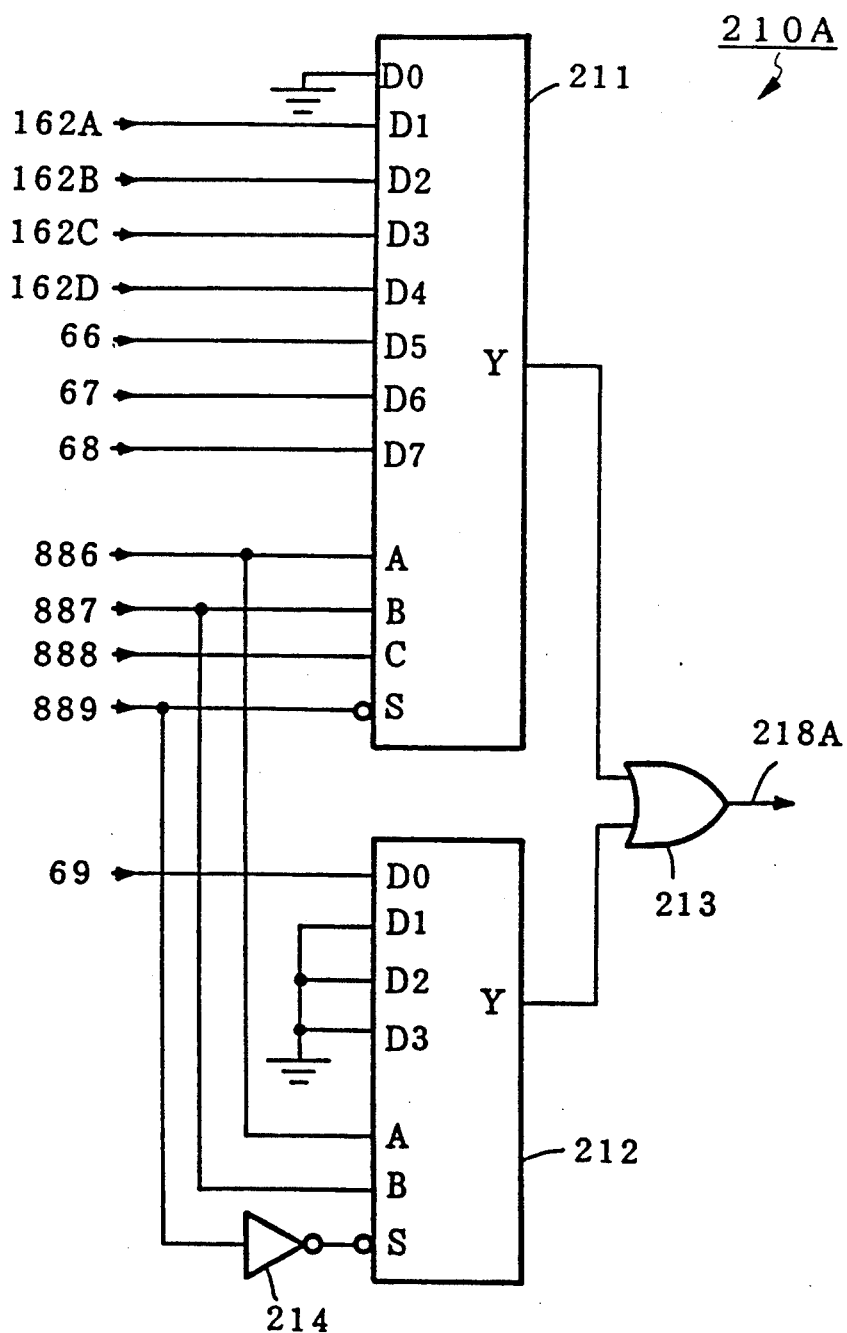
FIG. 6B presents a circuit diagram illustrating one embodiment of the multiplexer 210.

FIG. 6B illustrates the specific circuit diagram for the multiplexer 210A. Numeral reference 211 indicates an 8-bit multiplexer, and numeral reference 212 represents a 4-bit multiplexer. By applying the signals 162A~162D and 66~69, as well as the selection signals 886~889, which are applied to the data terminals D1~D7 of the multiplexer 211 and the DO of the multiplexer 212, to the select terminals A, B, and C and to the strobe terminal S of the 8-bit multiplexer and also to the select terminals A and B, and to the strobe terminal S via the inverter 214 of the 4-bit multiplexer, the output signals as selected are obtained at the respective Y-terminals of the multiplexers 211 and 212 and are output as the signal 218A to the S/S register 220A through the OR gate 213. When the signals for selection, 886~889, are all "0," the grounded data terminal DO is selected, a silent signal is output as the signal 218A from the y-terminal via the OR gate 213. The data terminals D1~D3 of the 4-bit multiplexer 212 will not be selected.

In FIG. 6C is shown a specific circuit diagram for the S/S register 220A while FIGS. 6D(a) through 6D(h) give a timing chart which present the waveforms of the individual parts of the register.

Upon the application of the signal 218A shown in FIG. 6D(a) from the multiplexer 210A to the serial input terminal A of an 8-bit shift register 221, the register 221 receives at its clock terminal the signal 1377 for the signal reception timing and the signal 1269 for the signal transmission timing as shown in FIG. 6D(b) through the OR gate 223, and, at the time of signal reception, the register 221 has the signal 218A input serially and latches the signal, and then outputs the signal in sequence at the timing set with the signal 1269 given in FIG. 6D(g), and outputs the signal 225A in FIG. 6D(h) through the AND gate 222 in the period when the signal 1268 shows "1". The respective output terminals QA, QB, ... QH of the 8-bit shift register 221 are explained with reference to the examples given in FIGS. 6D(c), 6D(d), and 6D(e). The shift is made by one bit each in the order of QA, QB, and so forth, and it is shown that the data information B7~0 (the letter B being omitted in the chart) are output in the regular sequence in the output from QH.

The signals 1377, 1268, and 1269 shown in FIGS. 6D(b), 6D(f), and 6D(g) are shown also in FIGS. 1E(e), 1E(b), and 1E(c) and, as is evident in these charts, the frame given in FIG. 6 is shown with a delay by one half of a frame.

Figure 6E:
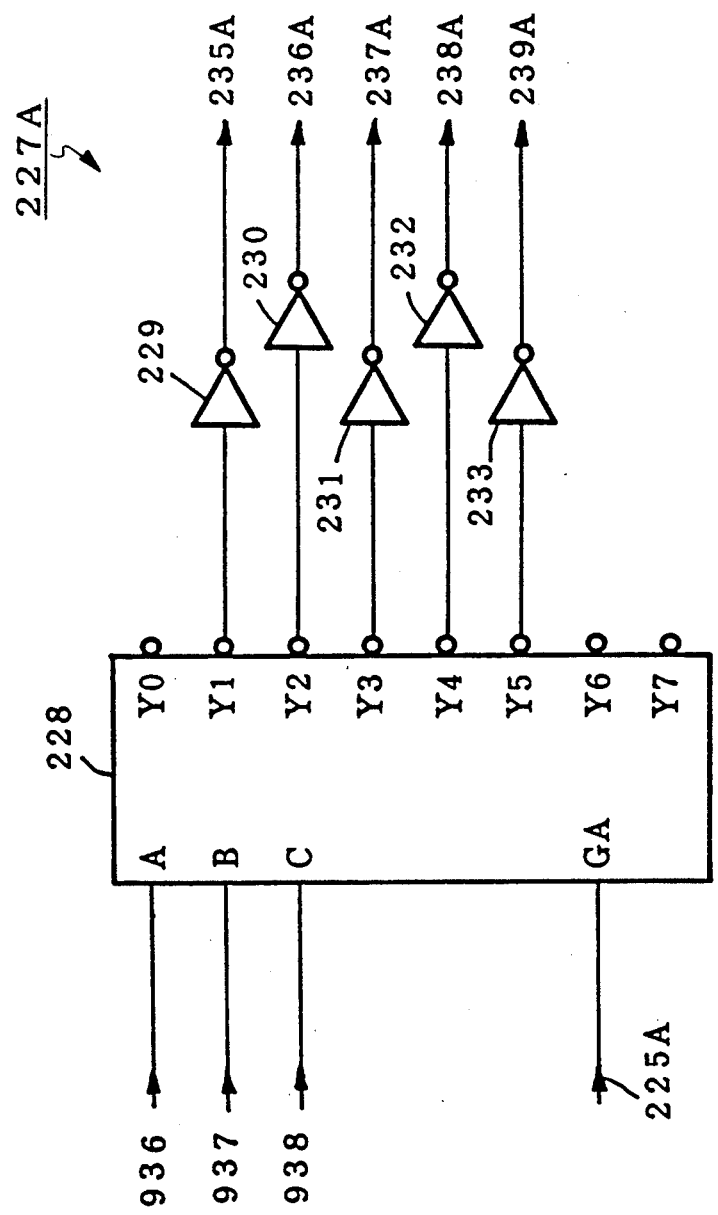
FIG. 6E presents a circuit diagram illustrating one embodiment of the demultiplexer 227A.

In FIG. 6E is shown a circuit diagram for the demultiplexer 227A. In the 3-input and 8-output decoder 228, which has received the selection signals 936~938 at the select terminals A~C and the signal 225 at the enable terminal GA, the signals 235A~239A are obtained from the terminals Y1~Y5 of its output terminals Y0~Y7 through the inverters 229~233. Here, no output at all is generated so that the output terminal Y0 will be selected, when the signals for selection 936~938 all show "0".

Figure 6F:
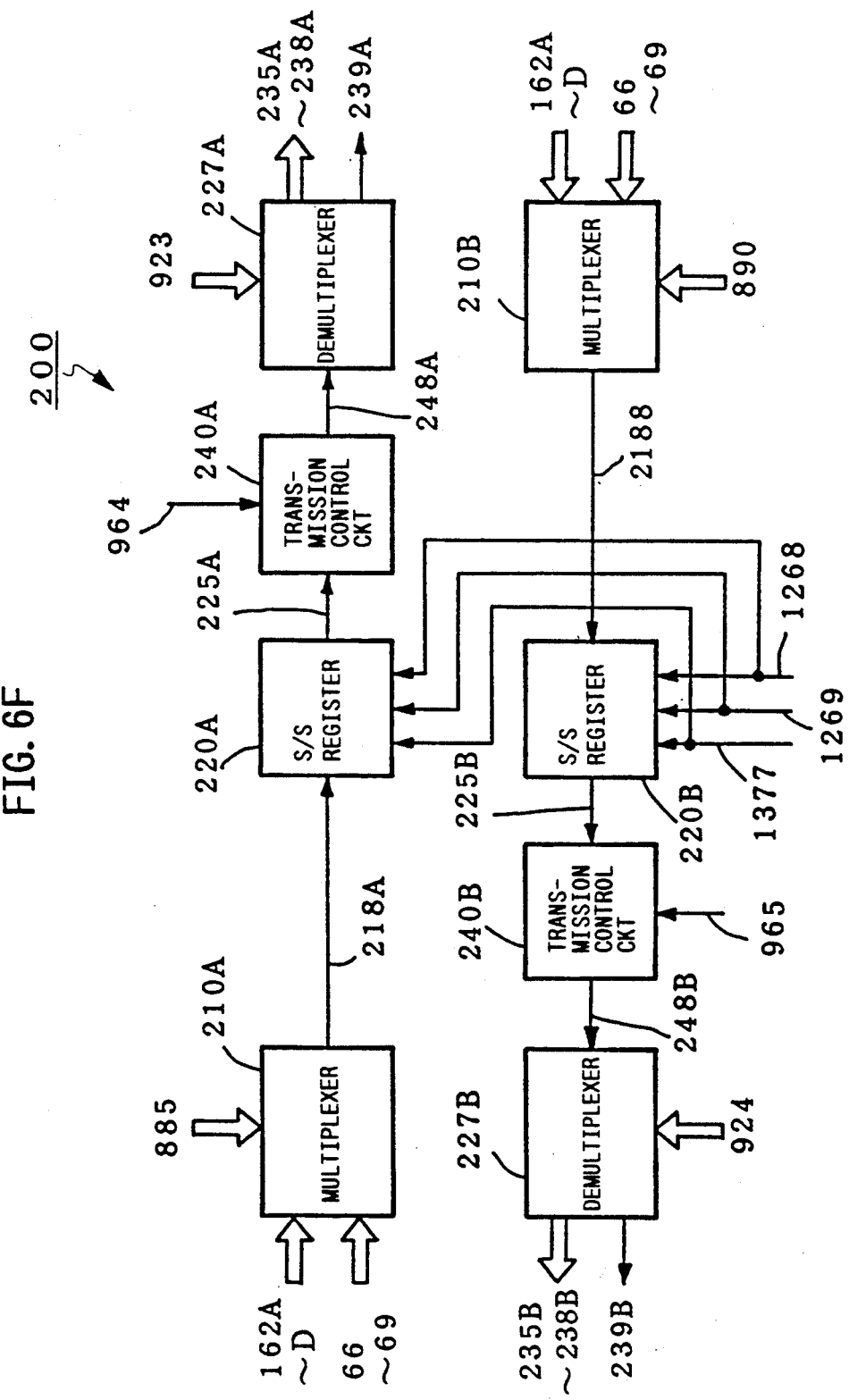
FIG. 6F presents a circuit block diagram illustrating other embodiment of the private line speech circuit 200.

FIG. 6F presents a circuit block diagram showing the other embodiment of the private line speech circuit 200, and the difference from the circuit shown in FIG. 6A is found in the point that the dispatch control circuits 240A and 240B have been added, and these embodiments are the same in respect of the other points.

The signal 225A from the S/S register 220A is not applied directly to the demultiplexer 227, but are allowed to pass through the signal 225a or prohibited from its passage through the signal by the aid of the control signal 964 in a dispatch control circuit 240A. This design feature offers the advantage that greater ease can be secured in the designing of the hierarchical architecture of the software in the CPU 20 by virtue of the separation between the selection of the destination and the sending of the signal in the demultiplexer 227A.

The specific circuit in this dispatch control circuit 240A is illustrated in FIG. 6G, and this circuit obtains the signal 248A, which is the output, when the signal 964 is "0" with the control signal 964 being applied through the inverter 242, and the signal 225A being applied directly, to the AND gate 241, respectively. The working of the dispatch control circuit 240B is the same as that of the control circuit 240A.

Figure 7A:
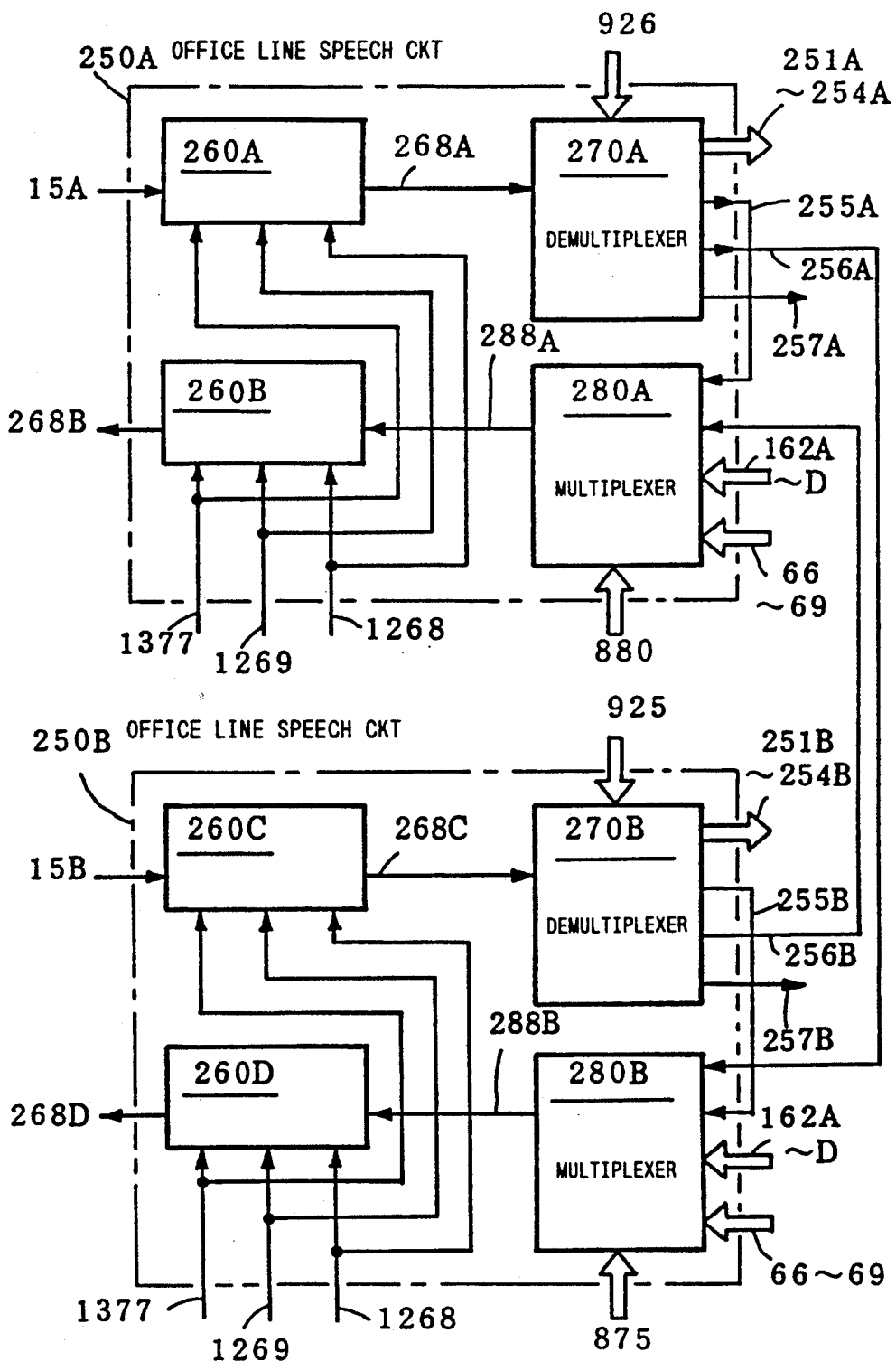
FIG. 7A presents a circuit block diagram illustrating one embodiment in a system where the central office line speech circuit 250 is connected for intra-office line communications.

In FIG. 7A, the two sets of circuit block diagrams are presented for the central office line speech circuits 250A and 250B, and these represent the circuits to be put into operation in the case where the calls arriving from the central office line are transferred to another office line for retransmission.

The signal 15A transmitted from a central office line is received by the S/S register 260A, which then outputs the signal 268A, which is then applied in its turn to the demultiplexer 270A, which outputs the signal 256A. The signal 256A is then applied to the multiplexer 280B for the central office line speech circuit 250B, through which the signal 288B is output to be input into the S/S register 260D, through which the signal 268D is output to the office line.

The signal 15B transmitted from another central office line is received similarly by the S/S register 260C, which outputs the signal 268C, which is then applied to the demultiplexer 270B to be output as the signal 256B, which is applied to the multiplexer 280A for the central office line speech circuit 250A, through which the signal 288A is output as the signal 268B through the S/S register 260B, to the central office line.

Here, the signal 1377 is the signal for signal reception timing to be applied to the S/S register 260A~260D, and the signal 1269 is likewise a signal for signal sending timing, and the signal 1268 is similarly a signal for indicating the sending period at "1". The bus signal 926 (925) is a bus signal for indicating the destination of a call, and buses 251A through 254A (251B through 254B) send out to the individual destinations the data information (B7~B0) addressed to the private line interface circuits 100A~100D.

The signal 257A (257B) sends out the data information (sound information) to the public address system circuit 700. The signal 255A (255B) is applied to the multiplexer 280a (280B). Numeral references 162A~D are the signals from the signal receiving circuits 150A~150D, and the signals 66~69 represent the sound source information. Selection is made with a bus signal 880 (875), which is intended for making selections of these signals 162A~D and 66~69, and the signal 288A (288B) is output to the S/S register 260B (260D).

Figure 7B:
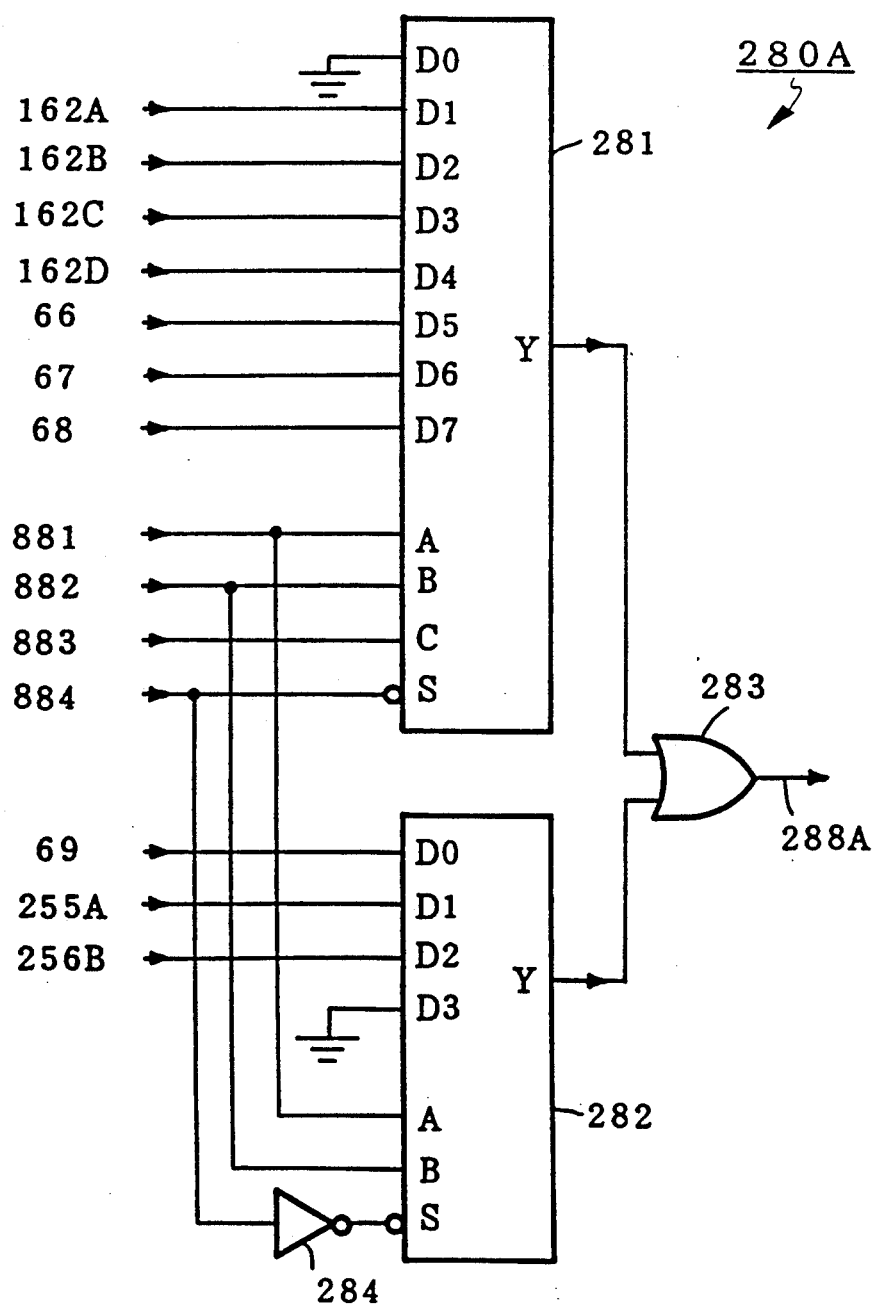
FIG. 7B presents a circuit diagram illustrating one embodiment of the multiplexer 280.

In FIG. 7B is shown a specific circuit diagram for the multiplexer 280A. Numeral reference 281 represents the 8-bit multiplexer, and numeral reference 282 represents the 4-bit multiplexer, and the signals 162A~162D, 66~69, 255A, and 256B, which are applied to the data terminals D1~D7 of the 8-bit multiplexer 281 and the terminals D0~D3 of 282, are selected with the selection signals 881~884 applied to the select terminals A, B and C and the strobe terminal S of the 8-bit multiplexer and to the select terminals A and B, and to the strobe terminal S through the inverter 284, of the 4-bit multiplexer, and the individual output signals so selected are obtained on the Y-terminals of these multiplexers, the output signals being output as the signal 288A to the S/S register 260B through the OR gate 283. When the selection signals 881~884 are all "0," the grounded data terminal D0 of the 8-bit multiplexer is selected, and a silent signal is output as the signal 288A from the Y-terminal through the OR gate 283. The data terminal D3 of the 4-bit multiplexer 282 will not be selected at any event.

Figure 7C:
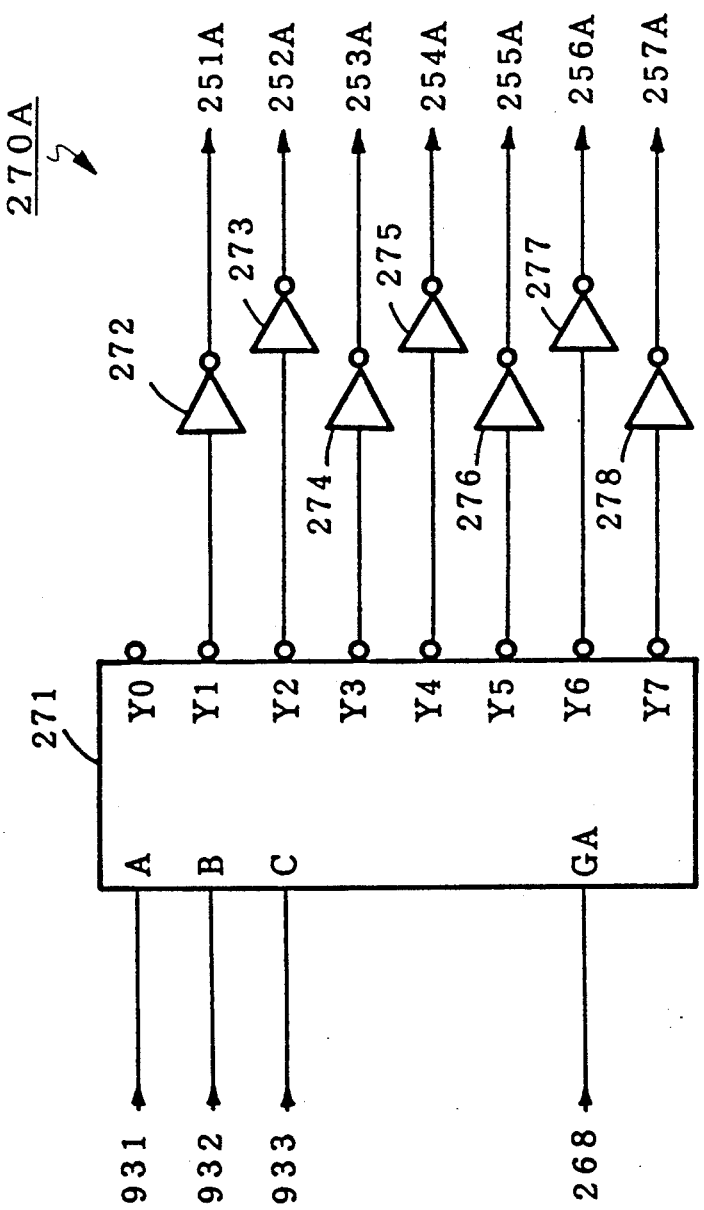
FIG. 7C presents a circuit diagram which illustrates one embodiment of the demultiplexer 270A.

In FIG. 7C is presented a circuit diagram for the demultiplexer 270A. In the 3-input and 8-output decoder 271, which has received the selection signals 931~933 included in the bus signal 926 at its select terminals A~C and the signal 268 at its enable terminal GA, the signals 251A~257A are obtained from the terminals Y1~Y7, out of its output terminals Y0~Y7, through the inverters 272~278. Here, when the selection signals 931~933 are all showing "0," no output at all is given, so that the output terminal Y0 will be selected.

Figure 7D:
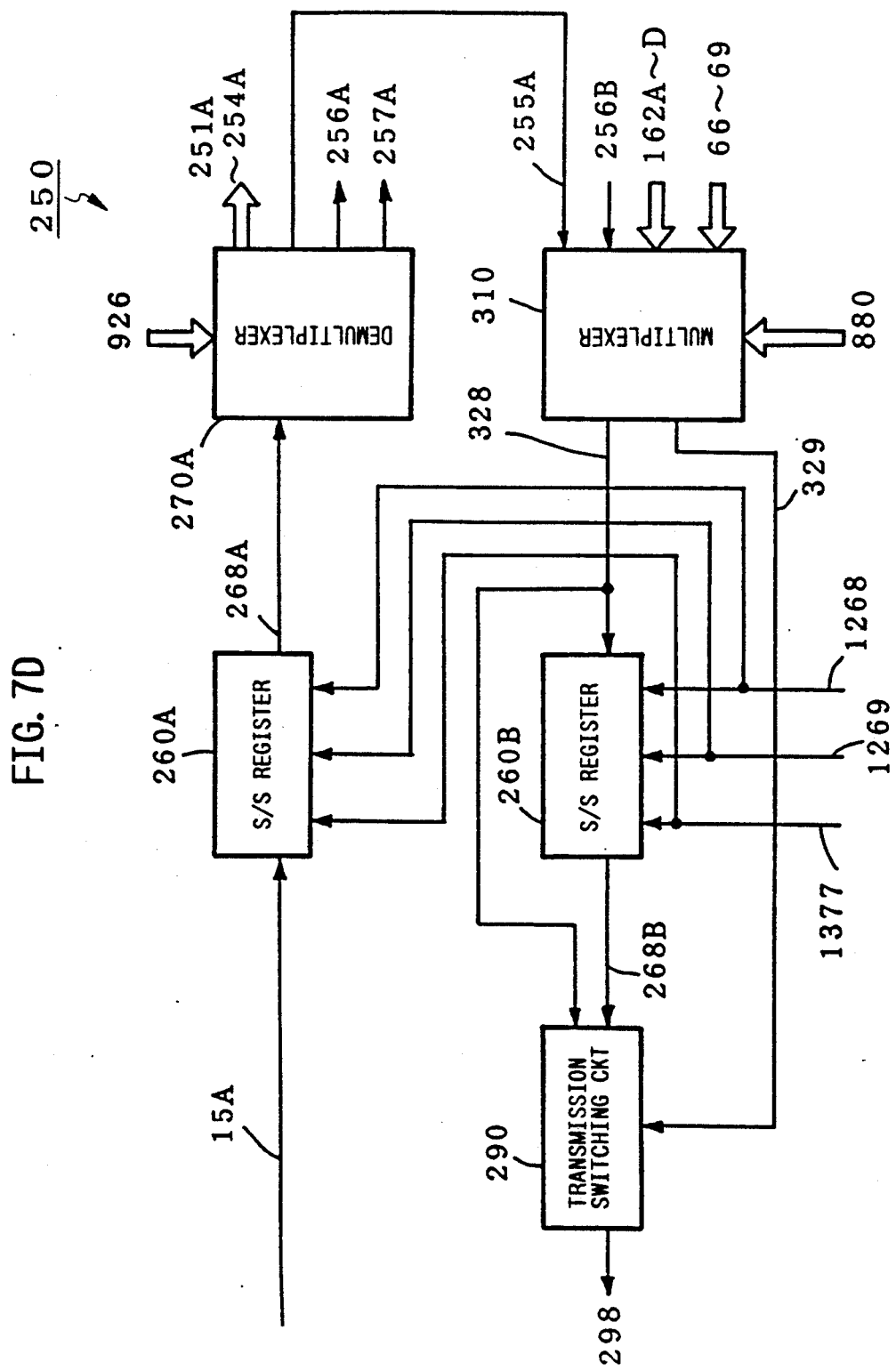
FIG. 7D presents a circuit block diagram illustrating other embodiments of the central office line speech circuit 250.

In FIG. 7D, other embodiments of the central office line speech circuit 250A or 250B are presented, and the differences of these embodiments as compared with the central office line speech circuit 250A shown in FIG. 7A are found in the point that the switching circuit for sending has been added to these and that the multiplexer 310, which is different from the multiplexer 280, is employed. Hence, a description is presented here with respect to these differences.

The circuit illustrated in FIG. 7D is a circuit which is suitable for the transfer operation explained in FIG. 7A. The signal 15A (328), which is the input signal for the S/S register 260A, is taken into the register in the second half of one frame as illustrated in FIG. 1E (d) and the signal is then sent out in the first half of the next frame as shown in FIG. 1E(a). Yet, in the transfer of the signal on the office line, the signal 255A from the demultiplexer 270A is applied immediately to the multiplexer 310, and the signal 328 output from the multiplexer is applied to the S/S register 260B, at which time the signals 1268 and 1269, i.e. the sending timing signals given in FIGS. 1E(b) and 1E(c), are already applied to the register, and consequently the S/S register 260B cannot take the signal 328 into itself, so that the signal bypasses the S/S register and is transmitted through the switching circuit for sending and transmitted as the signal 298 to the side of the office line through the OR circuits 13A and 13B. It is determined by the signal 329 from the multiplexer whether or not the signal 328 is to be output as the signal 298 from the switching circuit for sending 290, the signal being sent bypassing the S/S register 260B.

Figure 7E:
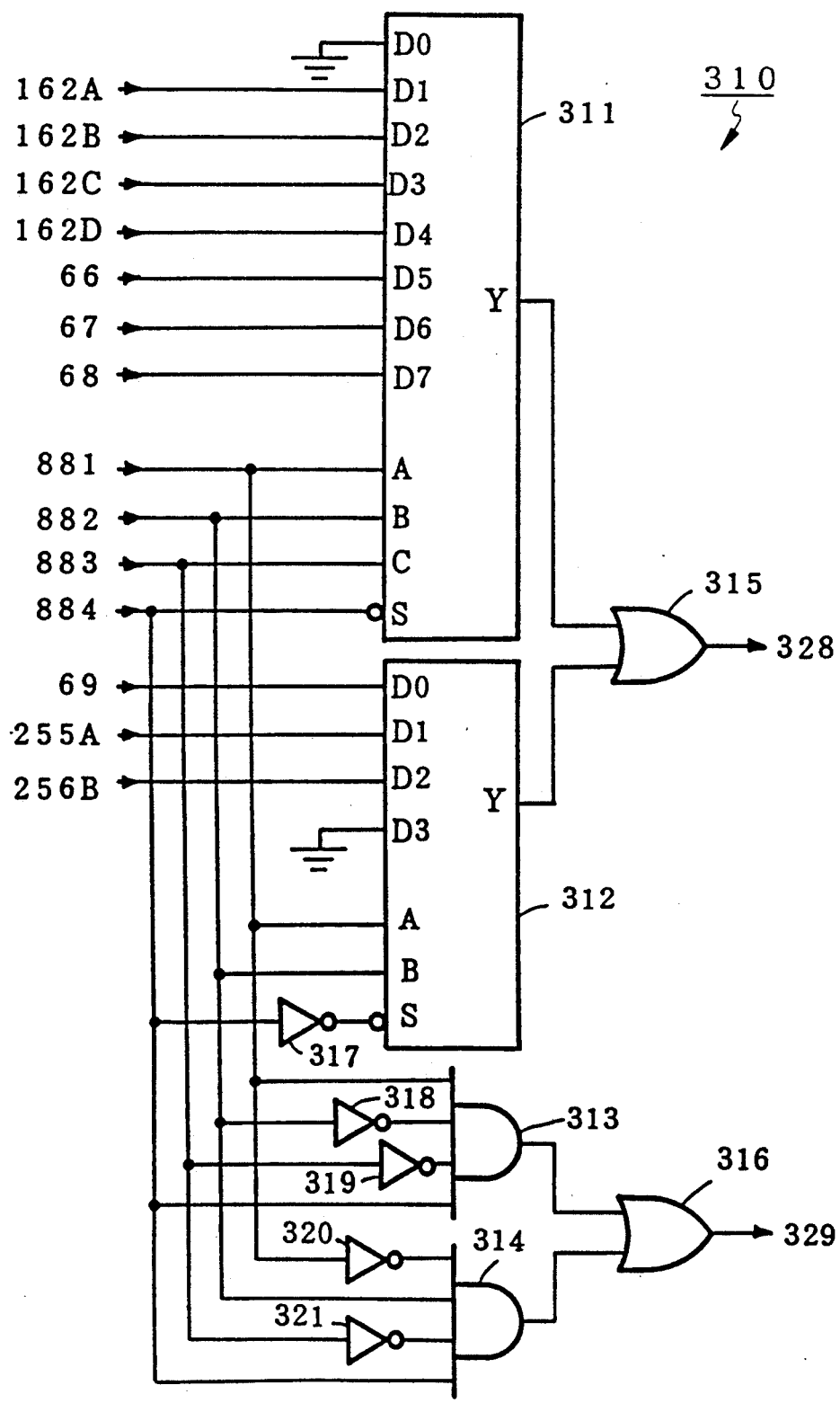
FIG. 7E presents a circuit diagram illustrating one embodiment of the multiplexer 310.

FIG. 7E shows a specific circuit diagram for the multiplexer 310. Numeral reference 311 indicates the 8-bit multiplexer, and numeral reference 312 represents the 4-bit multiplexer. The signals 162A~162D, 255A, and 256B, which are applied to the data terminals D1~D7 of the multiplexer 311 and the data terminals D0~D2 of the data terminals of the multiplexer 312 are selected with the selection signals 881~884 being applied to the select terminals A, B, and C, as well as the strobe terminals S, of the 8-bit multiplexer and to the select terminals A and B, as well as the strobe terminal S through the inverter 317, of the 4-bit multiplexer 312, and the signals so selected are obtained on the Y-terminals of these multiplexers and are output as the signal 328 to the S/S register 260B and the switching circuit for sending 290 through the OR gate 315.

When the selection signals 881~884 are all "0," the grounded terminal D0 on the 8-bit multiplexer 311 is selected, and a silent signal is output as the signal 328 from the Y-terminal through the OR gate 315. The data terminal D3 on the 4-bit multiplexer 312 will not be selected in any event. The selection signals 881~884 are applied to the AND gates 313 and 314 either through the inverters 318~321 or directly, and the output from these gates are OR'ed in the OR gate 316 and the signal 329 is output. When the selection signals 881~884 have selected the signal 255A or the signal 256B, the signal 329 is to be "1" in either case, but it is to be "0" in any other case.

Figure 7F:
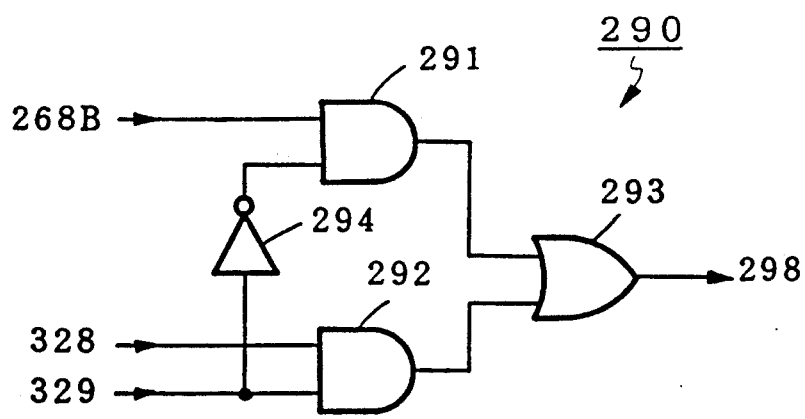
FIG. 7F presents a circuit diagram of one embodiment of the transmission switching circuit 290 and a table showing the relationship between the switching signal and the output signal.

In FIG. 7F(a), a specific circuit diagram for the dispatch switching 290 shown in FIG. 7D is presented.

A signal 268B, which is the output from a S/S register 260B and a control signal 329 are applied to an AND gate 291 through a inverter 294, and the output from the AND gate 291 is applied to the OR gate 293. The output from the AND gate 292, to which a signal 328 and the signal 329 from a multiplexer 310 have been applied, is applied to the OR gate 293, outputting a signal 298. The relationship between these signals 329 and 298 is illustrated in FIG. 7F(b). The signal 328 is output as the signal 298 when the signal 329 shows "1" and the signal 268B is output as the signal 298 when the signal 329 is "0".

Figure 7G:
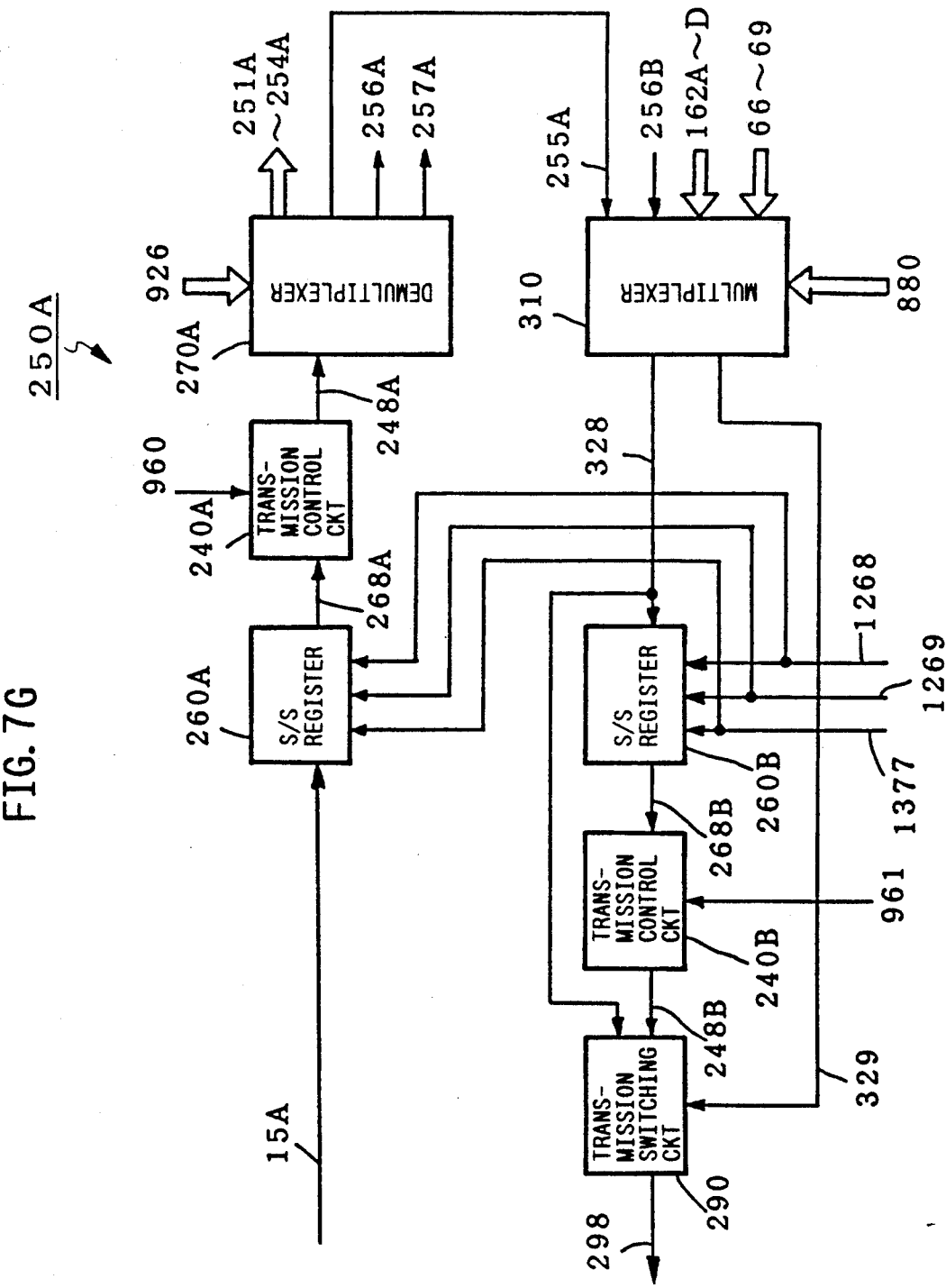
FIG. 7G presents a circuit block diagram illustrating other embodiments of the central office line speech circuit 250.

FIG. 7G presents a circuit block diagram illustrating other embodiments of the central office line speech circuit 250A shown in FIG. 7D, and the difference of these embodiments from those given in FIG. 7D is to be found in the point that the dispatch control circuits 240A and 240B have been added to these, which remain the same in the other respects.

A signal 268A from a S/S register 260A is not applied directly to a demultiplexer 270A, but the signal 248A is allowed to pass, or else prohibited from its passage due to the control signal 960 in a dispatch control circuit 240A. Such an arrangement has the advantage that greater ease is thereby attained in the designing of the hierarchical architecture of the software in the CPU 20 by the separation between the selection of the destinations in the demultiplexer 270A and the dispatching of the signals.

The specific circuit configuration of this dispatch control circuit 240A (240B) is identical to what has already been shown in FIG. 6G.

Figure 8A:
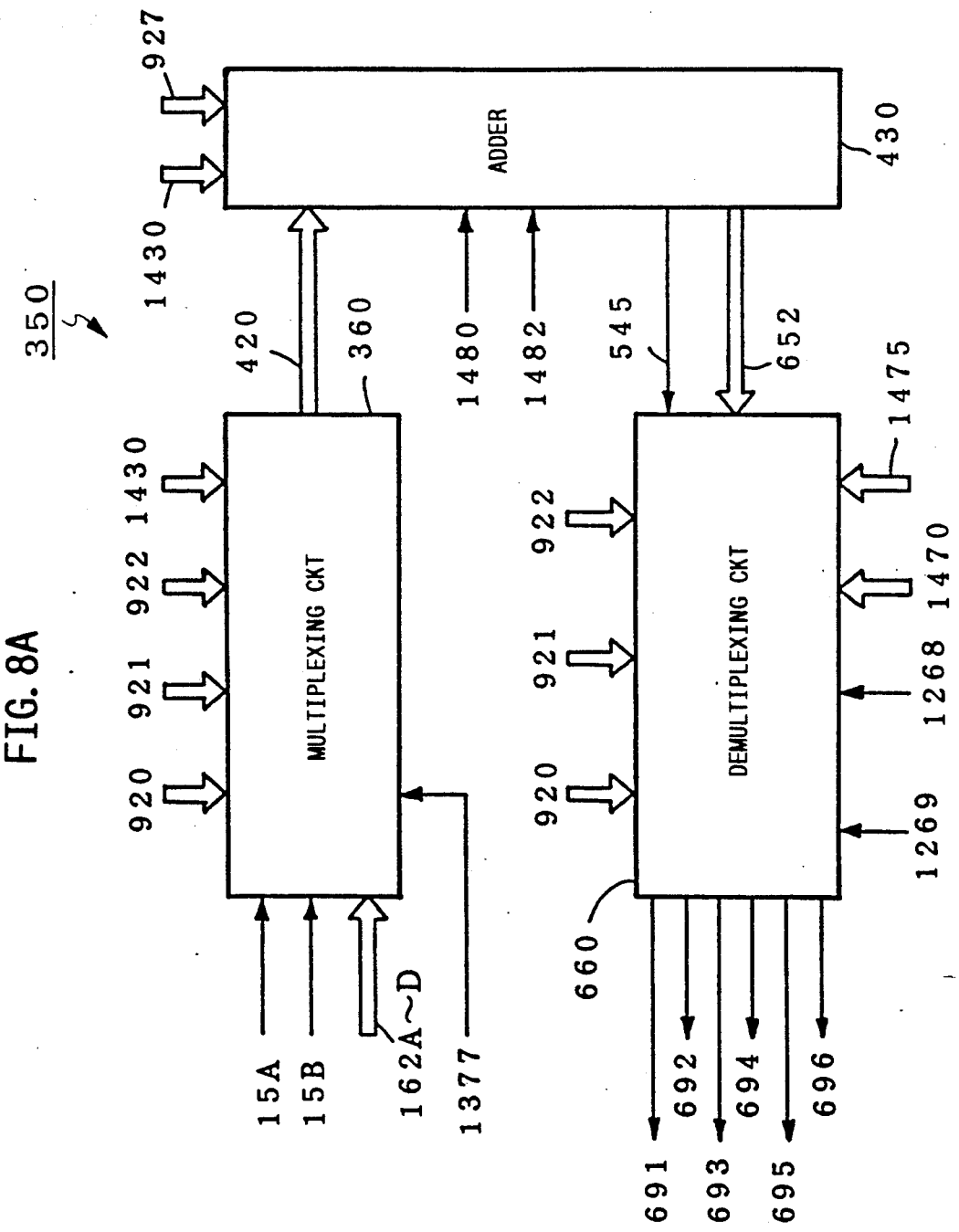
FIG. 8A presents a circuit block diagram illustrating one embodiment of the conference speech circuit 350.

FIG. 8A illustrates a circuit configuration of the conference service system circuit 350. Numeral reference 360 shows a multiplexing circuit, which multiplexes the signal 15A, 15B, which are respectively input serially from the central office line side, and signals 162A~162D, which are applied from the terminal unit 70 through the signal receiving circuits 150A~150D, making selection of the signals in accordance with the instructions given by the bus signals 920, 921, and 922, and then converts the selected signals into parallel arrangements at the timing set by the signal 1377, and outputs the signals as the bus signal 420 in parallel at the timing set by the bus signal 1430.

Numeral reference 430 represents an adder, which receives a bus signal 927 for setting the amount of attenuation to each of a plural number of signals in a bus signal 420 from the multiplexing circuit 360, a bus signal 1430, which is a timing signal for setting the attenuation, a signal 1480, which is a clear signal for setting the initial value at zero, and a signal 1482, which is to be used for latching the addition data, and the adder 430 outputs a signal 545, which represents the polarity of the signals, and a bus signal 652, which is used for outputting the results of the adding operations.

Numeral reference 660 represents a demultiplexing circuit, which latches the input signal 545 and the bus signal 652, which is a parallel signal, in accordance with the instructions issued by a bus signal 1470 at the timing set by a bus signal 1475 and outputs the latched signals as signals 691~696 connected to their respective destinations, at the timing set by a signal 1269, to such destinations as are directed by bus signals 920, 921, and 922 in the periods indicated by a signal 1268.

Figure 8B:
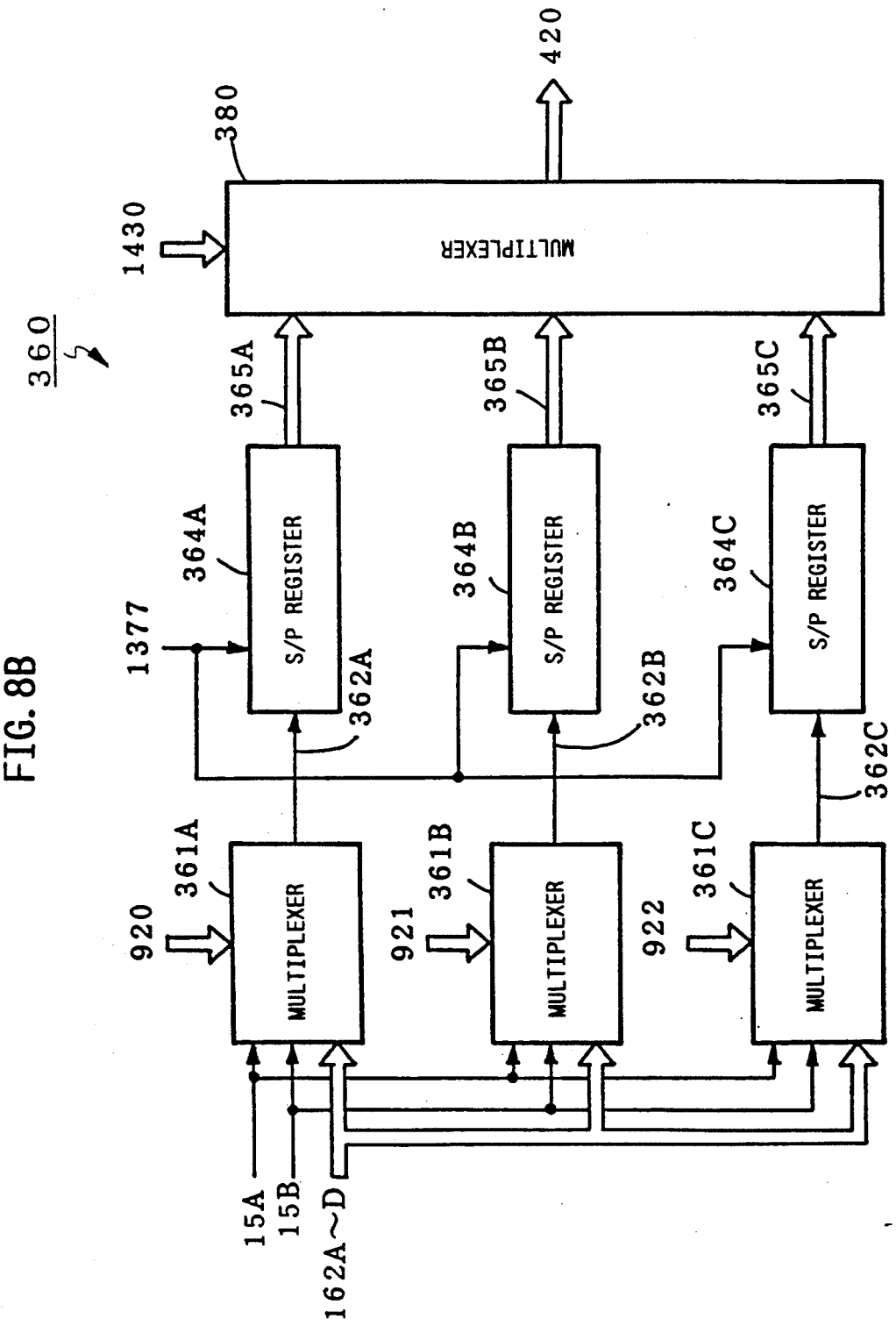
FIG. 8B presents a circuit block diagram illustrating one embodiment of the multiplex circuit 360.

FIG. 8B illustrates a more specific circuit configuration of the multiplexing circuit 360.

Numeral references 361A through 361C are multiplexers, which respectively receive signals 15A and 15B from the central office line side and signals 162A through 162D which are applied to them from the terminal unit 70 through the signal receiving circuits 150A~150D and respectively output multiplexed signals 362A~362C in accordance with bus signals 920~922, which give instructions on the individual destinations of the transmitted signals.

The signals 362A~362C in the individual outputs from the multiplexers 361A~361C are respectively applied to serial/parallel (hereinafter S/P) registers 364A~364C, which are registers for converting the serial input signals into parallel output signals, and are taken into the registers at the timing set by the signal 1377 and are output in accordance with the parallel bus signals 365A~365C and applied to the multiplexer 380.

Figure 8C:
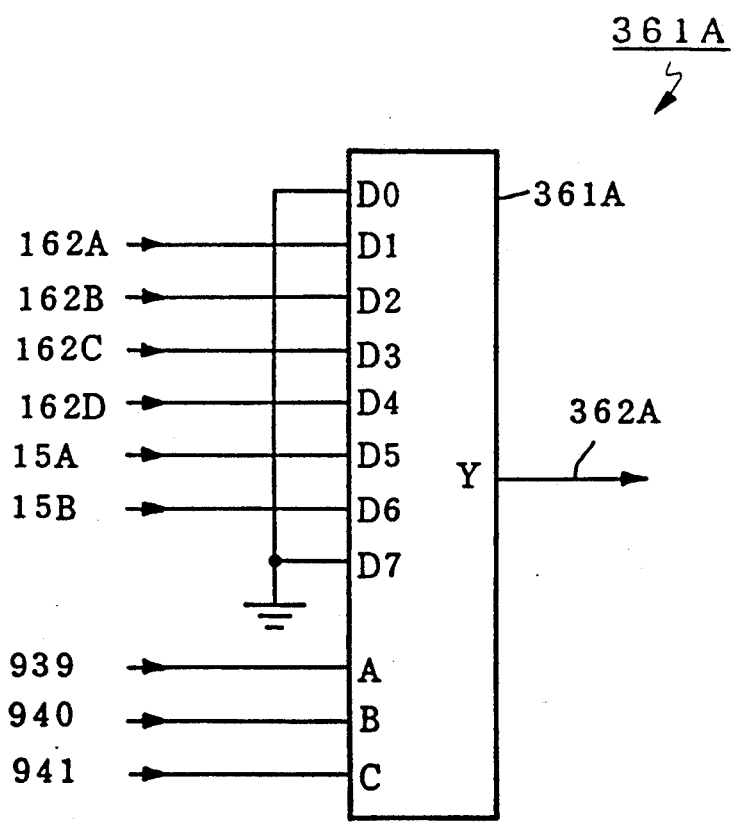
FIG. 8C presents a circuit diagram illustrating one embodiment of the multiplexer 361.

FIG. 8C illustrates a specific circuit diagram of the multiplexer 361A (the circuit configuration is the same also in 361B and 361C), and this multiplexer 361A receives the signals 162A~162D, which are applied from the terminal unit 70 through the signal receiving circuits 150A~150D, the signals 15A and 15B from the central office line side, and the signals 939~941, which constitute the bus signal 920 for making the selection of the individual destinations, as applied to its select data terminals D1~D6 and its select terminals A~C and outputs the multiplexed serial signal 362A to the output terminal Y.

Figure 8D:
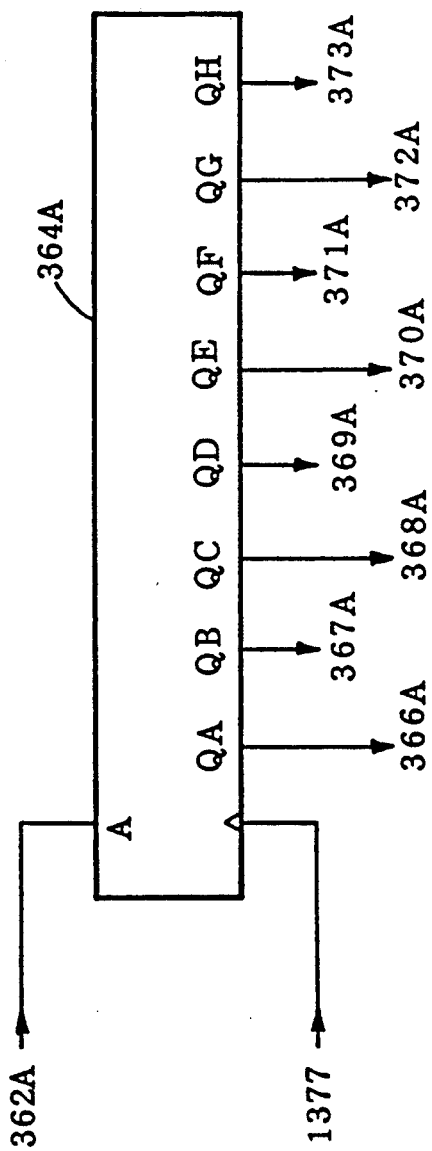
FIG. 8D presents a circuit diagram illustrating one embodiment of the serial/parallel register 364A.

FIG. 8D presents a specific circuit diagram for the S/P register 364A (364B, 364C), which is a register for outputting the signals as converted from serial input into parallel input, and this register takes into itself the signal 362A, receiving the signal 362A from the multiplexer 361A on its input terminal A and also receiving the signal 1377 for setting the signal receiving timing on its clock terminal, and obtains the signals 366A~373A (the bus signal 365A) as output in parallel on the output terminals QA~QH.

Figure 8E:
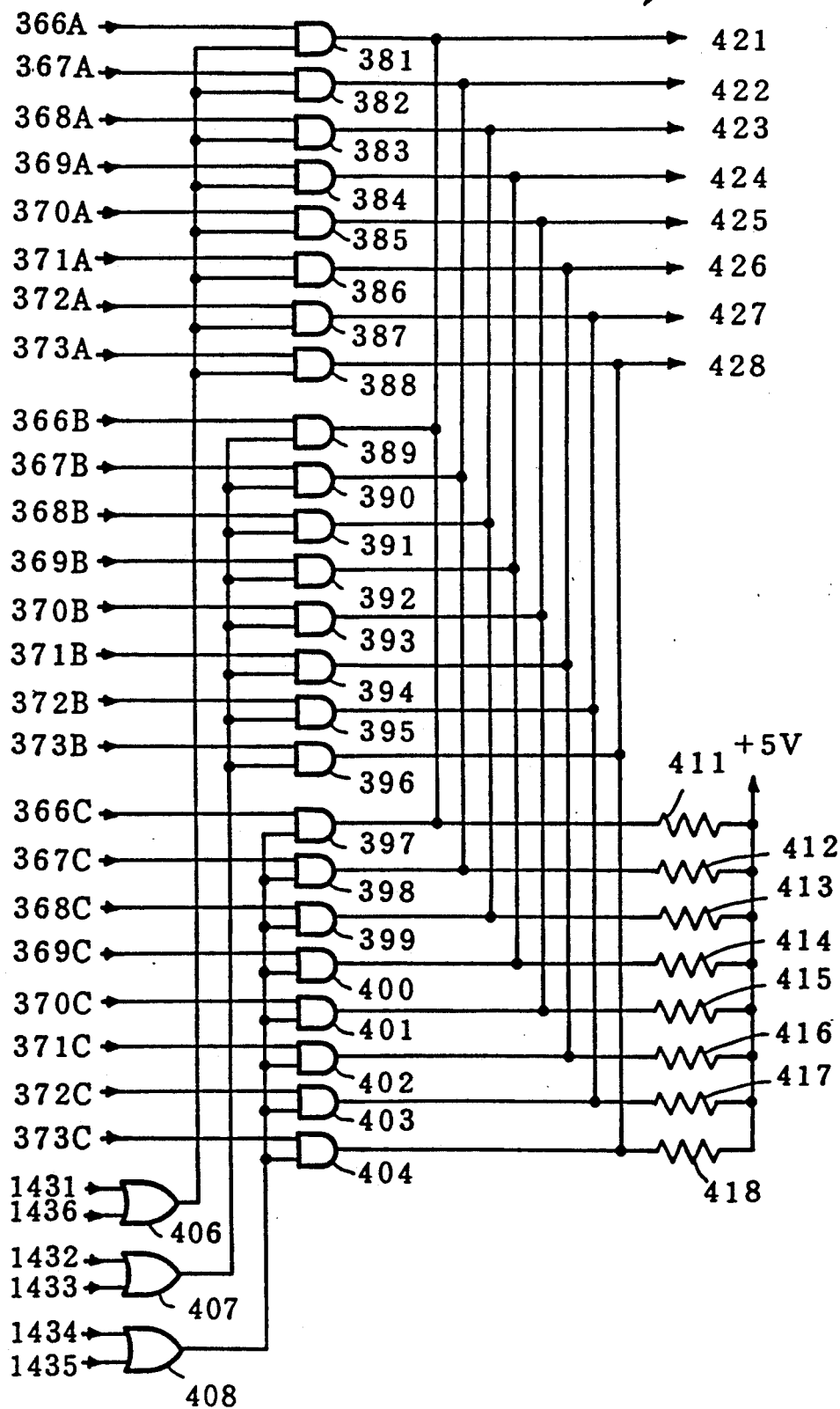
FIG. 8E presents a circuit diagram illustrating one embodiment of the multiplexer 380.

FIG. 8E illustrates a specific circuit diagram for the multiplexer 380, which is composed of the three sets comprising a first set of AND gates 381~388 and an OR gate 406, a second set of AND gates 389~396 and an OR gate 407, and a third set of AND gates 397~404 and an OR gate 408, and each of these sets has an identical construction.

Therefore, a description is given here with respect to the first set. The signals 366A~373A, which constitute the bus signal 365A, are respectively applied to the terminals on one side of the AND gates 381~388, and the signals 1431 and 1436, which are included in the bus signal 1430 indicating the timing for sending out the aforementioned signals by time division, are respectively applied to the terminals on the other side of the AND gates, which output the signals 421~428 (the bus signal 420) respectively at the timing indicated by the signals 1431 and 1436 for indicating the timing. The AND gates 389~396 output the signals 421~428 respectively at different points in time, and consequently the time-divided and multiplexed signals 421~428 can be obtained. The resistors 411~418 are the open-drain pull-up resistors employed for the wired-or operation performed on the three sets of these many AND gates.

Figure 9A:
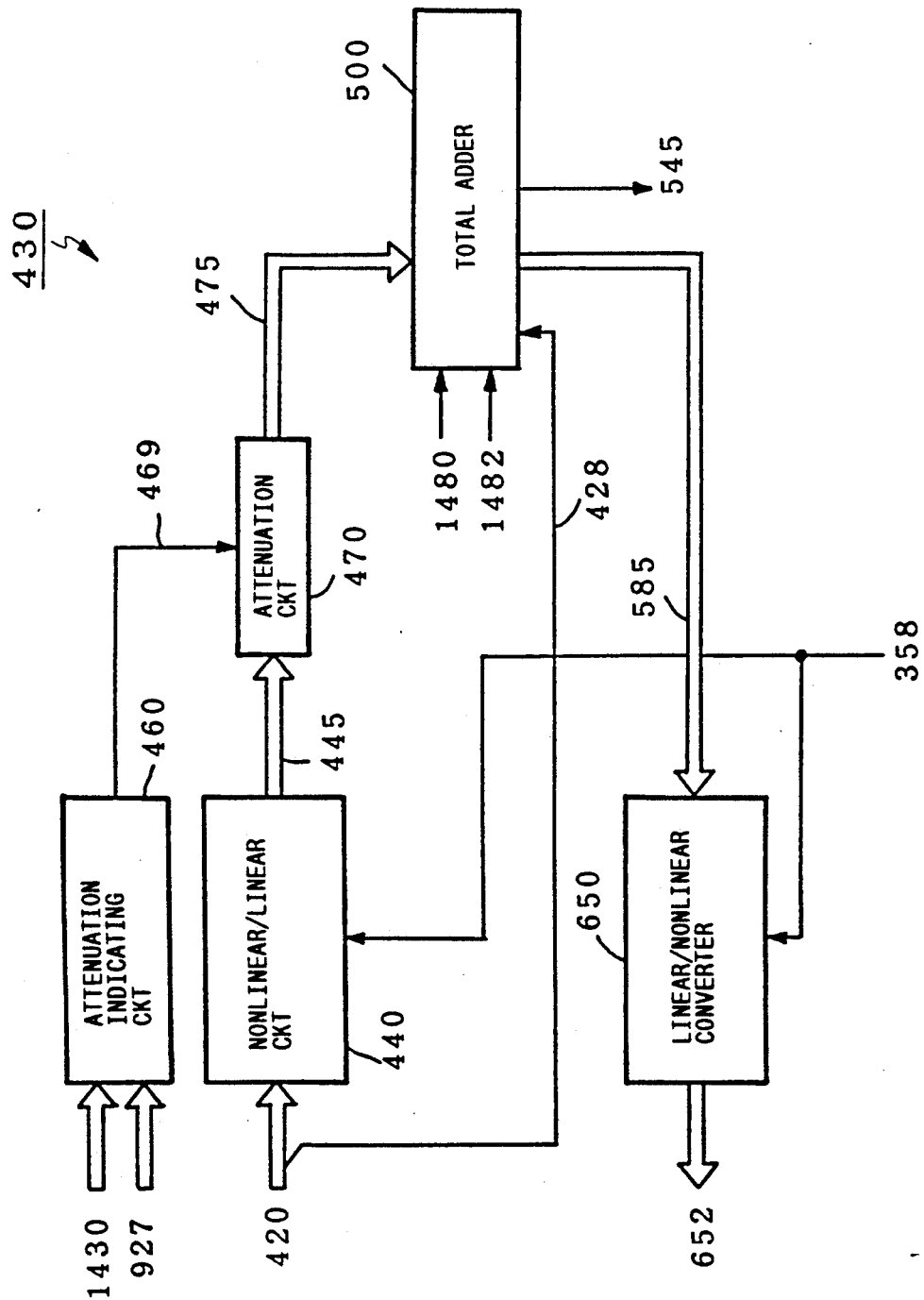
FIG. 9A presents a circuit diagram illustrating one embodiment of the adder 430.

FIG. 9A presents a more specific circuit configuration of the adder 430.

Numeral reference 440 represents a nonlinear/linear converter, which receives the bus signal 420, i.e. a nonlinear signal from the multiplexing circuit 360, and performs the conversion of the nonlinear signal into linear signal, receiving the application of the μ/A conversion signal 358, which indicates whether this nonlinear signal is under the μ-rule or under the A-rule, and then outputs the linear bus signal 445.

Numeral reference 460 represents an attenuation indicating circuit, which outputs the signal 469 with such an amount of attenuation as indicated by the bus signal 927 at the timing set by the bus signal 1430, which distinguishes the sender.

Numeral reference 470 shows an attenuation circuit, which gives attenuation to the linear bus signal 445 in accordance with the instructions issued by the signal 469 and outputs the bus signal 475, as attenuated in accordance with the instructions, to the sender's side.

This bus signal 475 is applied to the total adder 500, and, receiving the signal 428, which indicates the polarity of the data in the bus signal 420, the signal 1480, which is the clear signal for setting the initial value at zero, and the signal 1482, which is to be used for latching the addition data, the total adder 500 outputs the bus signal 585, which indicates the result of the adding operation, and the signal 545, which shows the polarity of the bus signal.

Numeral reference 650 shows a linear/nonlinear converter. The converter 650 performs the conversion of the bus signal 585, which is a linear signal as applied to it, into a nonlinear signal by the μ-rule in accordance with the instructions by the μ/A switching signal 358, and outputs the nonlinear signal as the bus signal 652.

Figure 9B:
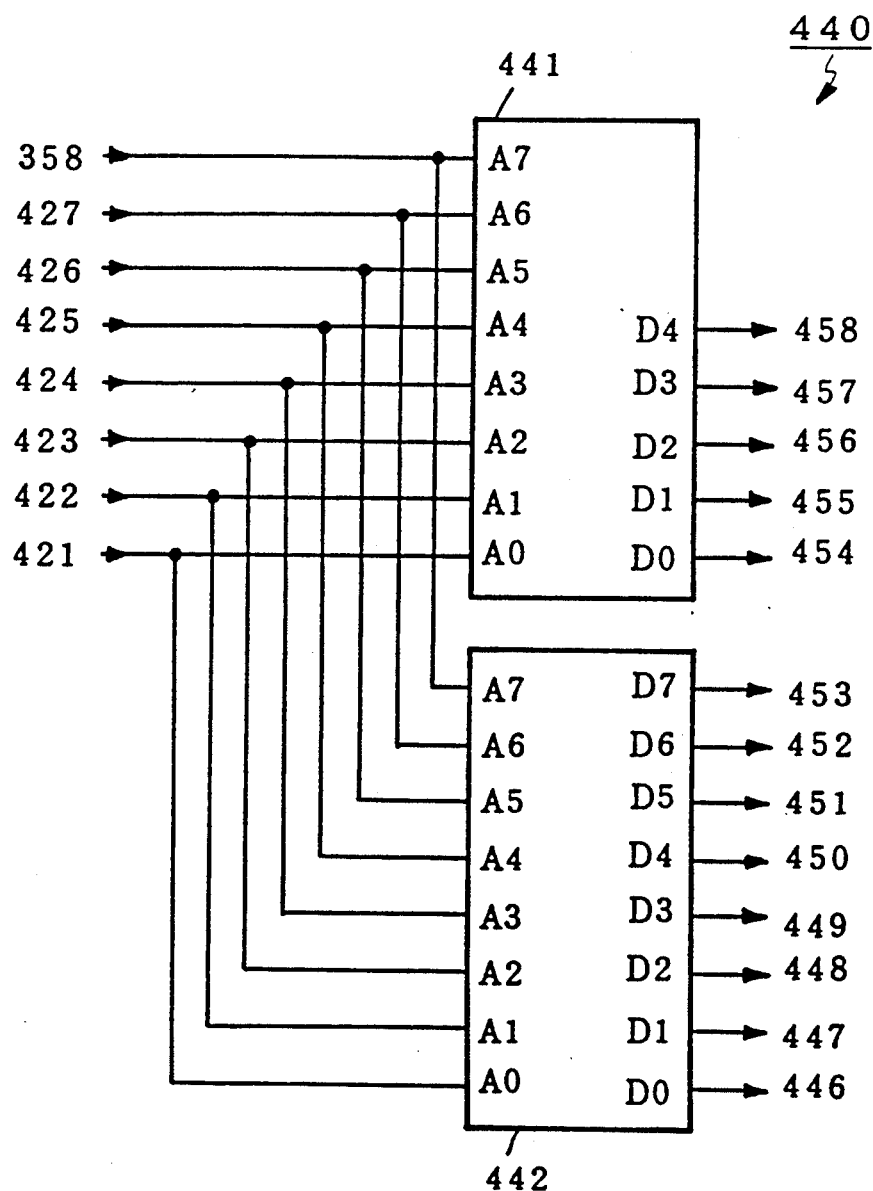
FIG. 9B presents a circuit diagram illustrating one embodiment of the nonlinear/linear converter 440.

FIG. 9B shows a circuit diagram of the nonlinear/linear converter 440.

Numeral references 441 and 442 are read only memories (ROM), and, to their respective input terminals A0~A6, the signals 421~427, among the signals forming the bus signal 420, are applied, while the μ/A switching signal 358 is applied to the input terminal A7, so that these memories output the linear data stored therein, i.e. the signals 446~453 from the output terminals D0~D7 of the ROM 442 and the signals 454~458 from the output terminals D0~D4 of the ROM 441, respectively. These signals 446~458 form the bus signal 445.

Figure 9C:
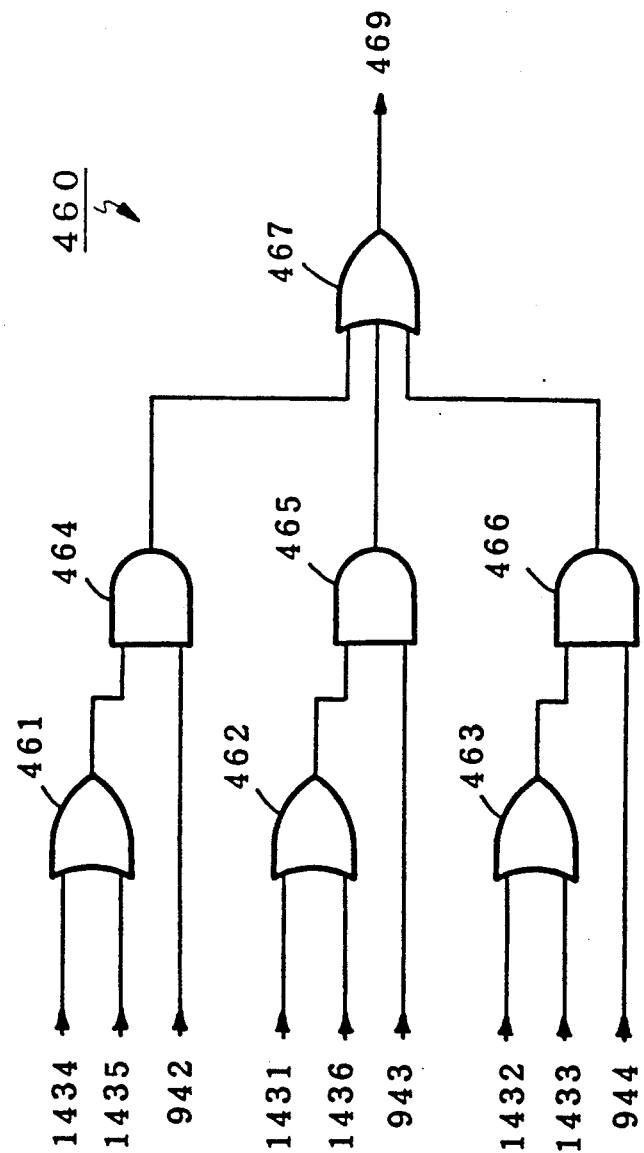
FIG. 9C presents a circuit diagram illustrating one embodiment of the attenuation indicating circuit 460.

FIG. 9C represents a circuit diagram for the attenuation indicating circuit 460, and, to the three OR gates 461~463, the signals 1434 and 1435, 1431 and 1436, and 1432 and 1433 are respectively applied while the bus signal 942~944, which respectively form the bus signal 927 for indicating the amount of attenuation, and the output from the OR gates are applied to the three AND gates 464~466, and the output from the individual AND gates 464~466 is applied to the OR gate 467, outputting the signal 469.

Figure 9D:
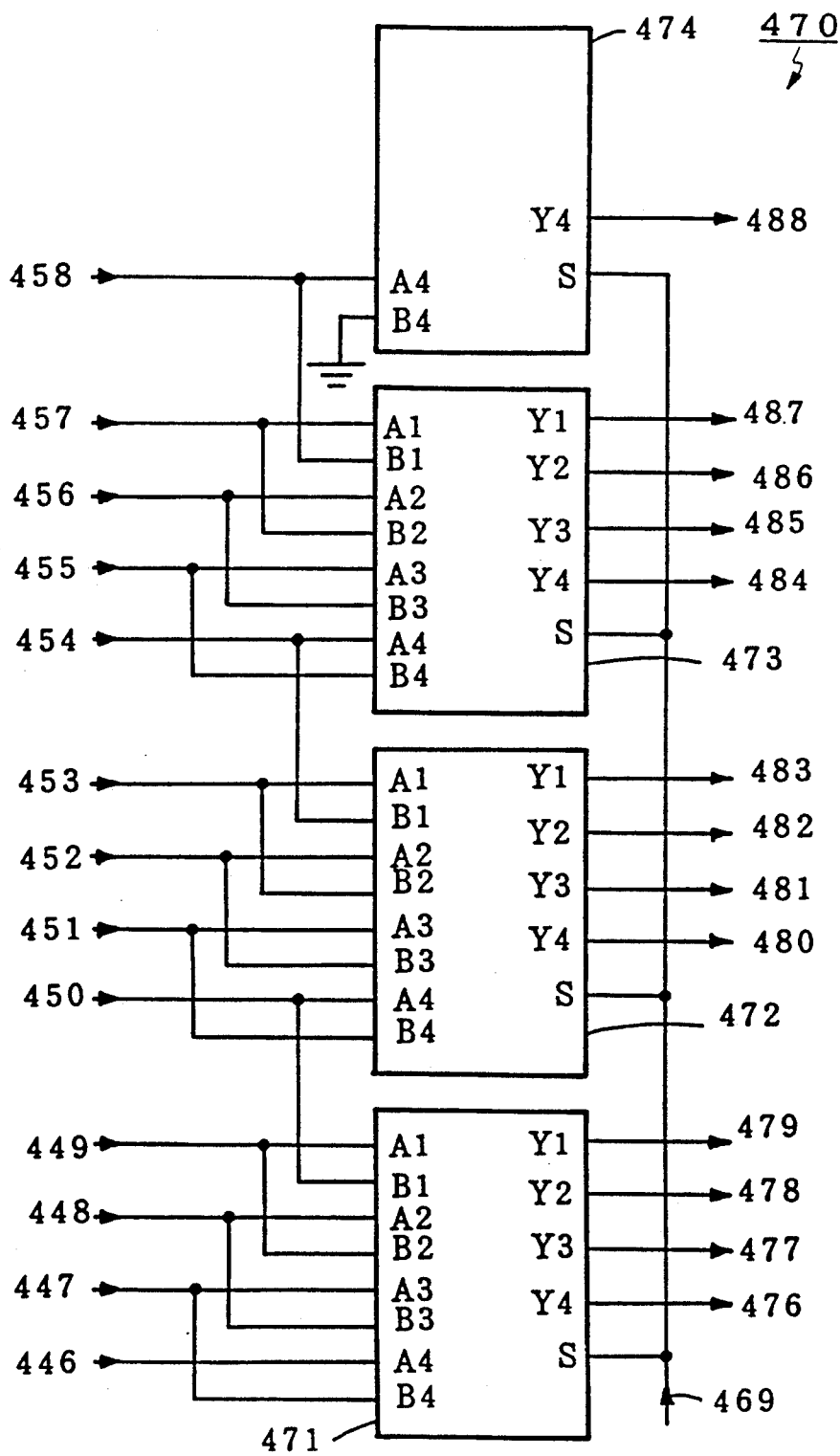
FIG. 9D presents a circuit diagram illustrating one embodiment of the attenuation circuit 470.

FIG. 9D represents the attenuation circuit 470, which is composed of 2-bit multiplexers 471~474.

The linear signals 446~449, 450~453, and 454~457 are respectively applied to the input terminals A4, A3, A2, and A1 on the 2-bit multiplexers 471, 472, and 473, and the linear signal 458 is applied to the input terminal A4 on the 2-bit multiplexer 474, and the signals 447, 448, 449, and 450, the signals 451, 452, 453, and 454, and the signals 455, 456, 457, and 458 are applied respectively to the input terminals B4, B3, B2, and B1 on the 2-bit multiplexers 471, 472, and 473, while the signal 469 for selecting either the input terminal A or the input terminal B is applied to each select terminal S. The signals 476~487 are output from the output terminals Y4~Y1 on the individual 2-bit multiplexers 471~473, and the signal 488 is output from the terminal Y4 on the multiplexer 474. These signals 476~488 constitute the bus signal 475.

Figure 9E:
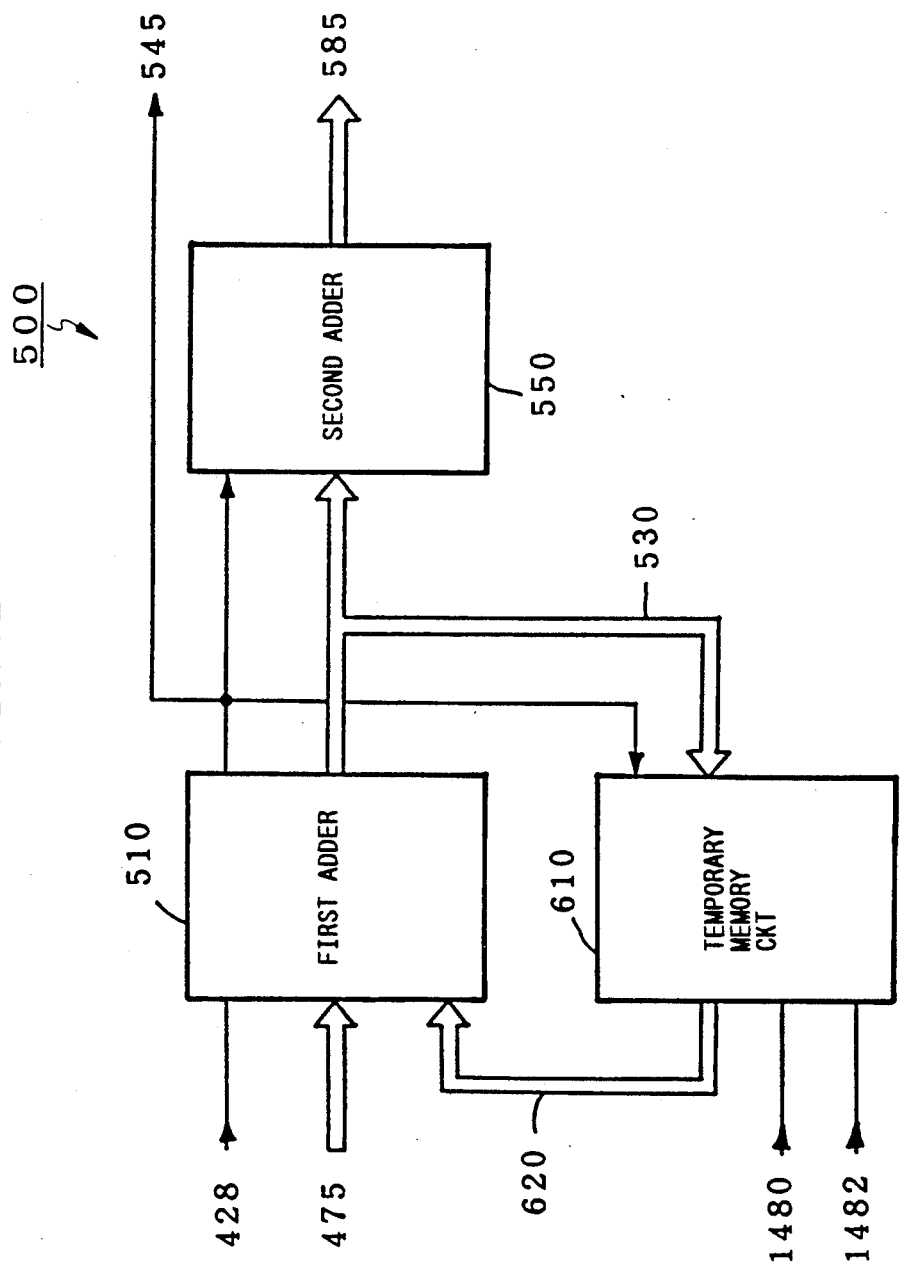
FIG. 9E presents a circuit block diagram illustrating one embodiment of the total adder 500.

FIG. 9E illustrates a more specific circuit configuration of the total adder 500. To the first adder 510a is applied the bus signal 475 as linearized and attenuated, the signal 428 which indicates whether the polarity of the bus signal 475 is positive or negative, and the bus signal 620 which indicates the result of the previous adding operation. This adder outputs the bus signal 530 which represents the result of the adding operation with a complement for 2, the bus signal 530, and the signal 545, which indicates the polarity of the data in the bus signal 530.

Numeral reference 550 represents a second adder, and, in the case where the bus signal 530 is expressed by a complement of 2, this adder further takes the two complements of the signal, upon the application of the signal 545 which indicates the polarity of the signal 530, and outputs the bus signal 585.

Numeral reference 610 shows a temporary memory circuit, which latches the bus signal 550 output from the first adder 510 with the signal 1482, after clearing the memory with the signal 1480, and outputs the bus signal 620. When the data of the bus signal 475 shows a negative value, the signal 545 indicates a negative value. In this case the bus signal 530 is expressed in terms of two complements, and this offers convenience for the addition of the bus signal 620, which is output from the memory, with the bus signal 475 in the first adder.

Figure 9F:
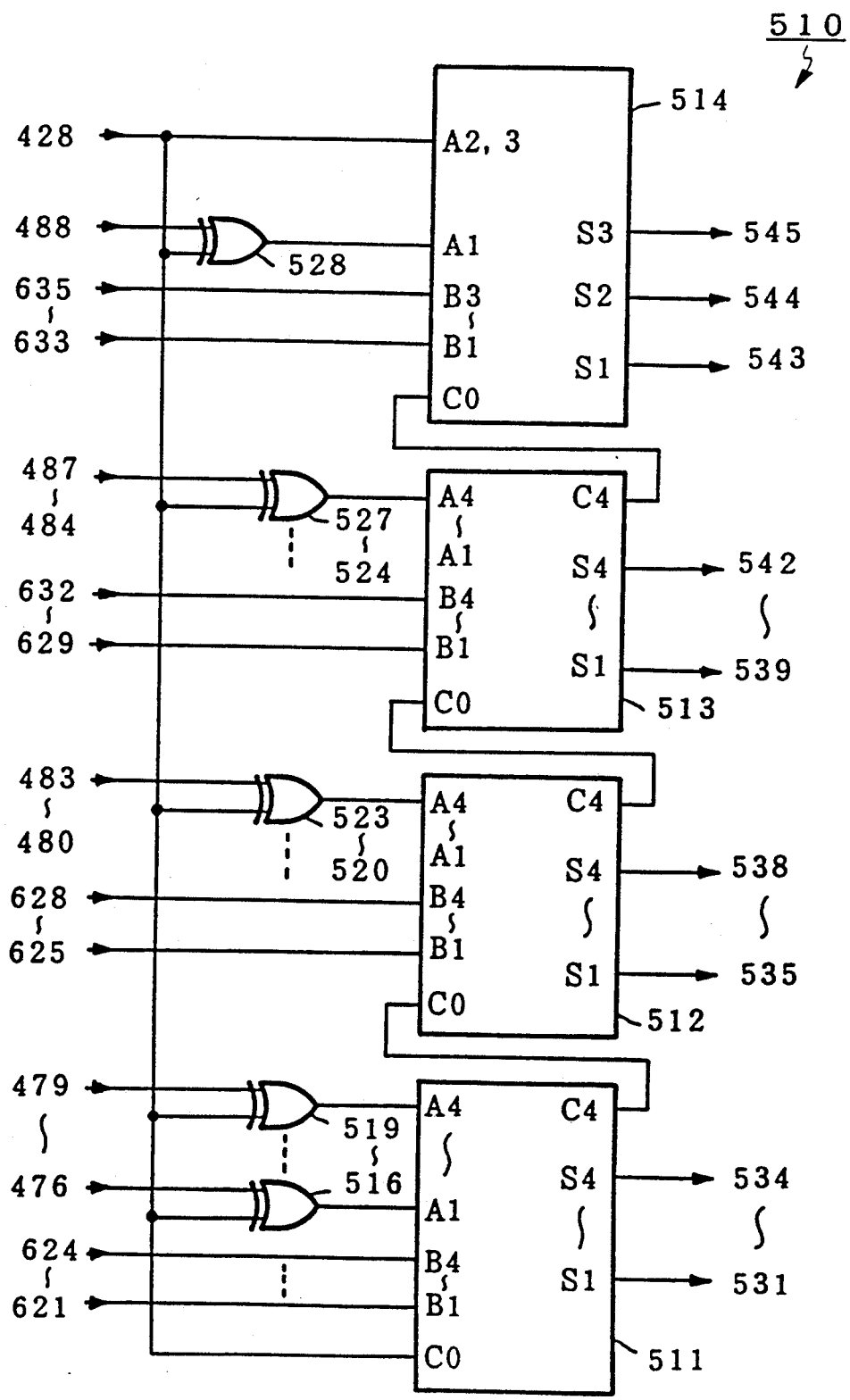
FIG. 9F presents a circuit diagram illustrating one embodiment of the first adder 510.

FIG. 9F shows a circuit diagram for the first adder 510, which is composed of the adders 511~514 and the EXCLUSIVE-OR gates 516~528.

The signals 476~488, which constitute the bus signal 475 from the attenuation circuit 470, are applied to the terminals on one side of the EXCLUSIVE-OR gates 516~528 while the signal 428, which indicates the polarity of the signals 476~488, is applied to the other terminals of the gates, and the individual outputs from the EXCLUSIVE-OR gates 516~528 are applied to the input terminals A1~A4 of the adders 511~513 and to the input terminal A1 of the adder 514, and, moreover, the signal 428, which indicates the polarity of signals, is applied to the input terminal C0 of the adder 511 and to the input terminals A2 and A3 of the adder 514. Furthermore, the bus signals 621~635, which constitute the bus signal 620 from the temporary memory circuit 610, are applied respectively to the input terminals B1~B4 of the adders 511~513 and to the input terminals B1~B3 of the adder 514. To the input terminal C0 on each of the adders 512~513, the carry signal from the terminal C4, which outputs the carry signals for the adders 511~513, and the results of the addition of the signals 476~488 and the signals 621~635 are output as the signals 531~545 from the output terminals S1~S4 of the adders 511~513 and from the terminals S1~S3 of the adder 514.

Figure 9G:
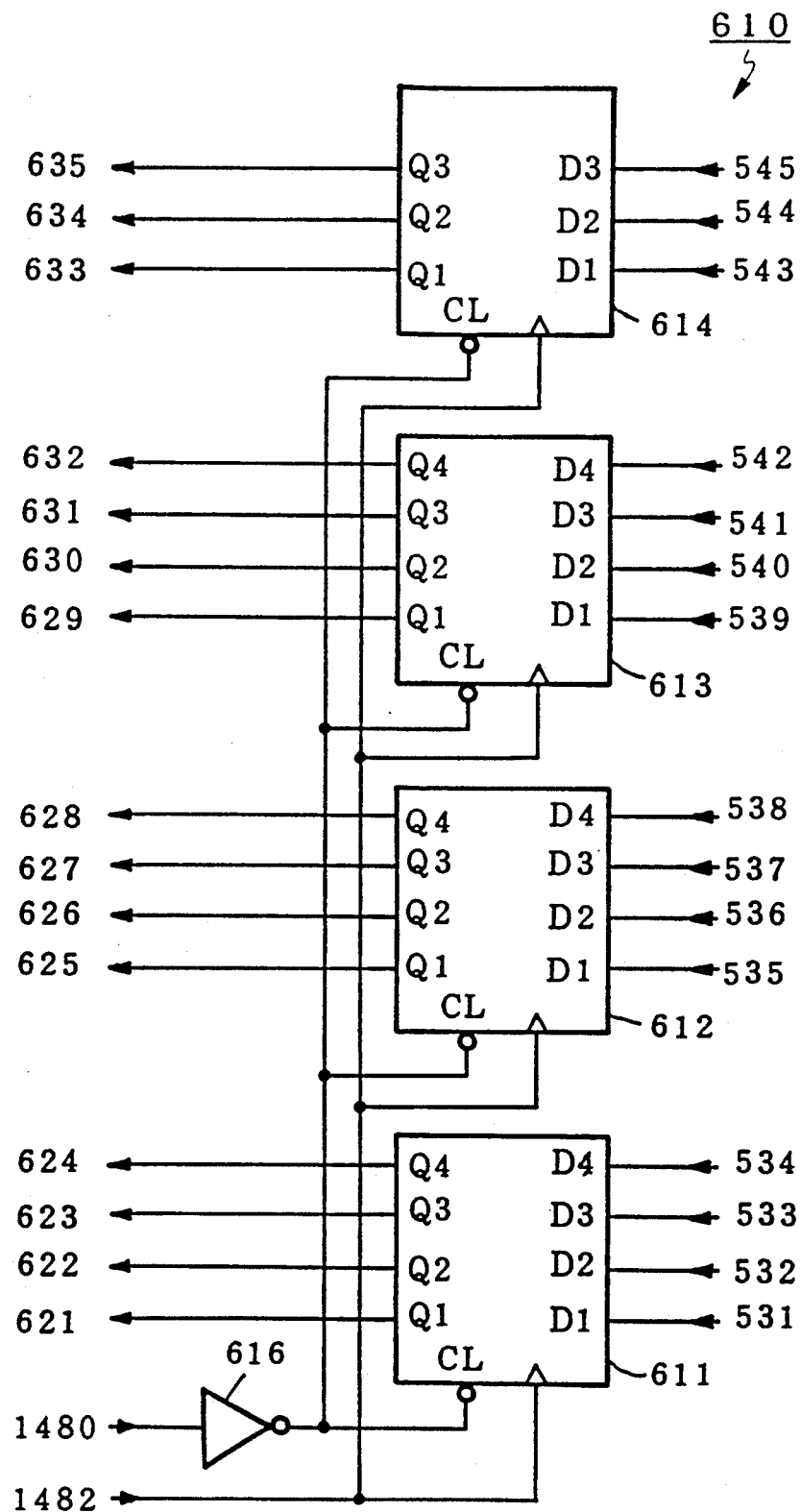
FIG. 9G presents a circuit diagram illustrating one example of the temporary memory circuit 610.

FIG. 9G illustrates the circuit diagram of the temporary memory circuit 610, which is composed of the latches 611~614 and the inverter 616.

To the input terminals D1~D4 of the latches 611~613 and the terminals D1~D3 of the latch 614, the signals 531~545 output from the first adder 510 are applied, respectively, and the individual clear terminals CL on the latches 611~614 receive the application of the clear signal 1480 through the inverter 616, with the latching signal 1482 being applied to the individual clock terminals, latching the signals 531~545 and outputting the signals 621~635.

Figure 9H:
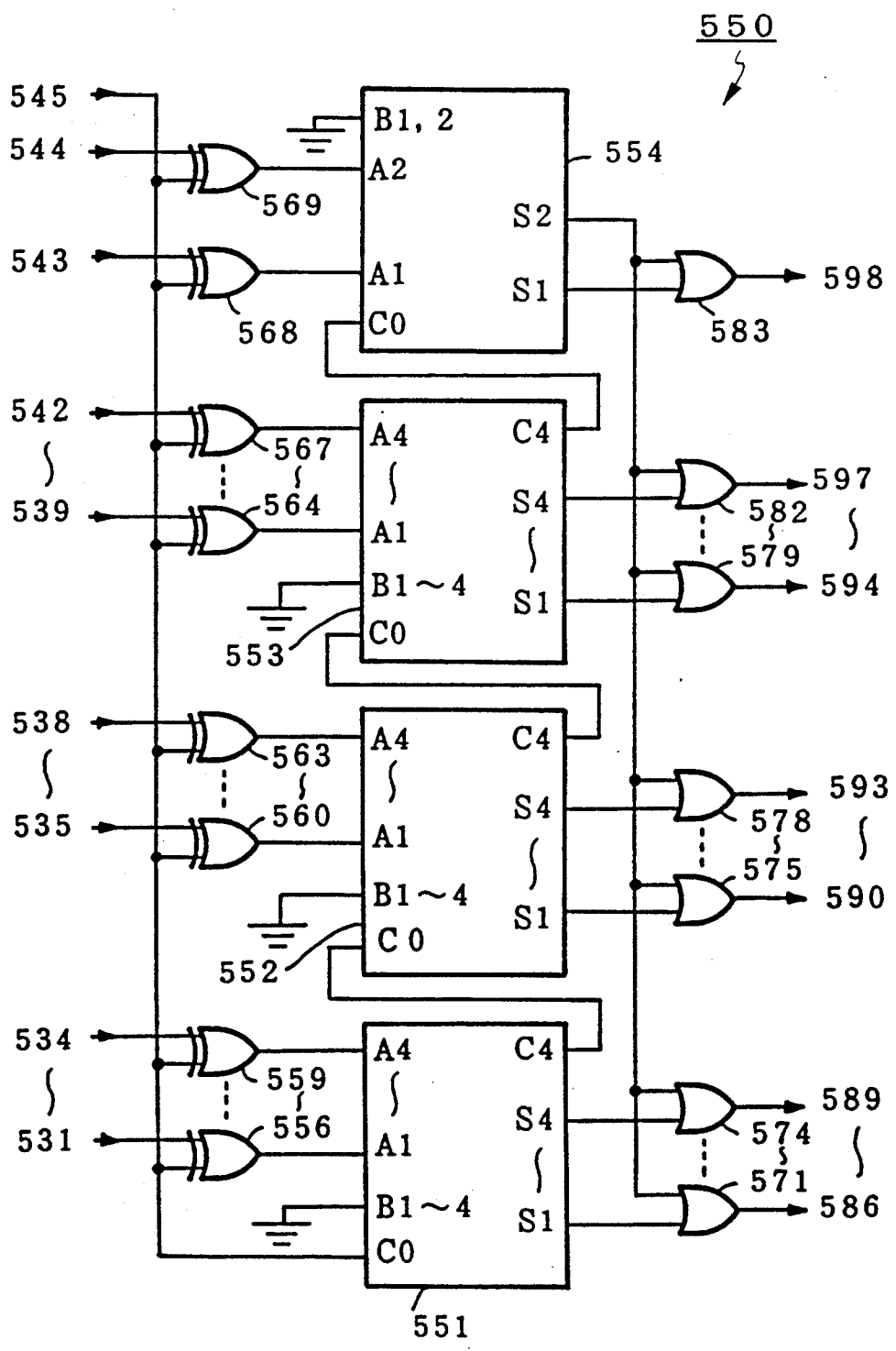
FIG. 9H presents a circuit diagram illustrating one embodiment of the second adder 550.

In FIG. 9H is given a circuit diagram for the second adder 550, which is composed of the adders 551~554, the EXCLUSIVE-OR gates 556~569, and the OR gates 571~583.

The signals 531~544, which constitute the bus signal 530 representing the results of the adding operations as output from the first adder 510, are respectively applied to the input terminals on one side of the EXCLUSIVE-OR gates 556~569 while the signal 545, which indicates the polarity of signals, is applied to the input terminals on the other side of the gates and to the input terminal C0 of the adder 551, and to the input terminals C0 on the adders 552~554 are respectively applied the carry-indicating signals from the output terminals C4 respectively of the adders 551~553, and the input terminals B1~B4 of the adders 551~553 and the input terminals B1 and B2 of the adder 554 are grounded for the input of zero. The output terminals S1~S4 on the adders 551~553 and the terminal S1 of the adder 554 are respectively connected to the input terminals on one side of the OR gates 571~583 while the signal indicating the overflow from the output terminal S2 of the adder 554 is applied to the terminal on the other side of the said gates, and, from the individual OR gates 571~583, the signals 586~598 are output respectively. These signals 586~598 constitute the bus signal 585.

Figure 9I:
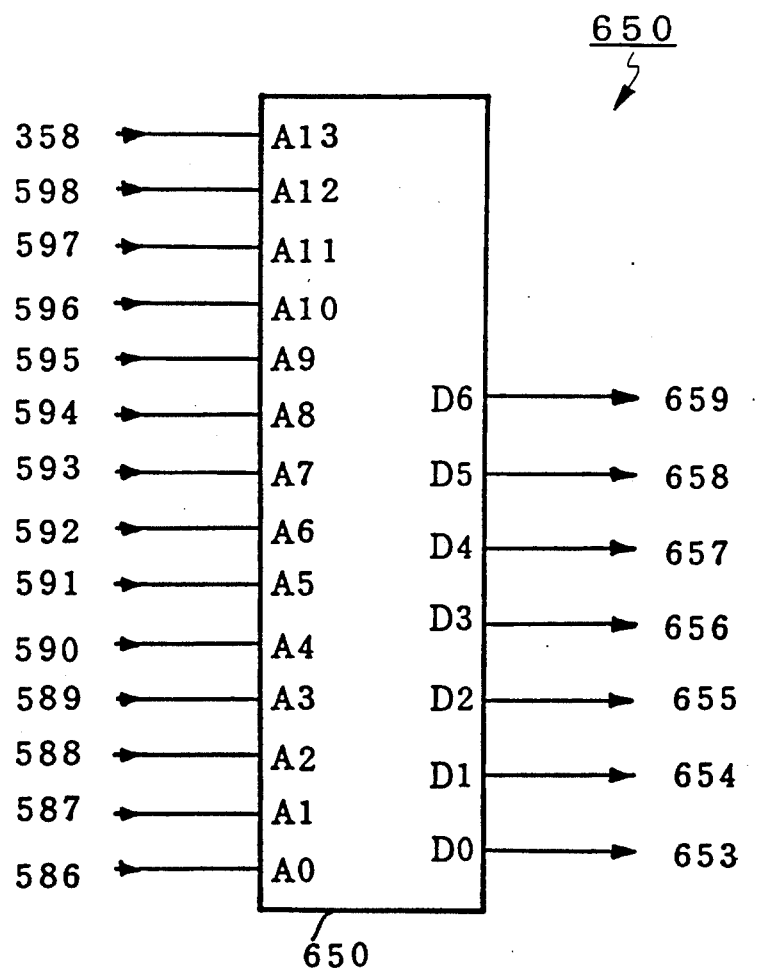
FIG. 9I presents a circuit diagram illustrating one embodiment of the linear/nonlinear converter 650.

In FIG. 9I, a circuit diagram is presented for the linear/nonlinear converter 650, and the signals 586~598, which constitute the bus signal 585 composed of the linear signal formed of the output from the total adder 500, are applied to the input terminals A0~A12 of the said converter 650, outputting to the output terminals D0~D the signals 652~659 as nonlinearized in accordance with the μ-rule or the A-rule as instructed by the μ/A switching signal 358 applied to the input terminal A13. These signals 652~659 constitute the bus signal 652.

Figure 10A:
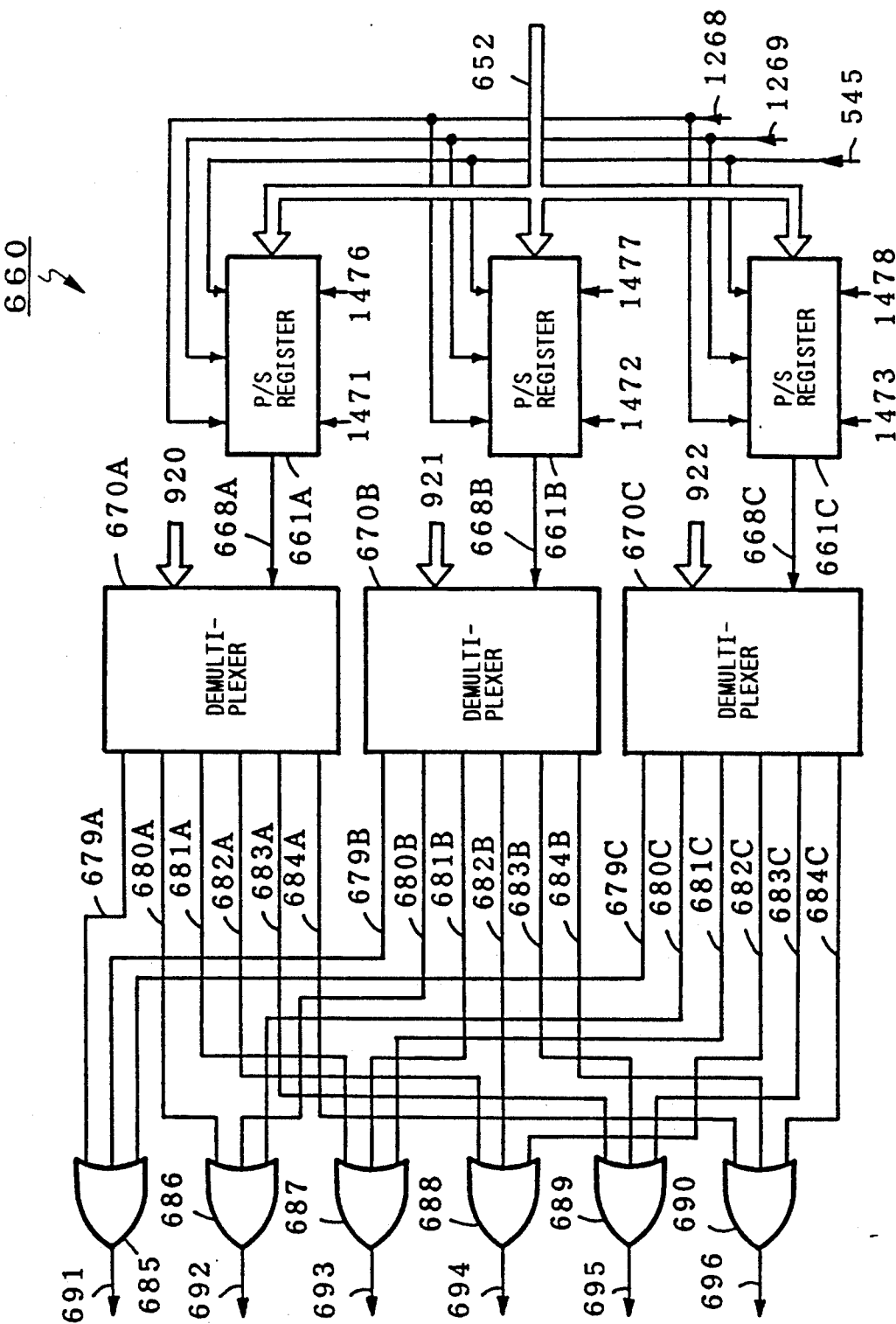
FIG. 10A presents a circuit block diagram illustrating one embodiment of the demultiplexing circuit 660.

FIG. 10A presents a more specific circuit configuration for the demultiplexing circuit 660 (FIG. 8A), which is composed of the P/S registers 661A~661C, the demultiplexers 670A~670C, and the OR gates 685~690.

The P/S register 661A (661B, 661C), which is to output parallel signals in a serial form, takes into itself the bus signal 652 indicating the results of the adding operations as output from the adder 430 and the signal 545 indicating the polarity of the data with the signal 1471, which functions as the latch clock, and with the signal 1476 (1477, 1478), which sets the latch timing, and the register outputs the serial signal 668A (668B, 668C) at the timing set by the signal 1269 in the period indicated by the signal 1268.

The demultiplexer 670A (670B, 670C) respectively output the signals 679A~684A (679B~684B, 679C~684C) as addressed to the destinations as instructed by the bus signal 920 (921, 922), which indicates the destinations for the signals, upon its reception of the signal 668A (668B, 668C), and the outputs from the individual demultiplexers 670A~670C are respectively OR'ed by the OR gates 685~690 and are output as the signals 691~696. Of these signals, 691 and 692 are output to the office line side as the signals 14A and 14B, being channeled respectively via the OR circuits 13A and 13B (Refer to FIG. 2A). The signals 693~696, moreover, are sent out respectively to the terminal unit 70 through the private line interface circuits 100A~100D.

Figure 10B:
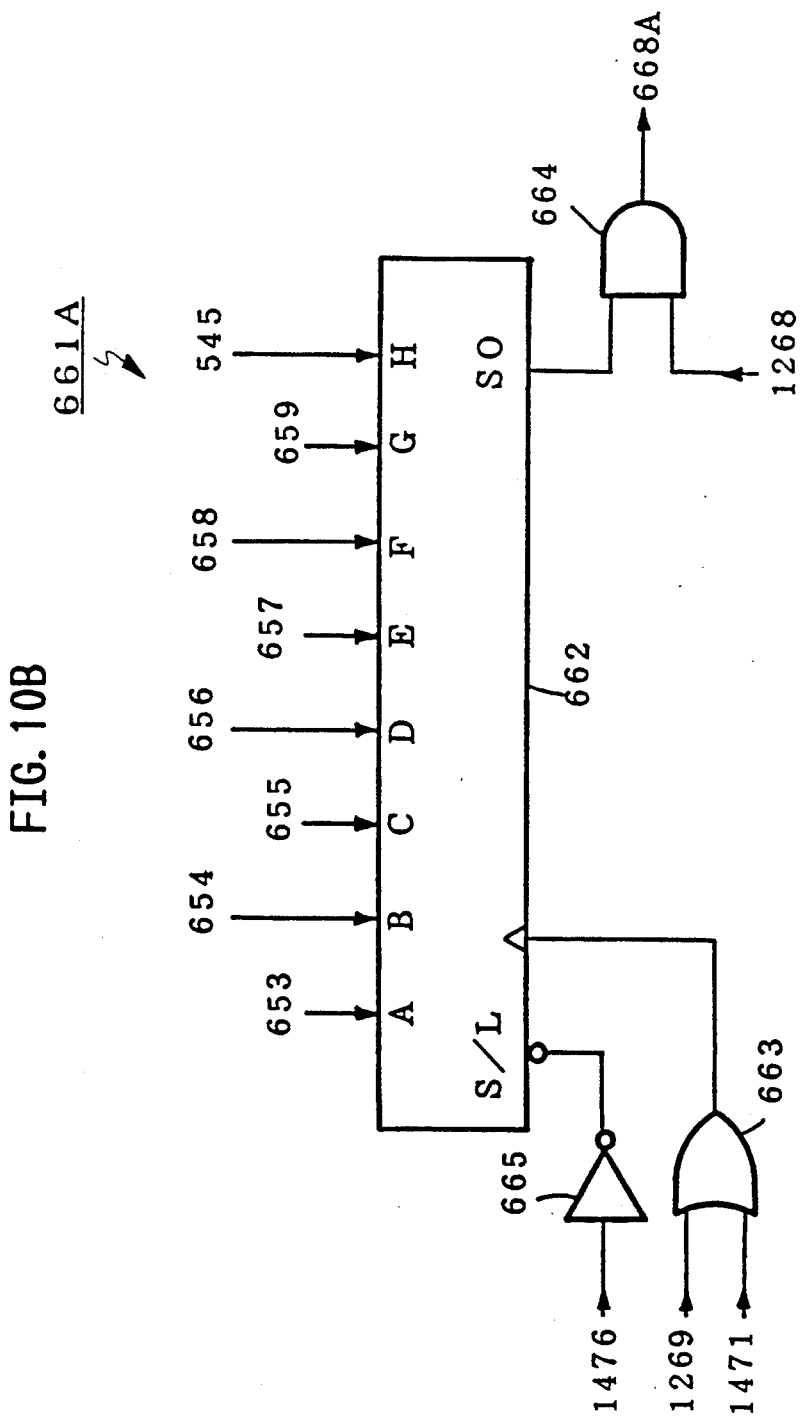
FIG. 10B presents a circuit diagram illustrating one embodiment of the parallel/serial register 661.

FIG. 10B illustrates the circuit diagram of the P/S register 661A (the same applying also to 661B and 661C). To the input terminals A~G of the shift register 662, the signals 653~659, of which the bus signal from the adder 430 is composed, are respectively applied, and, to the input terminal H, the signal 545, which indicates the polarity of the signals, is applied, and the signal 1476 for setting the latch timing is applied, through the inverter 665, to the shift/load terminal S/L, and, to the clock terminal, the signal 1471, which provides the latch clock, and the dispatch timing signal 1269 are applied through the OR gate 663, and subsequently the signal 1476 takes into itself the signals 653~659 and 545 at each rise of the signal 1471 during the period of "H" and then the signals are output as the signal 668A from the output terminal S0 through the AND gate 664 at the timing set with the signal 1269.

Figure 10C:
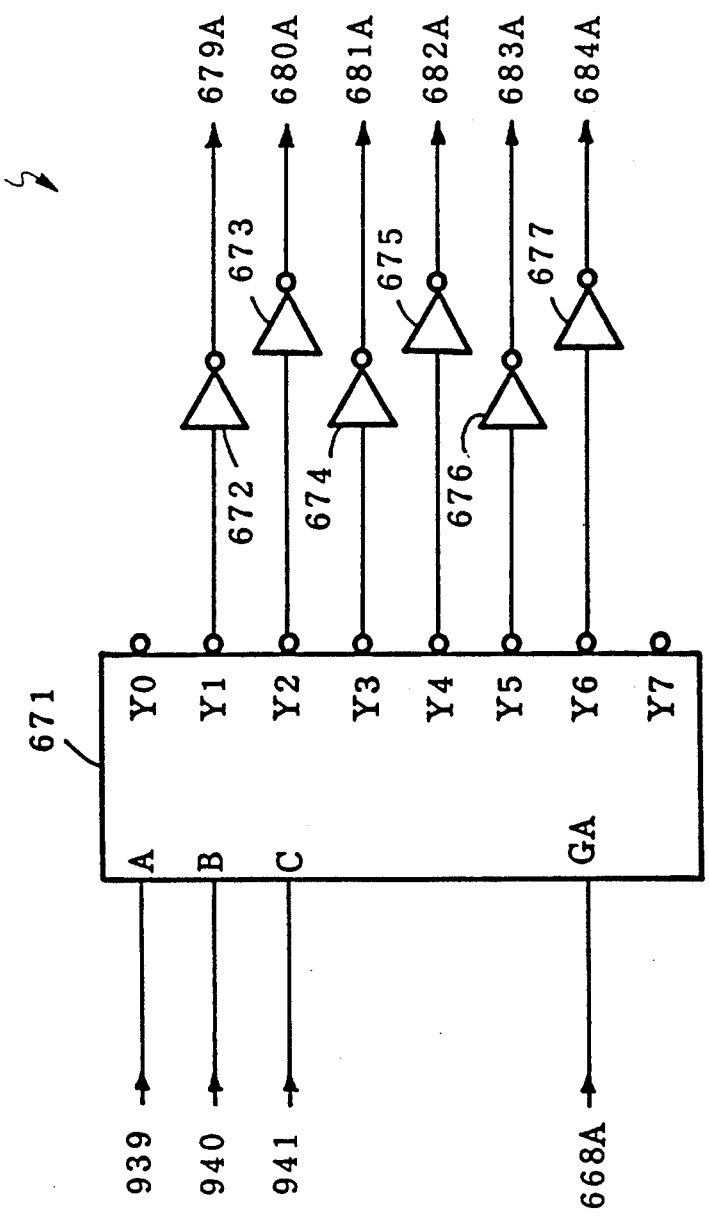
FIG. 10C presents a circuit diagram illustrating one embodiment of the demultiplexer 670.

FIG. 10C shows the demultiplexer 670A (The same applies to 670B, 670C). In the decoder 671, the signals 939~941, which constitute the bus signal 920 for indicating the destinations of signals, are applied respectively to the select terminals A~C and the signal 668 from the P/S register is applied to the enable terminal GA, and the signals 679A~684A are output to the output terminal Y1~Y6 respectively through the inverters 672~677.

FIGS. 10D and 10E are timing charts which express the principal operations of the conference service circuit 350.

FIGS. 10D (a), (b), and (c) respectively represent the signals 362A, 362B, and 362C, which are the outputs from the multiplexers 361A, 361B, and 361C (FIG. 8B), and the signal 1377, which is shown in FIG. 10D(b), is the signal for taking the signals 362A, 362B, and 362C respectively into the S/P registers 364A, 364B, and 364C. Thus, FIGS. 10D(e), 10D(f), and 10D(g) respectively present the signals 365A, 365B, and 365C, which are thus taken into the said registers and output therefrom.

In FIG. 10D(h) is shown the signal 1268, which expresses the period for sending the signals out of the S/P registers 661A~661C (FIG. 10A), while the signal 1269 for setting the timing of the sending operation is given in (i), and the signals 668A, 668B, and 668C, which are respectively the outputs from the P/S registers 661A~661C, are shown in FIGS. 10D(j), 10D(k), and 10D(l).

In FIG. 10D, the addition time T3 for two bits, as well as the guard time T2, as described in FIG. 1E is provided between the individual signals given in FIGS. 10D(a)-10D(g) and the individual signals given in FIGS. 10D(h)-10D(l), so that the overlapping of the individual signals in these two parts is thereby prevented and that it is made possible to conduct conference talks as necessary. In the period corresponding to the two bits in the addition time following this guard time T2, the adding operation shown in the timing chart in FIG. 10E is performed.

The addition time T3 is provided in the position immediately following the guard time T2 as shown in FIG. 1E, FIG. 10D, and FIG. 10E, for convenience in giving explanatory remarks on the guard time T2. However, the addition time T3 may be provided either as included in the guard time T2 or in such a way that it ends by a point immediately preceding B7, which is the initial bit in the data information.

In FIGS. 10E(a) through 10E(c) are shown the signals 1431~1436, of which the bus signal 1430 applied to the multiplexer 380 (FIG. 8B) while the contents of the nonlinear bus signal 420, which is the output from the multiplexer 380 is presented in FIG. 10E(d) as "A", "B", and "C" in correspondence to the S/P registers 364A, 364B, and 364C. The bus signal 475 shown in FIG. 10E(e) is the signal obtained by converting the nonlinear bus signal shown in FIG. 10E(d) into a linear signal and passing the signal through the attenuation circuit 470. After the temporary memory circuit 610 (FIG. 9E) is cleared with the signal 1480 shown in FIG. 10E(q), the linear signal 445 given in FIG. 10E(e) is latched at the timing set by the signal 1482 shown in FIG. 10E(f) of the same Figure and stored temporary memory circuit 610, and the signal thus stored in the memory is output in such a way as to present the balance signal 620 given in FIG. 10E(g).

In FIG. 10E(h) is shown the bus signal 585, which is the output from the second adder 550, and this bus signal 585 represents the result of the addition of the bus signal 474 given in FIG. 10E(e) and the bus signal 620 given in FIG. 10E(g).

In FIG. 10E(i) is shown the bus signal 652, which represents the nonlinear signal as converted from the linear bus signal 585 given in FIG. 10E(h). From this bus signal 652 shown in FIG. 10E(i), the data are taken into the S/P registers 651A~661C (FIG. 10A) with the rising rates given for the signals 1471 1473 in FIGS. 10E(j), 10E(k), and 10E(l) at the timing set with the signals 1476~1478 shown respectively in FIGS. 10E(m), 10E(n), and 10E(p).

Figure 11:
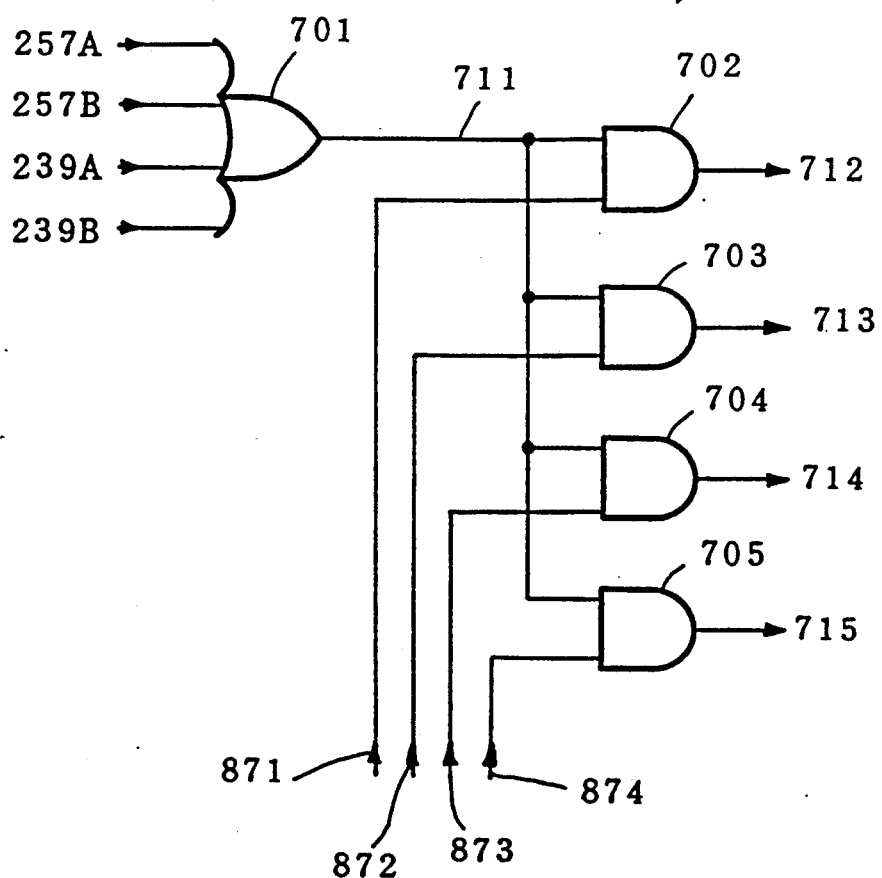
FIG. 11 presents a circuit diagram illustrating one embodiment of the public address system circuit 700.

In FIG. 11 is shown a circuit diagram for the public address system circuit 700, in which the signals 257A and 257B from the office line speech circuit 250A and 250B (FIG. 7A) and the signals 239A and 239B from the private line speech circuit 200 (FIG. 6A) are OR'ed in the OR gate 701, by which the signal 711 is obtained, and this signal 711 is applied to the input terminals on one side of the AND gates 702~705

To the input terminals respectively of the AND gates 702~705, the signals 871–874 indicating the destinations are applied, and, from the individual AND gates, the signals 712~715 are obtained. These signals 712~715 are respectively sent out to each terminal unit 70 through the private line interface circuits 100A~100B.

Figure 12A:
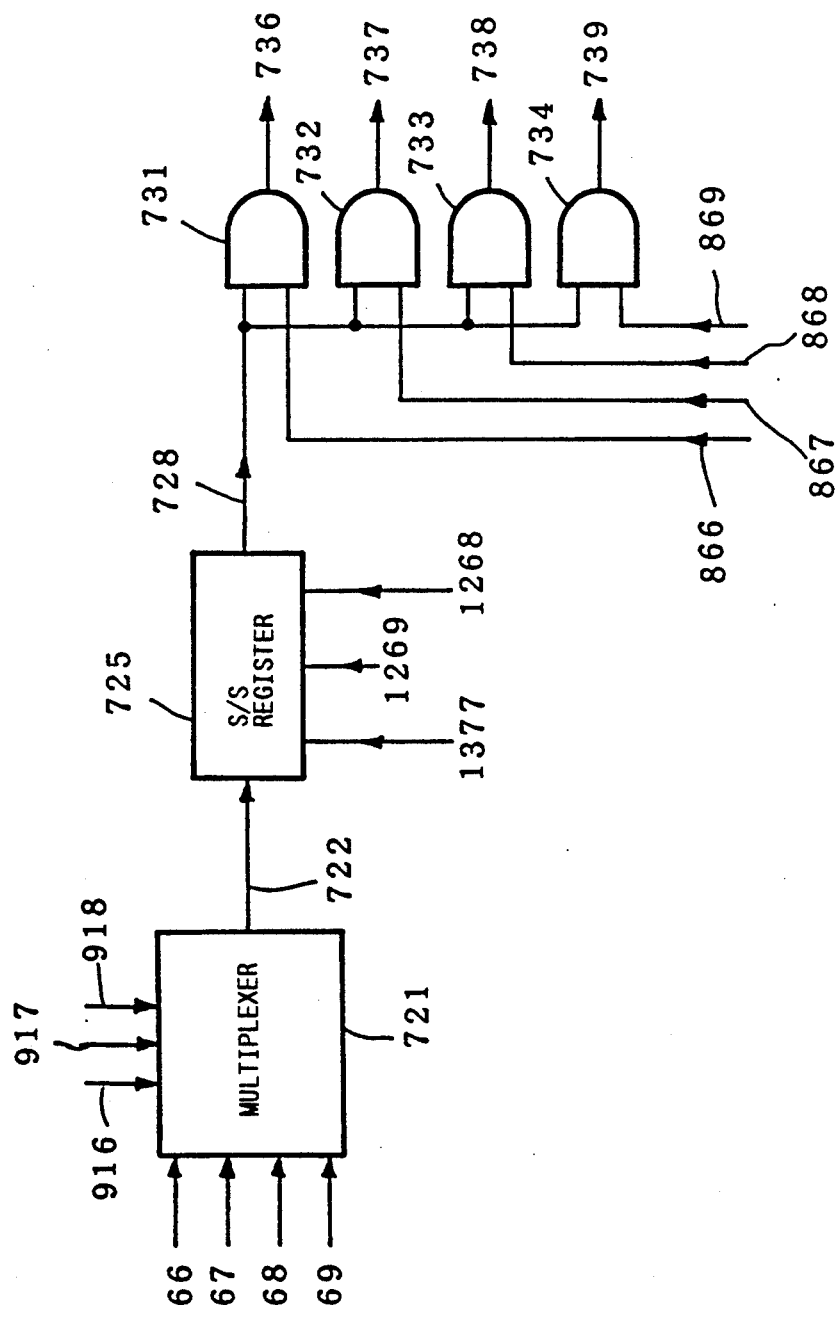
FIG. 12A presents a circuit block diagram illustrating one embodiment of the sound source circuit 720.

In FIG. 12A, a specific circuit configuration is presented for the sound source circuit 720, and, with the signals 66~69 from the various kinds of sound sources, the multiplexer 721 obtains the signal 722 as selected by the signals 916~918, which select the destinations of signals, and applies these signals to the S/S register 725, which is a register for serial input and serial output. There, the signal 728 is sent out at the timing set by the signal 1269 in the period determined by the signal 1268.

This signal 728 is applied to the input terminals on one side of the AND gates 731~734, and, to the input terminals on the other side of the individual AND gates, the signals 866~869, which instruct the destinations, are respectively applied, and the signals 736–739 are respectively obtained as the output signals from the individual AND gates 731~734. These signals 736–739 are sent out respectively to the individual terminal units 70 by way of the private line interface circuits 100A-100D.

Figure 12B:
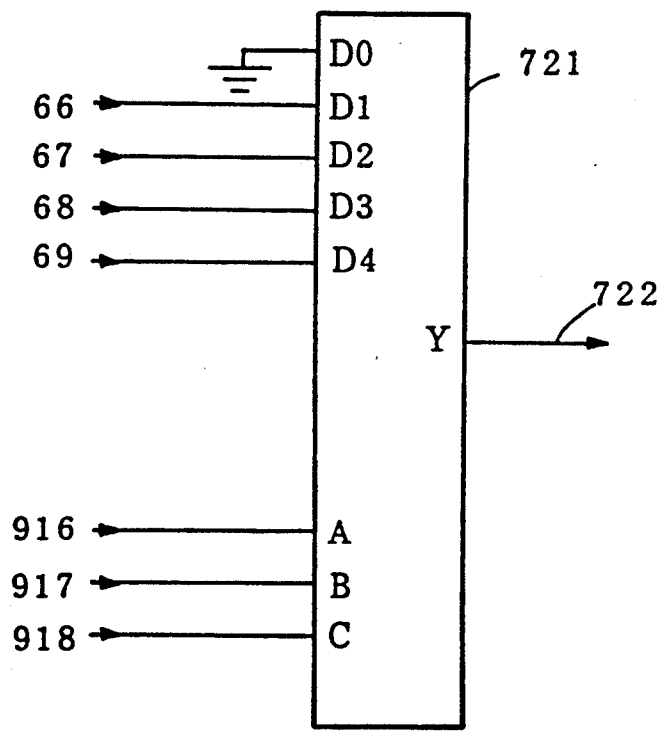
FIG. 12B presents a circuit diagram illustrating one embodiment of the multiplexer 721.

In FIG. 12B, a circuit diagram for the 8-bit multiplexer 721 is presented. To the input terminals D1-D4 of the multiplexer, the signals 66~69 from various kinds of sound sources are respectively applied, and, as the signals 916~918 for making selections of destinations are applied respectively to the select terminals A, B, and C, the signal 722 is obtained on the output terminal Y.

The circuit of the S/S register 725 shown in FIG. 12A is the same as what is obtained by replacing the signal 218A with the signal 722 and replacing the signal 255A with the signal 728 in the circuit presented in FIG. 6C.

FIG. 13A shows the internal structure of the CPU interface circuit 800.

Numeral reference 801 is an interrupting circuit, which generates the signal 808 indicating "1" during the period of interruption, receiving the signal 1316 for setting the timing for interruption, the signal resetting signal 21 for initialization at the time when the power is turned ON, and the signal 848 which is applied for resetting upon the completion of work.

Numeral reference 810 shows the address/decode circuit, which outputs the resetting signal 21 for initialization at the time when the power is turned on and also outputs the bus signal 816 indicating the timing and address for reading with the read signal 22, when the address-bus signal is applied to this circuit, and outputs the bus signal 821 and 826, which indicate the timing and the address for writing with the write signal 23, and the signals 834 and 844, and additionally outputs the signal 848 for resetting the interrupting circuit 801 upon the completion of a series of tasks.

Numeral reference 850 shows a 4-bit latch circuit, which, being reset with the resetting signal 21 for initialization at the time when the power is turned on, outputs the bus signals 860, 865, 870, 875, 880, 885, and 890 which sent out the data of the signals 36~39 to the addresses as instructed at the timing set by the bus signal 826, with the bus signal 826 for indicating the timing and address for writing and the signals 36~39 included in the data bus signal 35 applied to this latch circuit.

Numeral reference 900 represents a 3-bit latch circuit, which outputs the bus signals 915 and 920~927 for sending out the data of the signals 36~38 to such addresses as instructed at the timing set by the bus signal 834, when this latch circuit is reset with the resetting signal 21, which is used for initialization at the time when the power is turned on, with the bus signal 834 for indicating the timing and addresses for writing, as well as the signals 36~38 included in the data bus signal 35, being applied to this latch circuit.

Numeral reference 950 shows a 2-bit latch circuit, which, being reset with the resetting signal 21 for initialization at the time when the power is turned on, outputs the signals 960~965, which send out the data of the signals 36 and 37 to such addresses as instructed at the timing set by the bus signal 844 when the bus signal 844, which indicates the timing and address for writing, and the signals 36 and 37 included in the data bus signal 35 are applied to this latch circuit.

FIG. 13B shows a circuit diagram for the interrupting circuit 801, and FIG. 13C presents the timing chart which shows the waveforms of the individual sections of the interrupting circuit.

In FIG. 13B, numeral reference 802 represents a D-flipflop, and, to the data terminal D of this flipflop, "1" remains applied at all times, and this D-flipflop outputs to the CPU 20 (FIG. 1A) the signal 808 shown in FIG. 13C(c), which indicates with "1" the point that the system is in the interruption period, at each time when the signal 1316 for setting the timing for interruption shown in FIG. 13C(a) is applied to the flipflop, with the resetting signal 21 for resetting this flipflop when the power is turned on as shown in FIG. 13C(b) and with the resetting signal 848 shown in FIG. 13C(d) for resetting it upon the completion of operation being applied to the clear terminal CL through the NOR gate 803 through the inverter 804.

Figure 13D:
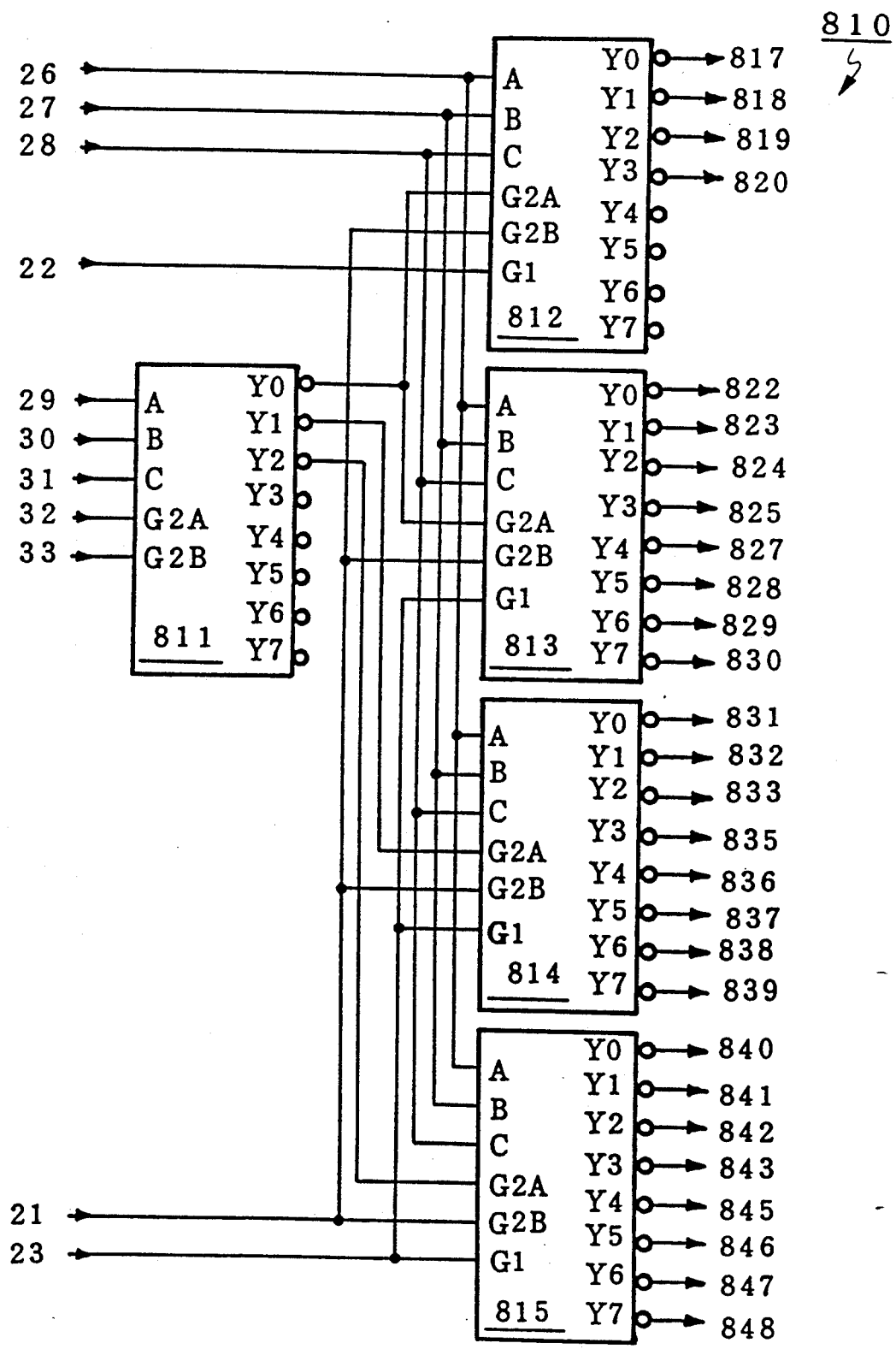
FIG. 13D presents a circuit diagram illustrating one embodiment of the address-decode circuit 810.

In FIG. 13D, a circuit diagram is presented for the address/decode circuit 810, and FIG. 13E shows a timing chart illustrating the waveforms of the individual parts of the circuit.

Numeral reference 811 is a decoder, which outputs the signal for selecting the decoder to the terminals Y0, Y1, and Y2, with the signals 29~33 in the five higher-order bits included in the address-bus signal 25 being applied to the terminals A, B, C, G2A, and G2B.

Numeral reference 812 is a decoder, which obtains the signals 817~820 included in the bus signals 816, which indicates the timing and address for reading, on the terminals Y0~Y3, receiving the read signal 22 to the terminal G1, the signal from the terminal Y0 of the decoder 811 to the terminal G2A, the resetting signal 21, which is to be used for the initialization to be made at time when the power is turned on, to the terminal G2B, and the signals 26~28 in the three lower-order bits in the address-bus signal 25 to the terminals A-C.

Numeral reference 813 is a decoder, which obtains the signals 822-825 included in the bus signal 821 for indicating the timing and address for writing and the signals 827-830, which are some of the signals included in the bus signal 826, on the terminals Y0~Y7, receiving the write signal 23 to the terminal G1, the signal from the terminals Y0 of the decoder to the terminal G2A, the resetting signal 21, which is to be used for the initialization at the time when the switch is turned on, to the terminal G2B, and the signals 26~28 in the three lower-order bits in the address-bus signal 25 to the terminals A~C.

Numeral reference 814 is a decoder, which obtains the signals 831~833, which are some of the signals included in the bus signal 826 for indicating the timing and address for writing, and the signals 835-839, which are some of the signals included in the bus signal 834, on the terminals Y0~Y7, with the write signal 23 being received on the terminal G1, the signal from the terminal Y1 of the decoder 811 being received on the terminal G2A, the resetting signal 21, which is to be used for the initialization at the time the power is turned on, being received on the terminal G2B, and the signals 26~28 in the three lower-order bits of the address-bus signal 25 being received on the terminals A-C.

Numeral reference 815 is a decoder, which obtains the signals 840-843, which are some of the signals included in the bus signal 834 indicating the timing and address for writing, and the signals 845~847 and the signal 848, which are some of the signals included in the bus signal 844, on the terminals Y0~Y7, with the write signal 23 received on the terminal G1, the signal from the terminal Y2 of the decoder 811 received on the terminal G2A, and the resetting signal 21, which is to be used for the initialization at the time when the power is turned on, being received on the terminal G2B, and the signals 26-28 in the three lower-order bits of the address-bus signal 25 received on the terminals A-C.

In the circuit illustrated in FIG. 13D, the address-bus signal 25, which includes the signals 26-33, is applied in the manner as indicated in FIG. 13E(a), and the write signal 23 is applied at the timing shown in FIG. 13E(b), and the bus signal 826 shown in FIG. 13E(d) is output, with the address-bus signal in FIG. 13E(a), at the timing set by the write signal 23 given in FIG. 13E(b). When the read signal 22 shown in FIG. 13E(c) is applied, the bus signal 816 shown in FIG. 13E(e) as instructed by the address-bus signal 25 shown in FIG. 13E(a) is output at the timing set by the read signal.

Figure 14A:
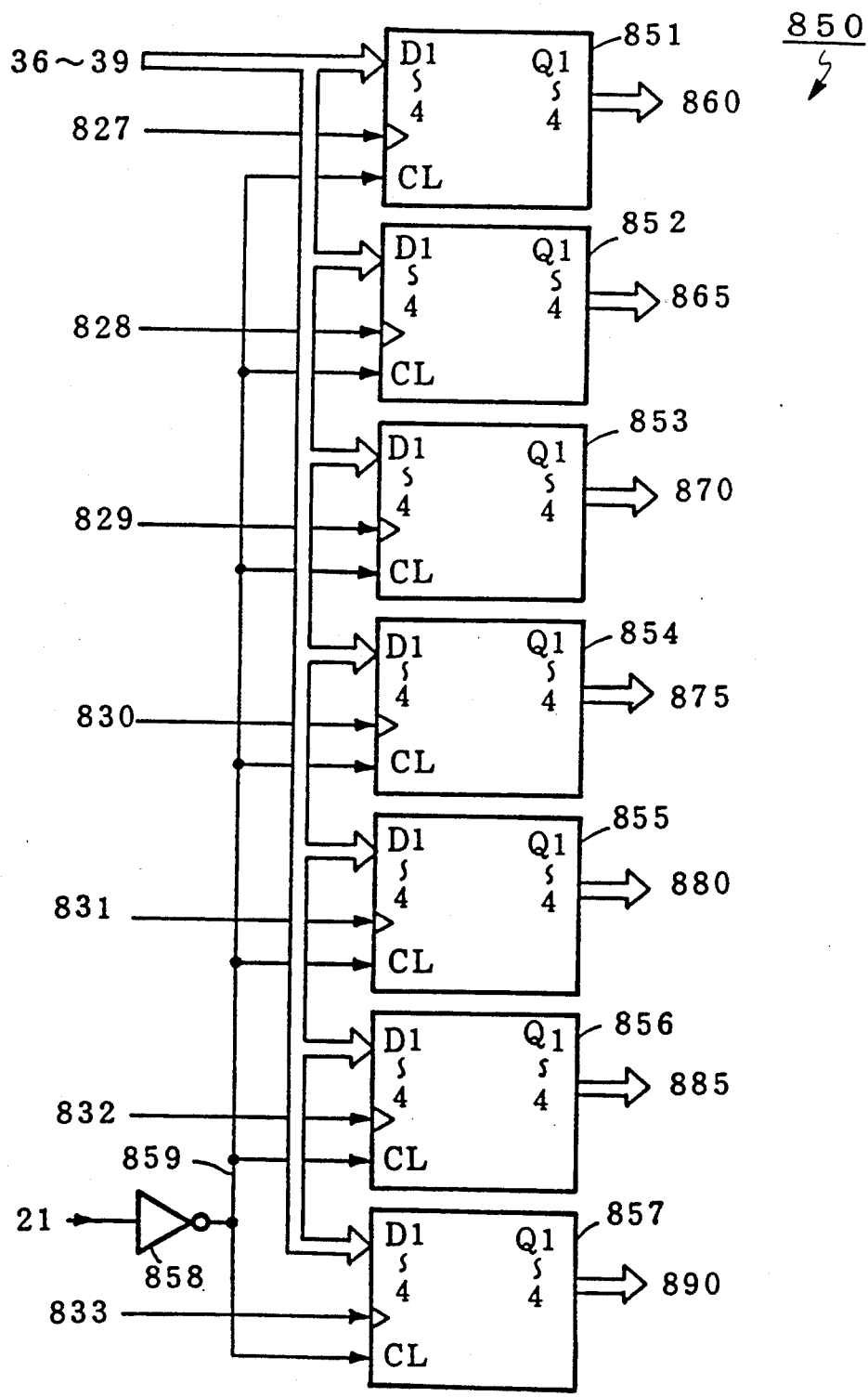
FIG. 14A presents a circuit diagram illustrating one embodiment of the 4-bit latching circuit 850.
Figure 14B:
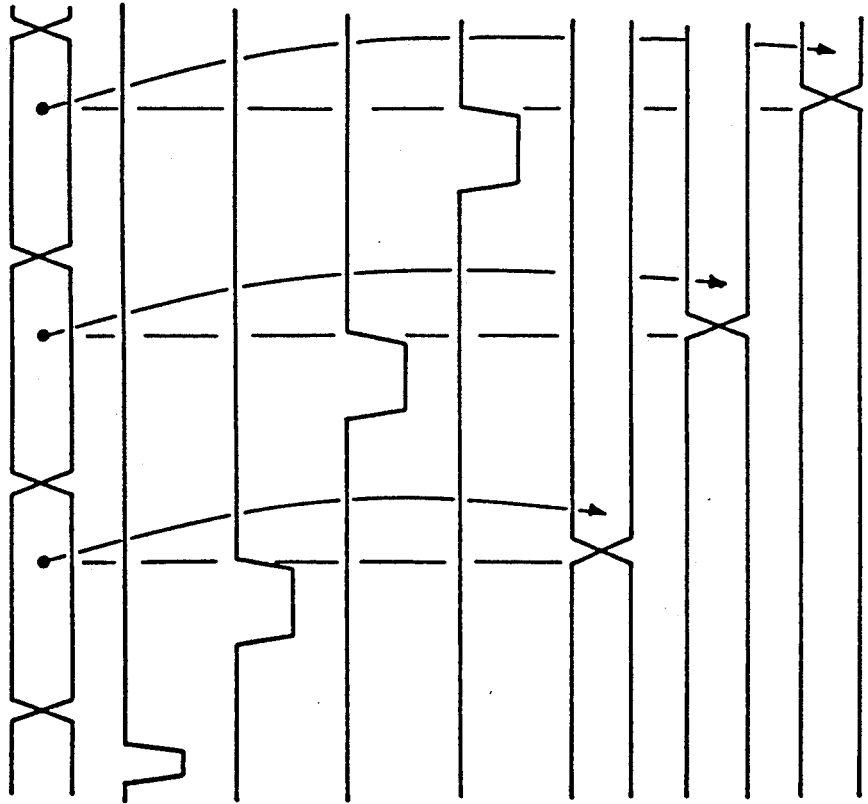
FIG. 14B presents a timing chart illustrating the waveforms of the individual parts of the 4-bit latching circuit 850.

In FIG. 14A is shown a circuit diagram for the 4-bit latch circuit 850 while FIG. 14B presents a timing chart illustrating the waveforms of the individual parts of the latch circuit.

Numeral references 851-857 are D-flipflops, and, to their clear terminals CL, the resetting signal 21 is inverted through the inverter 858 and is applied as the signal 859 shown in FIG. 14B (b), and the signals 36~39, which are some of the data-bus signal 25 shown in FIG. 14B (a) are applied to the data terminals D1~D4 of those flipflops, and, to each of their clock terminals, the signals 827-833, which indicate the timing and address for writing, are applied in the manner shown in FIGS. 14B(c)-14B(e), and the bus signals 860 (FIG. 14B(f)), 865 (FIG. 14B(g)), 870 (FIG. 14B(h)), 875, 880, 885, and 890, which send out the data of the signals 36-39 shown in FIG. 14B(a) at the timing set by the individual signals 827-833, are output.

Figure 14C:
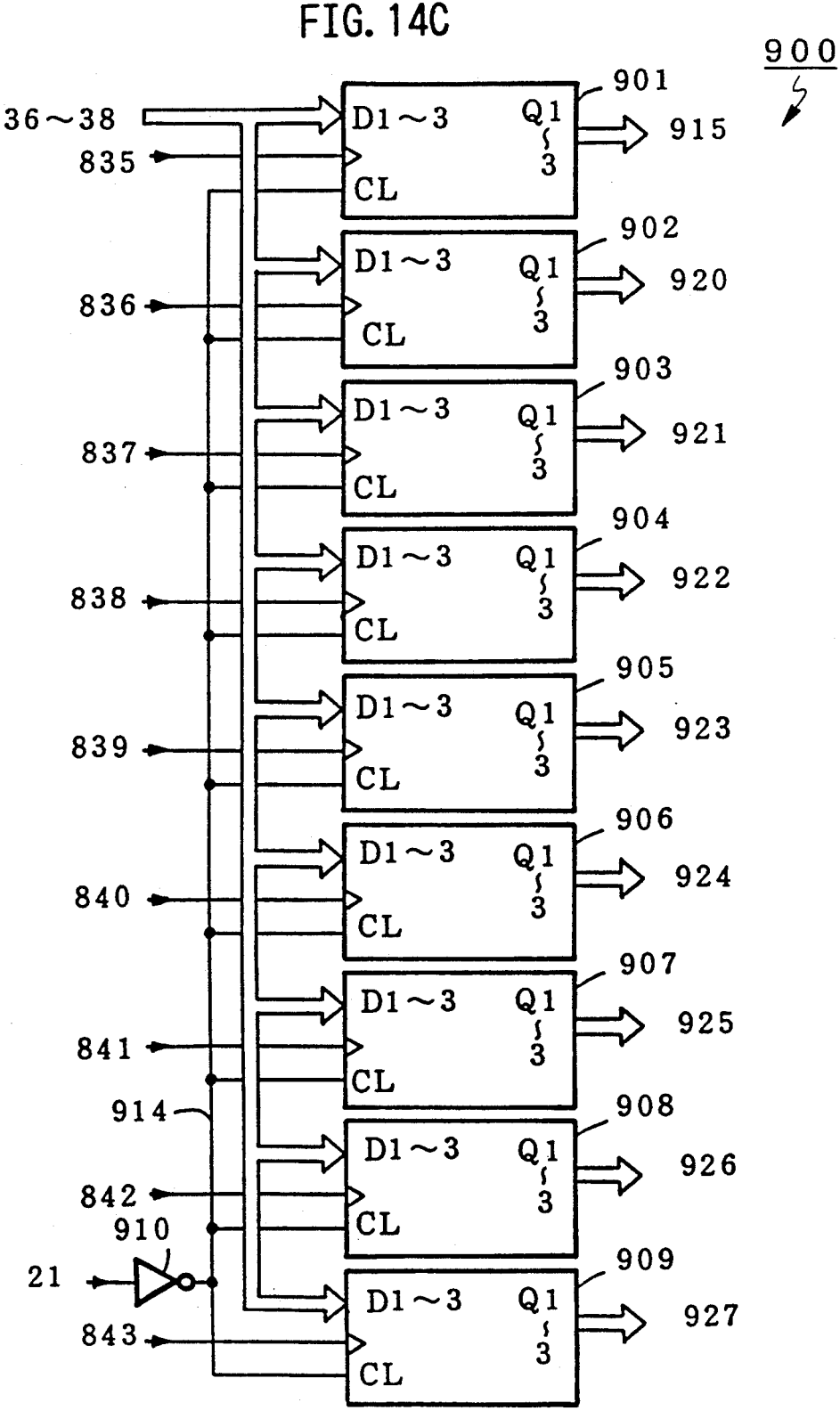
FIG. 14C presents a circuit diagram illustrating one embodiment of the 3-bit latching circuit 900.
Figure 14D:
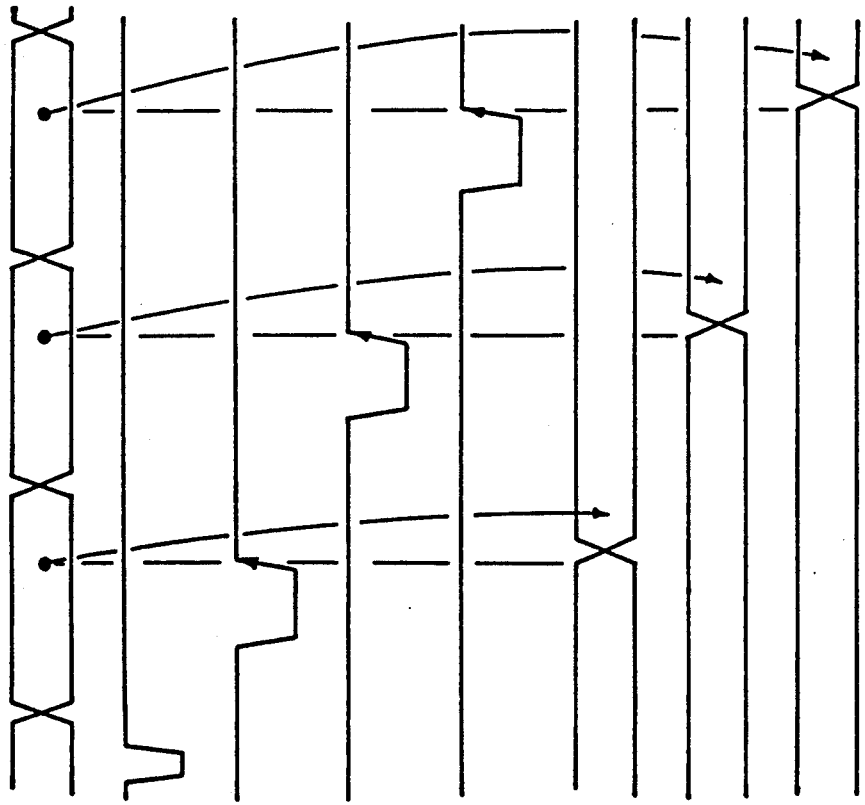
FIG. 14D presents a timing chart illustrating the waveforms of the individual parts of the 3-bit latching circuit 900.

In FIG. 14C, a circuit diagram is presented for the 3-bit latch circuit 900, and a timing chart showing the waveforms of its individual parts are presented in FIG. 14D.

Numeral references 901-909 are D-flipflops, and, to their clear terminals CL, the resetting signal 21, as inverted through the inverter 910, is applied as the signal 914 shown in FIG. 14D(b), and the signals 36~38, which are parts of the data-bus signal 25 presented in FIG. 14D(a), are applied to their data terminals D1~D3, and the signals 835~843, which indicate the timing and the address for writing, are applied to the clock terminals of the individual flipflops in the manner shown in part in FIG. 14D(c)-14D(e), and the D-flipflops output the bus signals 915 (FIG. 14D(f)), 920 (FIG. 14D(g)), 921 (FIG. 14D(h)), and 922-927, which send out the data of the signals 36~38 shown in FIG. 14D(a) at the timing set by the individual signals 835~843.

Figure 14E:
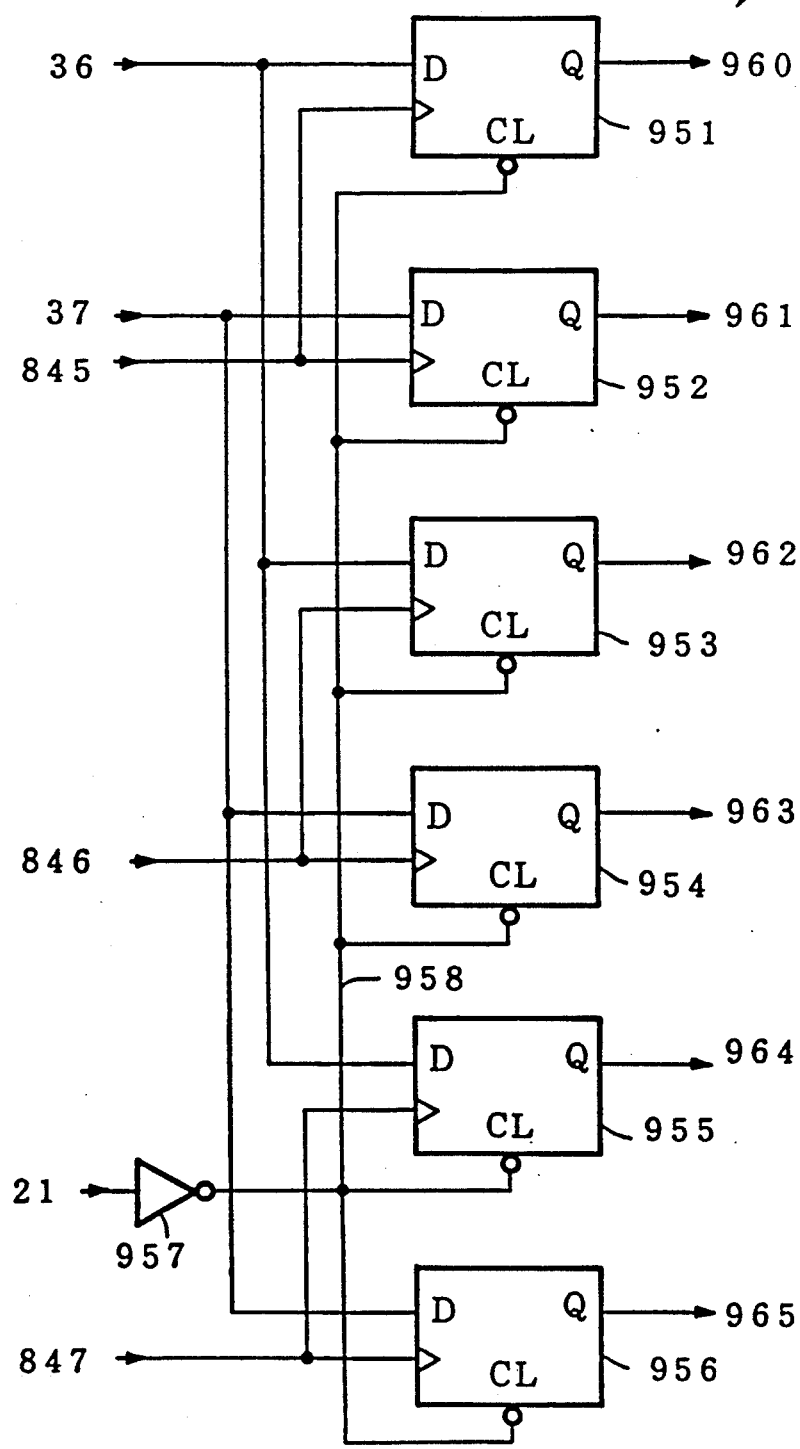
FIG. 14E presents a circuit diagram illustrating one embodiment of the 2-bit latching circuit 950.
Figure 14F:
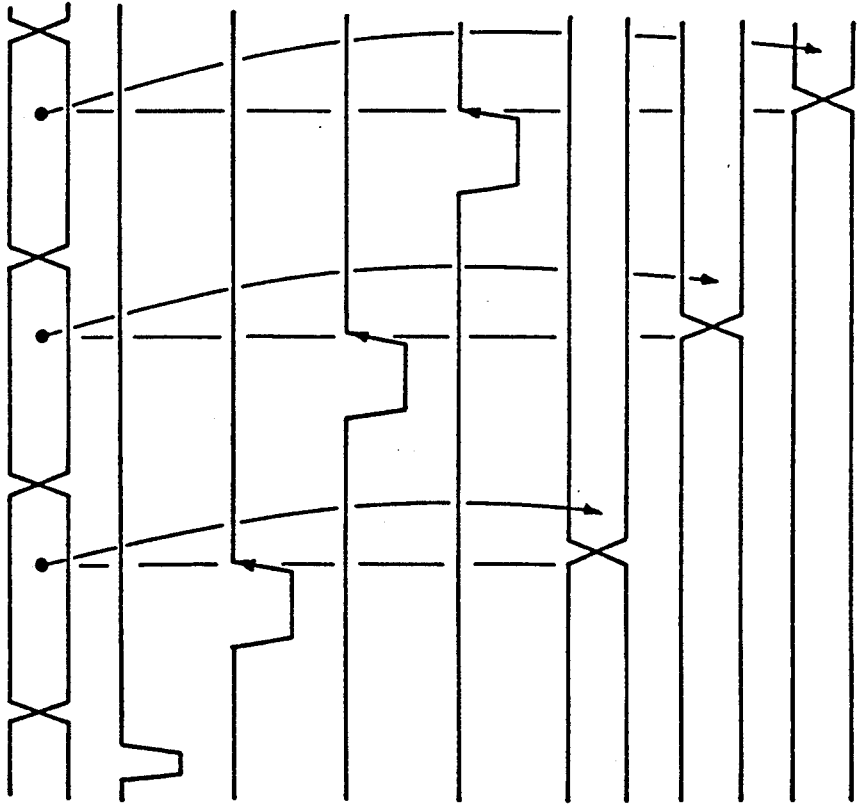
FIG. 14F presents a timing chart illustrating the waveforms of the individual parts of the 2-bit latching circuit 950.

In FIG. 14E, a circuit diagram is presented for the 2-bit latch circuit 950, and a timing chart showing the waveforms of the individual parts of the latch circuit is given in FIG. 14F.

Numeral references 951-956 are D-flipflops, and, to their clear terminals CL, the resetting signal 21 as inverted through the inverter 957 is applied as the signal 958 shown in FIG. 14F (b), and, to their data terminals D, the signals 36 and 37, which are some parts of the data-bus signal 25 shown in FIG. 14F(a), is applied, and, with the signals 845~847, which indicate the timing and address for writing, being applied to the individual clock terminals of the flipflops in the manner as shown in FIGS. 14F(c)-14F(e), the D-flipflops output the signals 960 and 961 (FIG. 14F(f)), 962 and 963 (FIG. 14F(g)), and 964 and 965 (FIG. 14F(h)), which send out the data of the signals 36 and 37 shown in FIG. 14F(a) at the timing set by each of the signals 845-847.

Figure 15A:
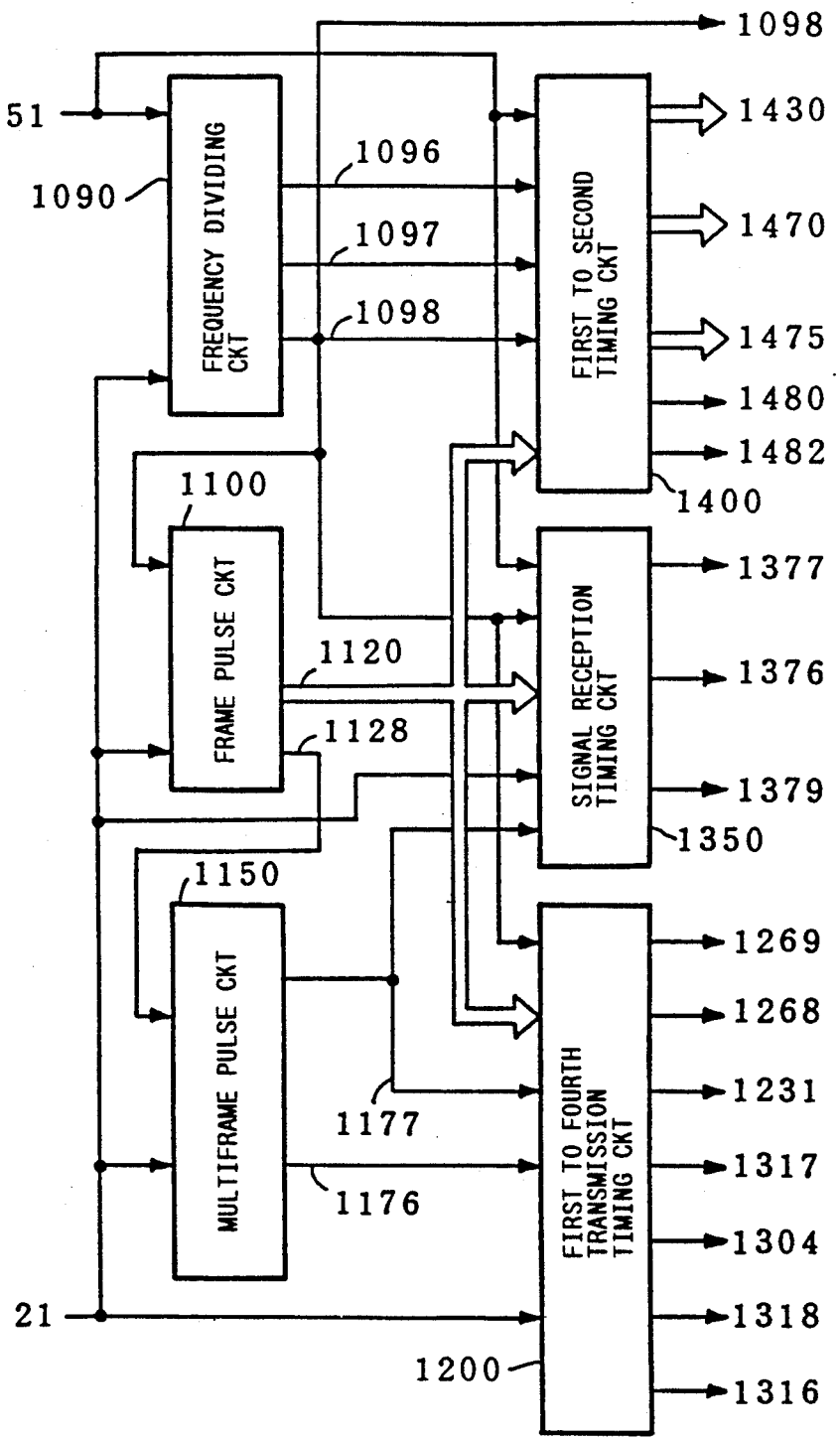
FIG. 15A presents a circuit block diagram illustrating one embodiment of the timing circuit 1000.

In FIG. 15A, the internal structure of the timing circuit 1000 is presented, and FIG. 15B and FIG. 15C show the timing charts which illustrate the waveforms of the individual parts of this timing circuit.

A frequency-dividing circuit 1090, with the reception of the resetting signal to be put into operation at the time when the power is turned on, outputs, for example, the signal 1096 by dividing into halves the clock 51 at the frequency of 2.048 MHz, the signal 1097 by dividing the clock frequency into four parts, and the signal 1098 at the frequency of 256 KHz by dividing the said clock frequency into eight parts.

Numeral reference 1100 is a frame pulse circuit, and, with the reception of the resetting signal 21, this circuit is reset, and, receiving the signal 1098, this circuit outputs the signal 1128, which is output for each frame, and the bus signal 1120 shown in FIG. 15B (a), which indicates the number of the frame.

Numeral reference 1150 is a multi-frame pulse circuit, which, being reset by the resetting signal 21, receives the application of the signal 1128, which is output for each frame, and outputs the signals 1177 and 1176, which are shown in FIGS. 15C(b) and 15C(c). The signal 1177 in FIGS. 15C(b) indicates the period of the frame in which the D-information can be sent. In specific terms, the signal indicates the period in which the D-information is sent out for the frame numbers 0~7.

The signal 1176 in FIG. 15C (c) indicates the period for the frame No. 8, which is the frame for sending out the F-bit (Refer to FIG. 1C), which serves the purpose of obtaining the period of the frame.

Numeral reference 1200 is the first or the fourth signal transmission timing circuit, which, being reset with the resetting signal 21, outputs the signal 1231, which indicates the timing for sending out the start bit given in FIG. 15B(d), the signal 1268, which indicates the timing for sending out the data information B given in FIG. 15B(e), the signal 1304, which indicates the timing for sending out the P-information given in FIG. 15B(f), the signal 1269, which indicates the timing for each bit in the period for sending out the signals 108A and 109A (Refer to FIG. 1A~1E) shown in FIG. 15B(j), the signal 1316, which indicates the timing for interruption into the CPU 20, and the signal 1317, which indicates the timing for sending out the F-bit, and the signal 1318, which indicates the period for sending out the data information B, when this timing circuit receives the application of the signal at the frequency of 256 KHz and the signals 1177 and 1176 shown in FIGS. 15C(b) and 15C(c), and the signal 1120 shown in FIG. 15B(a), for example.

Numeral reference 1350 is a signal reception timing circuit, which, being reset with the resetting signal 21, outputs the upstream signal 61A (Refer to FIG. 1B~1F), which is shown in FIG. 15B(k), for example, the signal 1376 (Refer to FIG. 4B(c), which has the frequency of 256 KHz and shown in FIG. 15B(g), the signal 1377 shown in FIG. 15B(h), (Refer to FIG. 1D, FIG. 1E, FIG. 1F, and FIG. 4B), and the signal 1379 shown in FIG. 15B(i) (Refer to FIG. 5B), with the signal 1098, the clock 51 and the signal 1177 (as shown in FIG. 15C(b)), and the signal 1120, which indicates the frame number, being applied to this circuit.

Numeral reference 1400 shows first and the second conference timing circuits, which, receiving the signals 1096~1098 from the frequency-dividing circuit 1090, as well as the clock 51, outputs the bus signal 1430, which is . composed of the signals 1431~1436 for conference service (Refer to FIG. 10E), the bus signal 1470, which is composed of the signals 1471~1473 for latching (Refer to FIG. 10E), the bus signal 1475, which is composed of the signals 1476-1478 indicating the latching period (Refer to FIG. 10E), and the signal 1480, which performs the resetting of the temporary memory circuit 610 (Refer to FIG. 10E), and the latching signal 1482 to be applied to the temporary memory circuit 610 (Refer to FIG. 10E).

The bus signals 1430, 1470, 1475, and the signals 1480 and 1482 are output in the timing with the addition time T3 (i.e. the duration between bit 0 and bit 1 in one frame) as shown in FIG. 15B(b) for the conference service system.

Similarly, in the signal transmission timing period shown in FIG. 15B(c) (i.e. between bit 0 and 12 in one frame), the signals 1232, 1268, 1269, 1304, and 1316~1318 are sent out. In the same way, the signals 1376, 1377, and 1379 are sent out in the period for signal reception timing (i.e. between bit 21 and bit 29 in one frame) as shown in FIG. 15B (c).

Figure 15D:
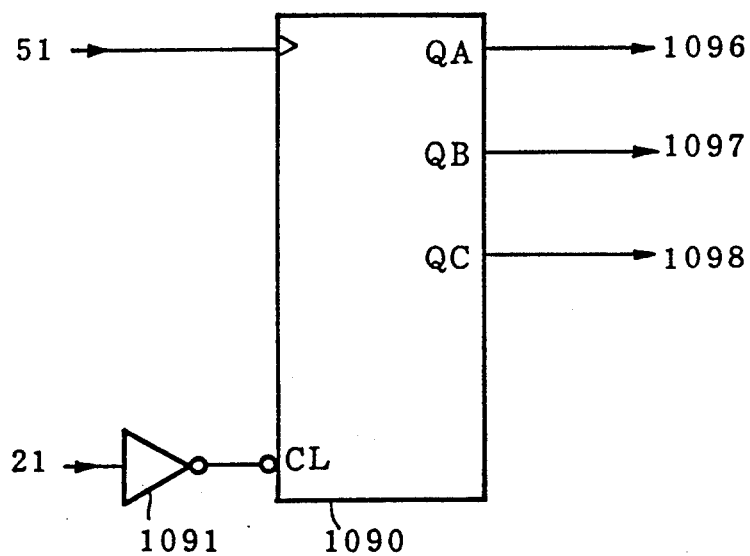
FIG. 15D presents a circuit diagram illustrating one embodiment of the frequency-dividing circuit 1090.
Figure 15E:
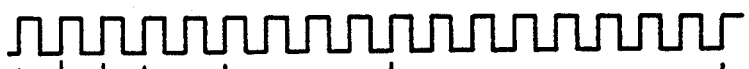
FIG. 15E presents a timing chart illustrating the waveforms of the individual parts of the frequency-dividing circuit 1090.
Figure 15E:
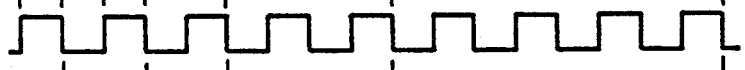
Figure 15E:
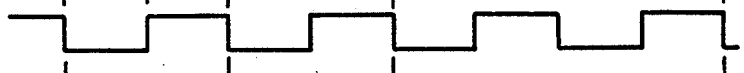
Figure 15E:
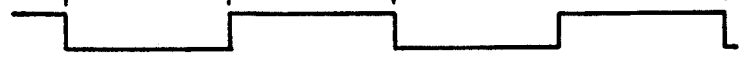

FIG. 15D shows the circuitry of the frequency dividing circuit 1090, and FIG. 15E presents a timing chart which shows the waveforms of the individual parts of this circuit.

Numeral reference 1090 is a frequency dividing circuit, which is cleared with the resetting signal 21, which is to be used for resetting at the time when the power is turned on, as received to its clear terminal CL through the inverter 1091, receives the clock signal 51 in FIG. 15E(a) to its clock terminal and obtains the signal 1096 shown in FIG. 15E(b) on its output terminal QA by dividing the frequency of the clock signal into halves, the signal 1097 shown in FIG. 15E(c) on its output terminal QB by dividing the clock signal frequency into four parts, and the signal 1098 in FIG. 15E(d) on its output terminal QC by dividing the clock signal frequency into eight parts.

Figure 15F:
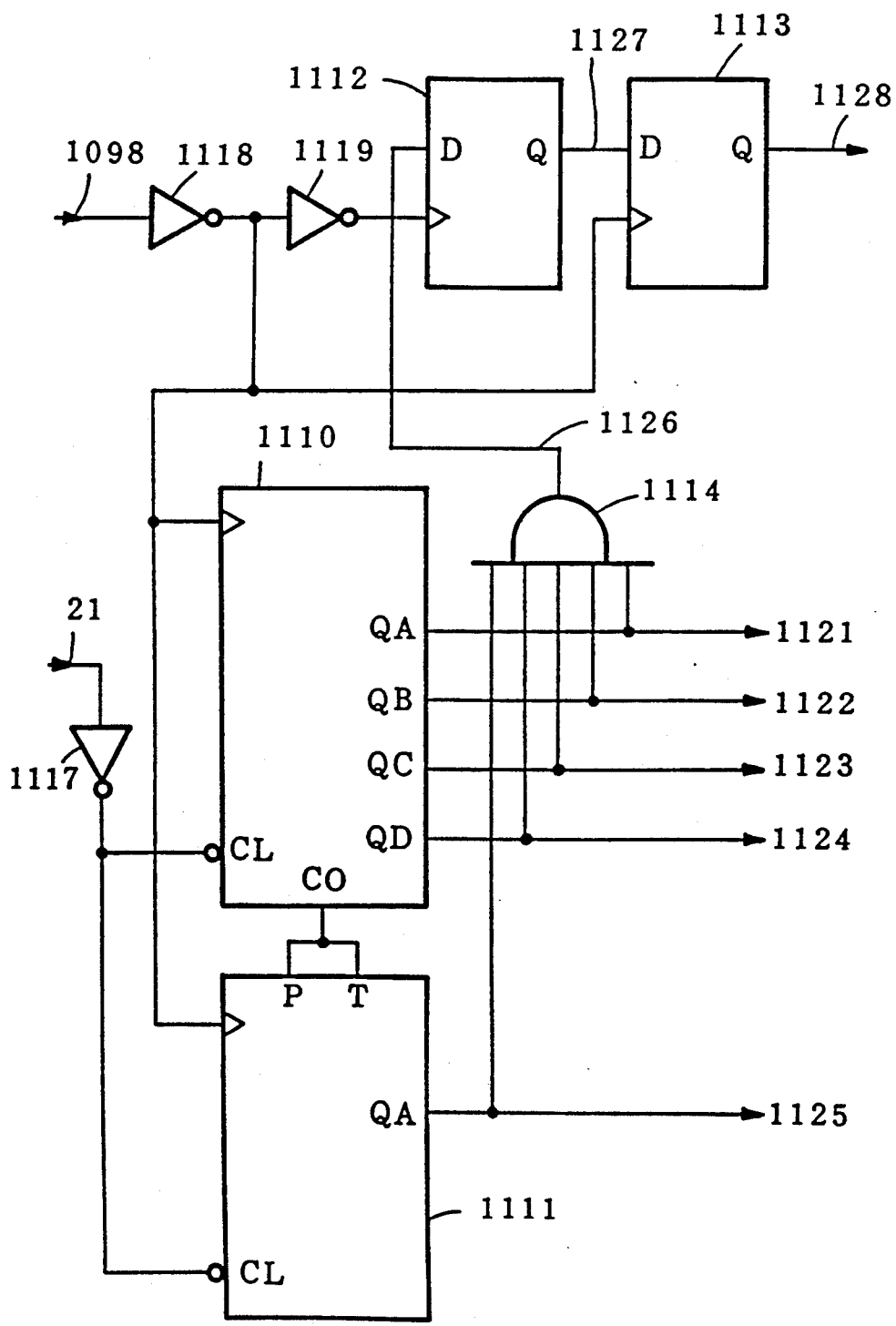
FIG. 15F presents a circuit diagram illustrating one embodiment of the frame pulse circuit 1100.

In FIG. 15F is shown the frame pulse circuit 1100, and, in FIG. 15G, the timing charts for the individual parts of this frame pulse circuit are presented.

Numeral references 1110 and 1111 are hexadecimal counters, both of which have the resetting signal 21, which is to be used at the time when the power is turned on, applied to the respective clear terminals CL through the inverter 1117, and, to their clock terminals, the signal 1098 shown in FIG. 15G (a) is applied through the inverter 1118. The outputs QA, QB, QC, and QD from the hexadecimal counter 1110 provide the signal 1121 obtained by dividing the frequency of the signal 1098 in FIG. 15G(a) into halves, the signal 1122 obtained by frequency division into four parts, the signal 1123 obtained by frequency division into eight parts, and the signal 1124 obtained by frequency division into sixteen parts are obtained, as shown in FIGS. 15G(b), 15G(c), 15G(d), and 15G(e), on the terminals QA, QB, QC, and QD of the hexadecimal counter 1110. When the hexadecimal counter 1110 attains the full-count state, the carry out terminal CO gives an output, which is applied to the enable terminals P and T on the hexadecimal counter 1111, which will then put out from its output terminal QA the signal 1125 obtained by dividing the frequency of the signal 1098 given in FIG. 15G(a) into 32 parts as shown in FIG. 15G(f).

The individual signals 1121~1125, which are thus obtained by frequency division, are turned into the signal 1126 shown in FIG. 15G(g) through the AND gate 1114 and is then applied to the data terminal on the D-flipflop 1112. To the clock terminal of this D-flipflop 1112, the signal 1098 shown in FIG. 15G(a) is applied through two inverters 1118 and 1119, and the signal 1127 shown in FIG. 15G(h) is obtained on the output terminal Q of the said D-flipflop 1112. This signal 1127 is applied to the data terminal of the D-flipflop 1113, and, on its clock terminal, the signal shown in FIG. 15G(a) is applied through the inverter 1118, and the signal 1128 shown in FIG. 15G(i) is obtained on the output terminal Q of this D-flipflop 1113.

Figure 15H:
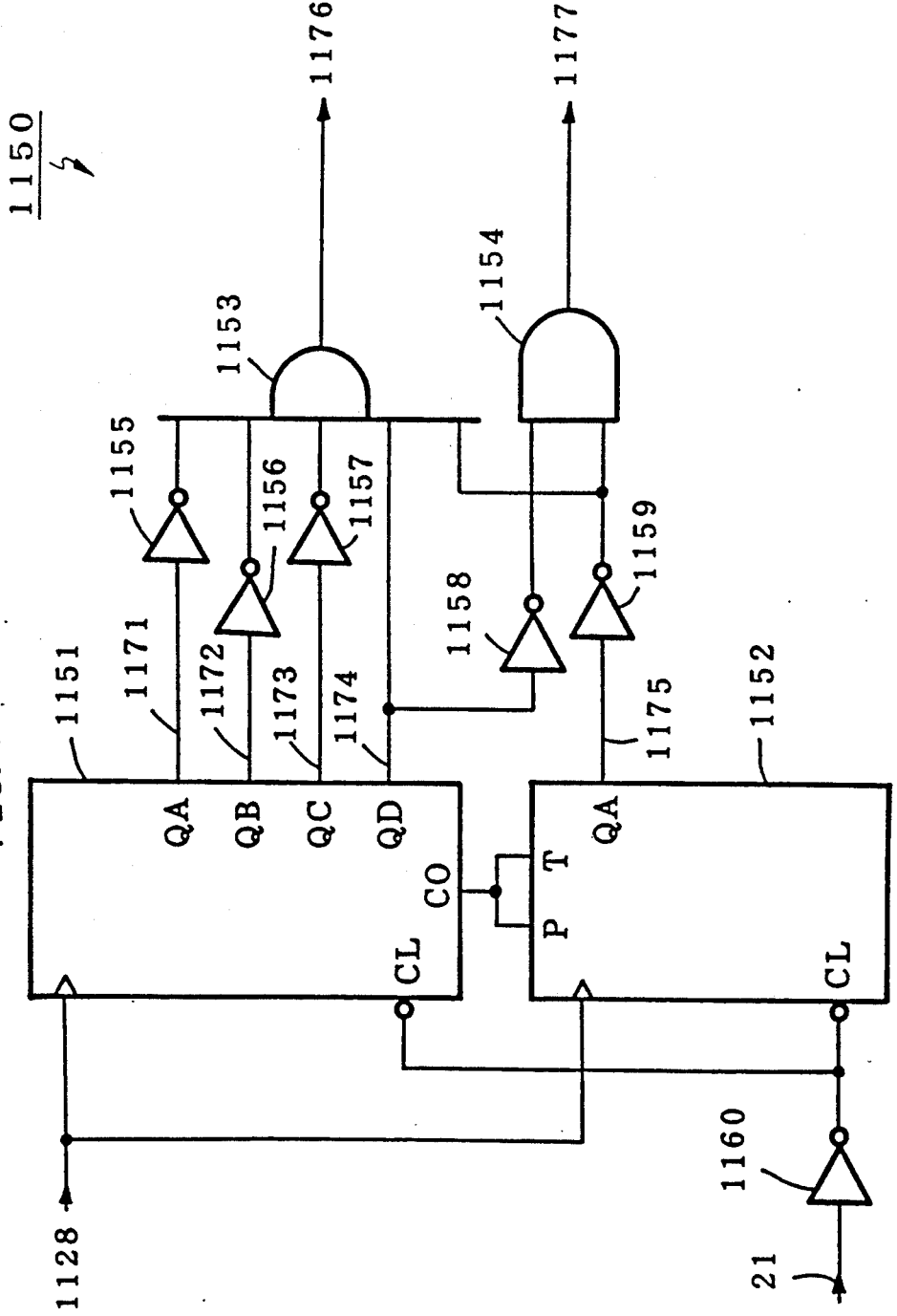
FIG. 15H presents a circuit diagram illustrating one embodiment of the multi-frame pulse circuit 1150.

In FIG. 15H, the circuitry of the multi-frame pulse circuit 1150 is shown, and, in FIG. 15I, the timing charts showing the waveforms of the individual sections of the circuit are presented.

Numeral references 1151 and 1152 are hexadecimal counters, both of which have the resetting signal 21, which is to be used at the time when the power is turned on, applied to the respective clear terminals CL through the inverter 1160, and, to their clock terminals, the signal 1128 shown in FIG. 15I(a) is applied through the inverter 1160. The outputs QA, QB, QC, and QD from the hexadecimal counter 1151 provide the signal 1171 obtained by dividing the frequency of the signal 1128 in FIG. 15I(a) into halves, the signal 1172 obtained by frequency division into four parts, the signal 1173 obtained by frequency division into eight parts, and the signal 1174 obtained by frequency division into sixteen parts are obtained, as shown in FIGS. 15I(b), 15I(c), 15I(d), and 15I(e), on the terminals QA, QB, QC, and QD of the hexadecimal counter 1151. When the hexadecimal counter 1151 attains the full-count state, the carry out terminal CO gives an output, which is applied to the enable terminals P and T on the hexadecimal counter 1152, which will then put out from its output terminal QA the signal 1175 obtained by dividing the frequency of the signal 1128 given in FIG. 15I(a) into 32 parts as shown in FIG. 15I(f).

The signal 1174 in FIG. 15I(e) thus obtained by the frequency division and is applied directly, while the individual signals 1171~1173, and 1175 obtained by frequency division are applied respectively through the inverters 1155~1157, and 1159, to the AND gate 1153, and the output from this gate becomes the signal 1176 shown in FIG. 15I (h). Moreover, the AND gate, to which the signal 1174 has applied via the inverter 1158 and the signal 1175 has applied via the inverter 1159, output the signal 1177 shown in FIG. 15I(g).

Figure 16A:
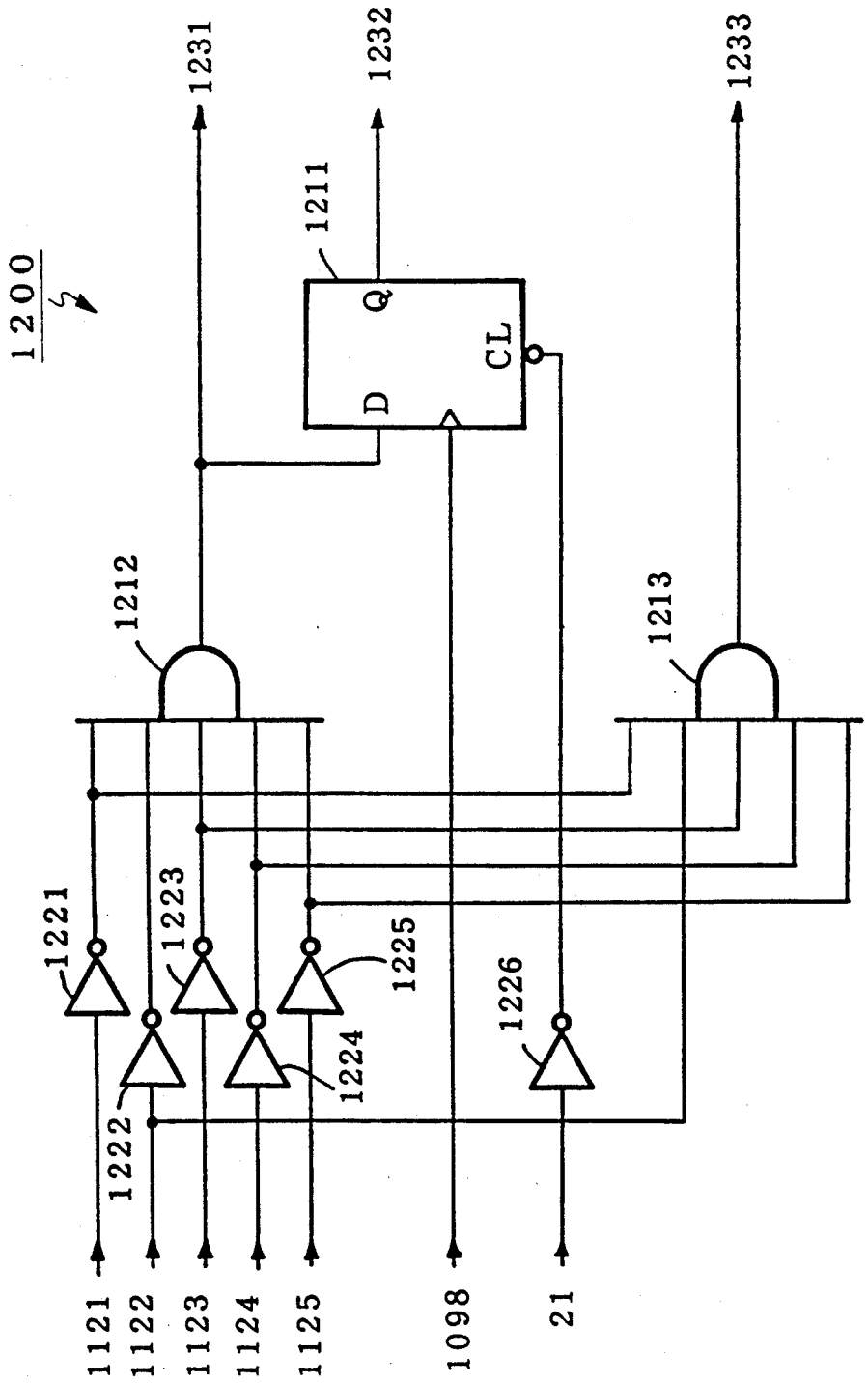
FIG. 16A presents a circuit diagram illustrating one embodiment of the first signal transmission circuit included in the first through the fourth signal transmission timing circuits 1200.

In FIG. 16A, a circuit diagram is presented for the first signal transmission timing circuit, which is included in the first to fourth signal transmission timing circuit 1200, while FIG. 16B shows the timing charts for the waveforms of the individual sections of this circuit.

The signals 1121~1125 given in FIGS. 16B(b)~16B(f) and forming the bus signal 1120 the bit number of which is indicated in numerical figures in FIG. 16B(a) are applied to the AND gate 1212, respectively, through the inverters 1221~1225, from which the signal 1231 shown in FIG. 16B(h) is output.

The signal 1098 shown in FIG. 16B(g) is applied to the clock terminal of the flipflop 1211 which has received to its clear terminal CL the application of the resetting signal, which is to be used at the time when the power is turned on, through the inverter 1226, and the signal 1231 shown in FIG. 16B(h) is applied to the data terminal of the flipflop 1211, and the signal 1232 shown in FIG. 16B(i) is then obtained on its output terminal Q.

The outputs from the inverters 1221, and 1233-1225 and the signal 1122 are applied to the AND gate 1213, from which the signal 1233 is output.

Figure 16C:
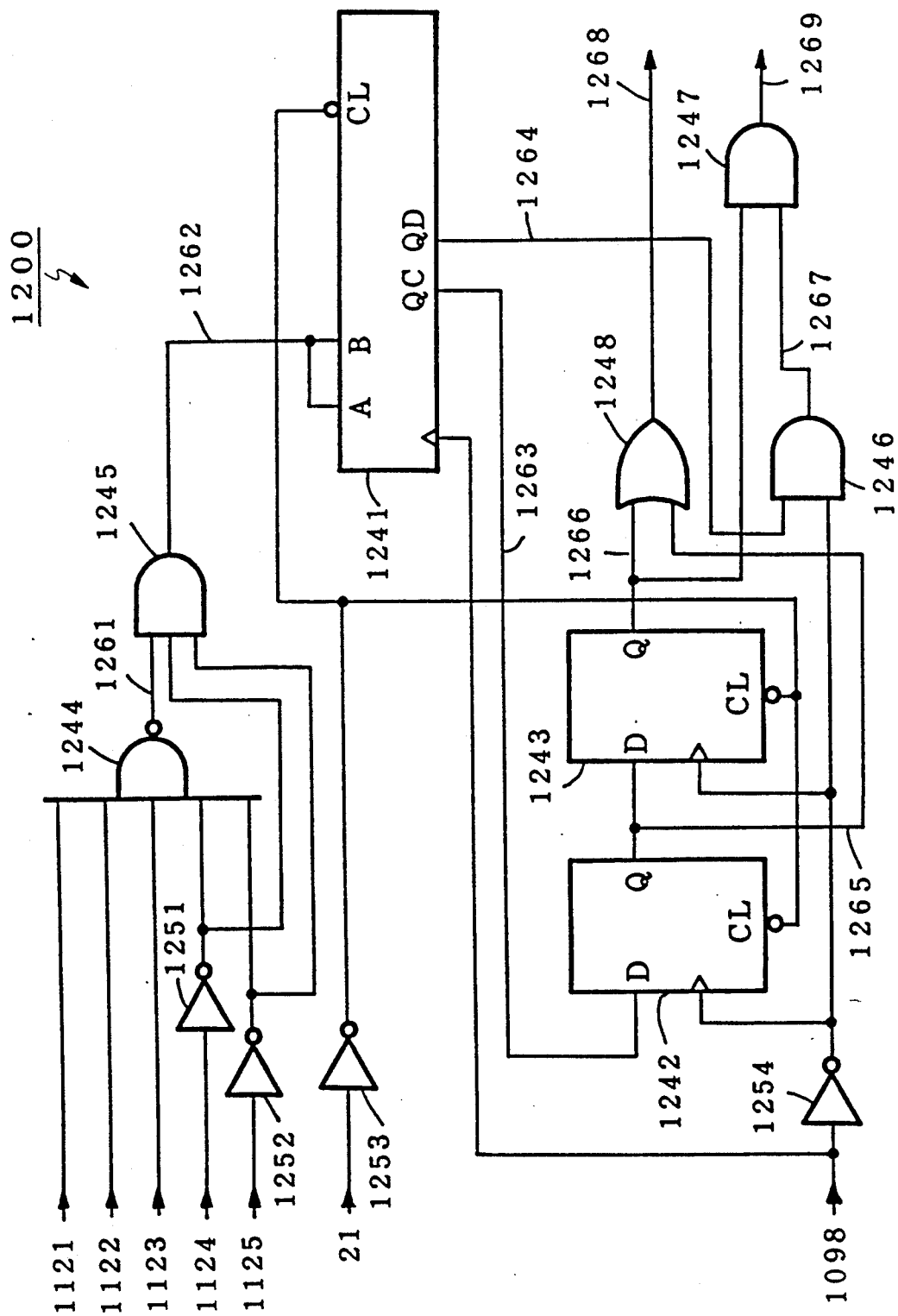
FIG. 16C presents one embodiment of the second signal transmission circuit included in the first through the fourth signal transmission timing circuits 1200.

FIG. 16C presents the second signal transmission timing circuit, which is included in the first to fourth signal transmission timing circuit 1200, and timing charts showing the waveforms of the individual sections of the time circuit are given in FIGS. 16E(a)-16E(k).

Of the signals 1121-1125 which constitute the bus signal 1120 the bit number of which is expressed in numerical figures in FIG. 16E(a), the signals 1121-1123 are applied directly, and the signals 1124 and 1125 are applied via the inverters 1251 and 1252, to the NAND gate 1244, which then outputs the signal 1261 shown in FIG. 16E(c), and this signal is applied to the AND gate 1252 while the output from the inverter 1251 and that from the inverter 1252 are also applied to the AND gate 1245, and the output from this gate becomes the signal 1262 shown in FIG. 16E(d), which is applied to the terminals A and B on the 8-bit shift register 1241.

To the clear terminal CL on the 8-bit shift register 1241, the resetting signal 21, which is to be used for resetting when the power is turned on, has already been applied through the inverter 1253, having reset the register, and the signal shown in FIG. 16E(b) is applied to the clock terminal of this register, so that the signal 1263 and the signal 1264, which are shown respectively in FIGS. 16E(e) and 16E(f), are output from the third and the fourth terminals of the register QC and QD.

The D-flipflops 1242 and 1243, which have been reset with the output from the inverter 1253 applied to their clear terminals CL at the time when the power is turned on, receives the application of the signal 1098 given in FIG. 16E(b) through the inverter 1254 while the signal 1263 shown in FIG. 16E(e) is applied to the data terminal D of the D-flipflop 1242, and the output at the terminal Q is obtained as the signal 1265 shown in FIG. 16E(g).

The signal 1265 is applied to the data terminal D of the D-flipflop 1243, which outputs the signal 1266 shown in FIG. 16E(h) on its terminal Q, and, the signal 1265 is applied with the signal 1266 to the OR gate 1248 so that the signal 1268 shown in FIG. 16E(i) is obtained.

The AND gate 1246 outputs the signal 1267 shown in FIG. 16E(j) when the output from the inverter 2354 and the signal 1264 is applied to it. This signal 1267 is applied, together with the signal 1266, to the AND gate 1247, which then outputs the signal 1269 shown in FIG. 16E(k).

Figure 16D:
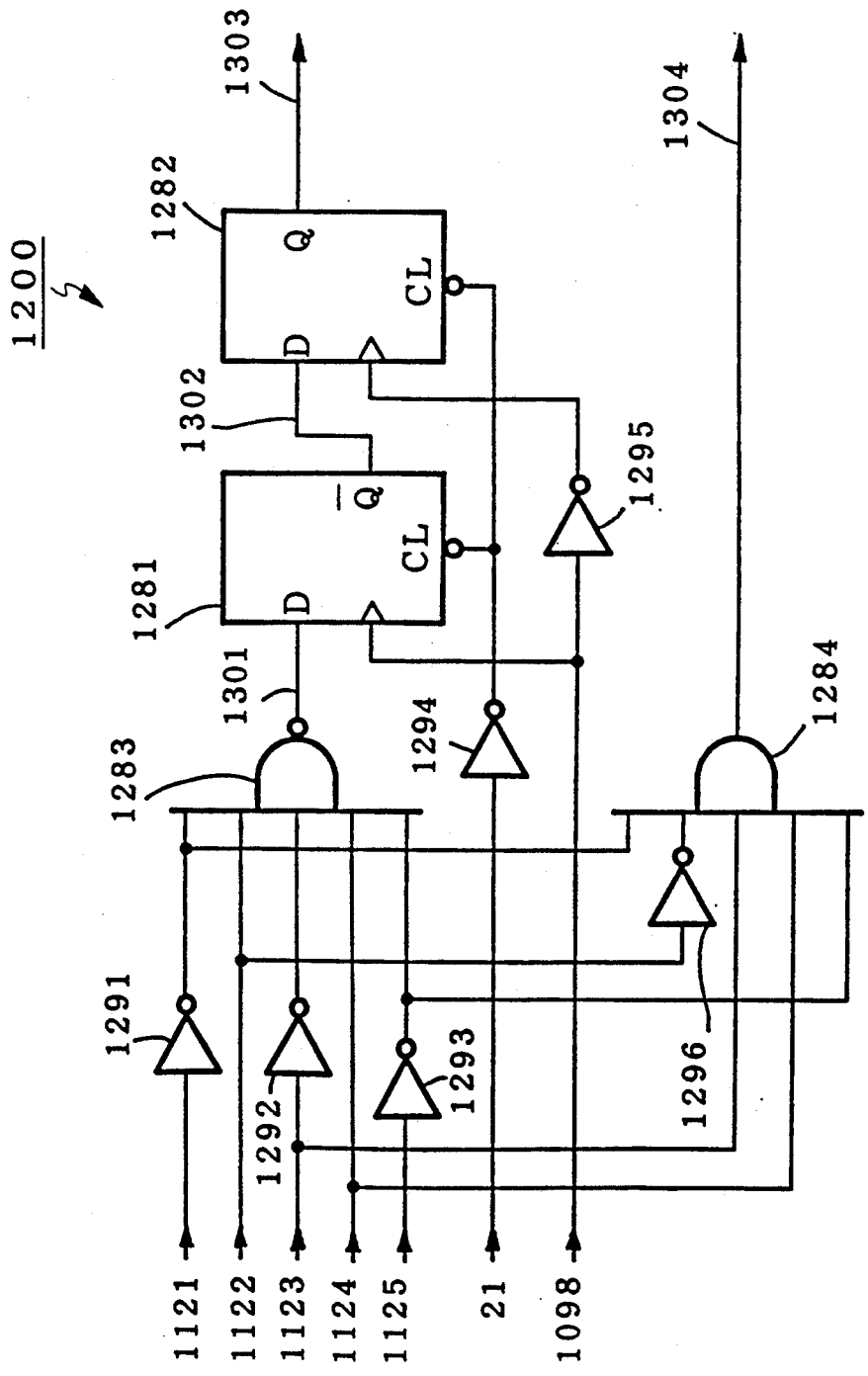
FIG. 16D presents a circuit diagram illustrating one embodiment of the third signal transmission timing circuit included in the first through the fourth signal transmission timing circuits 1200.

In FIG. 16D is shown a circuit diagram for the third signal transmission timing circuit, which is included in the first to the fourth signal transmission timing circuits 1200, and the timing charts for the waveforms of the individual parts of the timing circuit are presented in FIG. 16E(a), 16E(b) and 16E(l)~(p).

Of the signals 1121–1125, which constitute the bus signal 1120 with the bit number indicated in numerical figures in FIG. 16E(a), the signals 1121, 1123, and 1125 are applied through the inverters 1291~1293, and the signals 1122 and 1124 are applied directly, to the NAND gate 1283, which then outputs the signal 1301 shown in FIG. 16E(l) to be applied to the data terminal on the D-flipflop 1281.

To the clear terminal CL of this Dflipflop, the resetting signal 21, which is to be used at the time when the power is turned on, has already been applied through the inverter 1294, and the flipflop has already been reset thereby. To the clock terminal of the D-flipflop 1281, the signal 1098 shown in FIG. 16E(b) is applied, and the signal 1302 shown in FIG. 16E(m) is obtained on the terminal NOT Q.

This signal 1302 is applied to the D-flipflop 1282. The clear terminal CL of this D-flipflop 1282 is connected with the clear terminal CL of the D-flipflop 1281, and this D-flipflop is reset when the power is turned on. To the clock terminal on the D-flipflop 1282, the signal 1098 is applied through the inverter 1295, and the signal 1303 shown in FIG. 16E(n) is output on the output terminal Q of this D-flipflop 1282.

To the input terminal of the AND gate 1284, the signals 1121, 1122, and 1125 are applied respectively through the inverters 1291, 1296, and 1293, and the signals 1123 and 1124 are applied directly, and the output terminal of the gate outputs the signal 1304 shown in FIG. 16E(p).

Figure 16F:
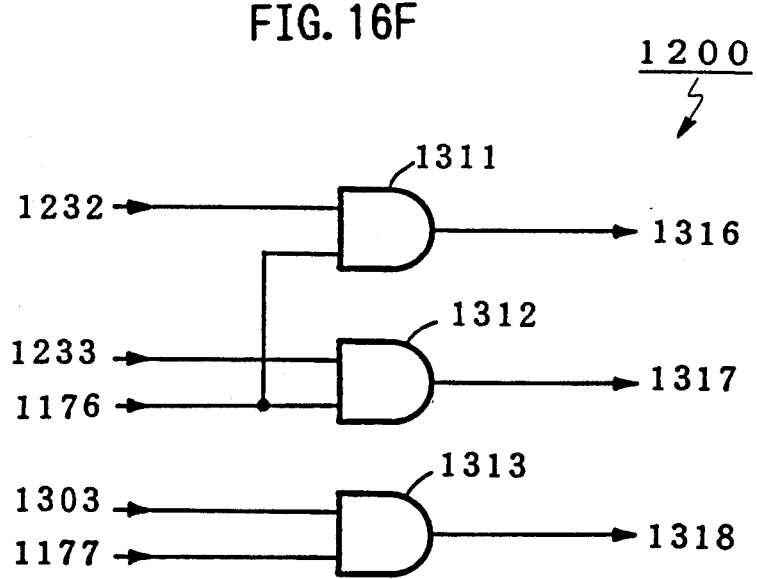
FIG. 16F presents a circuit diagram illustrating one embodiment of the fourth signal transmission timing circuit which is included in the first through the fourth signal transmission timing circuits 1200.

In FIG. 16F, the fourth signal transmission timing circuit, which is included in the first through the fourth signal transmission timing circuits 1200, is presented while FIG. 16G shows the timing charts representing the waveforms of the individual sections of the timing circuit.

In FIG. 16G(a), the bus signal 1170, which expresses the frame number in numerical figures, is presented in order to explain its timing relationship to the other signals.

To the AND gate 1311, the signals 1232 shown in FIG. 16G(f) and the signal 1176 shown in FIG. 16G(c) are applied, the gate then outputting the signal 1316 shown in FIG. 16G(h). To the AND gate 1312, the signal 1233 shown in FIG. 16G(g) and the signal 1176 shown in FIG. 16G(c) are applied, the gate outputting the signal 1317 shown in FIG. 16G(i). To the AND gate 1313, the signal 1303 shown in FIG. 16G(d) and the signal 1177 shown in FIG. 16G(b) are applied, the gate outputting the signal 1318 shown in FIG. 16G(e). The respective signals shown in FIGS. 16G(a) to 16G(i) are described with reference to the bus signal 1170 which expresses the frame number shown in FIG. 16G(a), and it follows from this that these signals are represented in an extremely shortened length in terms of time in comparison with the expressions in the signal 1177 in FIG. 15I(g), in the 1176 in FIG. 15I(h), in the signal 1303 in FIG. 16E(n), and in the signal 1232 and the signal 1233 given respectively in FIGS. 16B(i) and 16B(j).

Figure 17A:
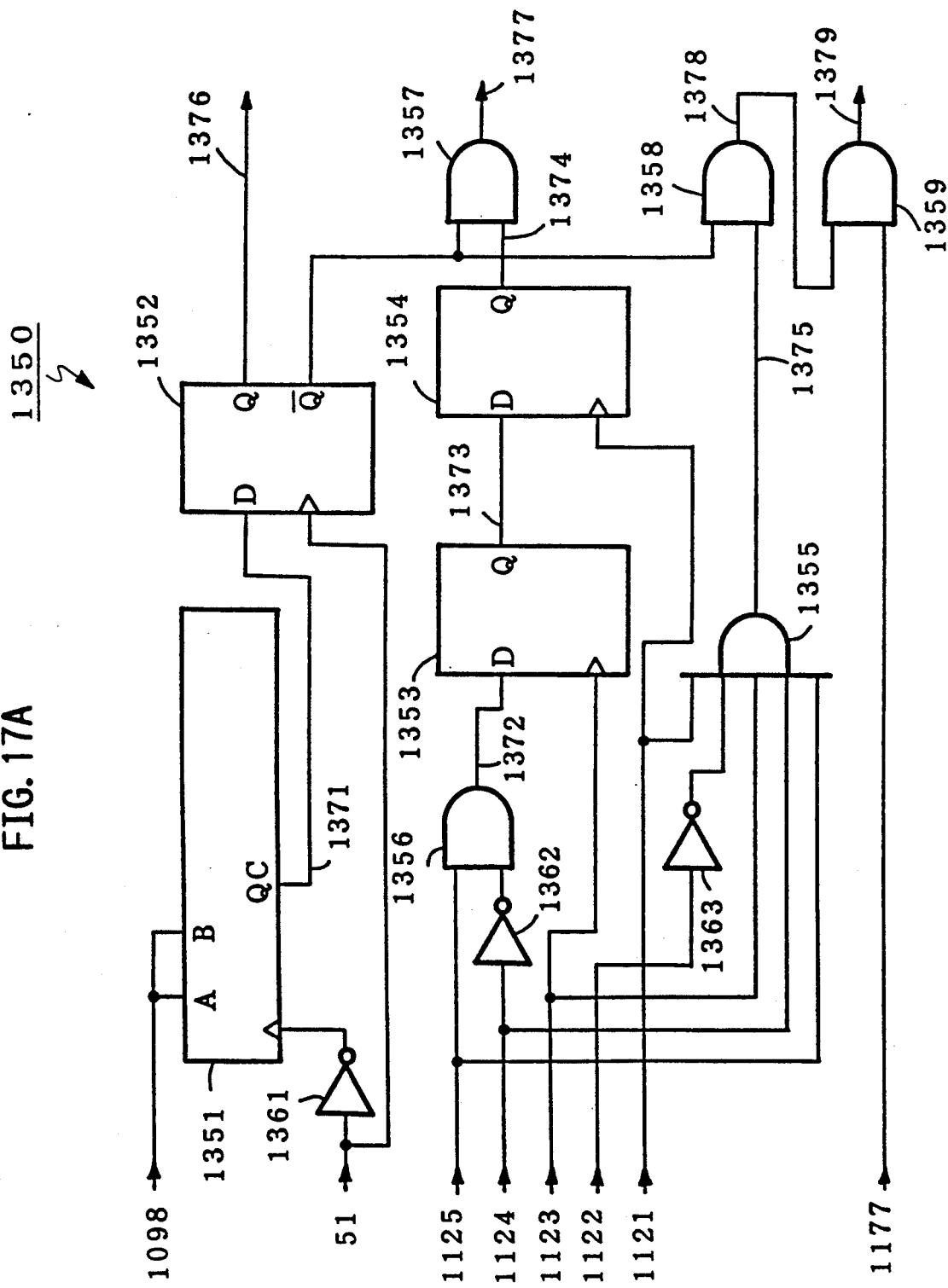
FIG. 17A presents a circuit diagram illustrating one embodiment of the signal receiving timing circuit 1350.

In FIG. 17A, a circuit diagram is presented for the signal reception timing circuit 1350, and the timing charts for the waveforms of the respective parts of this timing circuit are presented in FIG. 17B, FIG. 17C, and FIG. 17D.

Numeral reference 1351 is a 8-bit shift register, which receives the application of the signal 1098 shown in FIG. 17C(b) to its input terminals A and B, and, to its clock terminal, the clock 51 shown in FIG. 17C(a) is applied through the inverter 1361, and the shift register outputs the signal 1371 shown in FIG. 17C(c) from its third output terminal QC. This output is applied to the data terminal D of the D-flipflop 1352, and the clock 51 shown in FIG. 17C(a) is applied to the clock terminal of this D-flipflop 1352, the signal 1376 shown in FIG. 17C(d) being then obtained on the output terminal Q while the inverted signal thereof is obtained on the output terminal NOT Q.

Of the signals 1121~1125 shown in FIGS. 17B(b)~17B(f) and forming the bus signal 1120 expressing the bit number in numerical figures as shown in FIG. 17B(a), the signal 1125 is applied directly, and the signals 1124 is applied through the inverter 1362, respectively to the AND gate 1356, and the signal 1372 shown in FIG. 17B(i) is obtained as the output from the AND gate 1356.

This signal 1372 is applied to the D-flipflop 1353, and the signal 1123 shown in FIG. 17B(d) is applied to the clock terminal of the D-flipflop 1353, and, on the output terminal Q of this flipflop, the signal 1373 shown in FIG. 17B(j) is obtained. With the signal 1121 shown in FIG. 17B(h) applied to the clock terminal, the D-flipflop 1354k receives the signal 1373 shown in FIG. 17B(j) as applied to its data terminal, and the signal 1374 shown in FIG. 17B(k) is obtained on its output terminal Q.

To the AND gate 1357, the signal 1374 and the signal obtained by the inversion of the signal 1376 shown in FIG. 17B(k) are applied, and the signal 1377 shown in FIG. 17B(l) is obtained as the output from the AND gate. Here, the relationship between the clock 51 and the signal 1376, which are shown respectively in FIG. 17B(g) and FIG. 17B(h), is as explained in enlarged dimensions in FIGS. 17C(a) and 17C(b). Therefore, the rising and falling of the signal 1377 are in synchronization with the rise of the clock 51 given in FIG. 17B(g).

To the AND gate 1355, the signals 1121 shown in FIG. 17B(b), the signal 1123 shown in FIG. 17B(d), the signal 1124 shown in FIG. 17B(e), and the signal 1125 shown in FIG. 17B(f) are applied directly, and the signal 1122 given in FIG. 17B(c) is applied through the inverter 1363, so that the signal 1375 shown in FIG. 17B(m) is output from the AND gate 1355. The AND gate 1358 outputs the signal 1378 given in FIG. 17B(n) when this signal 1375 and the inverted signal of the signal 1376 shown in FIG. 17B(h) are applied to it.

The AND gate 1359, receiving the signal 1378, which is shown in common in FIG. 17B(n) and in FIG. 15C(c), and the signal 1177, which indicates the period for the frame numbers 0~7 in the manner shown in FIG. 15C(b), outputs the signal 1379 shown in FIG. 17D(d). In FIG. 17D(a), the bus signal 1120, which indicates the bit number within one frame, and the bus signal 1170, which indicates the frame number, are presented, and these express the timing relationship with the signals 1378 and 1379 shown in FIGS. 17D(c) and 17D(d), respectively.

Figure 18A:
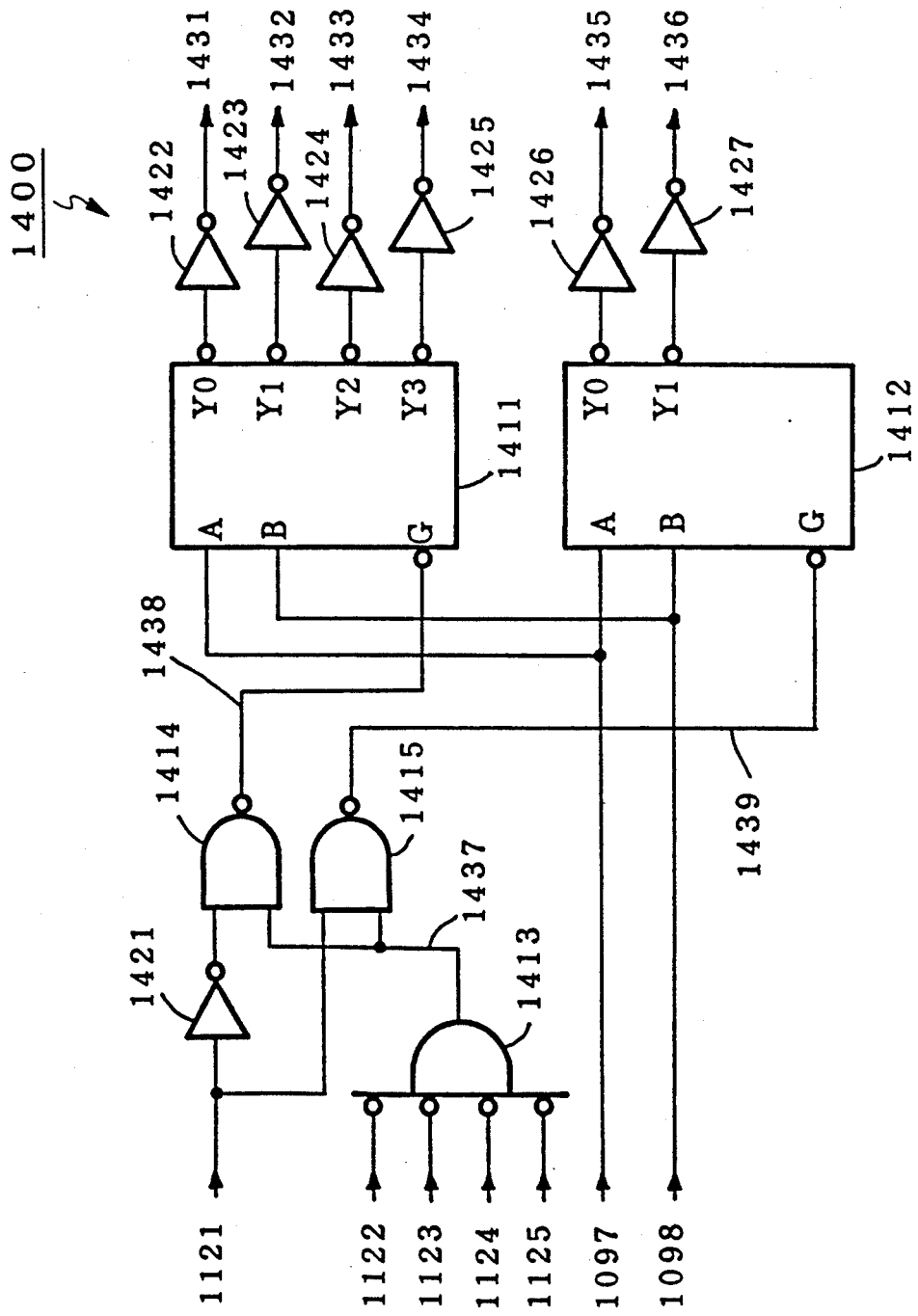
FIG. 18A presents a circuit diagram illustrating the first conference service timing circuit, which is included in the first and the second conference service timing circuits 1400.
Figure 18B:
FIG. 18B presents a timing chart illustrating the waveforms of the individual parts of the first conference service timing circuit.
Figure 18B:
Figure 18B:
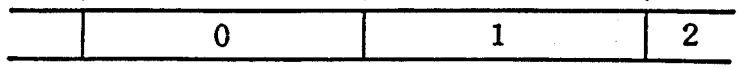
Figure 18B:
Figure 18B:
Figure 18B:
Figure 18B:
Figure 18B:
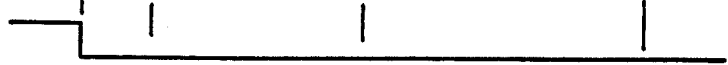
Figure 18B:
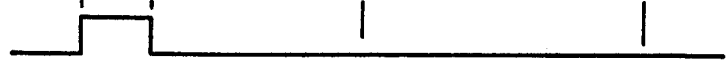
Figure 18B:
Figure 18B:
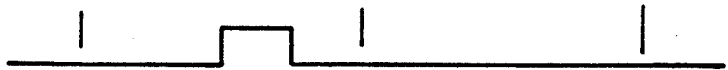
Figure 18B:
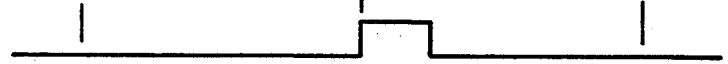
Figure 18B:
Figure 18B:
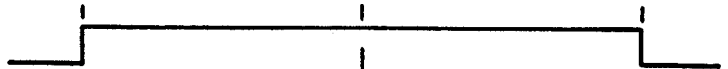
Figure 18B:
Figure 18B:

In FIG. 18A, a circuit diagram is presented for the first conference timing circuit, which is included in the first and the second conference timing circuits 1400, and in FIG. 18B, timing charts for the waveforms of the individual sections of the timing circuit are presented.

Of the signals 1121~1125 in FIGS. 18B(d)~18B(h), which constitute the bus signal 1120 expressing the bit numbers within one frame in numerical figures as shown in FIG. 18B(c), the signals 1122~1125 are applied to the NOR gate 1413, which outputs the signal 1437 shown in FIG. 18B(p).

To the NAND gate 1414, the signal 1121 given in FIG. 18B(d) is applied through the inverter 1421, and the signal shown in FIG. 18B(p) is applied directly, and the signal 1438 in FIG. 18B(q) is obtained as the output from the NAND gate 1414.

To the input terminals A and B of the decoder 1411, the signal 1097 (Refer to FIG. 15E(c)) shown in FIG. 18B(a) and the signal 1098 (See FIG. 15E(d)) shown in FIG. 18B(b) are applied respectively, while the signal 1438 given in FIG. 18B(g) is applied to the enable terminal G, and the decoder 1411 outputs the signals 1431~1434 shown in FIG. 18B(i)~18B(l) from the output terminals Y0-Y3 respectively through the inverters 1422~1425.

To the NAND gate 1415 are applied the signal 1121 shown in FIG. 18B(d) and the signal 1437 shown in FIG. 18B(p), and this NAND gate outputs the signal 1439 shown in FIG. 18B(r). To the input terminals A and B of the decoder 1412, the signal 1097 given in FIG. 18B(a) and the signal 1098 given in FIG. 18B(b) are applied, while the signal 1439 shown in FIG. 18B(r) is applied to the enable terminal G, and the signals 1435 and 1436 given in FIG. 18B(m) and 18B(n) are output respectively from the output terminals Y0 and Y1 of the decoder 1412 through the inverters 1426 and 1427, respectively.

Figure 18C:
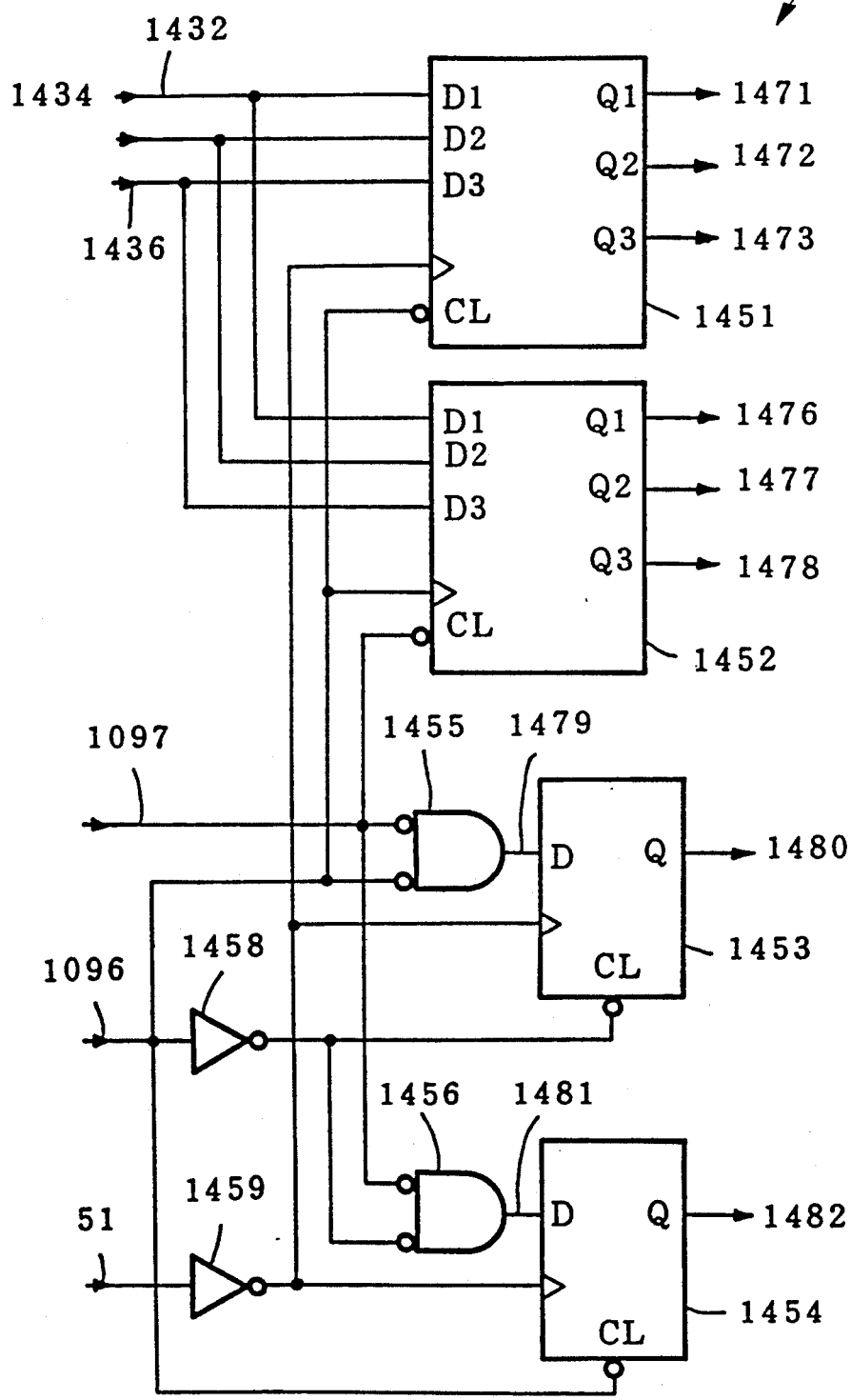
FIG. 18C presents a circuit diagram illustrating the second conference service timing circuit, which is included in the first and the second conference service circuits 1400.
Figure 18D:
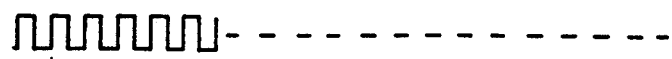
FIG. 18D presents a timing chart illustrating the waveforms of the individual parts of the second conference service timing circuit.
Figure 18D:
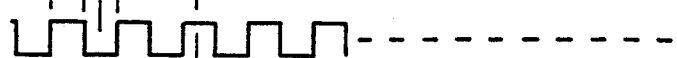
Figure 18D:
Figure 18D:
Figure 18D:
Figure 18D:
Figure 18D:
Figure 18D:
Figure 18D:
Figure 18D:
Figure 18D:

In, FIG. 18C, a circuit diagram is presented for the second conference timing circuit, which is included in the first and the second conference timing circuits 1400, and FIG. 18D presents timing charts for the waveforms for the respective sections of the confererence timing circuit.

Numeral references 1451 and 1542 are D-flipflops, and to the data terminals D1~D3 of each of these flip-flops are applied the signals 1432, 1434, and 1436, which are shown respectively in FIGS. 18B(j), 18B(l), and 18B(n), are applied.

To the clear terminal CL of the D-flipflop 1451, the signal 1096 shown in FIG. 18D(b) is applied, and, to its clock terminal, the clock 51 shown in FIG. 18D(a) is applied through the inverter 1459, and the signals 1471~1473, which are shown in FIGS. 18D(j)~18D(l), respectively, are output from the output terminals Q1~Q3.

The D-flipflop 1452 receives the signal 1097 obtained by dividing the frequency of the signal 1096 shown in FIG. 18D(b) into halves as applied to its clear terminal CL and also the signal 1096 shown in FIG. 18D(b) applied to its clock terminal, and the D-flipflop 1452 outputs the signals 1476~1478 shown in FIGS. 18D(g)~18D(i) respectively from the output terminals Q1-Q3.

To the NOR gate 1455, the signal 1097, which is obtained by the frequency division of the signal 1095 shown in FIG. 18D(b) into halves and the signal 1096 shown in FIG. 18D(b) are applied, and, as the output, the signal 1479 shown in FIG. 18D(c) is obtained, and this output signal is applied to the data terminal D for the D-flipflop 1453. To the clear terminal CL of this D-flipflop 1453, the signal 1096 shown in FIG. 18D(b) is applied through the inverter 1458, and the clock 51 given in FIG. 18D(a) is applied to the clock terminal of the D-flipflop 1453 through the inverter 1459, and the signal 1480 shown in FIG. 18D(d) is obtained as output from the terminal Q of this D-flipflop.

To the NOR gate 1456, the signal 1097, which is obtained by the frequency division of the signal 1096 given in FIG. 18D(b) into halves, and the signal 1096 are applied through the inverter 1458, and the NOR gate 1456 outputs the signal 1481 shown in FIG. 18D(e). The signal 1096 is applied to the clear terminal CL of the D-flipflop 1454, to which this signal 1481 has been applied, and the clock 51 is applied, through the inverter 1459, to the clock terminal of this D-flipflop 1454, which obtains the signal 1482 shown in FIG. 18D(f) on its output terminal Q.

In FIGS. 19-1 through 19-22 are presented flow-charts showing the flow of operations in the master unit 10 and the CPU 20 shown in FIG. 1A and FIG. 2A.

The CPU 20 checks at certain predetermined intervals whether or not the D-information, which represents the control information, is issued from the terminal unit 70 (S2001, FIG. 19-1), and, if the D-information is not detected (S2001N), then the CPU checks whether or not any signal is being issued from the central office line interface 11, namely, whether or not any signal indicating a call arriving at the central office is being issued (S2002), and, when the CPU finds that there is no signal being issued from the central office line interface 11, the CPU resumes its checking operation at the step S2001 (S2002N).

If the CPU 20 detects any signal, i.e. the signal indicating the arrival of a call at the central office, as generated at the step 2002 by the central office line interface (S2002Y), the CPU 20 detects the arrival of a call on the central office line 12 and puts the signal on the detected call and sends out the D-information carrying the call signal to the terminal unit 70 by the D-information transmission and reception circuit 170 through the private line interface 100 (S2021, FIG. 19-4), the CPU thereafter returning to the step S2001.

When the CPU 20 has found in the step S2001 that the D-information is present in the system (S2001Y), the CPU determines by checking the contents of the information whether or not any call is being made on the terminal unit 70 for any dispatch of message to the central office line (S2003, FIG. 19-1), and, in the case where any such call is being made (S2003Y), the CPU shifts the operation to the subroutine for dispatching a call on the central office line, and, in the case where no such call is being made (S2003N), the CPU checks whether or not the information indicates any dispatch of message at the terminal unit 70 to any other terminal unit 70 within the same system, i.e. whether it means a call sent within the private line system (S2004).

If the CPU 20 has ascertained that the checked information represents a call made within the private line system, the CPU shifts the operation to the subroutine for dispatching a private line call (S2004Y), but, in the case where the information does not indicate any call for the dispatch of a private line call (S2004N), then the CPU examines whether or not any call is being made for any public address system communication (S2005).

When the CPU has ascertained that a call is being made for any communication on the public address system, the CPU shifts the operation to the subroutine for the public address system (S2005Y), but, if the CPU has found that no such call is being made (S2005N), the CPU further ascertains whether or not any call is being made for the broadcasting of any background music (to be hereinafter referred to by the abbreviation, BGM) (S2006).

Figures 1, 19:
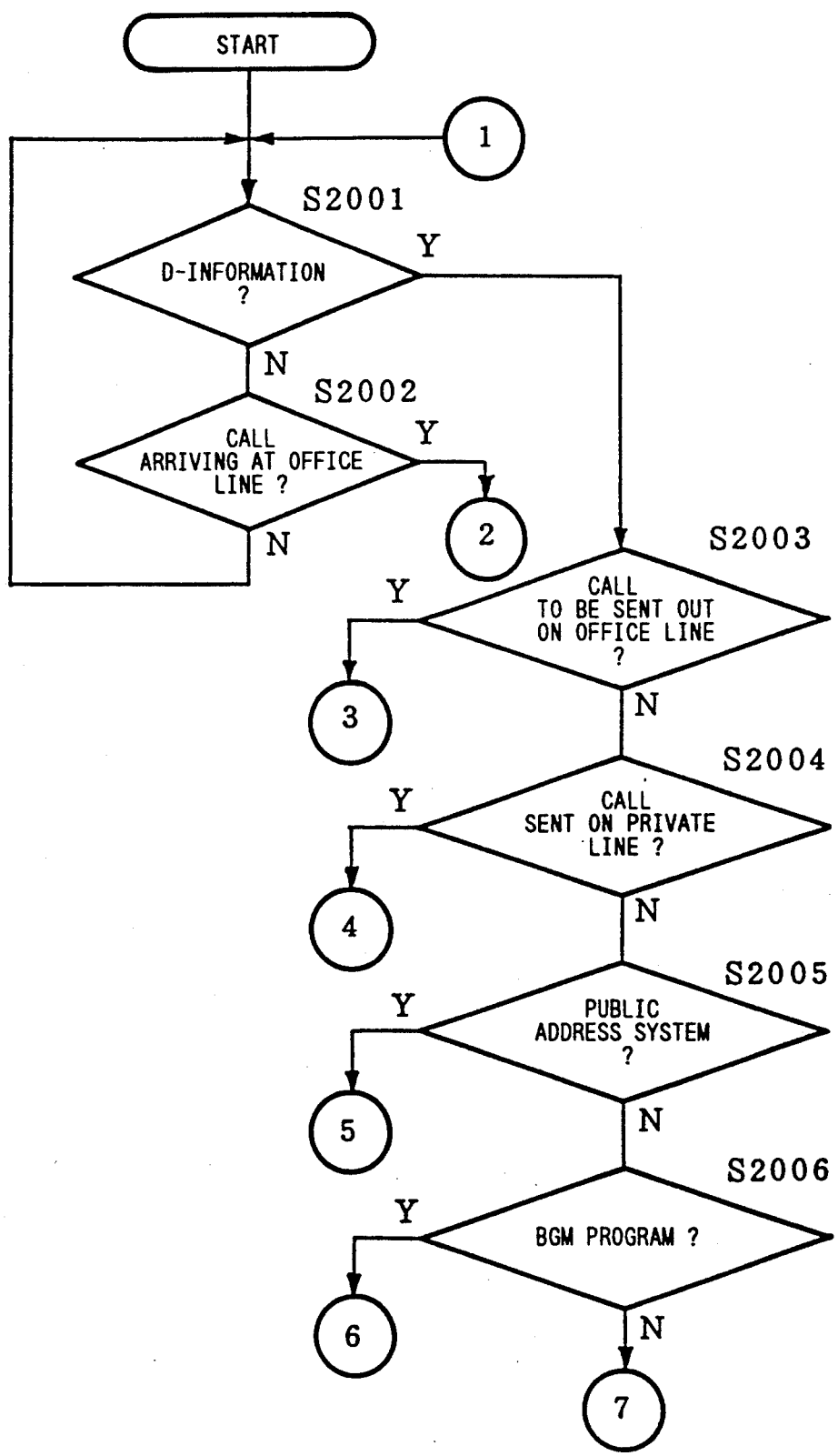
FIG. 19-1 through FIG. 19-22 present flowcharts illustrating the flow of operations to be performed in the master control unit 10 and the CPU 20.
Figures 2, 19:
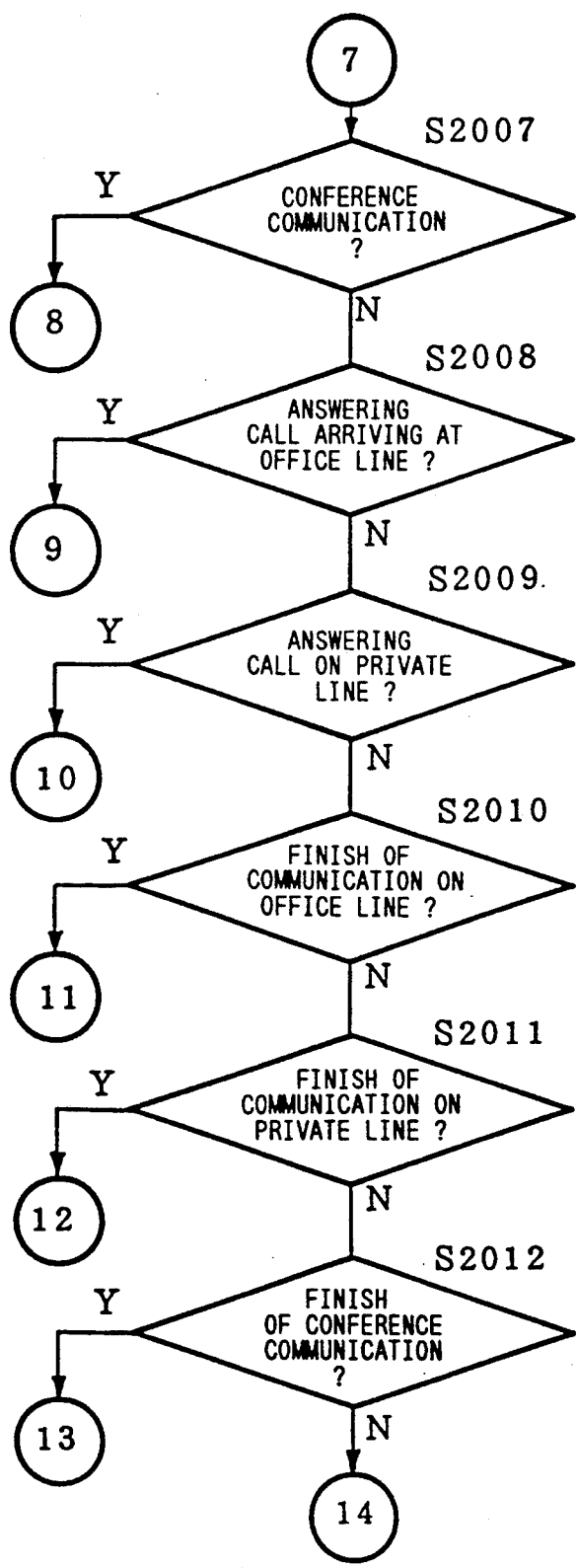

If the CPU ascertains that a call is being made for the broadcasting of the BGM, the CPU shifts the operation to the subroutine for the broadcasting of the BGM (S2006Y), but, in the case where the CPU has not been able to ascertain any such call (S2006N), it checks whether or not a call is being made for any conference communication (S2007, FIG. 19-2).

When the CPU has ascertained that a call is being made for any conference communication, the CPU shifts the operation to the subroutine for conference communication (S2007Y), but, in the case where the CPU has failed to ascertain any such call (S2007N), then the CPU checks whether or not the checked information represents a response from the terminal unit 70 in recognition of its reception of the notice which the CPU has issued to the terminal unit 70 in the step S2002Y on the arrival of a call at the central office line unit, that is, whether or not the information carries a response to an arrival of a call on the central office line (S2008).

When the CPU has ascertained that the checked information forms a response to an arrival of call on the central office line, the CPU shifts the operation to the subroutine for the response to a call arriving on the central office line (S2008Y), but, in the case where the CPU cannot ascertain any such call (S2008N), the CPU checks the information at the step S2004Y to determine whether it represents a signal of a response which another terminal unit 70 within the same system is making to a call placed by the terminal unit 70, that is, whether or not the checked information means a response to the arrival of a private line call (S2009).

When the CPU has ascertained that the checked information represents a response to the arrival of a call on the private line, the CPU shifts the operation to the subroutine for the response to the arrival of a call on the private line (S2009Y), but, in the case where the CPU has not been able to ascertain any such call (S2009N), then the CPU checks whether or not the communication with the central office line 12, which is executed as the result of the step S2008Y, has been finished, that is, the finish of a communication on the central office line (S2010), and, when the CPU has ascertained the finish of any such communication on the central office line, the CPU shifts the operation to the subroutine for the finish of a communication on the office line (S2010Y), but, in the case where the CPU cannot ascertain any such finish of communication on the central office line (S2010N), the CPU checks whether or not the checked information represents that the communication executed between the terminal units 70 as the result of the step S2009Y has been finished, that is, the checked information means a call for the finish of a communication on the private line (S2001).

When the CPU has ascertained that the checked information carries a call for the finish of any communication on the private line, the CPU shifts the operation to the subroutine for the finish of a communication on the private line (S2011Y), but, in the case where the CPU cannot ascertain any such call (S2011N), the CPU then checks whether or not the checked information represents a call for the finish of any conference communication executed as the result of the step S2007Y, that is, a call for the finish of any conference communication (S2010).

Figures 3, 19:
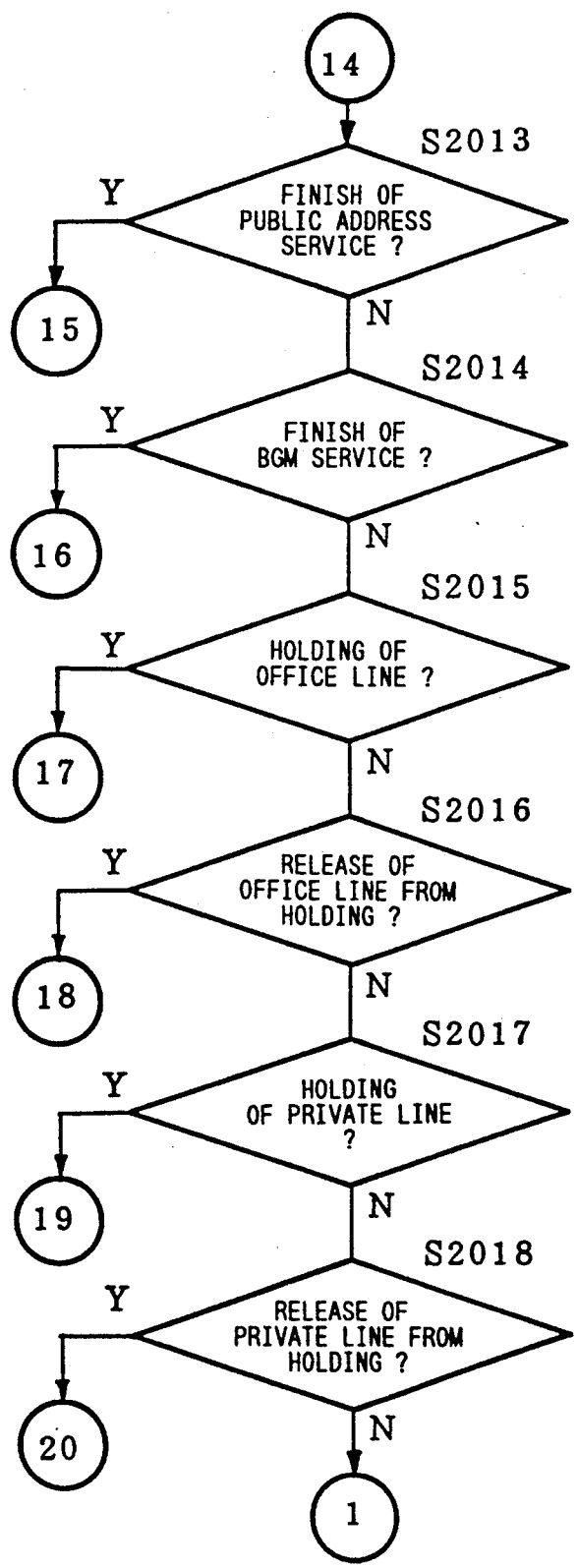
Figures 4, 19:
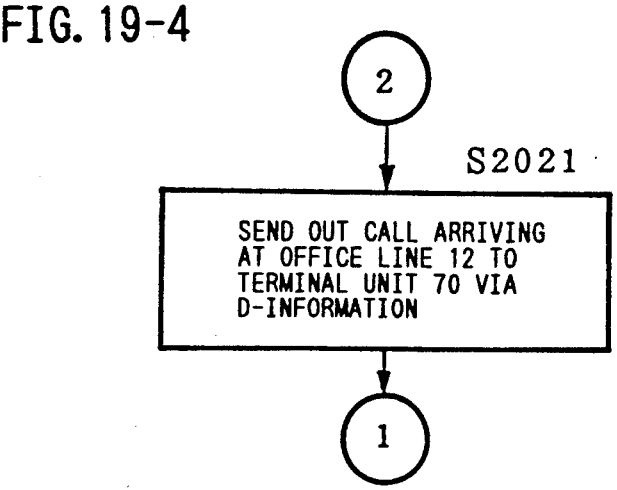

When the CPU has ascertained the finish of a conference communication, the CPU shifts the operation to the subroutine for the finish of a conference communication (S2012Y), but, in the case where the CPU has not been able to ascertain any finish of a conference communication (S2012N), the CPU checks whether or not the public address system communication which is executed as the result of S2005Y has been finished, that is, the finish of a public address system communication (S2013, FIG. 19-3).

When the CPU has ascertained a call for the finish of any public address system communication, the CPU then shifts the operation to the subroutine for the finish of a public address system communication (S2913Y), but, in the case where the CPU has failed to ascertain any such call (S2013N), then the CPU checks whether or not a call is being made for the finish of any BGM broadcasting program executed as the result of the step S2006Y, that is, a call for the finish of a BGM program (S2014).

When the CPU has ascertained a call for the finish of a BGM program, the CPU then shifts its operation to the subroutine for the finish of a BGM program (S2014Y), but, in the case where the CPU has not been able to ascertain any such call (S2014N), then the CPU checks whether or not the checked information represents any call for the holding of the central office line, which means that a response has been given to the arrival of a call on the central office line at the step S2008Y, and the communication between the central office line 12 and the terminal unit 70 is held up temporarily (S2015).

When the CPU has ascertained that a call is being made for the holding of the central office line, the CPU shifts the operation to the subroutine for the holding of the central office line (S2015Y), but, in the case where the CPU cannot ascertain any such call (S2015N), then the CPU checks whether or not any call is being made for the release of the central office line from holding, that is, a call for the release of the central office line which is held in the step S2015Y (S2016).

When the CPU has ascertained that a call is being made for a release of the central office line from holding, the CPU shifts the operation to the subroutine for release of the central office line from holding (S2016Y), but, in the case where the CPU cannot ascertain any such call (S2016N), then the CPU checks whether the checked information contains any call for the holding of the private line (S2017), namely, a call for the temporary holding of the private line in a response to the arrival of a call on the private line in the step S2009Y.

When the CPU has ascertained that a call is being made for the holding of the private line, the CPU shifts the operation to the subroutine for the holding of the private line (S2017Y), but, in the case where the CPU cannot ascertain any such call (S2017N), then the CPU checks whether the checked information represents any call for a release of the private line from holding, that is, a call for releasing the private line from holding executed in the step S2017Y (S2018).

When the CPU has ascertained that the checked information carries a call for a release of the private line from holding, the CPU shifts the operation to the subroutine for a release of the private line from holding (S2018Y), but, in the case where the CPU has not been able to ascertain any such call (S2018N), then the CPU returns to the step S2001.

Figures 5, 19:
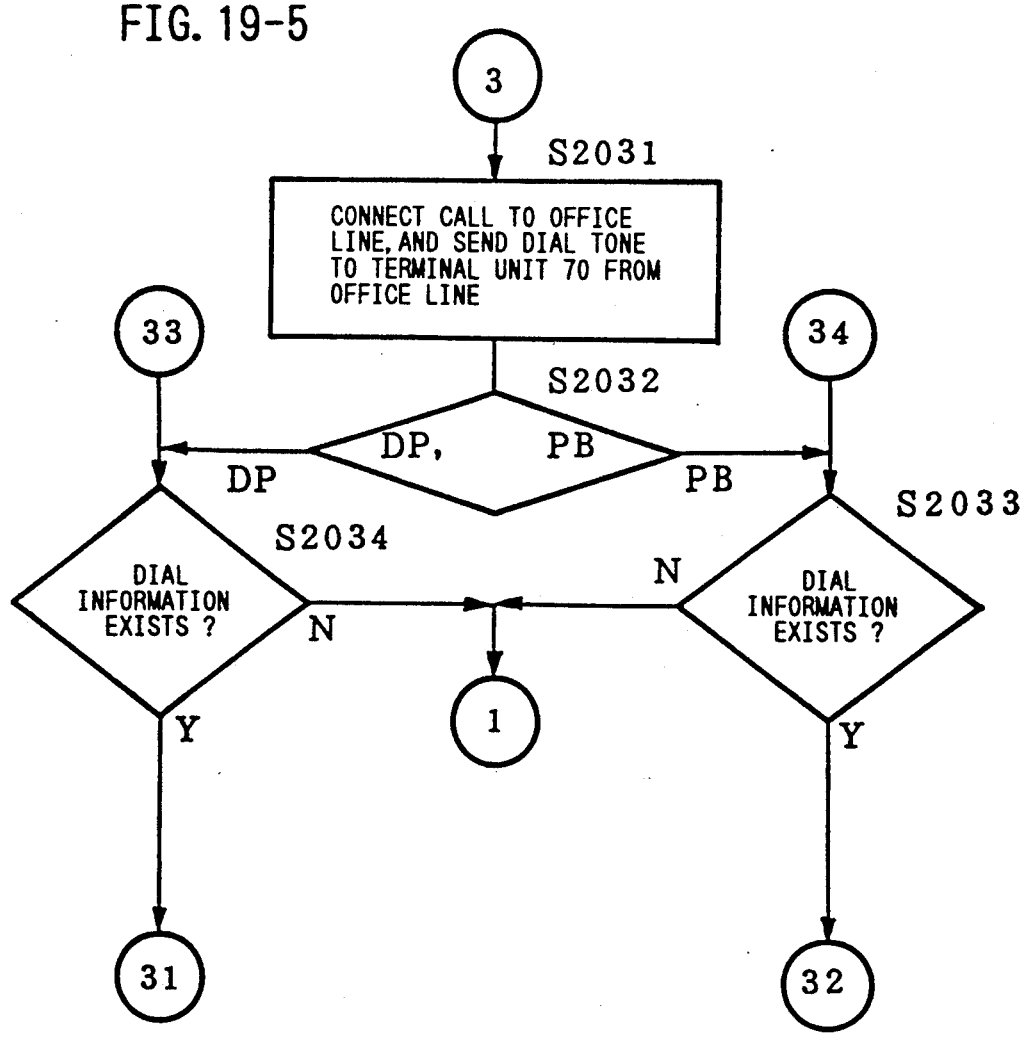

When the CPU 20 has ascertained any transmission of a call signal to the central office line in the step S2003 (FIG. 19-1), the central office line 12 is connected to the terminal unit 70 through the central office line interface 11, the central office line speech circuit 250, and the central office line interface circuit 100, and a dial tone is sent from the central office line 12 to the terminal unit 70, and the upstream signal is connected to the central office line 12 through the signal receiving circuit 150, the central office line speech circuit 250, the OR circuit 13, and the central office line interface 11 (S2031, FIG. 19-5).

The CPU distinguishes whether the central office line 12 is a line for dial pulse (DP) or a line for the push button (PB)(S2032), judging in either case (S2032PB, DP) whether the dial information is included in the D-information (S2033, 2034), and, in the case where the dial information is not included in the D-information (S2033N, S2034N), the CPU returns to the step S2001, but, in the case where the dial information is included in the information (S2033Y, 2034Y), the CPU prohibits the dial signal from returning as a side tone to the terminal unit 70 (S2036, S2041, FIG. 19-6, FIG. 19-7), and the CPU reads the dial signal transmitted from the terminal unit 70, and, in the case where the dial signal is DP, the CPU instructs the central office line interface 11 to transmit only the dial signal to the central office line, but, in the case where the dial signal is PB, the CPU forms a transmission channel which sends out only the dial signal to the central office line through the central office line speech circuit 250 and the OR circuit 13 (S2037, S2042), and sends out the dial signal (S2038, S2043).

In the case where dial pulses (DP) are to be sent out for a dial number, a dial pulse signal is formed in the central office line interface 11 and is sent out to the central office line, and, in the case where a dial number is to be sent out by the push-button (PB) system, the signal 66, which is the sound source for the push-button dial signal, is sent out to the central office line 12 through the central office line speech circuit 250, the OR circuit 13, and the central office line interface 11.

When the dial signal has been sent out, the prohibition of the side tone by the transmission control circuit 240 is cancelled, and a downstream speech channel is formed from the terminal unit 70 to the central office line (S2039, S2044), and also an upstream speech channel is formed from the central office line to the terminal unit 70 (S2040, S2045).

This operation is continued until the dial information is exhausted (S2033, 2034, FIG. 19-5).

Figures 8, 19:
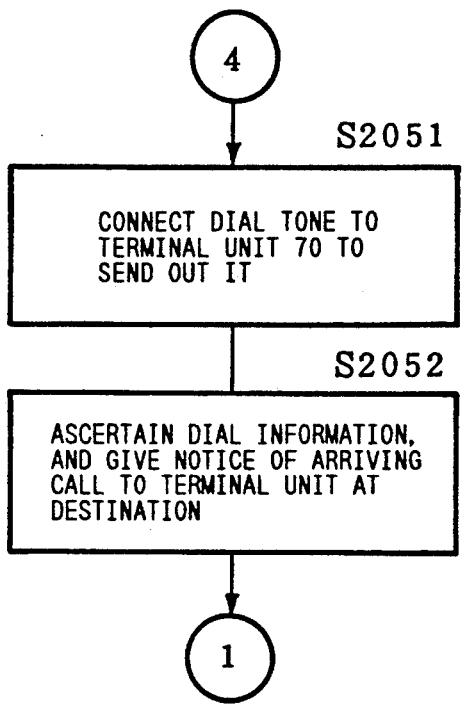

In the case of a transmission of a signal on the private line in the step S2004 (FIG. 19-1), in which one terminal unit 70 places a call on another terminal unit 70 (S2004Y), the signal 67, which is a dial tone, is connected to the terminal unit 70 which is the source of the signal transmission, through the private line speech circuit 200 and the private line interface circuit 100, and a dial tone is transmitted to the terminal unit 70 which is the source of the signal transmission (S2051, FIG. 19-8), and the CPU judges the destination on the basis of the dial information which the CPU receives from the source of the signal transmission through the D-information transmitting and receiving circuit 170 and the CPU notifies the terminal unit 70 at the destination of the arrival of a call (S2052). Thereafter, the CPU shifts the operation back to the step S2001.

In the step S2005 (FIG. 19-1), the CPU forms a transmission channel from the terminal unit 70 which is the source of the call to the private line speech circuit 200 through the signal receiving circuit 150, (S2061, FIG. 19-9) when the CPU has found that the information calls for a public address system communication (S2005Y), and also forms a transmission channel from the private line speech circuit 200 to the public address system circuit 700 (S2062), and, by a route reverse to this, the CPU also forms a transmission channel from the public address system circuit 700 to the other terminal unit 70 through the central office line interface circuit 100 (S2063), and then returns to the step 2001.

When the CPU ascertains a call made by any terminal unit 700 for any BGM program in the step 2006 (FIG. 19-1) (S2006Y), the CPU connects the signal 68, which is the sound source for the BGM program, to the sound source circuit 720 (S2071, FIG. 19-10), and, forming a transmission channel from the sound source circuit 720 to the private line interface circuit 100, the CPU sends out the signal 68, i.e. the sound source for the BGM program, to the terminal unit which has placed the call for the BGM (S2072). Then, the CPU returns to the step S2001.

When the CPU has ascertained in the step S2007 (FIG. 19-2) that the checked information carries a call placed for a conference communication by a terminal unit 70 other than the terminal unit 70 presently in communication with the central office line (S2007Y), the CPU turns off the downstream route (S2081, FIG. 19-11) which is connected to the terminal unit 70 currently in communication, through the central office line interface 11, from the office line 12 through the central office line speech circuit 250 and the private line interface circuit and also turns off the route by which the terminal unit 70 is connected to the central office line 12 through the signal receiving circuit 150, the central office line speech circuit 250, the OR circuit 13, and the central office line interface 11 (S2082).

Then, the CPU forms a downstream route from the central office line 12 to the terminal unit 70 through the central office line interface 11, the conference speech circuit 350, and the private line interface circuit 100 (S2083), and forms the route which provides a connection from the terminal unit 70 to the central office line 12 through the signal receiving circuit 150, the conference speech circuit 350, the OR circuit 13, and the central office line interface 11 (S2084). To the other terminal units 70 which have made requests for their participation in the conference communication, the CPU forms the two routes which it has formed in the steps S2083 and S2084, making it possible to perform conference communications through exchanges of voice information between the respective terminal units and the central office line 12 (S2085).

When the CPU has ascertained in the step S2008 (FIG. 19-2) that the checked information represents a response to the call made in the step S2021 (FIG. 19-4) (S2008Y), the CPU forms a transmission channel leading from the central office line 12 to the private line interface circuit 100 through the central office line speech circuit 250 (S2091, FIG. 19-12), and also forms another transmission channel from the signal receiving circuit 150 to the OR circuit 13 through the central office line speech circuit 250 (S2092), so that communications are conducted between the central office line 12 and the terminal unit 70, and the CPU then returns to the step S2001.

When the CPU has ascertained, in the step 2009 (FIG. 19-2), the arrivals of calls from other terminal units 70 as applied through the D-information transmitting and receiving circuit 170 in the step S2052 (FIG. 19-8) (S2009Y), the CPU forms a route from the private line speech circuit 200 to the private line interface circuit 100 (S2101, FIG. 19-13), and also forms a route from the signal receiving circuit 150 to the private line speech circuit 200 (S2102), forming a transmission channel to one terminal unit 70 and also forming transmission channels to other terminal units (S2103, S2104), so that communications are conducted between the two terminal units 70, after which the CPU resumes the step S2001.

Figures 10, 19:
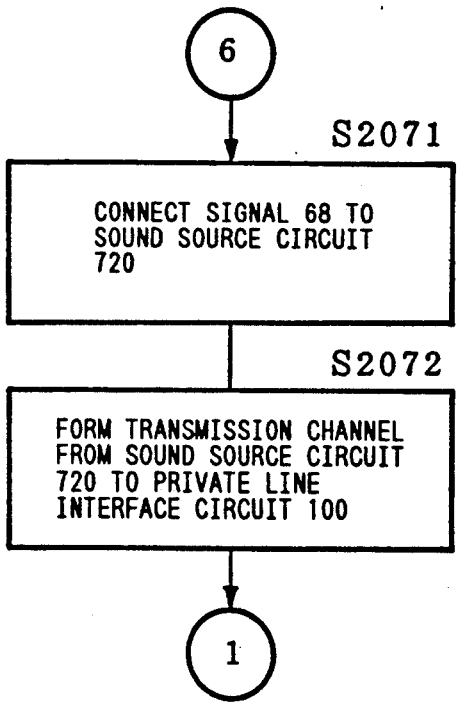
Figures 9, 19:
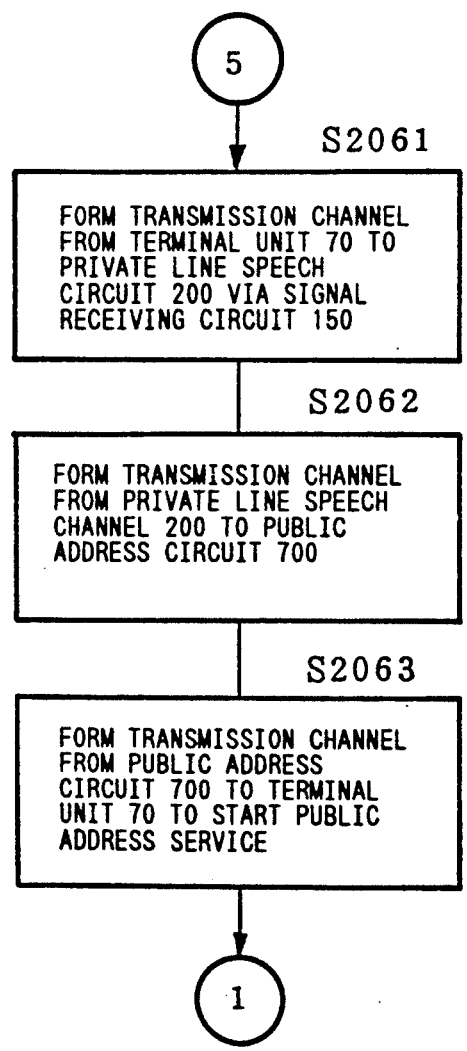
Figures 11, 19:
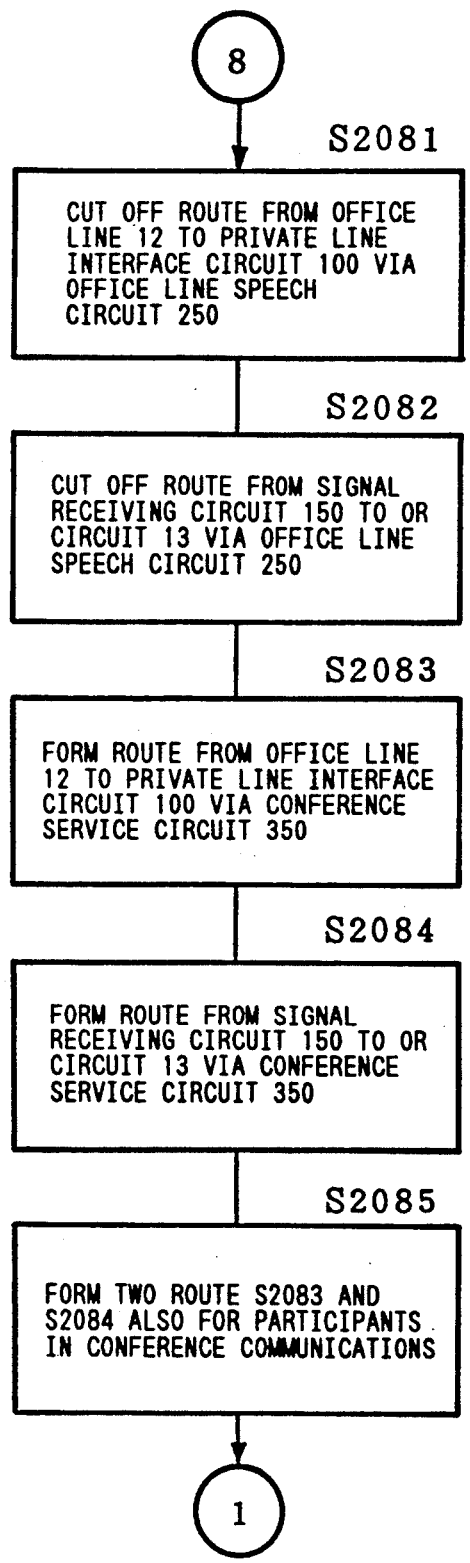
Figures 12, 19:
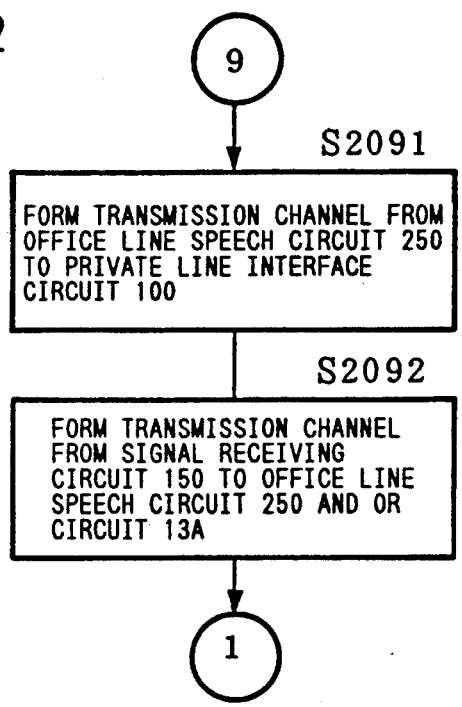
Figures 14, 19:
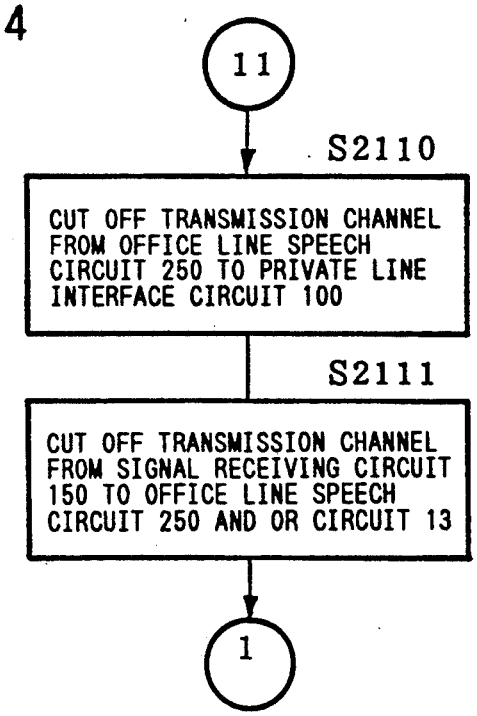

When the CPU has ascertained in the step S2010 (FIG. 19-2) that the communications between the central office line and the terminal unit 70 shown in FIG. 19-12 have been brought to an end (S201Y), the CPU cuts off the transmission channel from the central office line speech circuit 250 to the private line interface circuit 100 and the transmission channel leading from the signal receiving circuit 150 to the OR circuit through the central office line speech circuit 250 (S2110, S2111, FIG. 19-14), thereby putting an end to the connection between the central office line 12 and the terminal unit 70, and then the CPU resumes the step S2001.

When the CPU has ascertained in the step S2011 (FIG. 19-2) that the communications between or among the terminal units 70 have been brought to an end (S2011Y), the CPU cuts off the route from the private line speech circuit 200 to the private line interface 100 and the route from the signal receiving circuit 150 to the private line speech circuit 200, thereby cutting off the connection to one terminal unit 70 (S2121, S2122, FIG. 19-15), and also cutting off the connection to the other terminal unit 70 in the same manner (S2123, S2124), and thereafter resuming the step 2001.

When the CPU has ascertained in the step 2012 (FIG. 19-2) that the conference communications shown in FIG. 19-11 have been brought to an end (S2012Y), the CPU cuts off the route formed in the step 2083 (FIG. 19-11) and leading from the central office line 12 to the private line interface circuit 100 through the conference service circuit 350 (S2131, FIG. 19-16) and also cuts off the route formed in the step S2084 and leading from the signal receiving circuit 150 to the OR circuit 13 through the conference speech circuit 350 (S2132), and at the same time cuts off the two routes formed in the step S2085 and offered for use by the participants in the conference communications (S2133). Moreover, the CPU once again forms both of the two routes cut off in the steps S2081 and S2082 (S2134 and S2135). Thereupon, the CPU puts an end to the conference communications, resuming the step S2001 and entering into the subroutine for a response to an arriving call on the central office line, which is shown in FIG. 19-12, in order to resume the communications between the central office line 12 and one terminal unit 70 as conducted prior to the start of the conference communications.

When the CPU has ascertained in the step S2013 (FIG. 19-3) that the subroutine for a communication on the public address system shown in FIG. 19-9 has come to an end (S2013Y), the CPU cuts off the transmission channels leading from the individual terminal units to the public address system circuit 700 through the signal receiving circuit 150 (S2141, 2142, FIG. 19-17) and also cuts off the transmission channel formed to lead from the public address system circuit 700 to the individual terminal units 70 through the individual private line interface circuits 100 (S2143), thereupon resuming the step 2001.

When the CPU has ascertained in the step 2014 (FIG. 19-3) that the BGM broadcasting operation shown in FIG. 19-10 has been finished (S2014Y), the CPU cuts off the sending route for the signal 68, which is the BGM program, from the sound source circuit 720 (S2151, FIG. 19-18) and cuts off the route from the sound source circuit 720 to the private line interface circuit 100 (S2152), thereafter resuming the step 2001.

When the CPU has ascertained, in the step S2015 (FIG. 19-3), a call from the terminal unit 70 for the holding of the central office line in the course of a communication between the central office line and the terminal unit 70 as shown in FIG. 19-12 (S2015Y), the CPU cuts off the transmission channel from the signal receiving circuit 150 to the central office line speech circuit 250 (S2161, FIG. 19-19) and sends out the signal 69, which is a holding tone, to the central office line 12 through the office line speech circuit 250 and the OR gate circuit 13 (S2162), thereupon resuming the step 2001.

When the CPU has ascertained in the steps S2016 (FIG. 19-3) that the terminal unit 70 is placing a call for the release of the central office line from holding as shown in FIG. 19-9 (S2016Y), the CPU finishes the sending of the holding tone by cutting off the sending route for the signal 69, which is the holding tone, (S2171, FIG. 19-20), and resumes the communication by forming a transmission channel from the signal receiving circuit 150 to the central office line speech circuit 250 (S2172), thereupon resuming the step 2001.

Figures 13, 19:
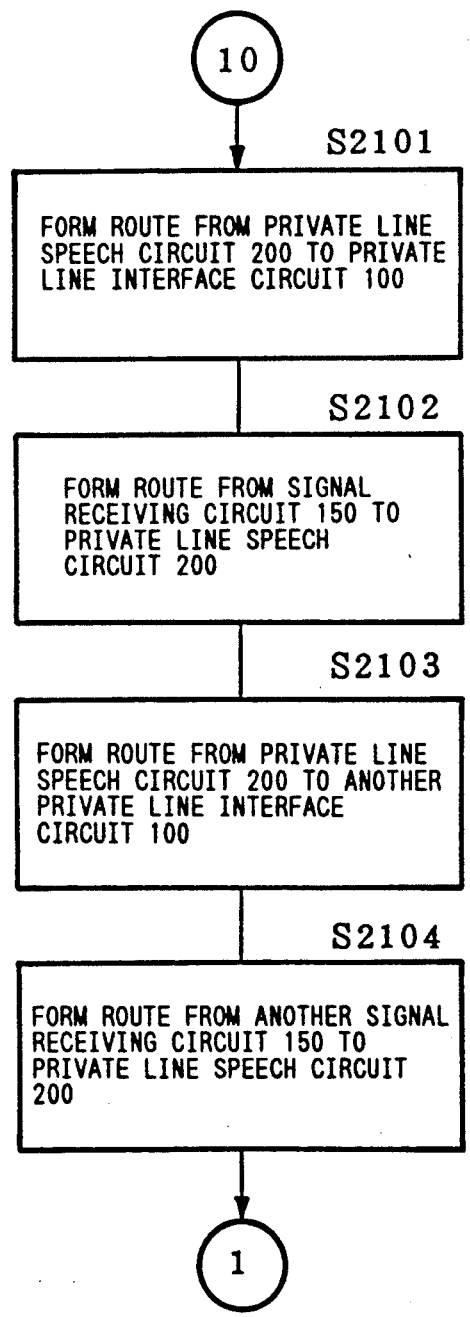
Figures 15, 19:
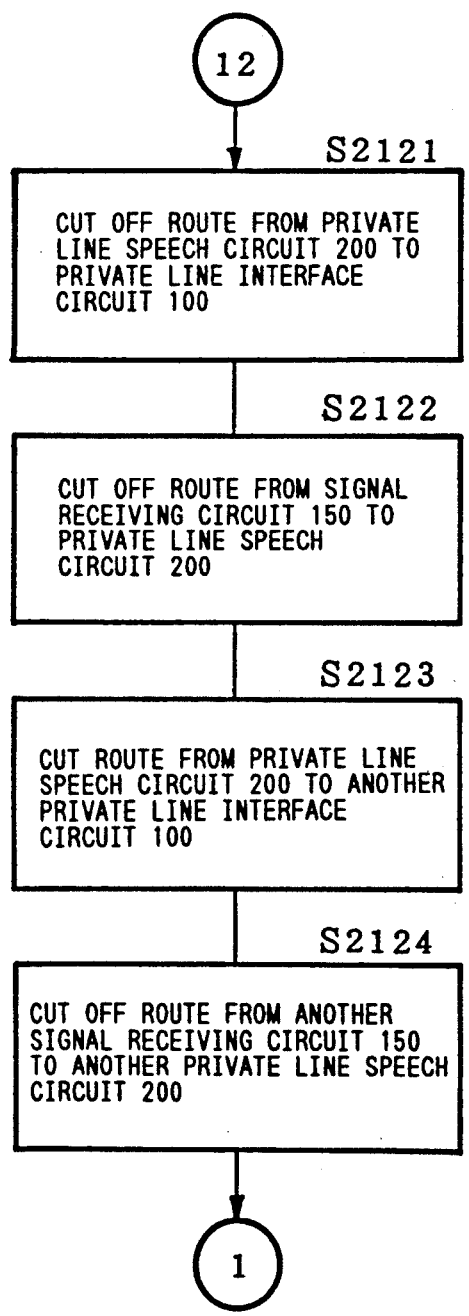
Figures 16, 19:
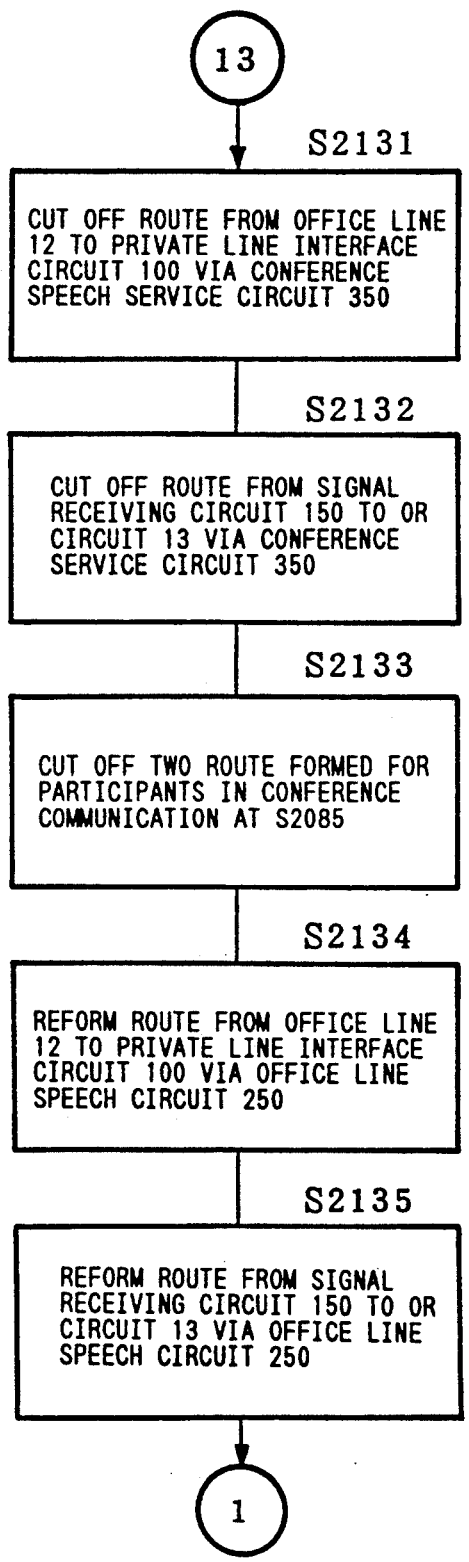
Figures 17, 19:
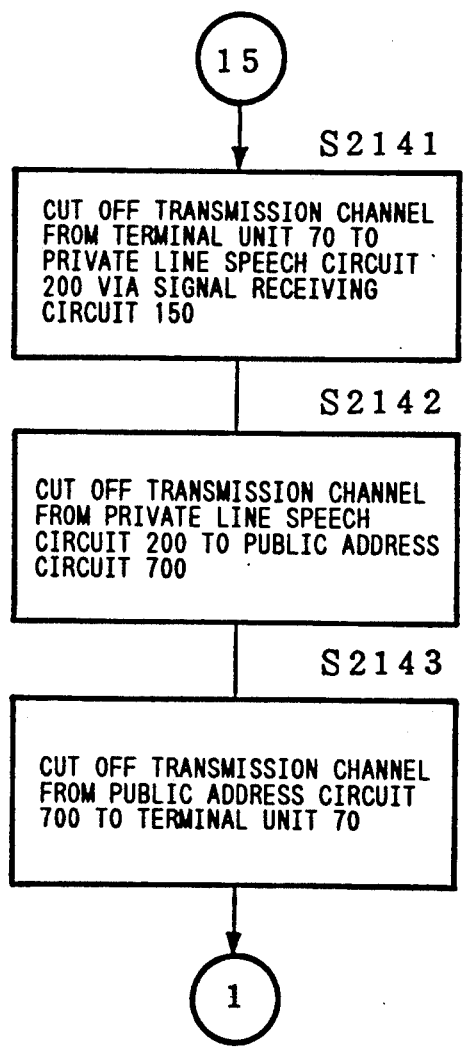
Figures 18, 19:
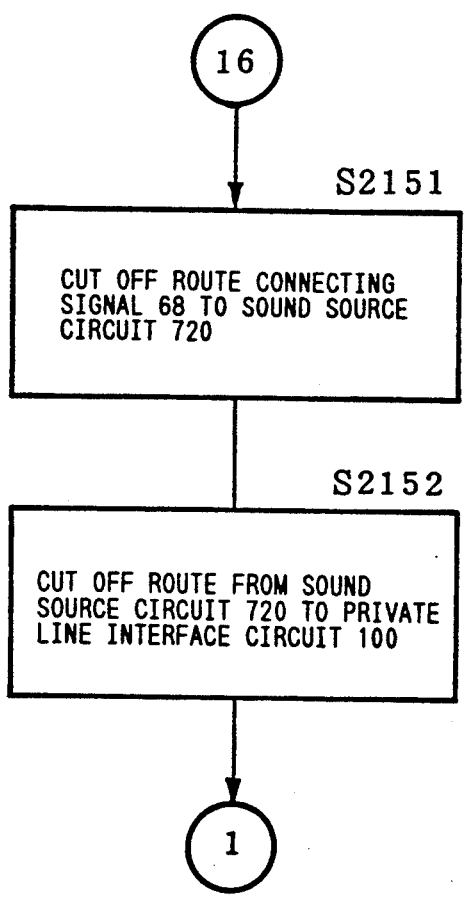
Figure 19:
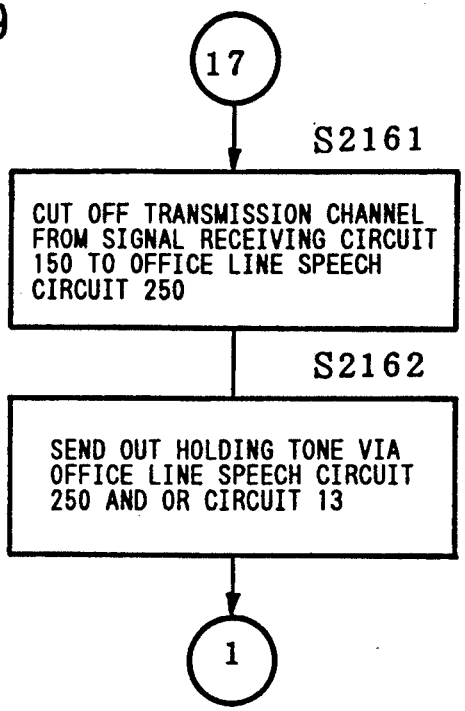

When the CPU has ascertained in the step S2017 (FIG. 19-3) that a call has been made by any of the terminal units 70 for the holding of the private line in the course of the communications between the terminal units 70 on the private line in FIG. 19-13 (S2017Y), the CPU cuts off the transmission channel from the signal receiving circuit 150 to the private line speech circuit 200 (S2181, FIG. 19-21) and turns on the transmission channel to make a connection of the signal 69 to the private line speech circuit 200, and sends out the holding tone, which is the signal 69, to the terminal unit 70, which is used by the other party to the communication, through the private line interface circuit 100 (S2182), thereupon resuming the step S2001.

Figures 19, 20:
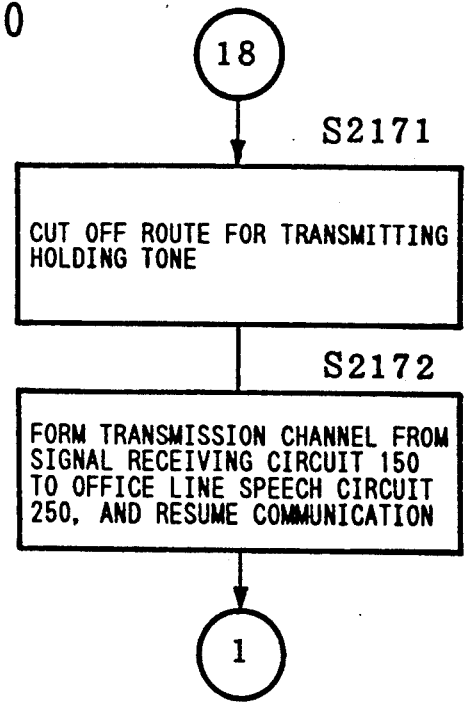
Figures 19, 20, 21:
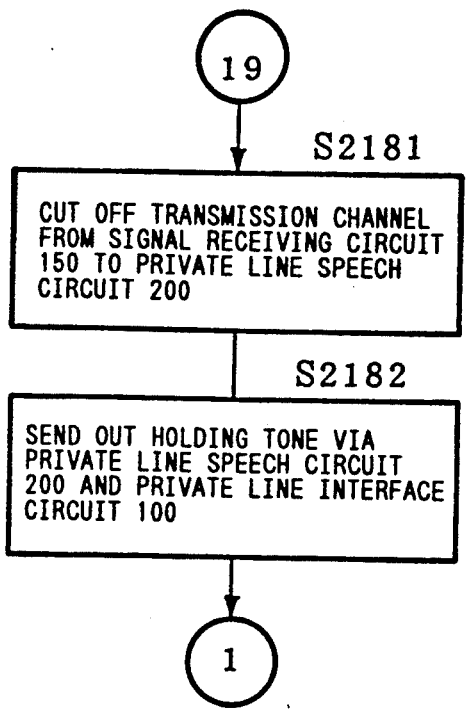
Figures 19, 20, 21, 22:
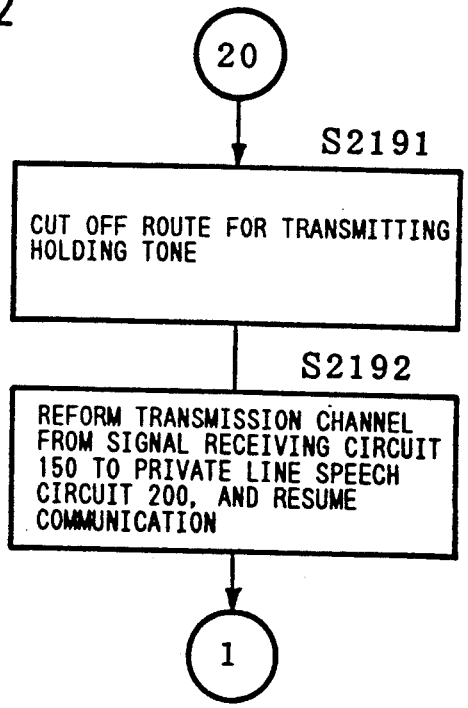

When the CPU has ascertained in the step S2018 (FIG. 19-3) that a call has been made for the release of the holding of a call on the private line as shown in FIG. 19-21 (S2018Y), the CPU cuts off the route for sending the holding tone on the private line speech circuit 100 (S2191, FIG. 19-22) and forms a transmission channel from the signal receiving circuit 150 to the private line speech circuit 200, so that communications may be resumed between the terminal units (S2192), and the CPU resumes the step S2001 when the communications are brought to a close.

As described above, this invention has made it possible to connect the terminal units to a central office line without any alteration of the circuitry, not only in a system with a short distance from the master control unit to the terminal units, but also in a system covering a long distance between them, permitting communications exchanged between voluntarily selected terminal units, between the selected terminal units and the central office line, or between central office lines through the transfer of communications. Additionally, this invention has made it possible to provide such many functions as to provide public address service to many terminal units from such sound sources as the central office line and the terminal units, and to conduct conference communications between the central office line and the terminal units or between the terminal units, and also to realize a system with high economic efficiency even in a small-sized system in spite of the fact that the system incorporates a PCM system. It is another economical feature of this system that the registers to be used for the input-output buffer for the conference speaking channel trunk need to be provided only in a number sufficient for the maximum number of the speakers who participate in conference communications on the system. Therefore, this invention offers extremely great advantages.

What is claimed is:

1. A key telephone system including a master control unit, a plurality of terminal units connected to said master control unit, a central office line interface for connecting a central office line to said master control unit, and a CPU connected to said master control unit for controlling transmission and exchange for signals in which down-information to be transmitted from said central office line to said terminal units and up-information to be transmitted from said terminal units to said central office line are subjected to PCM communication, wherein:

said master control unit is provided with a central office line communication trunk; and said central office line communication trunk comprises:

first register for receiving down-information from said central office line interface at a first time to temporarily store said down-information, and for sending out said down-information stored at a second time;

a demultiplexer for sending out said down-information sent out from said first register to said terminal units designated by said CPU;

a multiplexer for receiving up-information from said terminal units designated by said CPU;

a second register for receiving said up-information from said multiplexer at said first time to temporarily store said up-information, and for sending out said up-information stored to said central office line interface at said second time; and timing generation means for preparing said first time and said second time, in which one frame is constructed by said up-information and said down-information, and a guard time is provided between said up-information and said down-information according to time-delay in transmission of said up-information and said down-information.

2. A key telephone system including a master control unit, a plurality of terminal units connected to said master control unit, a central office line interface for connecting a central office line to said master control unit, and a CPU connected to said master control unit for controlling transmission and exchange for signals in which down-information to be transmitted from said master control to said terminal units and up-information to be transmitted from said terminal units to said master control unit are subjected to PCM communication, wherein;

said master control unit is provided with an extension communication trunk; and said extension communication trunk comprises:

a first multiplexer for receiving first up-information from first terminal unit of said terminal units designated by said CPU;

a first register for receiving said first up-information from said first multiplexer at a first time to temporarily store said first up-information, and for sending out said first up-information thus stored at a second time;

a first demultiplexer for sending out said first up-information sent out from said first register to a second terminal unit designated by said CPU as down-information;

a second multiplexer for receiving a second up-information from said second terminal unit designated by said CPU;

a second register for receiving said second up-information from said second multiplexer at said first time to temporarily store said second up-information, and for sending out said second up-information at said second time;

a second demultiplexer for sending out said first up-information from said second register to said first terminal unit designated by said CPU as down-information;

a first sending-out control means provided between said first register and said first demultiplexer for preventing the output of said first register from being sent out to said first demultiplexer according to an instruction from said CPU; and a second sending-out control means provided between said second register and said second demultiplexer for preventing the output of said second register from being sent out to said second demultiplexer according to an instruction from said CPU.

3. A key telephone system including a master control unit with a central office line communication trunk and an extension communication trunk, a plurality of terminal units connected to said master control unit, a central office line interface for connecting a central office line to said master control unit, and a CPU connected to said central office line interface and said master control unit for controlling signal transmission and signal, exchange in which down-information to be transmitted from one of said central office line and said master control unit to said terminal units, and up-information to be transmitted from said terminal units to one of said central office line and said master control unit are subjected to PCM communication, said central office line communication trunk comprising:

a first register for receiving first down-information from said central office line interface at a first time to temporarily store said first down-information, and for sending out said first down-information at a second time;

a first demultiplexer for sending out said first down-information from said first register to a first terminal unit designated by said CPU;

a first multiplexer for receiving a first up-information from said first terminal unit designated by said CPU; and a second register for receiving said first up-information from said first multiplexer at said first time to temporarily store said first up-information, and for sending out said first up-information to said central office line interface at said second time; and said extension communication trunk comprises:

a second multiplexer for receiving a second up-information from a second terminal unit designated by said CPU;

a second register for receiving said second up-information from said second multiplexer at said first time to temporarily store said second up-information and for sending out said second up-information at said second time;

a second demultiplexer for sending out said second up-information sent from said second register at said second time to a third terminal unit designated by said CPU as down-information;

a third multiplexer for receiving a third up-information from said third terminal unit designated by said CPU;

a third register for receiving said third up-information from said third multiplexer at said first time to temporarily store said third up-information, and for sending out said third up-information at said second time; and a third demultiplexer for sending out said second up-information sent from said third register at said second time to said second terminal unit designated by said CPU as down-information.

4. A key telephone system including a master control unit, a plurality of terminal units connected to said master control unit, a central office line interface for connecting a central office line to said master control unit, and a CPU connected to said central office line interface and said master control unit for controlling signal transmission and signal exchange, in which down-information to be transmitted from one of said central office line and said master control unit to terminal units and up-information to be transmitted from said terminal units to one of said central office line and said master control unit are subjected to PCM communication, wherein:

said master control unit is provided with a conference communication trunk, and said conference communication trunk comprises:

at least three multiplexers for receiving at least one of up-information from said terminal units designated by said CPU and down-information from said central office line, respectively;

at least three serial/parallel registers each being provided at said three multiplexers, correspondingly, for subjecting said at least one of up-information and down-information sent from said multiplexers to serial/parallel conversion at a first time, respectively;

time-division means for inputting said at least one of up-information and down-information subjected to serial/parallel conversion to time-divide said at least one of up-information and down-information into one parallel down-information at a predetermined time;

adder means for inputting said one parallel down-information to carry out conference operation;

at least three parallel/serial registers for receiving the result of said conference operation output from said adder means at a predetermined time to subject said result of said conference operation to parallel/serial conversion, and for sending out said result of said conference operation thus subjected to parallel/serial conversion at a second time, respectively; and at least three demultiplexers each being provided at said parallel/serial registers, correspondingly, for seconding out the result of said conference operation subjected to parallel/serial conversion by said parallel/serial registers to one of said terminal units designated by said CPU and said central office line as up-information.

5. A key telephone system as claimed in claims 1, 2, 3 or 4, further comprising timing generation means for preparing said first time and said second time, in which one frame is constructed by said up-information and said down-information, and a guard time is provided between said up-information and said down-information according to time-delay in transmission of said up-information and said down-information.

6. A key telephone system as claimed in claim 3, further comprising:

at least three fourth multiplexers for receiving at least one of up-information sent from said terminal units designated by said CPU and down-information sent from said central office line, respectively;

at least three serial/parallel registers each being provided at said fourth multiplexers, correspondingly, for subjecting said at least one of up-information and down-information sent from said fourth multiplexers to serial/parallel conversion at a first time, respectively;

time-division means for dividing said at least one of up-information and down-information subjected to serial/parallel conversion by said serial/parallel registers into one parallel down-information at a predetermined time;

adder means for inputting said one parallel down-information to carry out conference operation;

at least three parallel/serial registers for receiving the result of the conference operation output from said adder means at a predetermined time to subject said result of the conference operation to parallel/serial conversion, and for sending out said result of the conversion operation thus subjected to parallel/serial conversion at a second time, respectively;

at least three fourth demultiplexers each being provided at least parallel/serial registers, correspondingly, for sending out the result of the conference operation subjected to parallel/serial conversion by said parallel/serial registers to one of said terminal units designated by said CPU and said central office line as up-information.

7. A key telephone system including a master control unit, a plurality of terminal units connected to said master control unit, a central office line interface for connecting a central office line to said master control unit, and a CPU connected to said central office line interface and said master control unit for controlling transmission and exchange for signals, in which down-information to be transmitted from said central office line to said terminal units and up-information to be transmitted from said terminal units to said central office line are subjected to PCM communication, wherein:

said master control unit is provided acentral communication trunk, and said central office line communication trunk comprises:

a register for receiving a first down-information from said central office line interface at a first time to temporarily store said first down-information, and for sending out said first down-information at a second time;

a demultiplexer for sending out said first down-information sent from said register to other central office line communication trunk designated by said CPU;

a multiplexer for receiving a second down-information from said other central office line communication trunk designated by said CPU; and means for sending out said second down-information from said multiplexer to said central office line interface as up-information when said CPU designates other central office line communication trunk.

* * * * *